United States Patent
Shane

(10) Patent No.: US 7,280,519 B1
(45) Date of Patent: Oct. 9, 2007

(54) DYNAMIC METROPOLITAN AREA MOBILE NETWORK

(76) Inventor: Darrell Harvey Shane, 17229 Weddington St., Encino, CA (US) 91316-2645

(*) Notice: Subject to any disclaimer, the term of this patent is extended or adjusted under 35 U.S.C. 154(b) by 1013 days.

(21) Appl. No.: 10/338,210

(22) Filed: Jan. 7, 2003

Related U.S. Application Data

(60) Provisional application No. 60/346,652, filed on Jan. 8, 2002.

(51) Int. Cl.
H04Q 7/24 (2006.01)
H04L 12/66 (2006.01)
H04L 12/56 (2006.01)

(52) U.S. Cl. ............... 370/338; 370/346; 370/352; 370/401

(58) Field of Classification Search ............... None
See application file for complete search history.

(56) References Cited

U.S. PATENT DOCUMENTS

| | | |
|---|---|---|
| 5,850,592 A | 12/1998 | Ramanathan |
| 6,028,857 A | 2/2000 | Poor |
| 6,046,978 A | 4/2000 | Melnik |
| 6,055,429 A | 4/2000 | Lynch |
| 6,075,783 A | 6/2000 | Voit |
| 6,104,712 A | 8/2000 | Robert et al. |
| 6,134,587 A | 10/2000 | Okanoue |
| 6,160,804 A | 12/2000 | Ahmed et al. |
| 6,185,204 B1 | 2/2001 | Voit |
| 6,201,965 B1 | 3/2001 | Mizell et al. |
| 6,219,715 B1 | 4/2001 | Ohno et al. |
| 6,243,585 B1 | 6/2001 | Pelech et al. |
| 6,285,684 B1 | 9/2001 | Suzuki et al. |
| 6,298,234 B1 | 10/2001 | Brunner |
| 6,304,556 B1 | 10/2001 | Haas |

(Continued)

FOREIGN PATENT DOCUMENTS

WO    WO 99/16263    4/1999

(Continued)

OTHER PUBLICATIONS

Imielinski, T. and Navas, J., Internet Engineering Task Force Network Working Group, Request for Comments:2009, Nov. 1996, "GPS-Based Addressing and Routing", Rutgers University.

(Continued)

Primary Examiner—Chi Pham
Assistant Examiner—Soon D. Hyun
(74) Attorney, Agent, or Firm—Michael Blaine Brooks, P.C.; Michael B. Brooks

(57) ABSTRACT

Disclosed is a scalable, hybrid mobile network termed the Metropolitan Area Mobile Network (MAMN) based on a new dynamic mobile network protocol-DynaMo. DynaMo supports TCP/IP based communication between nodes, whether they are moving or stationary. DynaMo is a location-based routing technique that integrates MAMN, with wired TCP/IP networks (such as the Internet). Through the disclosed use of a modified Domain Name Services (DNS), communication between wired and wireless nodes, moving or stationary, is supported and is transparent to the end-user. DynaMo supports the use of multiple channels and implements a scheme for channel reuse. A hybrid encryption mechanism, based on public/private key pairs enables signed and secure communication.

10 Claims, 91 Drawing Sheets

U.S. PATENT DOCUMENTS 6,307,843 B1    10/2001    Okanoue
6,535,498 B1*    3/2003    Larsson et al. ............. 370/338
6,990,075 B2*    1/2006    Krishnamurthy et al. ... 370/236

FOREIGN PATENT DOCUMENTS

WO    WO 01/10086    2/2001
WO    WO 01/69862    9/2001

OTHER PUBLICATIONS

Davis, C., Vixie, P., Goodwin, T., and Dickinson, I., Internet Engineering Task Force Network Working Group, Request for Comments:1876, Jan. 1996, "A Means for Expressing Location Information in the Domain Name System".

Farrell, C., Schulze, M., Pleitner, S., and Baldoni, D., Internet Engineering Task Force Network Group, Request for Comments: 1712, Nov. 1994, "DNS Encoding of Geographical Location".

Perkins, C., Internet Engineering Task Force Network Working Group, Request for Comments: 3220, Jan. 2002, "IP Mobility Support for IPv4", Nokia research Center.

Perkins, Charles E., *Ad Hoc Networking*, 2001, pp. 7, 8, 141-158, 173-190, 225-232, 258, 354-355. Addison-Wesley, USA.

* cited by examiner

DYNAMIC METROPOLITAN AREA MOBILE NETWORK

CROSS-REFERENCE TO RELATED APPLICATION

This application claims the benefit of the following U.S. Provisional Application, the disclosure of which, including all appendices and all attached documents, is hereby incorporated herein by reference in its entirety for all purposes: U.S. Provisional Application No. 60/346,652, of Darrell Harvey Shane entitled, "TOWARDS A DYNAMIC MOBILE NETWORK, THE DESIGN OF A METROPOLITAN AREA MOBILE NETWORK-MAMN," filed Jan. 8, 2002.

RESERVATION OF COPYRIGHT

The disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND

1. Field of the Invention

The present invention relates to mobile communications networks and, more particularly to ad hoc network route creation protocols and route maintenance protocols using a modified Domain Name Service.

2. Description of the Prior Art

Cellular service providers presently offer limited mobile data networking services even though their cellular networks are particularly designed to carry voice communications more than data-rich transmissions. The amount of RF spectrum assigned to a voice channel is carefully sized to carry voice, but this sizing can be a severe limitation when carrying data. The networking technology used to carry voice is based on "virtual private circuits." That is, once a connection is established and regardless of how infrequently the channel is used, charges are based on the amount of time the circuit exists. In contrast, data networks employ a technology called "packet switching" that allows for a more equitable rate structure based on network usage (i.e., the number of data packets delivered). Another benefit of packet switching is that the hardware is comparatively less expensive and easier to maintain.

The Internet is comprised substantially of a vast collection of interconnected wired networks. Routers connect networks to each other. Each router maintains a routing table that identifies the networks and routers reachable from that router. Routing tables work well in situations where the connectivity between nodes does not change rapidly. Every computer connected to the Internet has a unique Internet protocol (IP) address that encodes necessary information usable for routing packets to that node. A node cannot be disconnected from one network and connected to a different network without changing the IP address of the node. It is generally understood that the performance of conventional techniques used for routing packets through the Internet degrades in larger networks with rapidly changing configurations such as a metropolitan area mobile network.

Current cellular mobile networks are not entirely mobile, that is, while the terminal (customer) nodes are mobile, the rest of the network is stationary. In contrast, ad hoc networks are mobile networks in which intermediate nodes (as well as terminal nodes) can move while they relay data. By combining the features of the cellular mobile network with an ad hoc network into a "hybrid mobile network," cellular service providers realize significant benefits. For example, presently the coverage area of conventional cellular mobile networks only extends as far as the area covered by its mobile base stations. If a new area is to be covered by the mobile network, additional mobile base stations must be erected and strategically placed. In a hybrid mobile network, packets of data hop from mobile node to mobile node until the packets reach their destinations or a mobile base station. Thus, the coverage area of the hybrid mobile network extends much further than that of a conventional cellular mobile network. In a hybrid mobile network, the area has overlapping coverage, resulting in a more resilient and robust network. Suppose a mobile base station is experiencing hardware problems; network traffic through that base station is rerouted to neighboring mobile base stations by "hopping" through mobile nodes in the vicinity. In addition, when a mobile base station is deluged with communication requests, some of the congestion is offloaded to neighboring mobile base stations by hopping from mobile node to mobile node. Another advantage is that while still providing broad coverage, cellular service providers have an option to deploy new services to a select subset of mobile base stations. A hybrid mobile network establishes a growth path to a unified wireless, IP-based, packet-switching network for all data, including voice.

A proactive-reactive hybrid routing protocol is disclosed for use in ad-hoc networks in U.S. Pat. No. 6,304,556, issued Oct. 16, 2001 to Z. J. Haas, entitled "Routing and Mobility Management Protocols for Ad-Hoc Networks," assigned to Cornell Research Foundation, Inc. The mobility management protocol has some of the network nodes assuming the mobility management function by forming a virtual network embedded within the actual ad-hoc network with each participating management node knowing and communicating the location of all nodes within its zone. Other mobility management techniques are discussed in U.S. Pat. No. 6,160,804, issued Dec. 12, 2000 to W. Ahmed, et al., entitled "Mobility Management for a Multimedia Mobile Network," assigned to Lucent Technologies, Inc.

SUMMARY

Disclosed is a metropolitan area mobile network (MAMN) that is a foundation for an entirely new class of applications in which communication services are offered to customers wherever they are and charged for the communication services they actually use (e.g., the data packets that travel over a private wireless channel or that pass through a "gateway" node into/from a public or private network). The business model is tiered with costs proportional to the Type of Service (ToS) used. The most basic tier, communicating over the public airwaves, is free. However, one must realize that like our public transportation system, the public spectrum is used by many and can become congested making it inappropriate for certain types of data. For example, large volume data transfers and time sensitive data (like audio and video streams) require a different type of service. Communication Service Providers (CSP) will offer different ToS communications (such as higher capacity or higher quality channels) and charge for their use.

To remain or become competitive, every modern network must consider offering access to the Internet, and a metropolitan area mobile network (MAMN) is no exception. The dynamic mobility (DynaMo) protocol of the several embodiments of the present invention is designed to allow data to flow smoothly to and from wired networks, transparent to the end user.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION

Several embodiments of the present invention comprises a reactive, wireless, ad hoc, Internet protocol that routes packets based on location. This protocol, Dynamic Mobility or DynaMo, also provides a means for connecting to wired networks.

Network Topology

In describing the correlation between geographic and network topologies, practitioners in the field recognize that in creating planar projections of particular areas of a Earth's spheroidal surface, the directional properties can be generally preserved while linear distances are distorted albeit for relatively small areas, these distortions are negligible in most practical applications.

Figure 1:
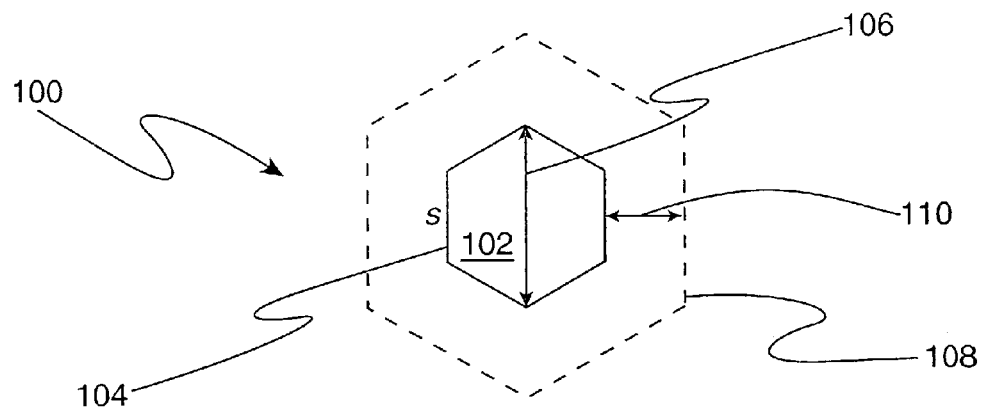
FIG. 1 is a diagram of a single cell structure.

A regular hexagon is termed a cell with side length s. FIG. 1 illustrates a cell 100 with a side length, s 104, outer boundary, ϵ 110, and an outer perimeter 108. A cell is a small area, thus its distortion when projected onto a map is ignored. Cells are oriented with left and right sides parallel to a y-axis 106. The center of a cell is termed its centroid.

Figure 2:
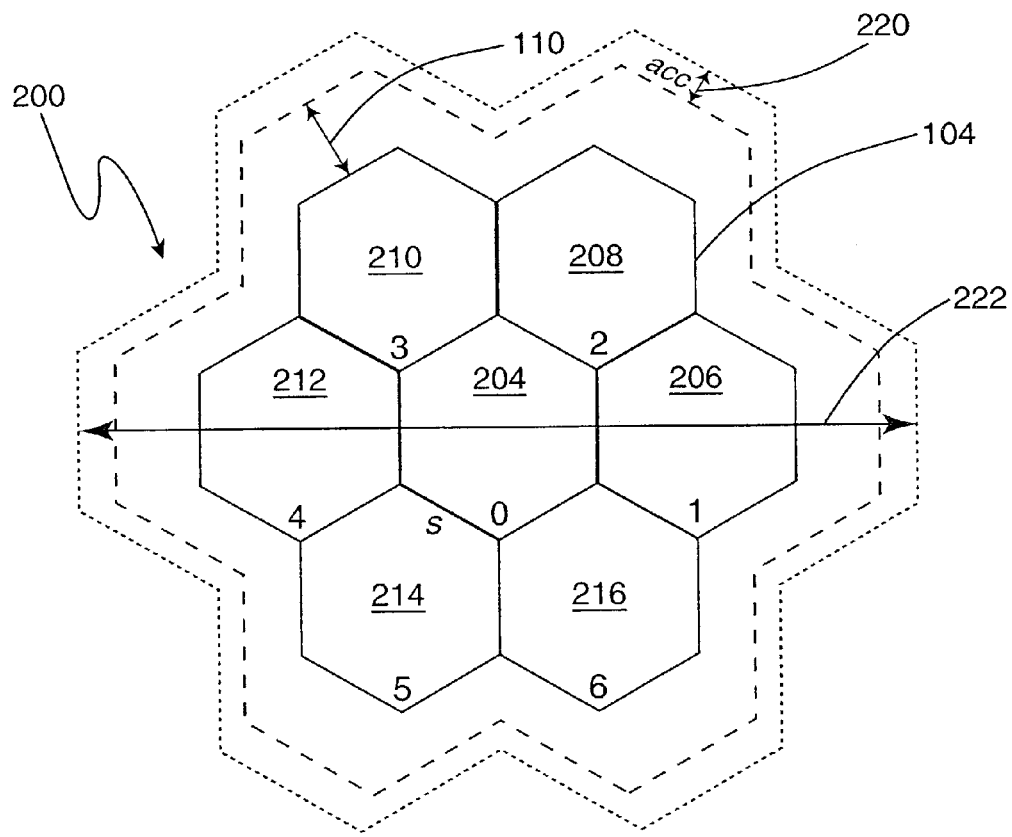
FIG. 2 is a diagram of a cell neighborhood.

For purposes of several embodiments of the present invention, a node is a host contained by a particular cell 100 that has at least one transceiver and is able to determine its position at anytime. A neighborhood is a center cell and its 6 adjacent cells, each sharing a common side with the center cell. FIG. 2 illustrates the preferred circumstance where any transmitting node is able to communicate directly with any other node within the neighborhood 200 of the transmitting node's containing cell. That is, in the preferred embodiment, nodes in cell 204 are able to communicate with nodes in adjacent cells 206, 208, 210, 212, 214, 216 with ongoing communications continuing robustly with the moving of a communicating node across a cell boundary. The outer boundary, ϵ 110, provides a "buffer region" in which a node leaving the cell has time to adjust before entering another cell. The value of the outer boundary 110 is a balance between network resilience when confronted with signal interference and cell size. A reasonable value for ϵ 110 is side length s 104. The constant "acc" is the accuracy of the Global Positioning System, GPS 220, and is usually set to a conservative value of 10 meters. The broadcast radius, μ 222, of a node can be represented by:

$$\mu = 6 \times \frac{\sqrt{3}}{2} s + 2\varepsilon + 2acc \quad [1]$$

and the side length s 104 can be represented by:

$$s = (\mu - 2\epsilon - 2acc) \div 3\sqrt{3}. \quad [2]$$

A set of horizontally adjacent cells all with a side length, s 104, can be termed a cell row. The nature of abutted hexagonal cells causes the top and bottom sides of a cell row to be comprised of alternating extended and recessed portions. The extended portions can be termed peaks and the recessed portions, valleys. It follows that if the valleys of the top side of a first cell row are substantially coincident with the peaks of the bottom side of a second cell row, then the two cell rows are adjacent. A set of adjacent cell rows in which all cells have the same side length s 104 is called a band. An area, a, is said to cover an area, a', if every point in a' is also a point in a. Thus, a' is covered by a, and a covers a'. A rectangle is an area defined by two points: the lower left corner ($lat_0$, $lon_0$) and the upper right corner ($lat_1$, $lon_1$) whose sides are parallel to the axes. The interior rectangle of a band is the largest rectangle completely covered by the band. The exterior rectangle of a band is the smallest rectangle that completely covers the band.

Two bands are adjacent if the top edge of the interior rectangle of one band is co-linear with the bottom edge of the exterior rectangle of the other and if the bands' vertical bisectors are co-linear (i.e., they are centered). The alignment of the peaks and valleys of the two bands is not exact because the cell side lengths, s 104, are not equal. A covering is a set of adjacent bands. Given an area and a value for radius, μ 222, the minimum covering is the smallest covering that covers the area. The following containment expression holds:

$$area \subseteq interior\ rectangle \subseteq exterior\ rectangle, \quad [3]$$

where interior rectangle is the minimum covering's interior rectangle, and exterior rectangle is the minimum covering's exterior rectangle.

The bottom of the interior rectangle of the lowest band is co-linear with the bottom of the minimum rectangle. The center of the area is coincident with the center point of the covering.

Figure 3:
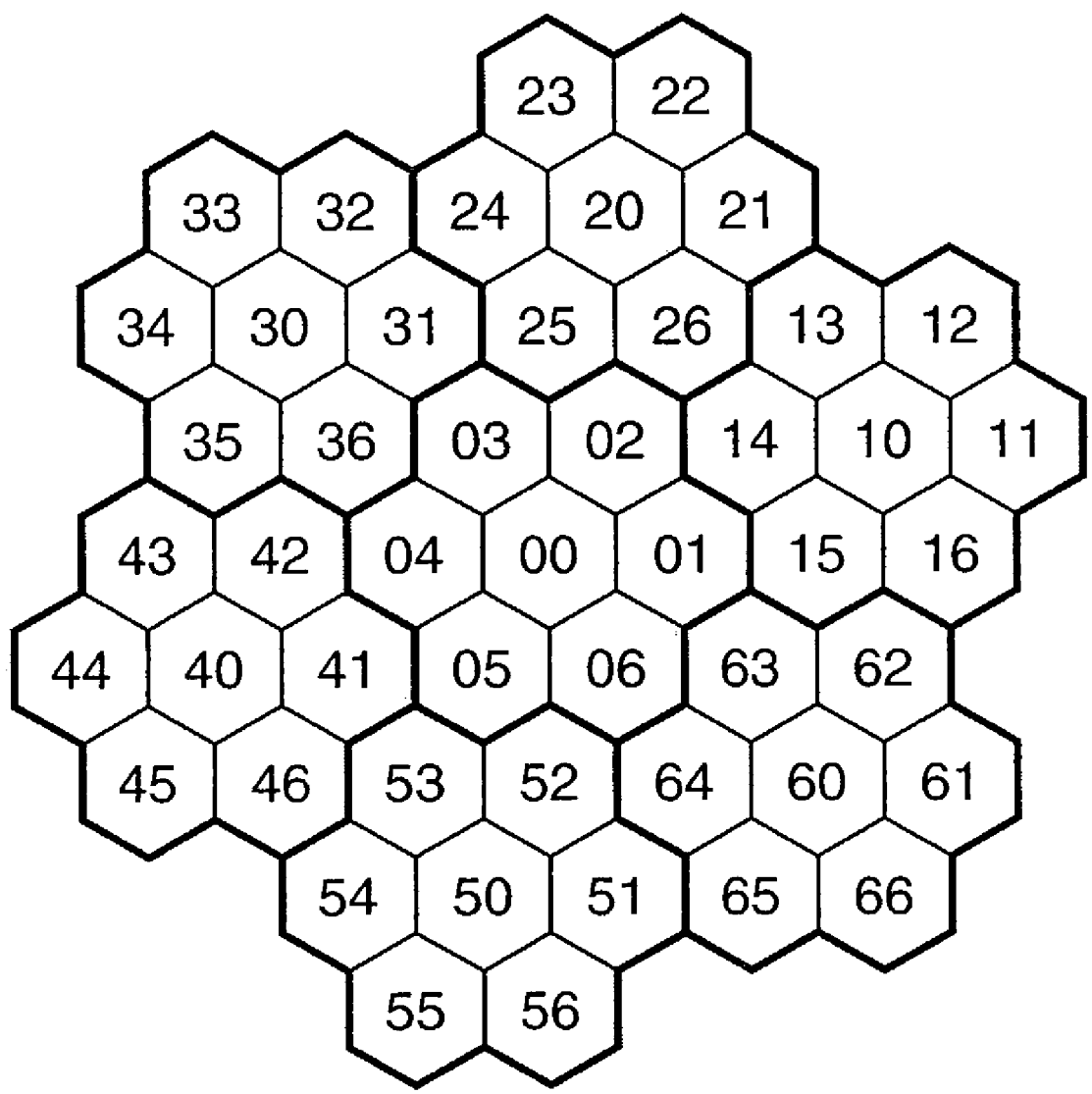
FIG. 3 illustrates a 2-cluster with center 1-cluster outlined in bold.
Figure 4A:
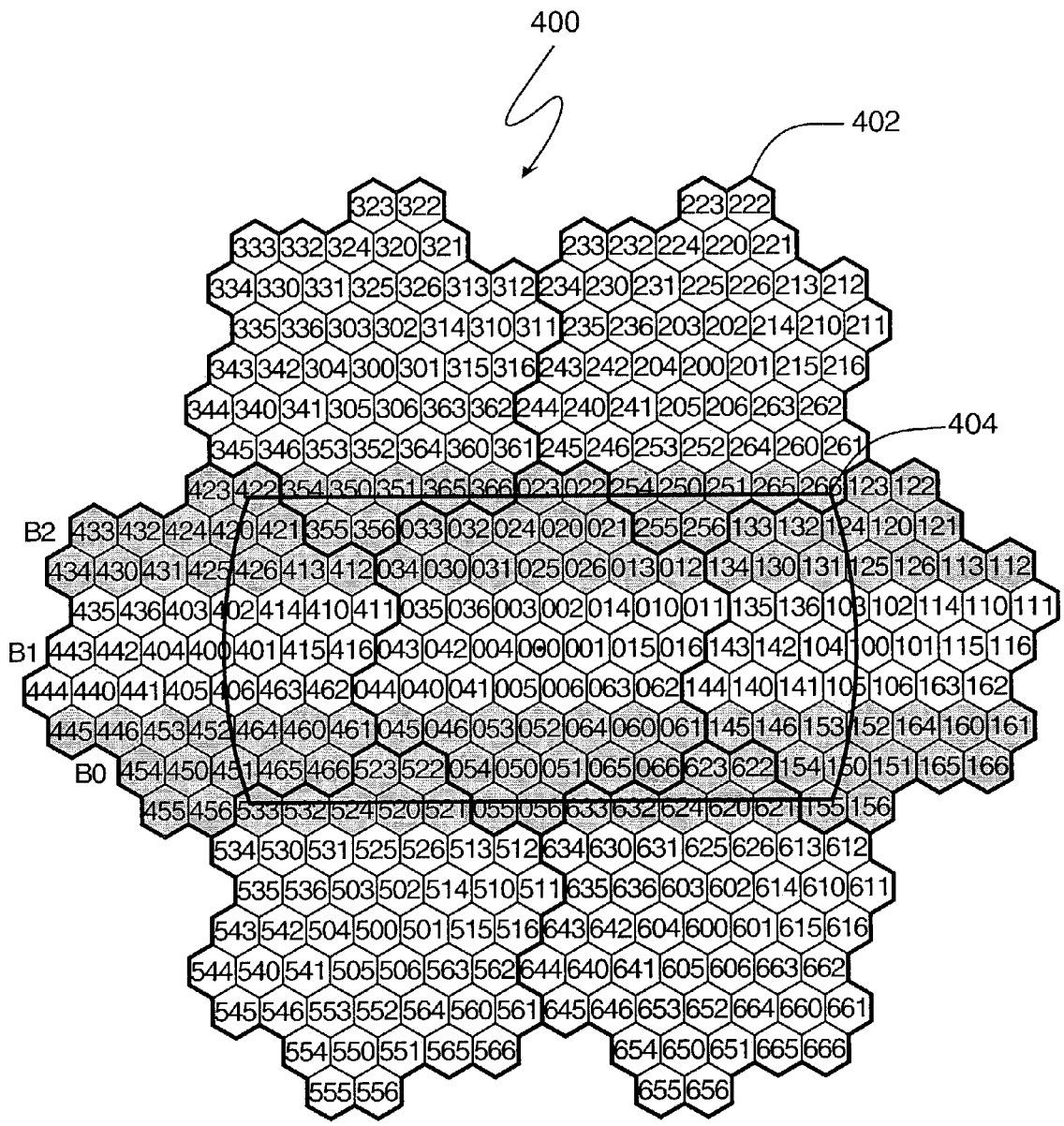
FIG. 4A illustrates a Rectangular area of the Earth covered by a 3-cluster.
Figure 4B:
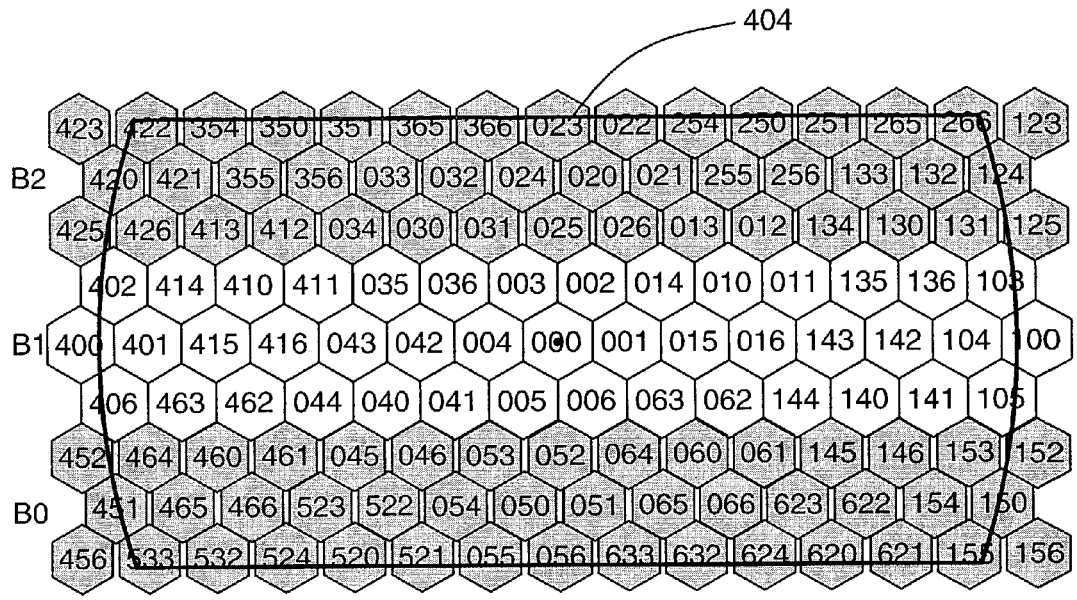
FIG. 4B illustrates a Minimum covering of a rectangular area of the Earth.

A 0-cluster, or zero-cluster, is an alternate name for a cell. A 1-cluster, or one-cluster, is either a neighborhood or a neighborhood surrounded by a ring of 12 cells. Illustrated in FIG. 3 is a 2-cluster, or two-cluster, inherently with neighborhoods as 1-clusters. In general, an n-cluster is an aggregate of seven "(n−1)-clusters." The utility of clusters is that they nest and thus naturally form a hierarchy. In particular, this hierarchy provides a kind of efficiency that several embodiments of the present invention exploit. The numbering of cells within a cluster illustrates how a hierarchy is constructed and is critical to integrating the wireless and wired networks as described below. FIG. 4A illustrates the rectangular area of the Earth 404 covered by the smallest n-cluster 400 of cells 402 (which happens to be a 3-cluster). FIG. 4B illustrates the minimum covering of the region 404. The minimum covering 404 is comprised of three adjacent bands: (a) band 0, B0; band 1, B1; and band 2, B2. Band 1 is centered about the equator and contains cells with the largest side length. The side length of the cells in band 0 and band 2 are equal but smaller than the cells in band 1. The radius of the slice of Earth at a given latitude shrinks as the distance from the equator increases and accordingly the cell columns converge.

Due to projection distortions, inequality in the size of the cells in band 0 trades with error in the positions of the cells. In FIG. 4B, the cell sizes are preserved in a two-dimensional display. In practice, the cell columns are aligned longitudinally and in order to maintain vertical alignment across all bands, gaps between cells in band 0 and band 2 appear in FIG. 4B, but are merely artifacts of this two-dimensional display.

Band 0 can be termed the bottom band, and band 2 can be termed the top band. Band 1 can be termed an interior band. Each cell in the n-cluster 400 has a unique cell number called its cellid.

Figure 4C:
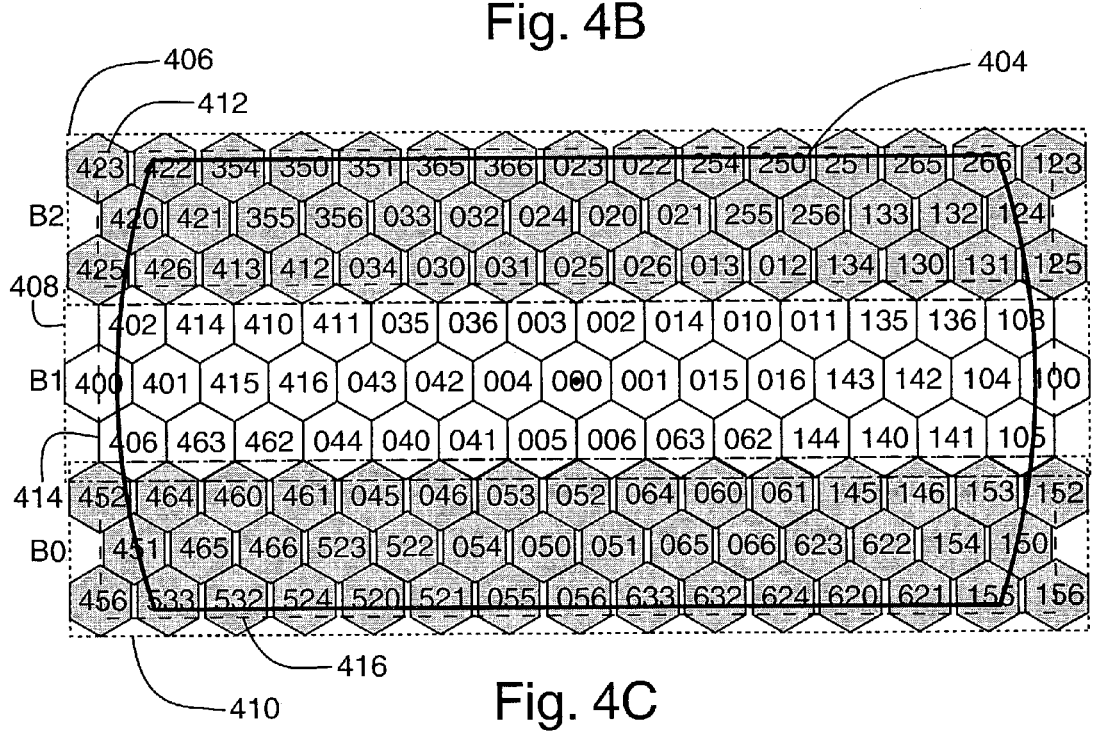
FIG. 4C illustrates the interior and exterior rectangles of three bands according to embodiments of the present invention.

In FIG. 4C, each band's interior rectangle is drawn as a dashed lined 412, 416, and the exterior rectangle is drawn as a dotted line 406, 408, 410.

In a covering as illustrated in FIG. 4C, a band transition is the latitudinal position of the last cell row in a band 414; it is when the following inequality first becomes true:

$$\mu \times abs(\cos(lat_1) - \cos(lat_0)) > acc. \quad [4]$$

Where $lat_0$ is the bottom of the interior rectangle of the band, and $lat_1$ is the top of the exterior rectangle. Thus, the difference between the projection of μ onto the Earth's surface at any two cell center points in a band cannot exceed the GPS accuracy acc. In FIG. 4C, there are two band transitions. A node located close to a band transition could be using a radius, μ 222, which is off by ±acc when communicating with a node in the other band. A band can be considered as the largest area in which distortion, due to the map projection, can be ignored.

A clique is set of cells in which each cell has its own unique control channel (and possibly its own unique data channel). The size of the cell group determines the frequency of channel reuse. The more cells per clique the less chance of interference from communication in surrounding cells. However, the clique size needs to be weighed against the total number of distinct channels required. DynaMo embodiments of the present invention work with a clique of size 7 or 19. When a receiving node broadcasts a busy tone while receiving, then the "hidden terminal problem" is further reduced. A cell's cellid is used to determine its various communication class channels.

Communication Classes

As previously discussed, data are divided into packets. Packets originate at a source node and are successfully delivered to the destination node. Between the source and destination, a packet is relayed from one intermediate node to another. Accordingly, a sender is either the source node or an intermediate node and, in either case, a sender moves the packet closer towards the destination. A recipient is either the destination node or an intermediate node. The recipient is the node to which the sender relays the packet along its journey to the destination. A relay node is either the source node, the destination node or one of the intermediate nodes. A route is the ordered set of relay nodes from source to destination. A pair of nodes, a sender and a recipient, can be termed a step along the route and a packet is said to have moved a step along its route when it has been successfully transmitted from the sender to the recipient. The sender and recipient of a step are called adjacent nodes. In general, the channel on which a packet is sent is determined by the recipient's cell and the type of communication to follow, called the communication class. A sender relays a packet to a recipient by broadcasting to the recipient on the appropriate channel. A sender's broadcast on a recipient's channel is termed cell-cast where cell-casting is an integral action in route creation.

A transient route is a route whose previous steps are forgotten and whose future steps are yet unknown. Thus, at any particular moment, only the current step of a transient route is known. As soon as the packet moves a step along its route, the previous step is disbanded.

The communication classes in which a node is intended to participate aid in determining its hardware requirements. There are five distinct classes of communications: (a) control, C0; connectionless, C1; connection-based, C2; circuit-based, C3; regioncasting, C4; and multicasting, C5. A covering must support at least classes C0 and C1, while the remaining classes are optional.

C0 class communication includes packets used to create, maintain and disband a route. A mobile node informs other nodes when it moves to a new cell via C0 channels. To reduce cross-talk and increase network utilization, each cell in a clique has its own control channel.

C1 class communication corresponds to individual data packets that have no relationship to previous or future packets. Connectionless class communication can be used to deliver packets comparable to the Internet Control Message Protocol (ICMP) and User Datagram Packets (UDPs). The same clique used for determining C0 communication is used to distinguish between the various C1 channels.

Both C0 and C1 communication classes establish a transient route in the process of delivering a single packet to the destination node. Communication based on transient routes requires that a node have at least one transceiver capable of tuning any C0 or C1 channel in the clique.

The C2 class forms the basis of end-to-end communications. The clique for C2 communication is the same as that used for C0 and C1 communication classes. The C2 channels may or may not be distinct from the C1 cell channels. C2 packets are only relayed on C2 channels, just as only C1 packets are relayed on C1 channels and C0 packets only on C0 channels.

An intermediate node receives a packet on the appropriate communication class channel of the containing cell of the node. The node then relays the packet to another node located in a neighboring cell on that cell's appropriate communication class channel. The route established to carry C2 communications persists until one of the relay nodes disbands the route. Adjacent nodes in a persistent route remain in mutual contact ensuring that the route remains unbroken. An intermediate node, n, performs localized route maintenance when one of the following five events occurs: (1) n moves to another cell; (2) either sender node of node n moves to another cell; or (3) recipient node of node n moves to another cell; (4) when the source moves to a new cell; or (5) when the destination moves to a new cell.

There are three possible actions an intermediate node can take to maintain its portion of the route: (1) remove itself from the route, by joining its two adjacent nodes together; (2) find a replacement node to take its place; or (3) take no immediate action other than to continue remaining part of the route.

C2 class communication establishes a persistent route over which a sequence of packets is delivered. The route is bi-directional. That is, packets are delivered from source to destination as well as from destination to source. For a node to participate in C2 class communications, it must have at least two transceivers. The first transceiver monitors the C2 channel of the containing cell of the node and relays any data packets it receives in the appropriate direction. The second transceiver monitors the C0 and C1 channels of the containing cell of the node.

Connection-based route establishment is performed with C0 communication. However, once the route is established, communication between the source and destination nodes takes place over C2 channels. For example, if there is a route established between source node a and destination node b through the intermediate node n, then C2 packets traveling from a to n are broadcast on the C2 channel of the containing cell of n (n.cell.channel(C2)) and then from n to b, packets are broadcast on the C2 channel of b, (b.cell.channel(C2)). In the reverse direction of this example, b broadcasts to n on n.cell.channel(C2), and n broadcasts to a on a.cell.channel (C2).

Like C2 class communication, circuit-based communication establishes a route between the source and destination. C2 communication occurs on the C2 channel of the containing cell of each recipient node, whereas C3 communication occurs on channels specifically set aside for those communications requiring dedicated bandwidth. A route for C3 communication is established from a mobile base station to a terminal node. This ensures that the communication service provider (typically the owner or controller of the channels that are to be used for C3 communication) has control over specific channels to allocate to whom and when.

The establishment of the route is performed over C0 channels. However, once the route is established, the communication between relay nodes is performed over C3 channels. For each four-tuple of nodes (source, destination, sender, recipient), there is a different C3 channel, unique to the neighborhood, containing both the sender and recipient. For example, if there is a route established between source node α and destination node β through the intermediate node n, then C3 packets traveling from α to n are over the C3 channel C3(α, β, α, n), and from n to β, the C3 packets travel over C3(α, β, n, β). In the reverse direction of this example, β relays to n on C3(α, β, β, n) which is the same as C3(α, β, n, β), and n relays to α on C3(α, β, n, α)=C3(α, β, α, n).

C3 class communication establishes a persistent route for each of the two directions, i.e., a persistent route for the source-to-destination direction and a persistent route for the destination-to-source direction. For a node to participate in C3 communication, it must be equipped with at least three transceivers (a separate radio receiver and radio transmitter). A first transceiver monitors and relays packets along the route, source-to-destination. A second transceiver monitors and relays packets along the route, destination-to-source. A third transceiver monitors the C0 and C1 channels of the containing cell of the particular node.

Region-cast communication is communication class C4 and pertains to the broadcasting into a defined region. DynaMo provides a means for creating and, if needed, maintaining a route to a cell. A modified form of diffusion search is used to deliver packets to all cells in the region. Unlike communication classes C1, C2 and C3, region-casting is not point-to-point communication. Rather, region-casting is point-to-multipoint communication.

Like region-casting, multicasting is point-to-multipoint communication. The multicast communication is communication class C5 and pertains to a controlled diffusion of packets throughout the network. Gateway hosts (e.g., mobile base stations) are used to disseminate packets into the ad hoc network. The packets are spread throughout the network in the same way a diffusion search progresses.

Routing

Two nodes in a network can communicate provided there is a path between them. The process of constructing the path is called "route creation." Route creation is comprised of "hopping" from one intermediate node to the next and then searching for the destination node. A path can be entirely wireless or, more likely, combined wired and wireless. Once a persistent wireless route is established, it must be maintained. Route maintenance is a localized process where by each participating node optimizes its portion of the route. Routing within the wireless network requires that each node know its present position. A GPS receiver suffices for mobile nodes while stationary nodes can have their positions surveyed and pre-programmed. A node's present position is required to enable DynaMo routing. For instance, a node uses its position to determine its containing cell. Node positions are also used to rank competing nodes for the next leg during route creation. Domain Name System (DNS) is employed in a modified form as disclosed so to integrate the wired and wireless networks. The following details the route creation process, route maintenance and explains those changes needed of DNS to integrate the wireless and wired networks.

Wireless Network Routing

At its most basic level, DynaMo is a location-based routing protocol. At any time a node that is using DynaMo can determine the cell in which it is located. There are a few techniques a node can use to locate the node with which it wishes to communicate. Without any prior information, a node can perform a search for another node. Like the ripples formed when a pebble is thrown into a pond, a Diffusion Search is a search that begins at the center and in an orderly manner generally proceeds uniformly outward in all directions.

However, if a node possesses a "recent cellid" of the destination node, then a more efficient technique can be used to find a route between the source and destination nodes. The ideal route between source and destination is a straight line, l, connecting the centers of their respective containing cells. In the less than ideal circumstances of practical application, l is extended in a perpendicular second dimension to form a corridor. Any node in a cell whose center point is in this corridor can participate in the route. A route is created by sequentially connecting participating nodes. Route creation begins when the source node starts by selecting a neighboring cell whose center position, when projected onto l, is closer to the destination than the projected center of the cell containing the source node and then a node from the selected cell is chosen as a recipient. This process is called stepping and repeats until the destination node is found or until the cell known to the network to most recently have contained the destination cell is reached and thereafter a diffusion search is initiated to find the destination node. When the destination is found via a diffusion search, a route is constructed back to the node that launched the search and thusly a route is created. A route is optimal if the projection of the center of the cell onto l of each successive node in the route is closer to the destination, and the corridor contains the cell centers of all nodes participating in the route.

As nodes move, the route can become sub-optimal. It is the responsibility of each node participating in the route to locally optimize its portion of the route. An intermediate node has three possible actions it can take when the cell of either the source or destination node changes, or when either of the two adjacent route nodes change, or move to another cell. The intermediate node can: (a) remove itself from the route; (b) find a replacement node to take its place; or (c) make no change and continue to participate in the route. A cell is termed connected to a neighboring cell if there is at least one node in each cell. To keep the source and destination nodes connected to the intermediate nodes, both the source and destination are able to add additional nodes to the route as they move.

Establishing a Wireless Route

Figure 5A:
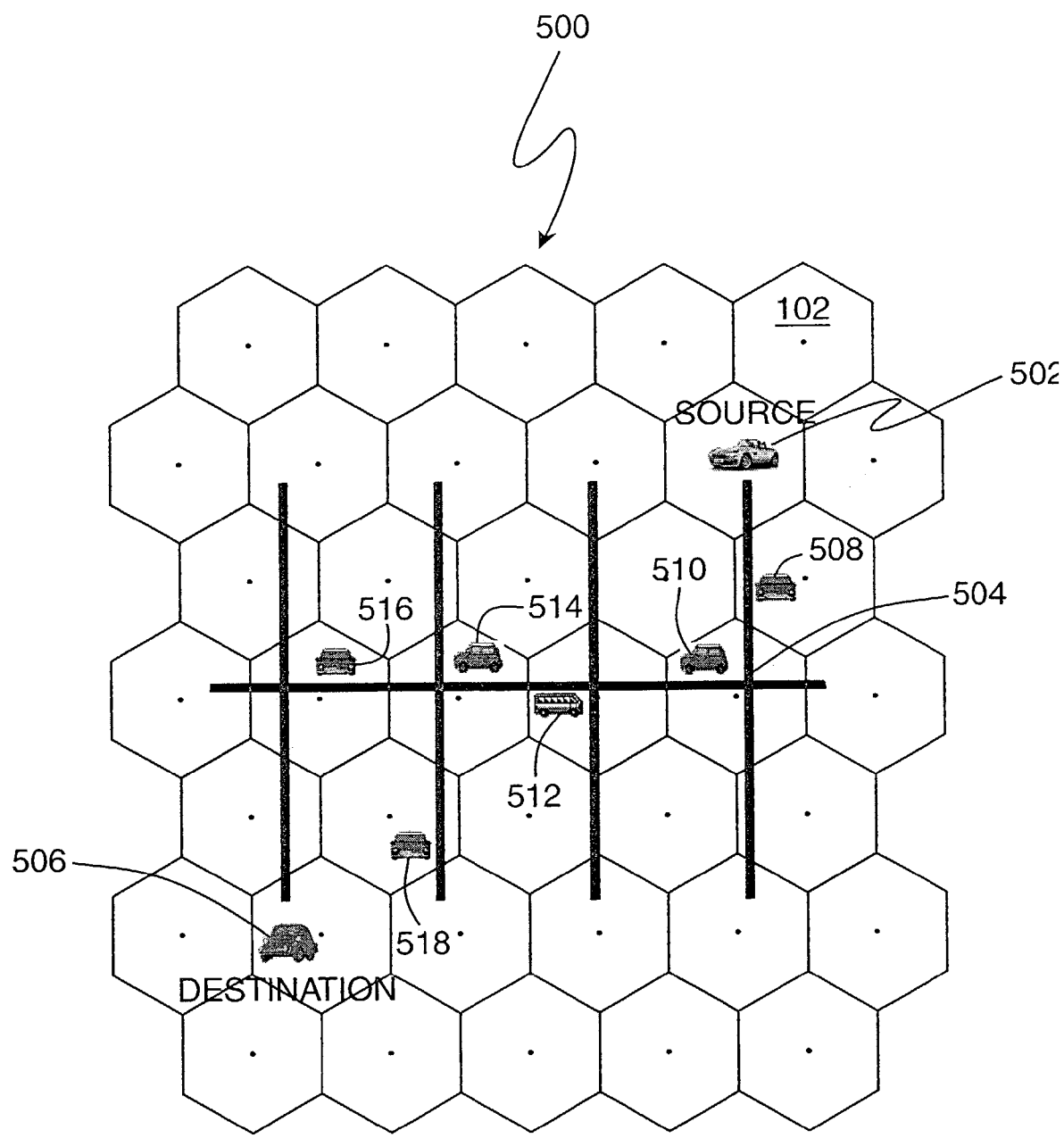
FIG. 5A illustrates a wireless route creation pictorial layout of route creation from source to destination.
Figure 5B:
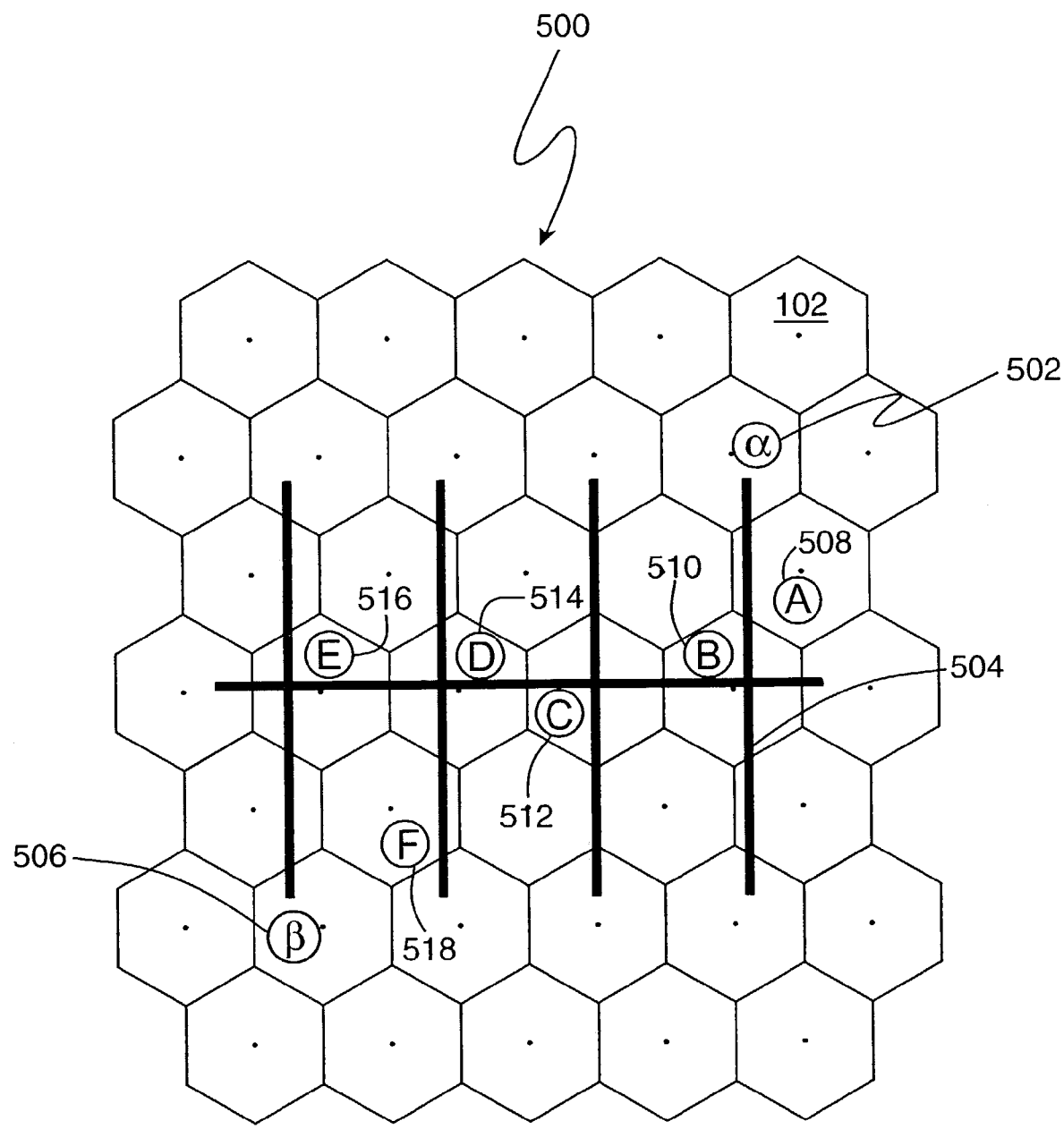
FIG. 5B illustrates a wireless route creation symbolic layout of route creation from $\alpha$ to $\beta$.

FIGS. 5A-5F illustrate an exemplary nodal array 500 (FIG. 5A). The icons represent automobiles, 506, 508, 510, 512, 514, 516, 518 and the bold lines represent streets 504. The area in this example is partitioned into 38 hexagonal cells, like 102. A first mobile node, as a source, α 502, seeks to communicate with a second mobile node, a destination, β 506, and where α 502 knows a cell in which β 506 was recently located. To more readily disclose the route establishing method further, the nodes are abstracted to alphabetical symbols in FIG. 5B.

Figure 5C:
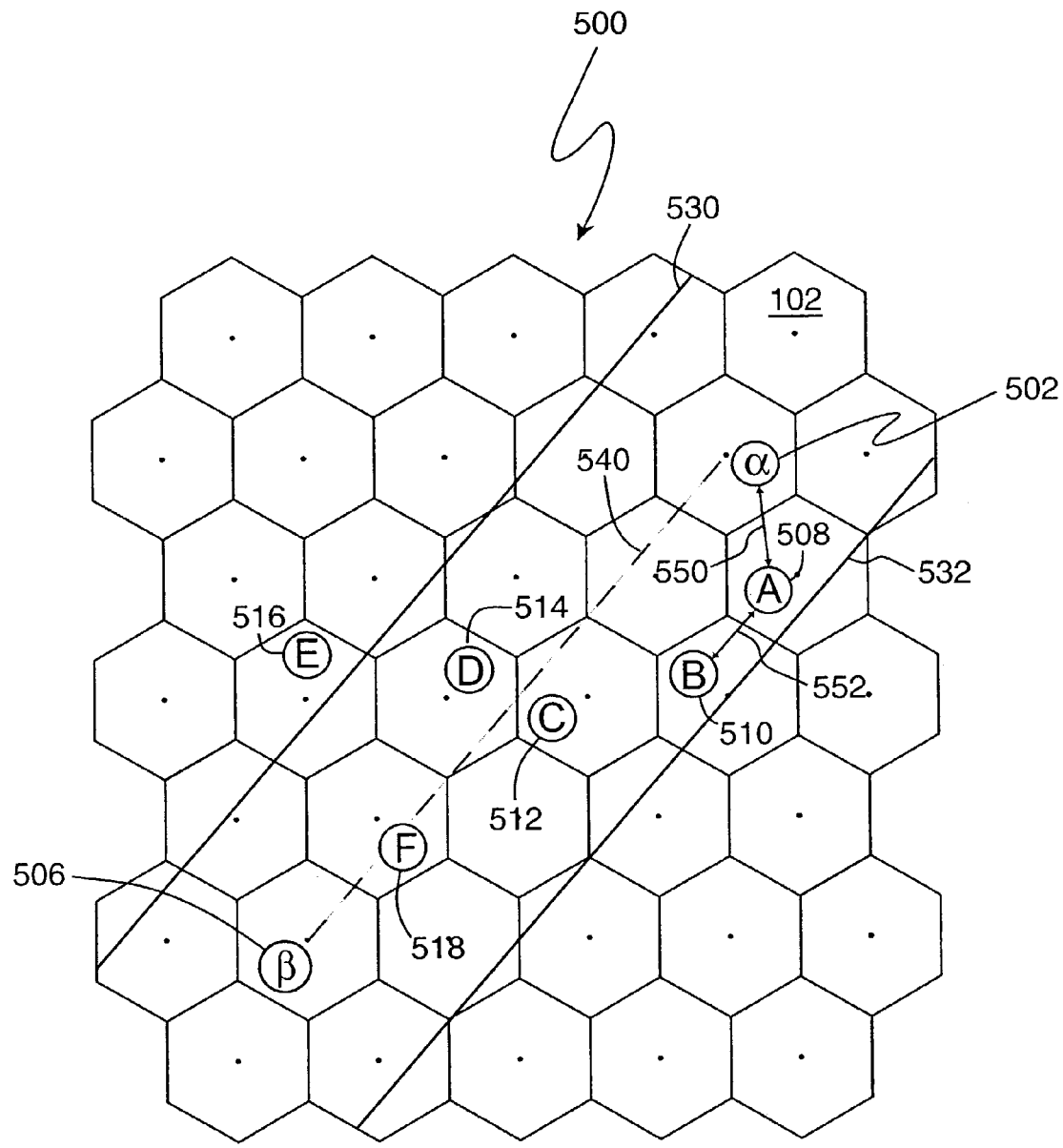
FIG. 5C illustrates a wireless route creation one leg at a time, route creation constraints and first two legs.
Figure 5D:
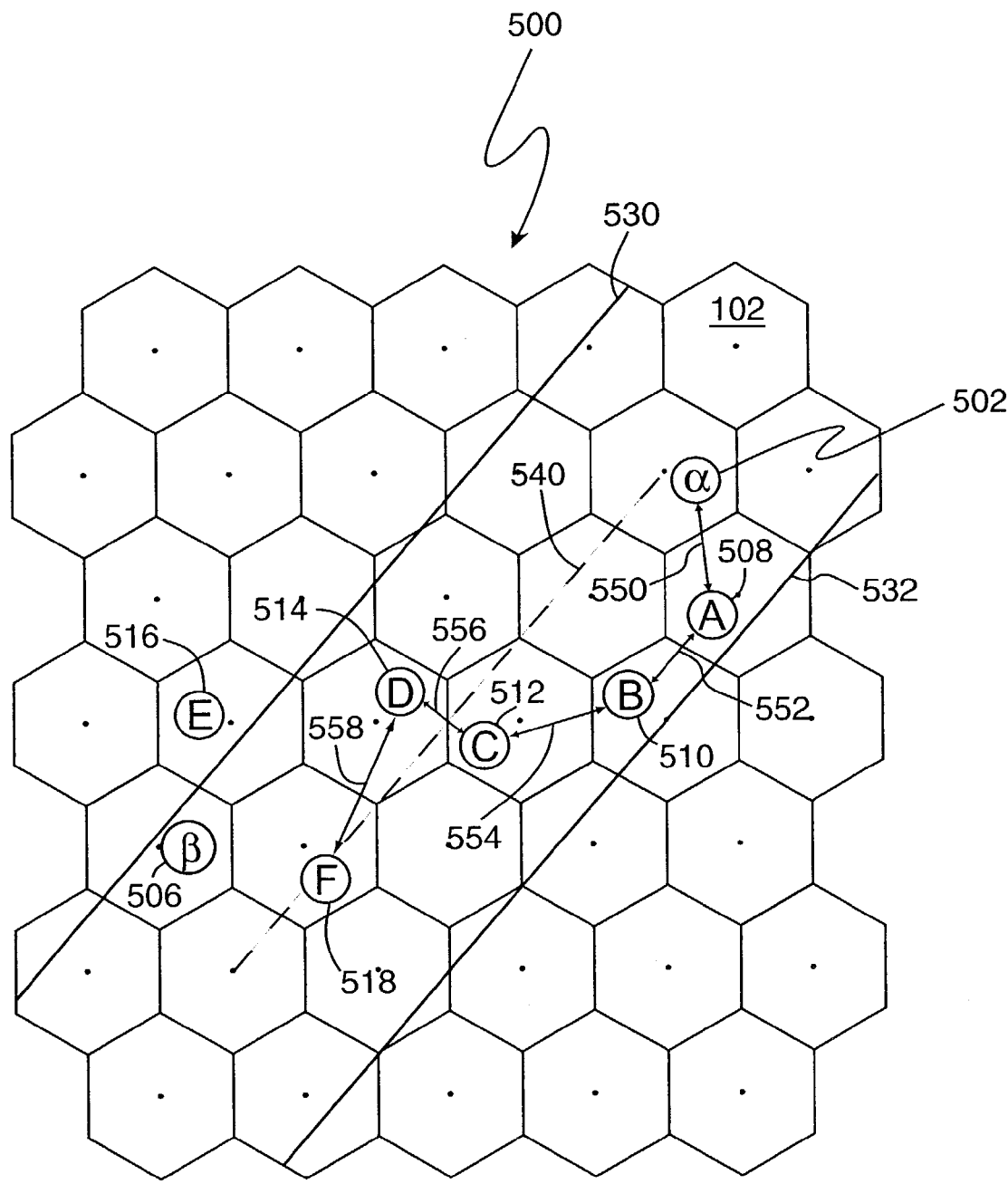
FIG. 5D illustrates a wireless route creation one leg at a time, route legs up to diffusion search.
Figure 5E:
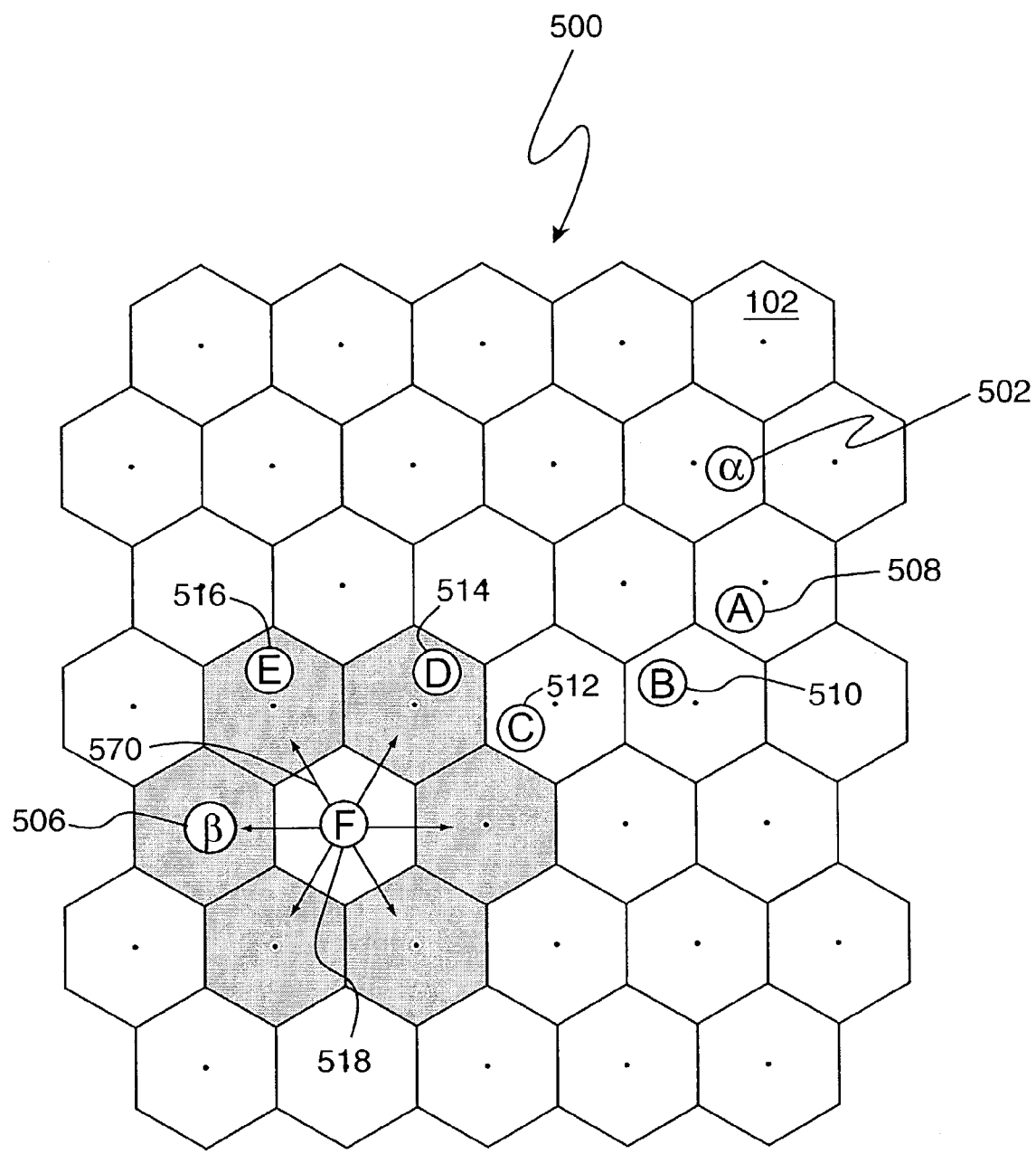
FIG. 5E illustrates a wireless route creation to destination node, diffusion search for destination.
Figure 5F:
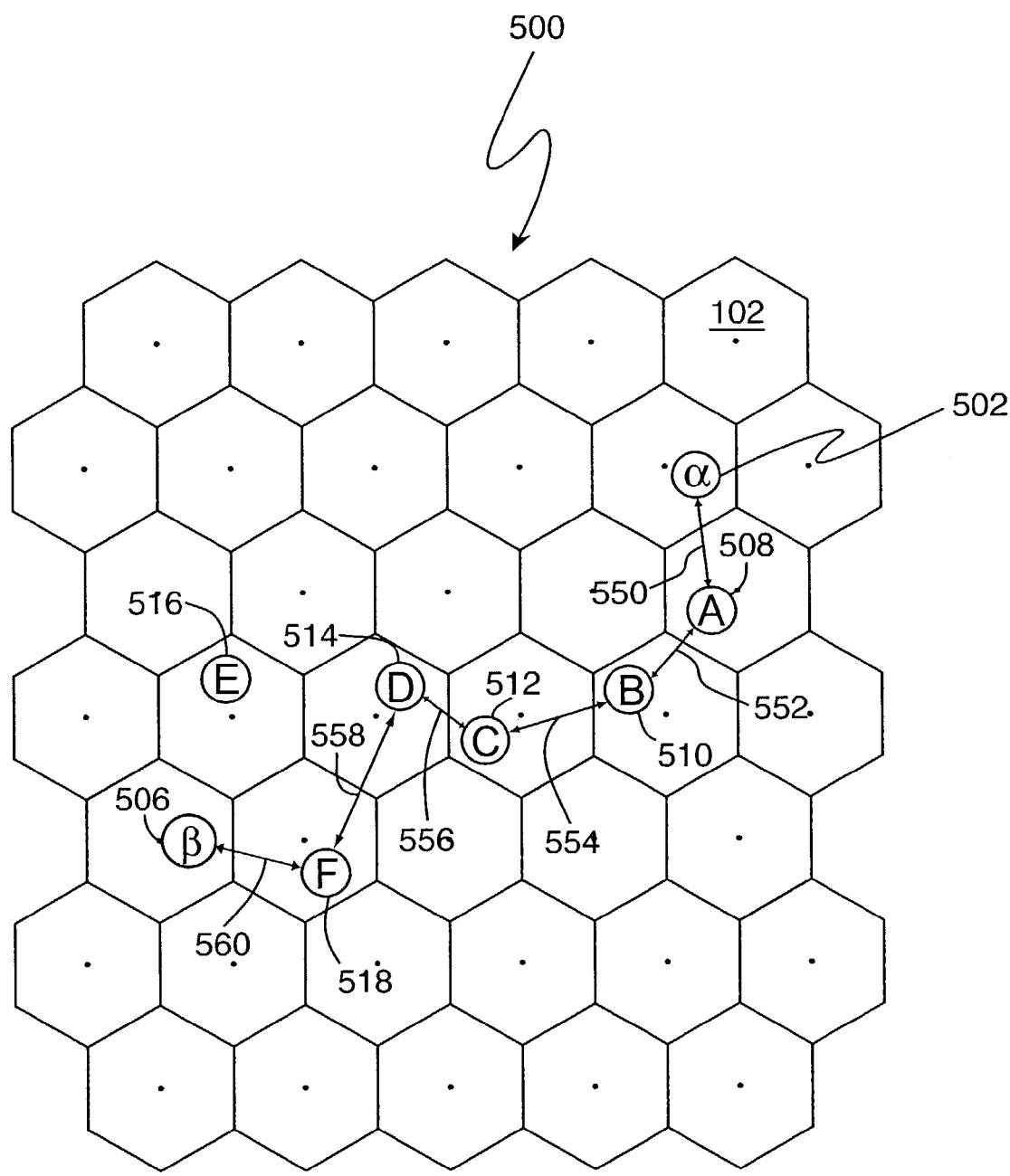
FIG. 5F illustrates a wireless route creation to destination node, complete route.

FIG. 5C shows the dashed line 1 540 drawn from the center of the cell containing α 502 to the center of cell most recently known to the network as containing β 506. The solid lines 530, 532 that parallel the dashed line, 1 540 represent the boundaries of the corridor. The source 502 initiates the route by selecting a neighboring cell with a center, as projected onto 1 540 that is closer to the center of the cell containing β 506 than the center of the cell containing α 502. In this illustration, the selected cell contains node A 508. The link 550 between α 502 and A 508 represents the first hop drawn as a first double-headed arrow. Next, A selects B 510 applying the same selection criteria and thus forms the second hop 552, shown as a second double-headed arrow. Node B 510 extends the route to the cell containing node C 512 is Node B 510 randomly selects from its adjacent cells, cell-casts into it, and waits for a reply from one or more potential nodal route participants contained by the cell. If no replies are received, B 510 tries a previously unselected cell. If more than one reply is received, B 510 selects the best node (e.g., the node closest to the cell center). FIG. 5D illustrates the case where B 510 selected node C 512. FIG. 5D illustrates the results of route creation proceeding from C 512 to D 558 and from D 558 to F 518. The cell containing E 516 is not considered by node D 514 because the center of the cell is outside of the corridor. Unknown to F 518, the destination, β 506, has moved into another cell 102. FIG. 5E illustrates that after receiving no replies from its cell-casting into the last known cell to contain the destination, F 518 initiates a diffusion search for β 506. FIG. 5F illustrates that after the destination is located, β 506 constructs a route back to F 518, and thereby completes the route creation process.

Hybrid Network Routing—a Bridge Between Wired and Wireless

Every host or computer attached to the Internet is assigned a unique IP address (e.g., 4 bytes using IPv4, 16 bytes using IPv6). Generally, everyone who browses the World Wide Web is familiar with domain names (e.g., www.uspto.gov). The DNS converts host names like (www.uspto.gov) to IP addresses. Before a packet of data is sent on its way through the Internet to a destination (such as www. uspto.gov), a DNS server is asked for the IP address of the host www.uspto.gov. The packet is then sent to that IP address. Translation from host name to IP address is performed by the host and is transparent to the end user. The function of DNS is important in understanding how the metropolitan area network of the present invention integrates via gateway nodes with wired networks.

The three "building-block" functions DynaMo uses to interface with the Internet comprise: (a) the diffusion search, previously introduced; (b) an IP-address-to-cellid query; and (c) a cellid-to-IP-addresses query. Generally, the operation of the IP-address-to-cellid query can be restated as the DNS returning the cellid of a cell that recently contained the mobile node corresponding to the given IP address of the mobile node. Generally, the cellid-to-IP-addresses query is the reverse of the IP-address-to-cellid query and its operation can be restated as the DNS returning a list of IP addresses of one or more gateway nodes closest to the cell corresponding to the given cellid. DynaMo uses IP addresses in a subtly different but substantial way from the manner in which the wired Internet uses IP addresses. When a node is mobile, its IP address is used only as a unique identifier; no routing information is encoded in the IP address.

While wireless communication remains slower and more prone to errors than wired communication systems, the preferred routing starts when the source node seeks an entrance-gateway node to a wired network (e.g., the Internet). If the destination node is mobile, the entrance-gateway searches for an exit-gateway from the wired network back out to the mobile network.

Figure 6A:
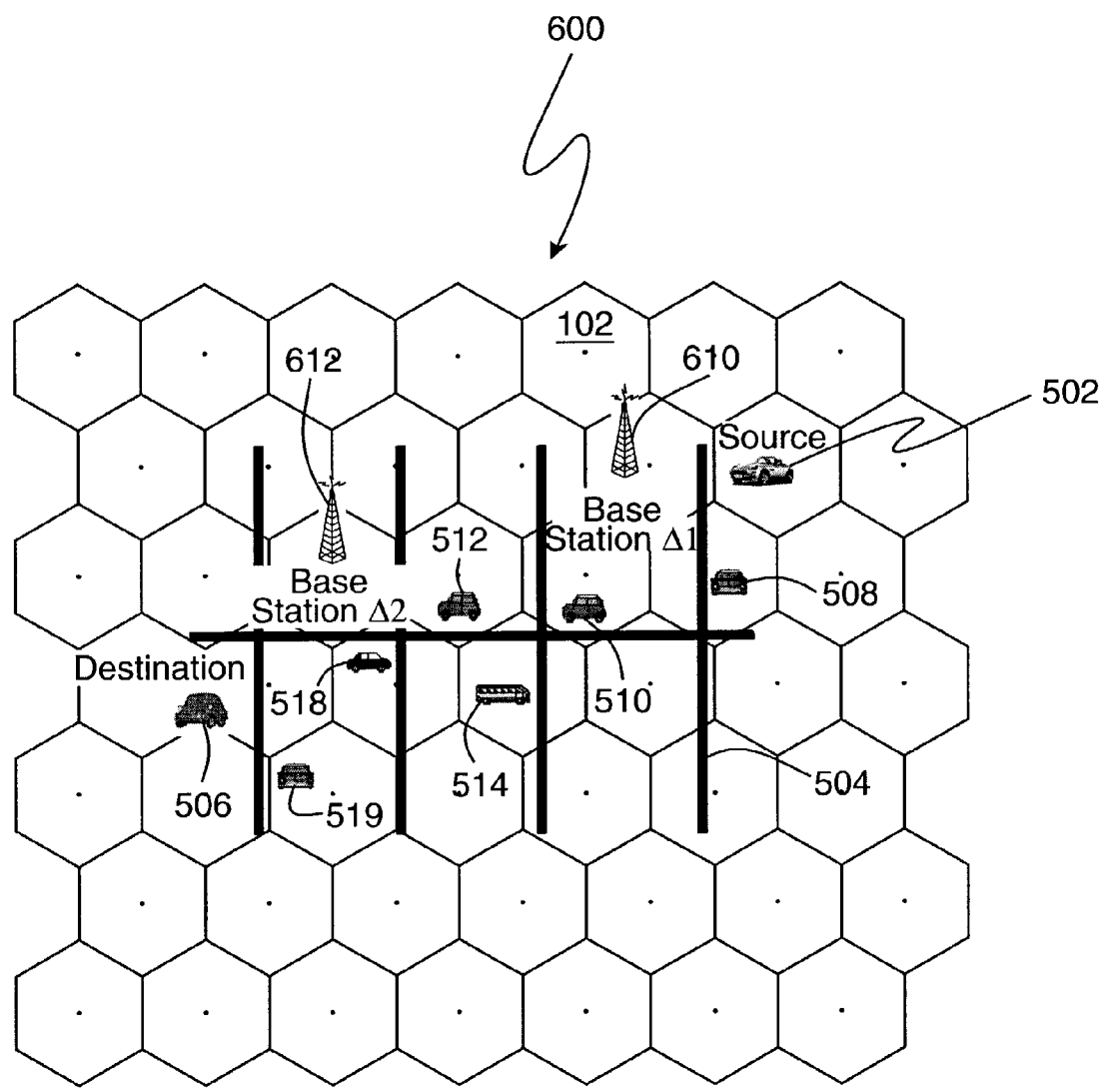
FIG. 6A illustrates a hybrid route creation through the Internet, pictorial layout of route creation, source to destination.
Figure 6B:
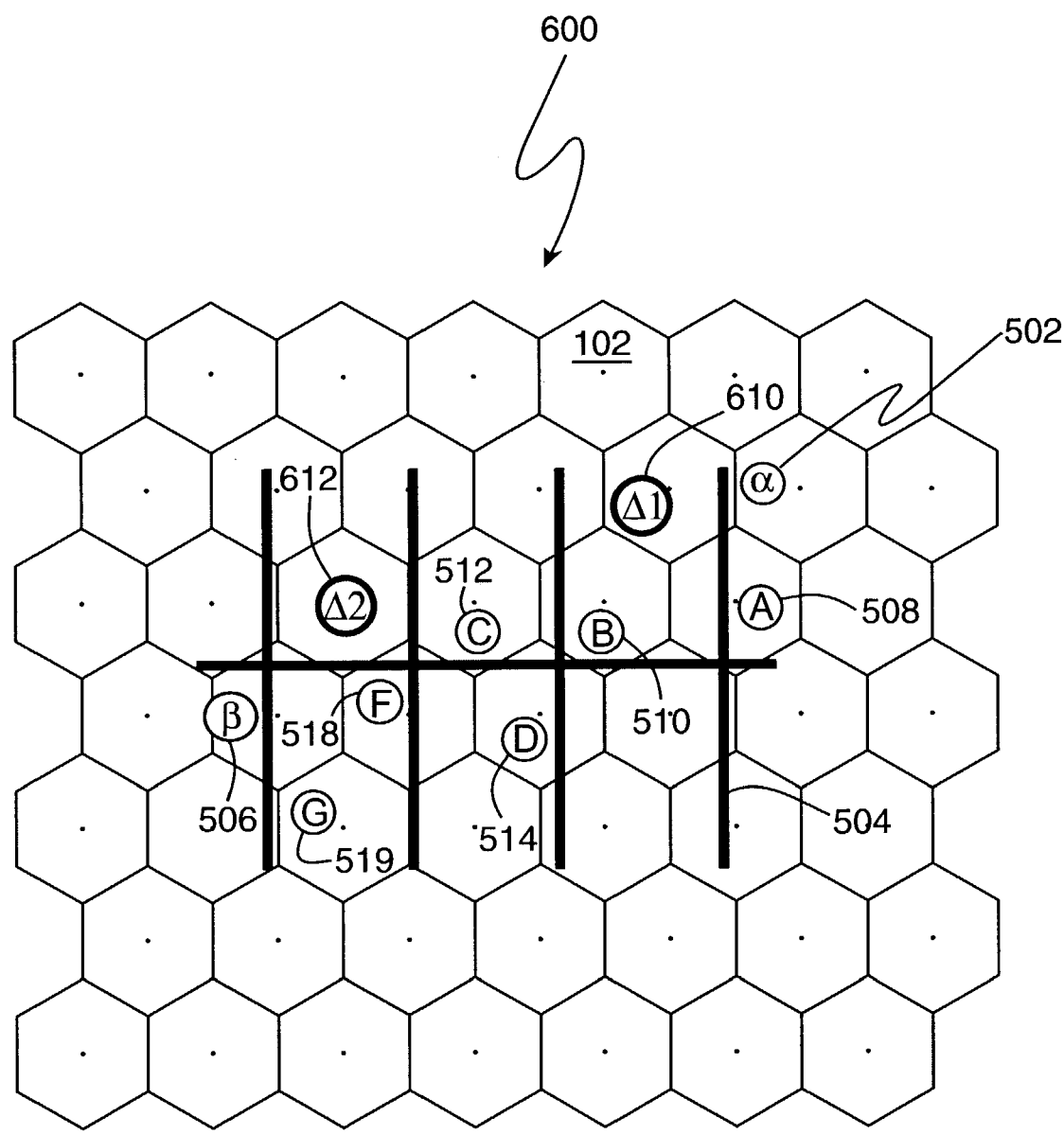
FIG. 6B illustrates a hybrid route creation through the Internet, symbolic layout of route creation, $\alpha$ to $\beta$.

FIGS. 6A-6B illustrate the case where a route created between two wireless nodes passes through the Internet. As in the exclusively wireless case above, the mobile source node α 502 (FIG. 6A) wishes to communicate with the destination mobile node β 506. The significant difference between the two examples is the introduction of mobile base stations $\Delta_1$ 610 near α 502 and $\Delta_2$ 612 located near β 506. If α 502 already has the IP address of β 506, then the source uses the IP address of β 506 to issue an IP-address-to-cellid query. FIG. 6B, the nodes are shown as alphabetical referenced to better illustrate the routing.

Figure 6C:
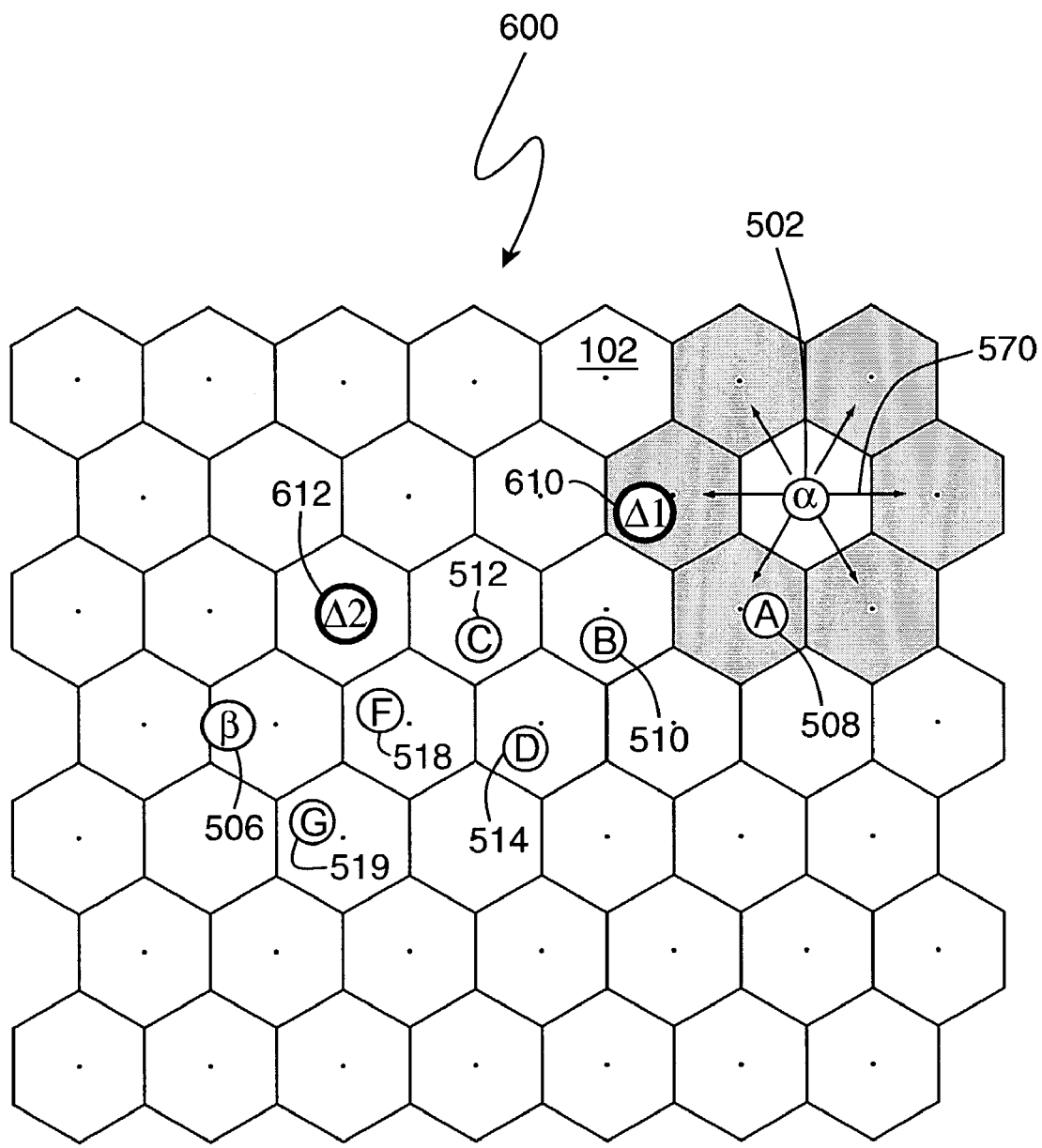
FIG. 6C illustrates a hybrid route creation through the Internet, diffusion search for gateway.

FIG. 6C illustrates that if α 502 has no prior information about the location of a nearby gateway node, then α 502 performs a diffusion search in order to get the query packet regarding β 506 to a gateway node. The query packet contains both the IP address of α 502 and its cellid. The IP address of α 502 and its cellid are both needed in order to route the DNS reply packet back to α 502. For purposes of illustration, if α 502 finds a base station, $\Delta_1$ 610, as a result of its diffusion search for an entrance-gateway, then α 502 will send its query packet to $\Delta_1$ 610. The base station $\Delta_1$ 610 issues the query to a DNS server on behalf of α 502. When the entrance-gateway, $\Delta_1$ 610, receives the reply from a DNS server, the gateway repackages the reply (i.e., includes the IP address and cellid of α 502) and sends it to α 502 using the route creation process described earlier, including diffusion searching for α 502, which plays the role of a destination node. With the IP address and cellid of the destination node, β 506, the source node, α 502, begins the route creation process. The source can either create a route back to $\Delta_1$ 610 or perform a diffusion search to find a closer entrance-gateway into the Internet.

Figure 6D:
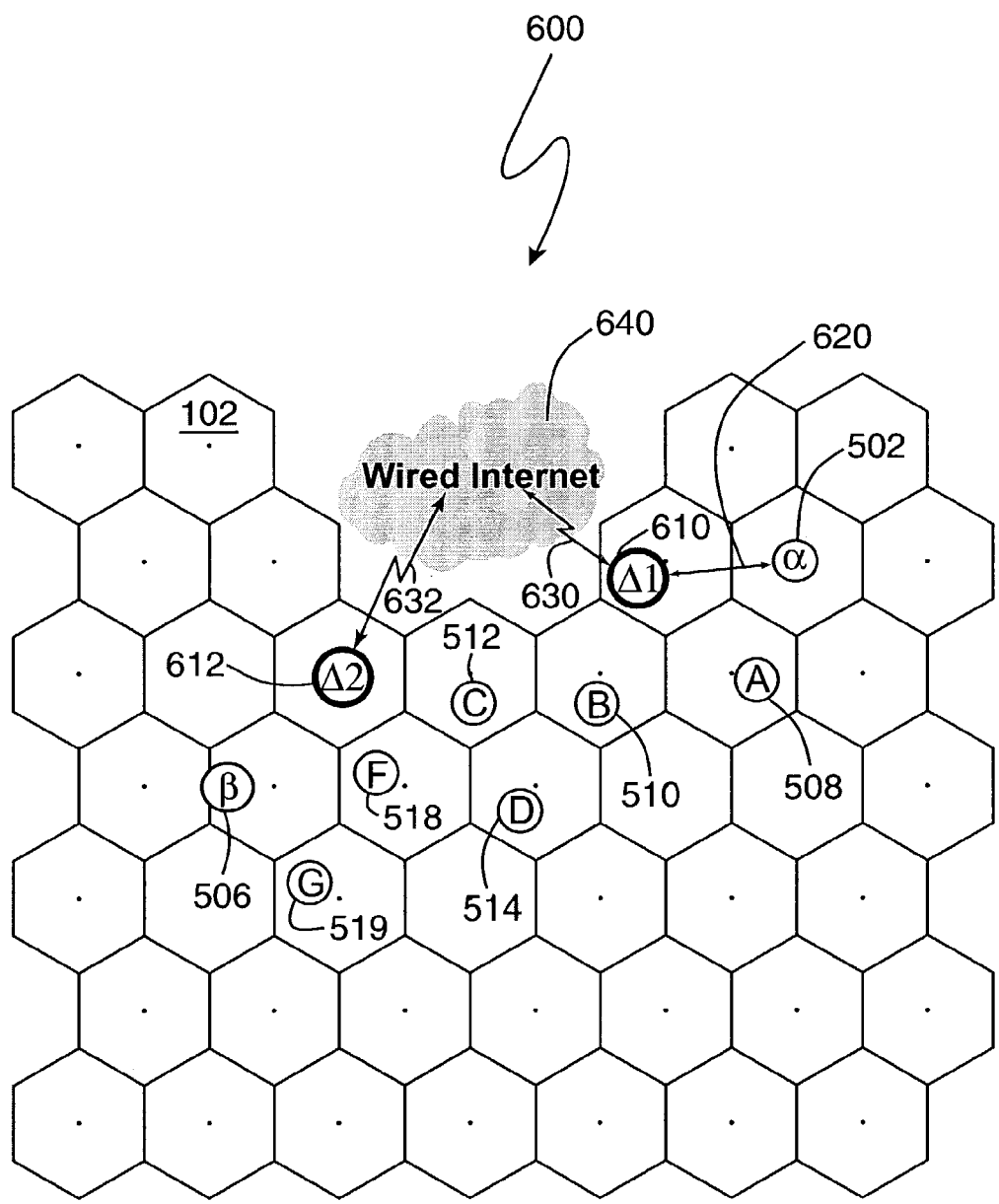
FIG. 6D illustrates a hybrid route creation through the Internet, partial route through the Internet to $\Delta_2$.
Figure 6E:
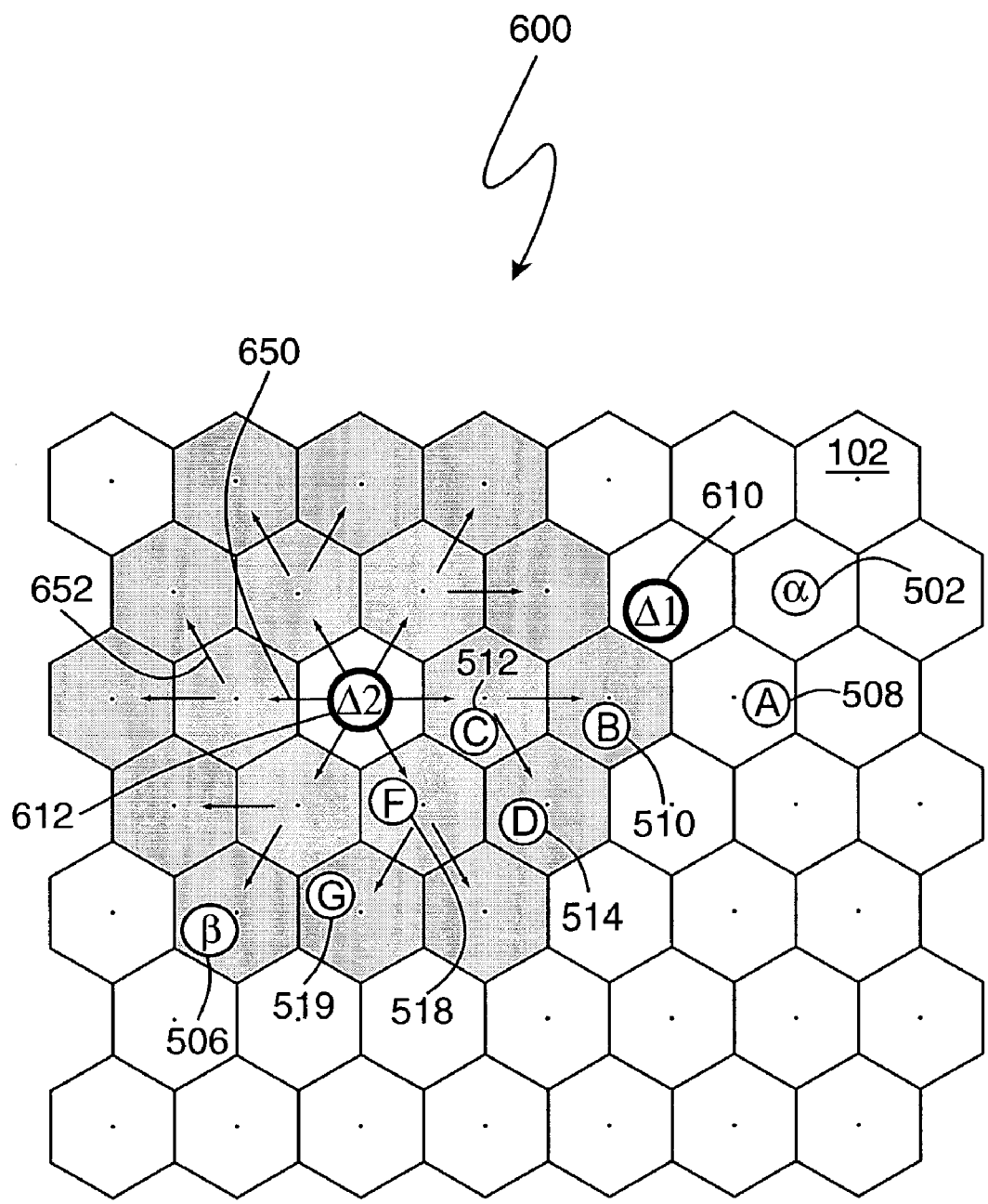
FIG. 6E illustrates a hybrid route creation, finding $\beta$ & last few legs, diffusion search to find $\beta$.
Figure 6F:
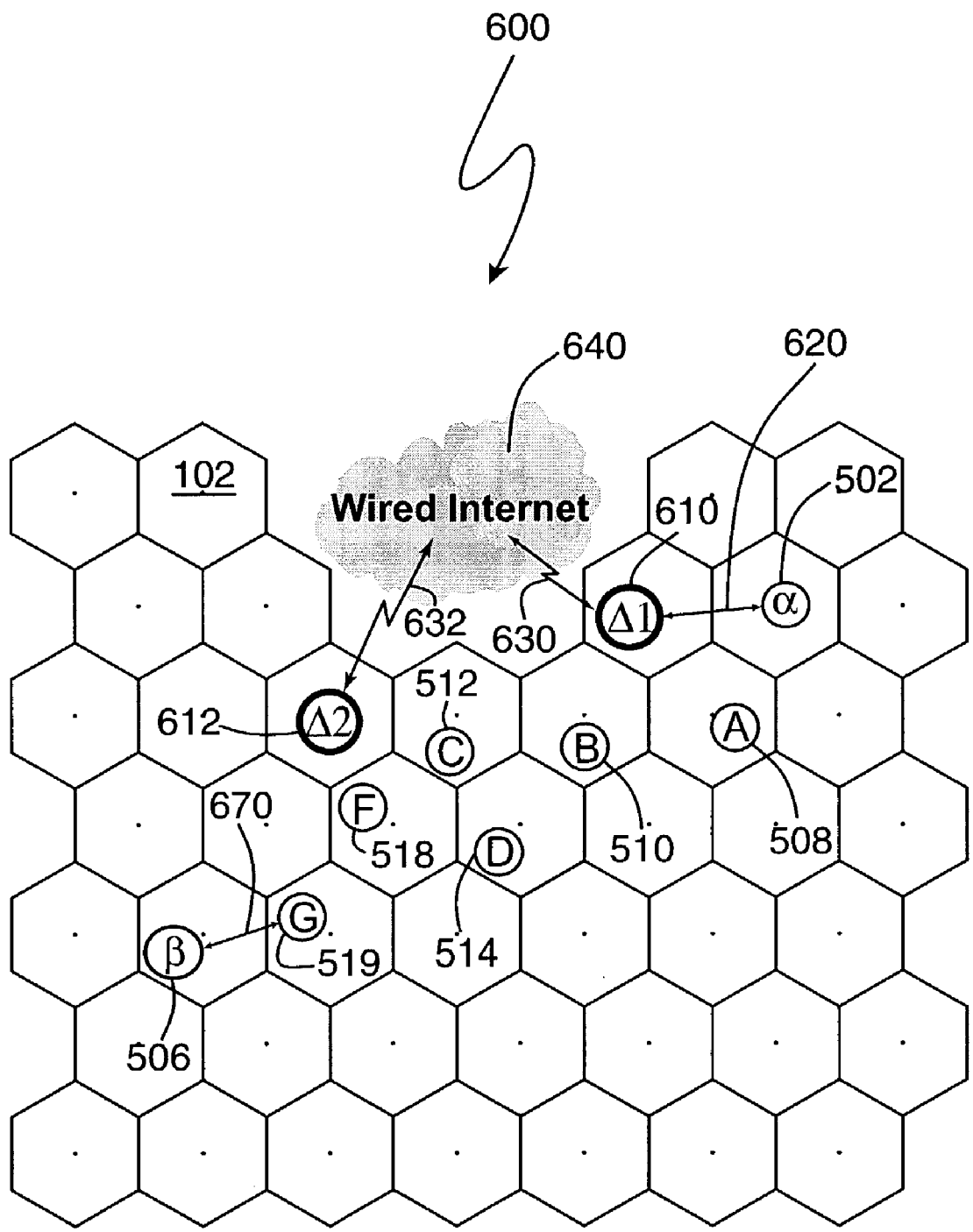
FIG. 6F illustrates a hybrid route creation, finding $\beta$ & last few legs, route creation from $\beta$ back to $\Delta_2$.
Figure 6G:
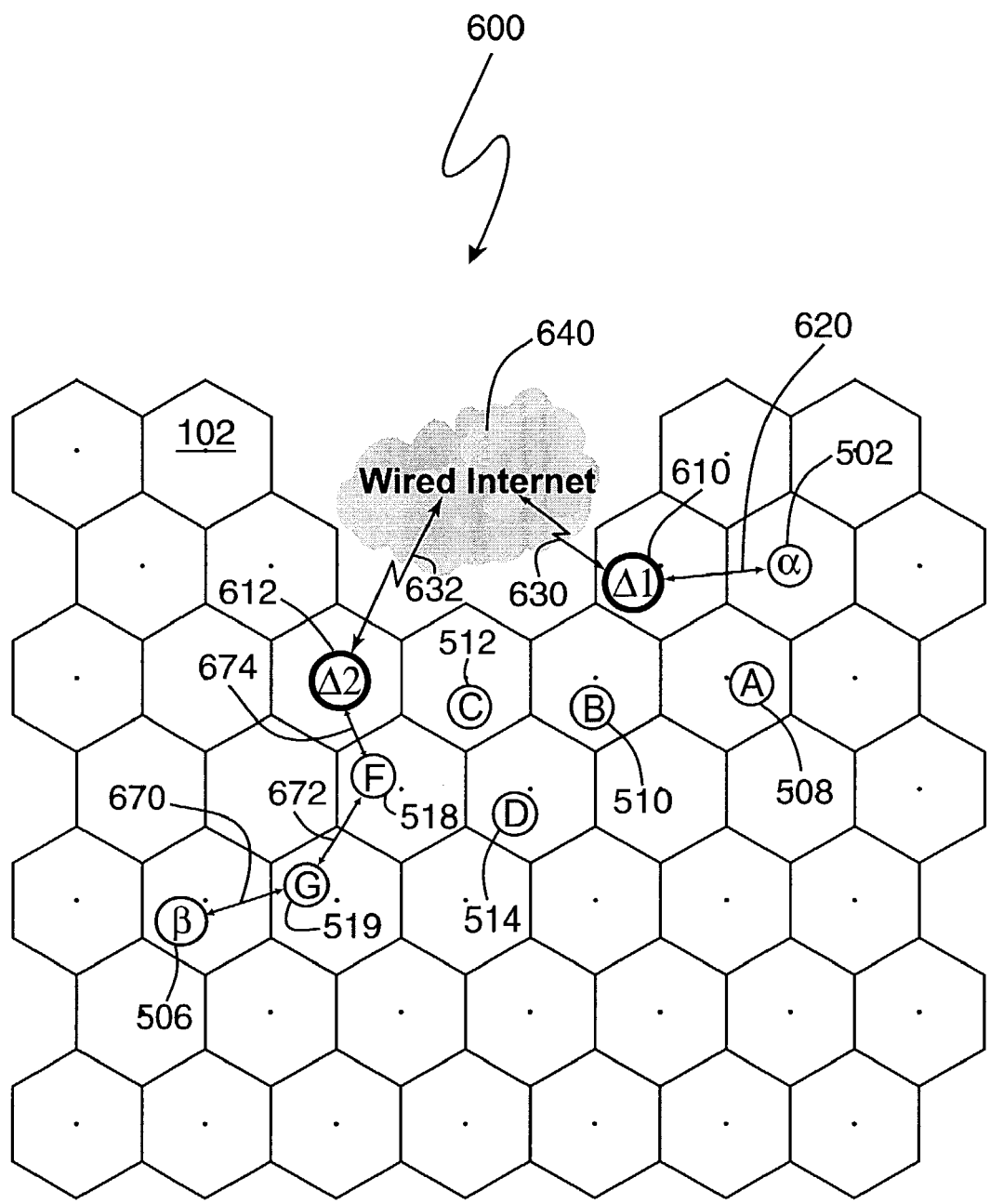
FIG. 6G illustrates a hybrid route completed.

As illustrated in FIG. 6D, the source node, α 502, creates a route 620 back to the entrance-gateway, $\Delta_1$ 610. With the first packet, the entrance-gateway, $\Delta_1$ 610 extracts the cellid of the destination node, β 506, and issues a cellid-to-IP-addresses query to locate an exit-gateway close to the destination node, β 506. From the list of potential exit-gateways, $\Delta_2$ 612, is selected. There is a leg 620 from the source, α 502, to the entrance-gateway, $\Delta_1$ 610, and a "virtual leg" through the wired Internet 640 connecting the entrance-gateway, $\Delta_1$ 610 to the exit-gateway, $\Delta_2$ 612. Using an IP tunneling protocol, the entrance-gateway, $\Delta_1$ 610 repackages the packet and sends it over the virtual leg to $\Delta_2$ 612. The exit-gateway, $\Delta_2$ 612 unpacks the packet to determine the IP address and cellid of the destination, β 506. FIG. 6E illustrates the controlled expanding search rings of a diffusion search that $\Delta_2$ 612 initiated in order to find β 506 which, in this example, has moved from its initial cell. FIG. 6F illustrates that once β 506 is found, β 506 completes the route back to the exit-gateway, $\Delta_2$ 612. Finally, FIG. 6G shows the completed hybrid route between α 502 and β 506 using the Internet as a virtual leg between the gateways $\Delta_1$ 610 and $\Delta_2$ 612.

Route Creation

In a route of all wireless nodes, route creation is comprised of node-hopping and diffusion searching. Node hopping is the iterative process of selecting nodes, to participate in the route, each successively closer to the destination's last known cell (that is, the destination's recent cell). Each sender selects a recipient from a set of competing nodes until the neighborhood of the cell, known as the cell most recently containing the destination node, is reached. In the event it has moved from its last known containing cell, a diffusion search is then initiated to find the destination node.

Moreover, the several embodiments of the present invention enable bi-directional communication to be initiated from either wired or wireless nodes. DynaMo routing supports ingress, and egress, into, and from, the wireless network, through gateway nodes. A mobile node may act as a gateway between two different coverings. A gateway is one type of node through which routes may need to pass. A stationary node may be strategically positioned in a region to help route communication around an impediment. Nodes that participate in a route for the life of the route are permanent route nodes. The source and destination nodes are examples of permanent route nodes.

A waypoint is a permanent intermediate route node. A waypoint node remains part of a route regardless of where the source and/or destination nodes move. The most common use of waypoints is to connect the wireless and wired networks. When a route is created, the waypoint that moves the first packet from the wired network to a wireless network is called an "exit-waypoint" (a permanent exit-gateway), and a waypoint that moves the first data from a wireless network to the wired network is call an "entrance-waypoint" (a permanent entrance-gateway). During route creation, a waypoint node can be specified. A route segment is a route between: (a) the source node and a waypoint; (b) two waypoints; or (c) a waypoint and the destination node. If no waypoint is specified, then the route segment is the entire route. The first node of a segment is termed a segment start node. The segment start node can be either the source node or a waypoint. The last node of a segment is termed a segment end node and can be either the destination node or a waypoint.

A route leg is the portion of a route between two adjacent nodes. If both the start node and end node of a segment are gateways to the wired network, then the route segment between them can be termed a virtual leg. The line l is defined for each route segment, except a virtual leg. The line l passes through the center of the cell containing the segment start node and the center of the cell containing the segment end node. Between two adjacent segments, the end node of the first is the start node of the second.

If the waypoint acts as a gateway between the wired and wireless networks, then the route is comprised of two or three route segments, depending on whether both source and destination nodes are mobile. If the source node is mobile and the destination is a wired node, then the first route segment is comprised of the wireless nodes between the source and the waypoint and the second route segment is from the waypoint to the destination. If the destination is wireless like the source, then the first route segment is like that already disclosed, but the second route segment is between the entrance-waypoint and the exit-waypoint. The third route segment is comprised of the wireless nodes between the exit-waypoint and the destination.

There are four common route embodiments of the present invention: (1) one wired route segment—where all nodes are wired; (2) one wireless route segment—where all nodes are wireless; (3) two route segments, one wired and one wireless—where either the source or destination node is wired and the other is wireless; and (4) three route segments, two wireless and the middle route segment is a virtual leg—where both source and destination nodes are wireless.

The source node determines the route configuration before initiating route creation. If a waypoint is specified, then the source node determines the route leg configuration to the waypoint, but the waypoint determines the route configuration to the destination. The source node sets the parameters under which the route configuration unfolds. The four fields the source node uses to influence the route configuration are: DESTIP, DESTCELLID, WAYPOINTIP/NET, and WAYPOINTCELLID. The DESTIP field contains the destination node IP address, if specified, otherwise NULL indicates that no IP address is specified. The DESTCELLID field contains the tentative containing cell of the destination node, otherwise NULL indicates that no cell is specified. The WAYPOINTIP/NET field contains either the waypoint node's IP address or a network address of a network through which the route can tunnel. A NULL value indicates that neither a waypoint IP address nor a network address is specified. The WAYPOINTCELLID is the tentative containing cell of the waypoint node; otherwise, NULL indicates that no cell is specified.

By bit encoding the presence of a non-NULL value as 1 and a NULL value as 0 for each of the fields, a four-bit index is constructed. The index is calculated as follows:

$$indx = DESTIP?\times 8 + DESTCELLID?\times 4 + WAYPOINTIP/NET?\times 2 + WAYPOINTCELLID?; \quad [4]$$

where DESTIP?, DESTCELLID?, WAYPOINTIP/NET? and WAYPOINT-CELLID? represent the bit encoding of DESTIP, DESTCELLID, WAYPOINTIP/NET and WAYPOINTCELLID, respectively and the indexing is described in Table 1.

TABLE 1

| index | Description |
|---|---|
| 0 | Undefined |
| 1 | Undefined |
| 2 | Undefined |
| 3 | Undefined |
| 4 | node-hopping to the specified cell; used in regioncasting |
| 5 | Undefined |
| 6 | Diffusion search to a waypoint with a network interface whose network address matches the WAYPOINTIP/NET network address, then the waypoint decides the route configuration to the destination cell; used in regioncasting |
| 7 | node-hopping then diffusion searching for the waypoint node with the specified IP address, with the specified tentative containing cell, then the waypoint decides the route configuration to the specified destination cell; used in regioncasting |
| 8 | diffusion searching for the specified destination node; used in point-to-point communications |
| 9 | Undefined |
| 10 | diffusion searching for either waypoint node with the specified IP address or with a network interface whose network address matches the WAYPOINTIP/NET network address, then the waypoint decides the route configuration to the specified destination node; used in point-to-point communications |
| 11 | node-hopping then diffusion searching for the waypoint node with the specified IP address, with the specified tentative containing cell, then the waypoint decides the route configuration to the specified destination node; used in point-to-point communications |
| 12 | node-hopping then diffusion searching for the specified destination node with the specified tentative containing cell; used in point-to-point communications |
| 12 | undefined |
| 14 | undefined |
| 15 | undefined |

To aid in determining the appropriate configuration, the source node uses a number of factors, such as: communication class, distance between source and destination, public versus private covering, desired quality of service (QoS), and the like. The node properties that factor into a particular route configuration are maintained in and retrieved from a modified DNS.

There are three principal route segment creation methods, with the particular method preference determined by the route configuration. The three methods of segment creation are:

1. The segment start node performs a diffusion search for the segment end node. As previously disclosed, the source node performs a diffusion search for an entrance-gateway; the waypoint $\Delta_1$ is the first route segment's end node.

2. The segment start node performs a hop-and-search for the segment end node. A hop-and-search is the process of hopping through the route corridor towards the destination node, searching for either the destination node or a waypoint node. A waypoint is identifiable by its IP address, or by its network address. When a waypoint's network address is specified, any node with an IP address on that network should immediately reply to the HOPREQUEST packet. Whereas, if a waypoint's IP address is specified, only the node with that IP address should immediately reply to the HOPREQUEST packet.

3. The segment is a virtual leg and IP-tunneling is used to route the packet through the wired network from the entrance-gateway to the exit-gateway. The route illustrated in FIG. 6G contains an example of a virtual leg.

The methods described herein are unencumbered by code to handle non-routing related packets. Additionally, most timing constraints have been purposely omitted to more simply convey the routing fundamentals. The methods make use of the programming constructs called processes and threads. Each arriving packet is filtered through one or more packet filters. If the packet matches the filter, then the filter function is evaluated within a thread; as such, the filter function has access to the process' data structures. The variable SELF represents the current node that is either the source node or a relay node attempting to step the route one node closer to the destination's last known cell.

Figure 7A:
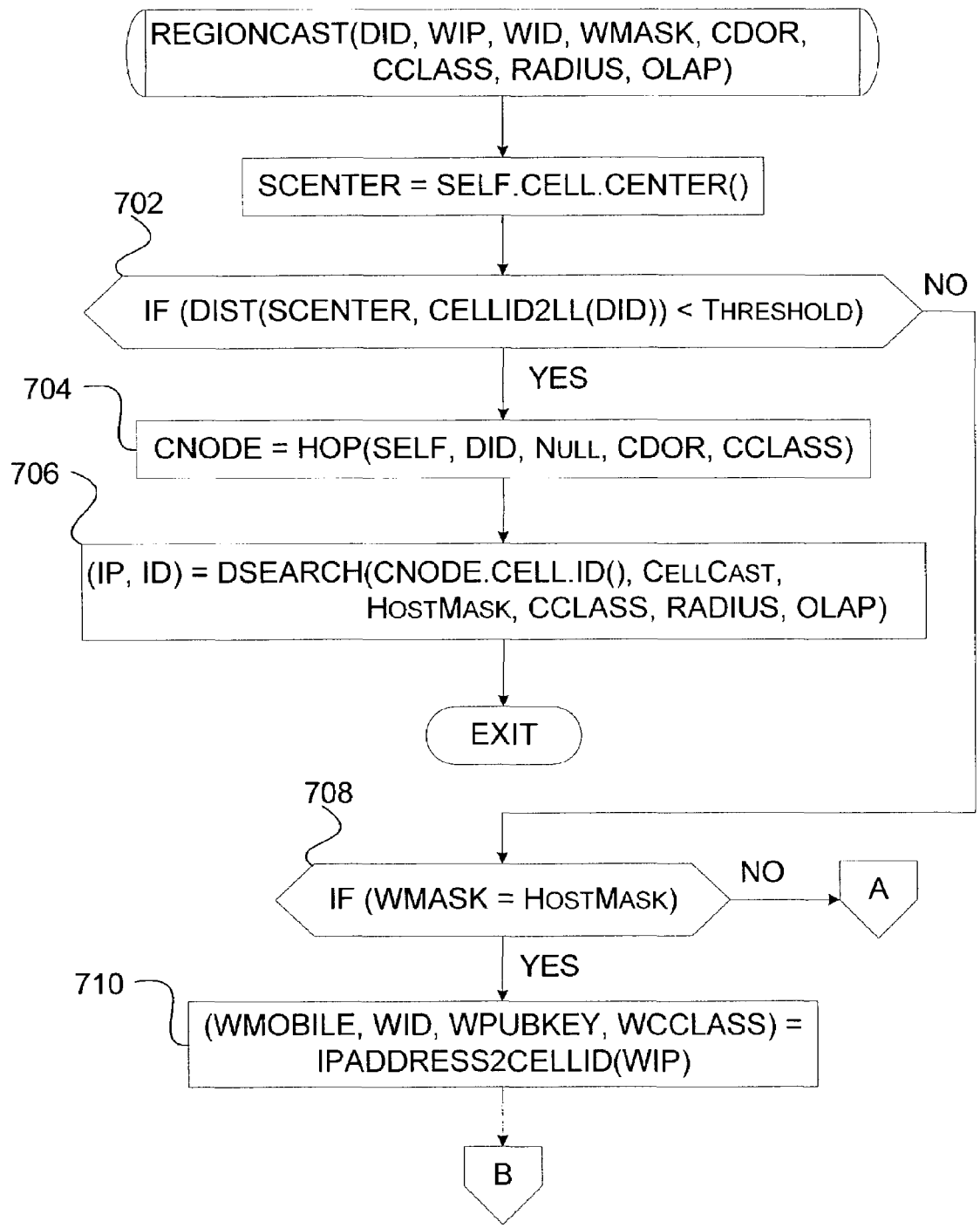
FIGS. 7A-7B illustrate the REGIONCAST method according to embodiments of the present invention.
Figure 7B:
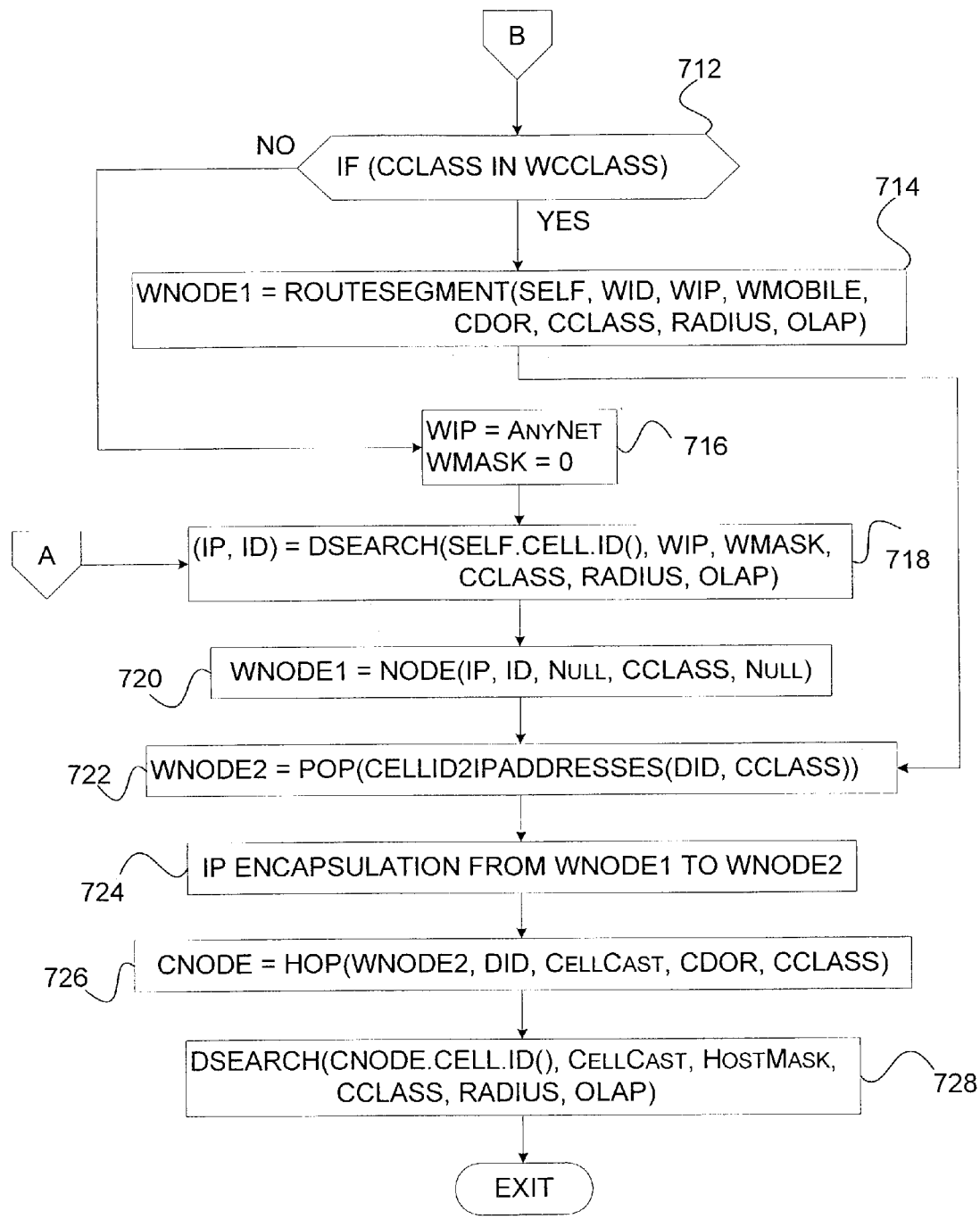

FIGS. 7A-7B depict the region-casting (REGIONCAST) method of the present invention that is a method for creating a route from the node SELF to a destination cell and disseminating a packet into all cells within a circular region. FIG. 7A illustrates that if the distance between SELF and the destination is less than THRESHOLD 702 then a completely wireless route is created. From SELF, the route is created by hopping from node to node 704 through a corridor surrounding the line passing through the center of the cell containing SELF (SCENTER) and the center of the cell whose cellid is DID, until a node in DID is reached. While hopping, each subsequent node's containing cell center must be no further from DID's center than the previous route node's cell center when projected onto 1. Moreover, each route node must be able to accommodate CCLASS communication class. CNODE is set to the last node hopped to that was returned by the HOP function. CNODE is contained in cell DID and is the center node of the pending DSEARCH (short for diffusion search) 706. In general, DSEARCH returns the IP address (IP) and cellid (ID) of the destination node, but when regioncasting, IP is NULL.

If the distance between SELF's cell's center and DID's center is greater than or equal to THRESHOLD, no at condition 702, then a hybrid route, passing through another network (possibly a wired network or the Internet), is created 708. If SELF knows the IP address of a close gateway node, then WMASK equals HOSTMASK and WIP is the gateway node's IP address. If SELF does not know the gateway's containing cellid (WID) or its maximum communication class (WCCLASS) then an IPADDRESS2CELLID query is initiated 710 to collect that information. If the gateway node's maximum communication class is unable to support the requested class of communication (CCLASS) then a diffusion search (FIG. 7B) is initiated for any gateway node able to support CCLASS communication steps 712, 716, and 718.

If the IP address of a gateway node is not specified (i.e., WMASK is not equal to HOSTMASK and WIP is a network address or the constant ANYNET), control flows from 708 to 718. A diffusion search is launched to search for an entrance-gateway capable of CCLASS communications 718. The node object WNODE1 represents the entrance-gateway that was found 720. The entrance-gateway performs a CELLID2IPADDRESSES query to locate an exit-gateway close to DID 722.

Communication between WNODE1 and WNODE2 is encapsulated 724 to ensure that the source IP address is not lost when packet(s) leave the exit-gateway and enter the wireless network. The route segment from the exit-gateway to the destination cell is created by node hopping from the exit-gateway to a node that is in DID 726. Finally, a diffusion search is used to spread the packet into the region 728.

If the gateway node's maximum communication class is capable of CCLASS communication then a route segment is created between SELF and the gateway node WNODE1 714. WNODE1 performs a CELLID2IPADDRESSES query to locate an exit-gateway close to DID 722. The remaining steps are explained in the previous paragraph.

Figure 8A:
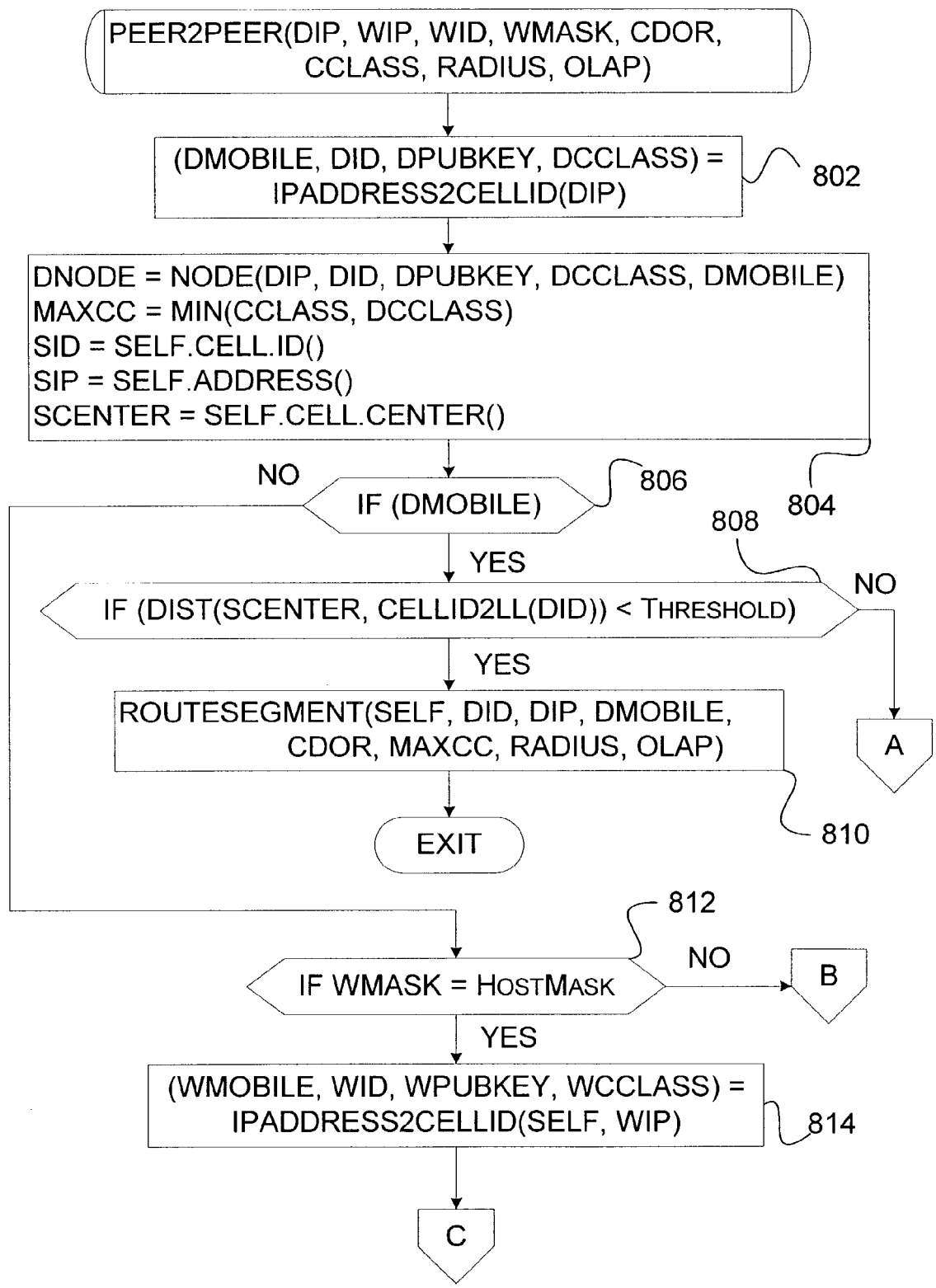
FIGS. 8A-8C illustrate the PEER2PEER method according to embodiments of the present invention.
Figure 8B:
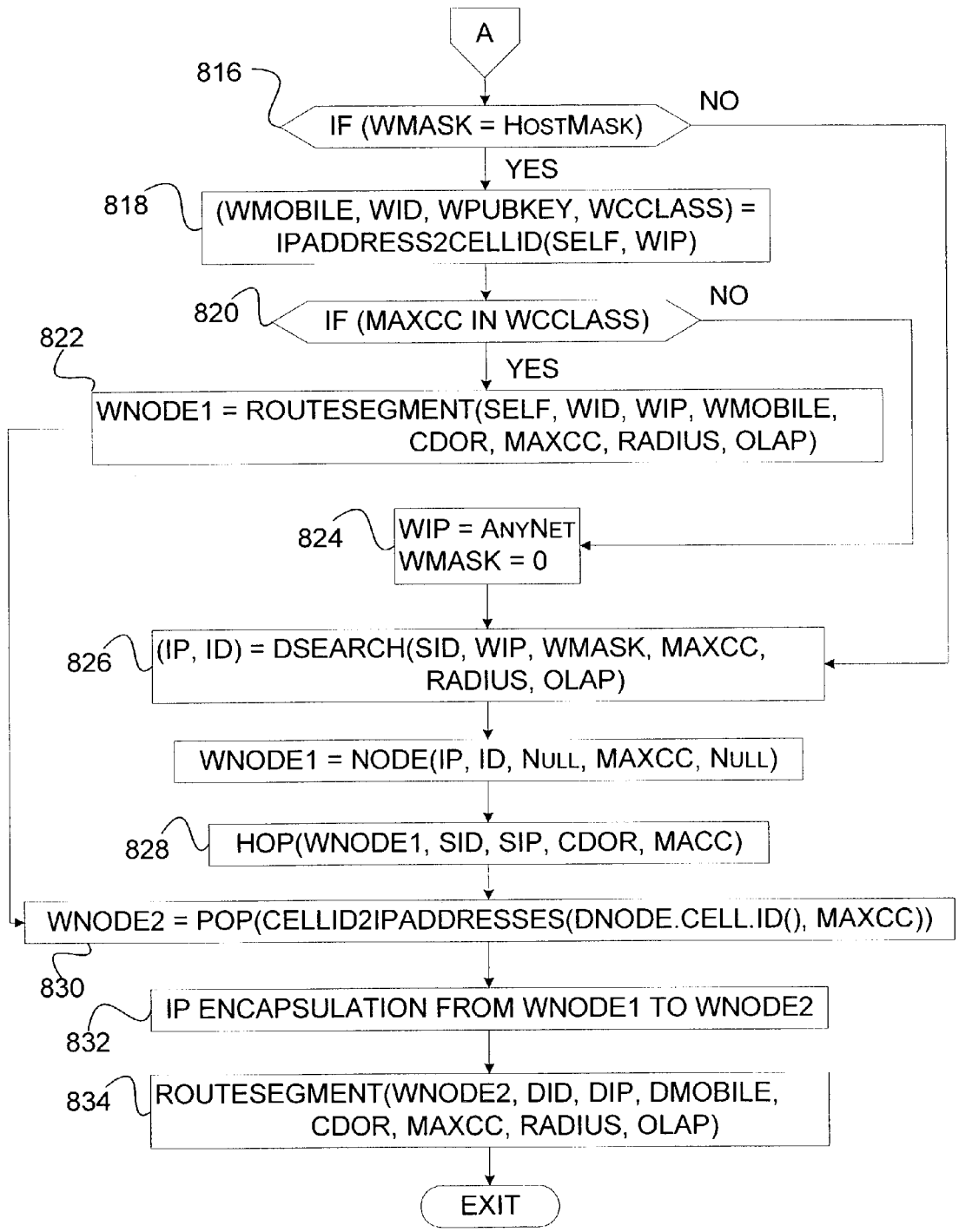
Figure 8C:
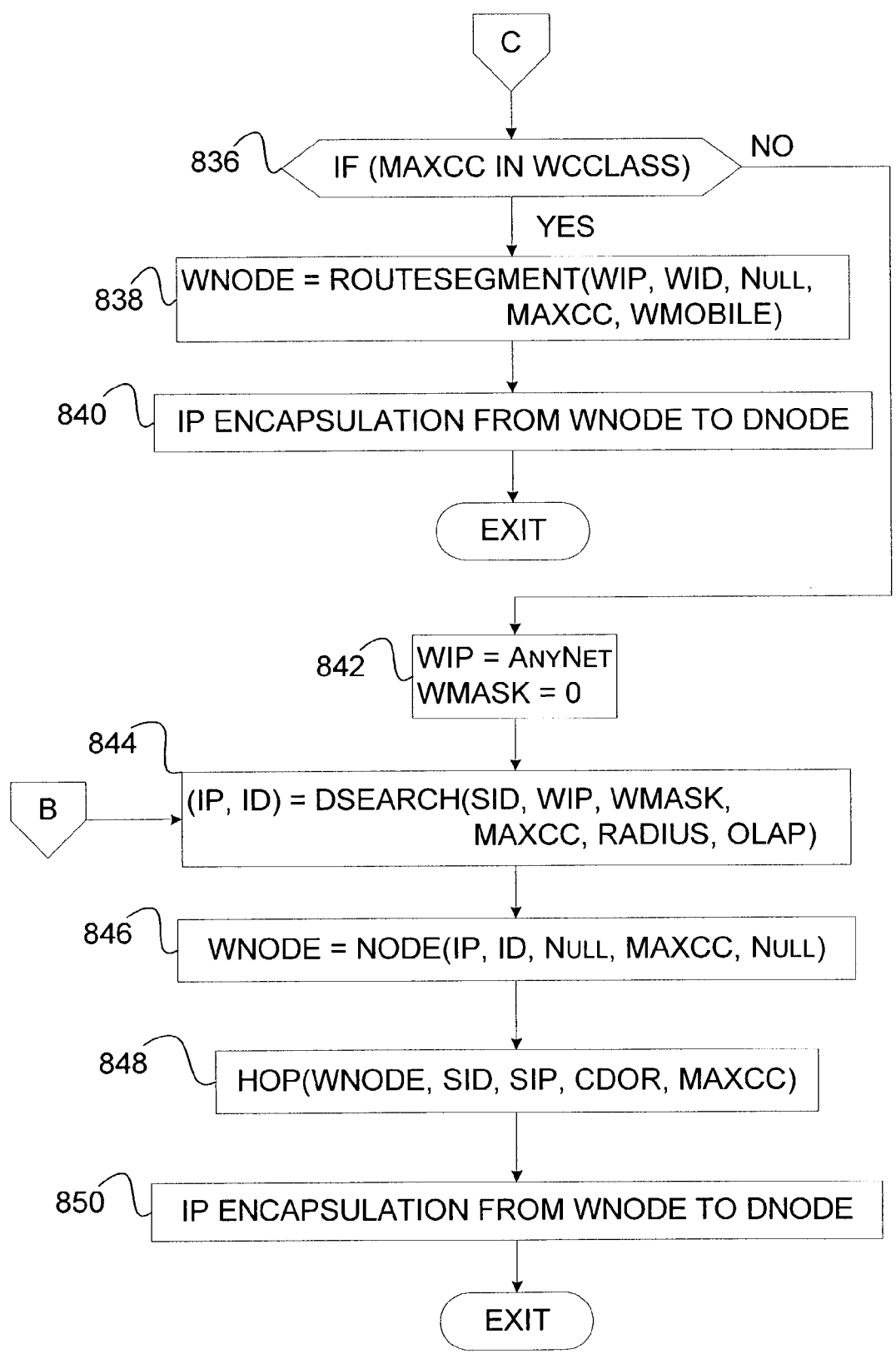

FIGS. 8A-8C illustrate the PEER2PEER method embodiment of the present invention that creates a route from the node SELF to a destination node. Issuing an IPADDRESS2CELLID query for DIP 802, SELF collects the destination node's properties, such as whether it is mobile (DMOBILE), its tentative containing cell's cellid (DID), its public-key (DPUBKEY), and its maximum communication class (DCCLASS). The variable DNODE represents the destination node; MAXCC is the maximum communication class that both SELF and the destination node support. If the destination node is mobile, that is, a "yes" at condition IF(DMOBILE) 806, and the distance between SELF and the destination is less than THRESHOLD, that is, a "yes" at the distance threshold condition 808, a completely wireless route is created from SELF to the destination 810.

If the distance between SELF and the destination is at least THRESHOLD, that is, "no" at the distance threshold condition 808, then a hybrid route is created. If SELF knows the IP address of a waypoint node that can act as an entrance-gateway, it issues a query 818 for the waypoint's tentative cell (WID) and its maximum communication class (WCCLASS). If the waypoint node can accommodate MAXCC communication, that is, "yes" at the IF(MAXCC INWCCLASS) condition 820, then a route segment is created between SELF and WIP 822. The entrance-gateway node issues a CELLID2IPADDRESSES query 830 to locate an exit-gateway close to the destination node's tentative cell (WNODE2). Between the two gateway node's, communication is encapsulated 832 to ensure that the source and destination IP addresses are not lost when the packet enters the wired network. WNODE2 constructs a route segment to the destination node 834.

If the waypoint known to the source node cannot accommodate MAXCC communication class, that is, a "no" at the IF(MAXCC IN WCCLASS) condition 820, then SELF initiates a search for any waypoint node that can act as an entrance-gateway and support MAXCC communication class 826. The entrance-gateway, WNODE1, creates the route segment back to the source node 828. WNODE1 locates an exit-gateway WNODE2 830. Communication between the gateways is encapsulated 832. Finally, WNODE2 constructs a route segment to the destination 834.

If the source node must search for an entrance-gateway, that is, a "no" at the IF(WMASK=HOSTMASK) condition 816, then a diffusion search is initiated 826; the route segment is created when WNODE1 "hops" back to SELF. A virtual segment is constructed 830, and then WNODE2 establishes a route segment to the destination 834.

If the destination node is not mobile, that is a "no" at the IF(DMOBILE) condition 806, and if SELF knows the IP address of a nearby gateway node that is, a "yes" at the IF(WMASK=H<small>OST</small>M<small>ASK</small>) condition 812, it issues a query 814 for the waypoint's tentative cell (WID) and its maximum communication class (WCCLASS). If the waypoint node can accommodate MAXCC communication, that is, a "yes" at the IF(MAXCC IN WCCLASS) condition 836, then a virtual route segment is created between WIP and the destination 838. Communication between the waypoint and the destination is encapsulated 840 to ensure that the source IP address is not lost when the packet enters the wired network.

If the waypoint cannot accommodate MAXCC communication class (no at condition 836), then SELF initiates a search for any waypoint node that can act as a gateway and support MAXCC communication class 844. The gateway, called WNODE 846, creates a route back to the source node 848. WNODE establishes communication with the destination node; communication between WNODE and the destination is encapsulated 850.

If SELF must search for a gateway, that is, a "no" at the IF(WMASK=H<small>OST</small>M<small>ASK</small>) condition 812, then a diffusion search is initiated 844; the route segment is created when WNODE hops back to the source node 848. Communication between the gateway and the destination is encapsulated 850.

Figure 9:
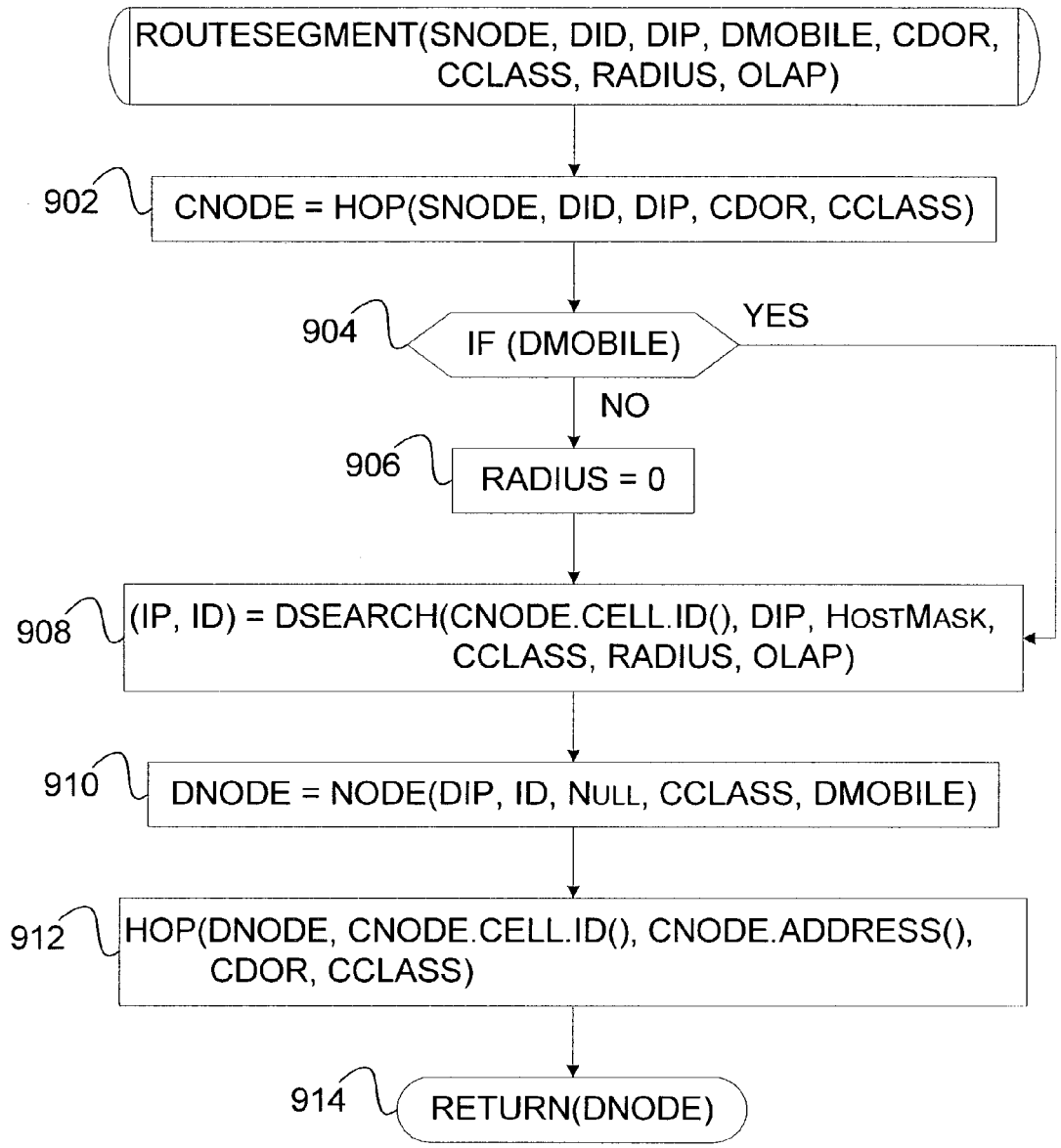
FIG. 9 illustrates the ROUTESEGMENT method according to embodiments of the present invention.

FIG. 9 illustrates the method embodiment of the present invention for creating a wireless route segment. The method, RouteSegment, creates an all wireless route segment-source node to destination node. SNODE begins the route creation process by hopping one node closer to the destination's tentative cell 902. When DID is reached, a node in that cell, CNODE, becomes the center cell from which a diffusion search is initiated 908. If the destination node is not mobile, that is, a "no" at the IF(DMOBILE) condition 904, then the radius of the search is reduced to just DID; otherwise the radius of the search remains unchanged. Once the diffusion search locates DIP, the destination node hops back to CNODE, completing the route segment 912. The destination node is returned.

Node-Hopping

Node-hopping or simply "hopping" results in the sequence of nodes $(n_o, n_1, n_2, \ldots, n_j)$ where $n_o$ is the source node ($\alpha$), and $n_j$ is in the neighborhood of the destination node's ($\beta$) recent cell.

One-half the corridor width can be expressed by the variable $\sigma$. A larger corridor width (i.e., a larger value of $\sigma$) allows for greater flexibility in circumventing barriers. However, the number of hops in a route may increase, and thus make the route less optimal.

Let l=Ray($\alpha$.cell.center( ),$\beta$.cell.center( )). The sequence of nodes $(n_0, n_1, n_2, \ldots, n_j)$ represents a route. A route has the following properties:

$$\cdot dist(proj(n_i.\text{cell.center}(\ ),l),n_j.\text{cell center}(\ )) \geq$$

$$dist(proj(n_{i+1}.\text{cell.center}(\ ),l),n_j.\text{cell.center}(\ )).$$

Where, i=0, . . . , j−1. Loosely, each subsequent node in the sequence is closer to the destination's last known cell. Or more precisely, the distance of the projection of the cell center of each subsequent node in the sequence onto l from the destination's last known cell center forms a monotonically, non-increasing sequence.

$$\cdot dist(n_i.\text{cell.center}(\ ),l) < \sigma.$$

Where, i=0, . . . , j. No node can be more than a distance of $\sigma$ from l.

Figure 10:
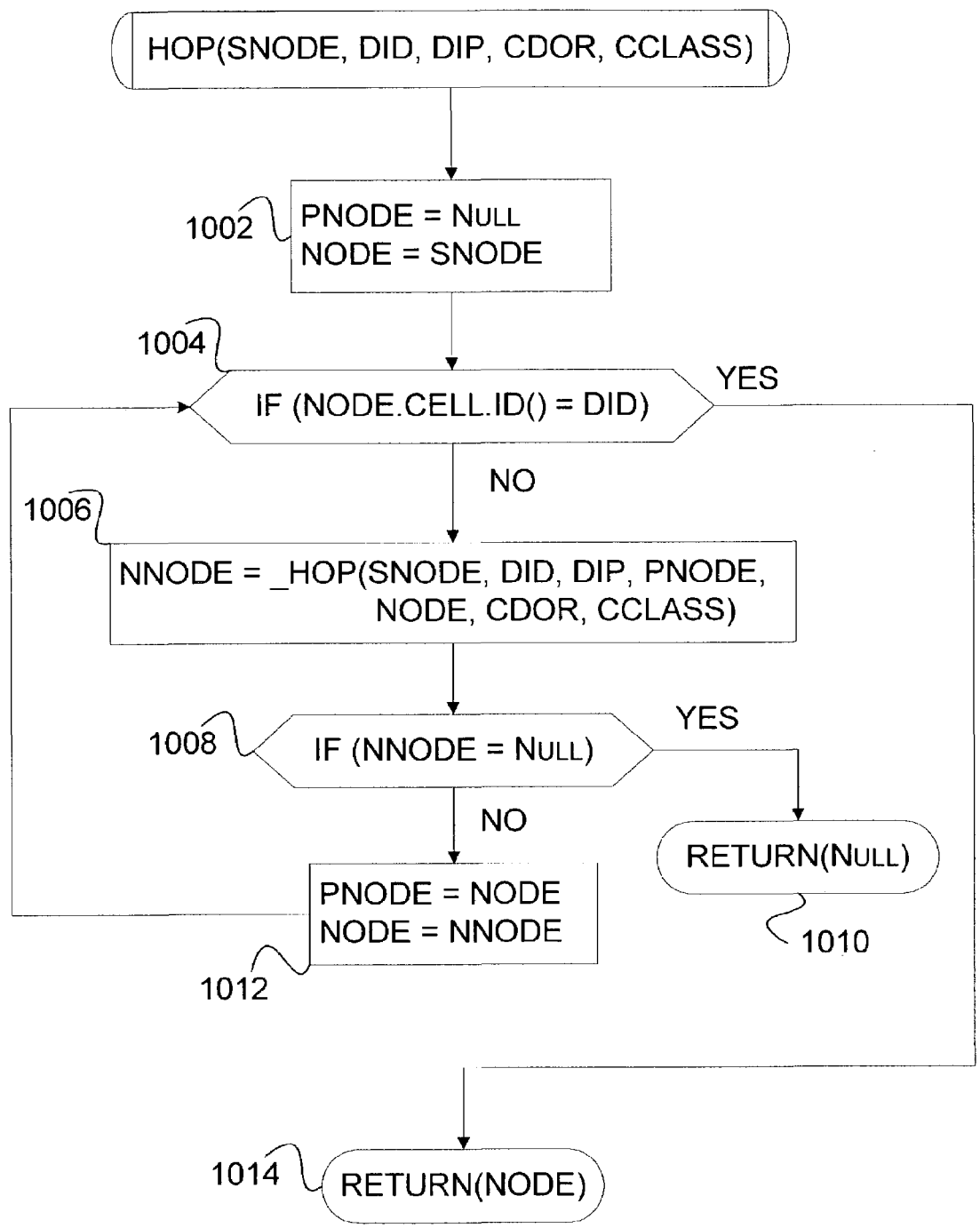
FIG. 10 illustrates the HOP method according to embodiments of the present invention.

FIG. 10 illustrates the Hop method embodiment of the present invention that creates an all wireless route from the source node to the destination node's tentative cell. In preparation for looping over adjacent nodes, the previous node (PNODE) is initialized to N<small>ULL</small> and the current node (NODE) is set to the source node, SNODE 1002. If the current node's cell is the destination node's tentative cell, that is a "yes" at the IF(NODE.CELL.ID( )=DID) condition 1004, then return the current node. Otherwise, the route is incomplete, that is a "no" at the IF(NODE.CELL.ID( )= DID) condition 1004; additional nodes, each one closer to DID than the previous node, must be found. The internal function _HOP advances the route one node closer to DID 1006. If _HOP was unable to advance the route, that is a "yes" at the IF(NNODE=N<small>ULL</small>) condition 1008, then N<small>ULL</small> is returned. Otherwise, _HOP was successful, that is a "no" at the IF(NNODE=N<small>ULL</small>) condition 1008, and PNODE and NODE are adjusted in preparation for another call to _HOP 1012.

Figure 11A:
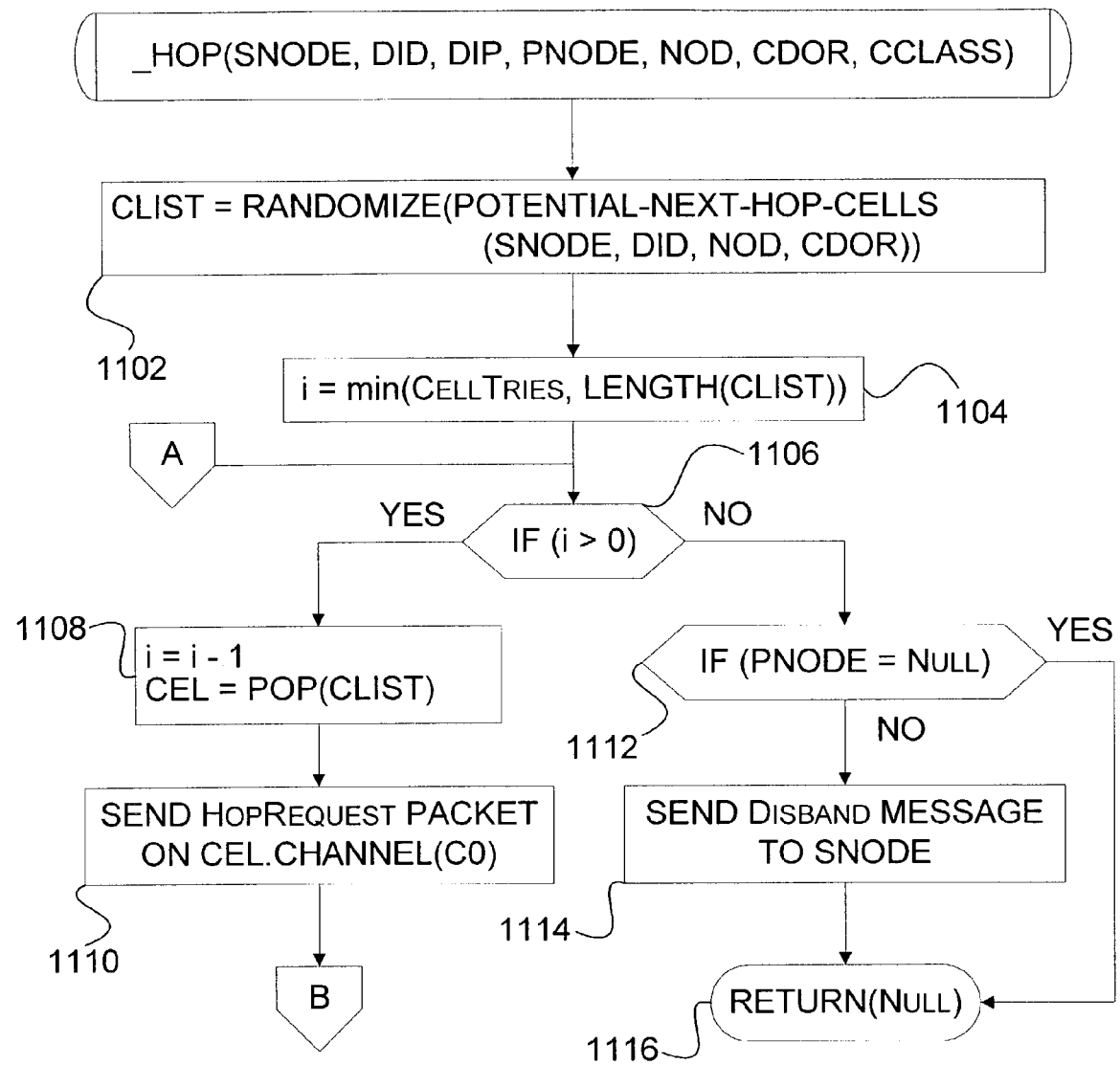
FIGS. 11A-11C illustrate the low-level _HOP method according to embodiments of the present invention.
Figure 11B:
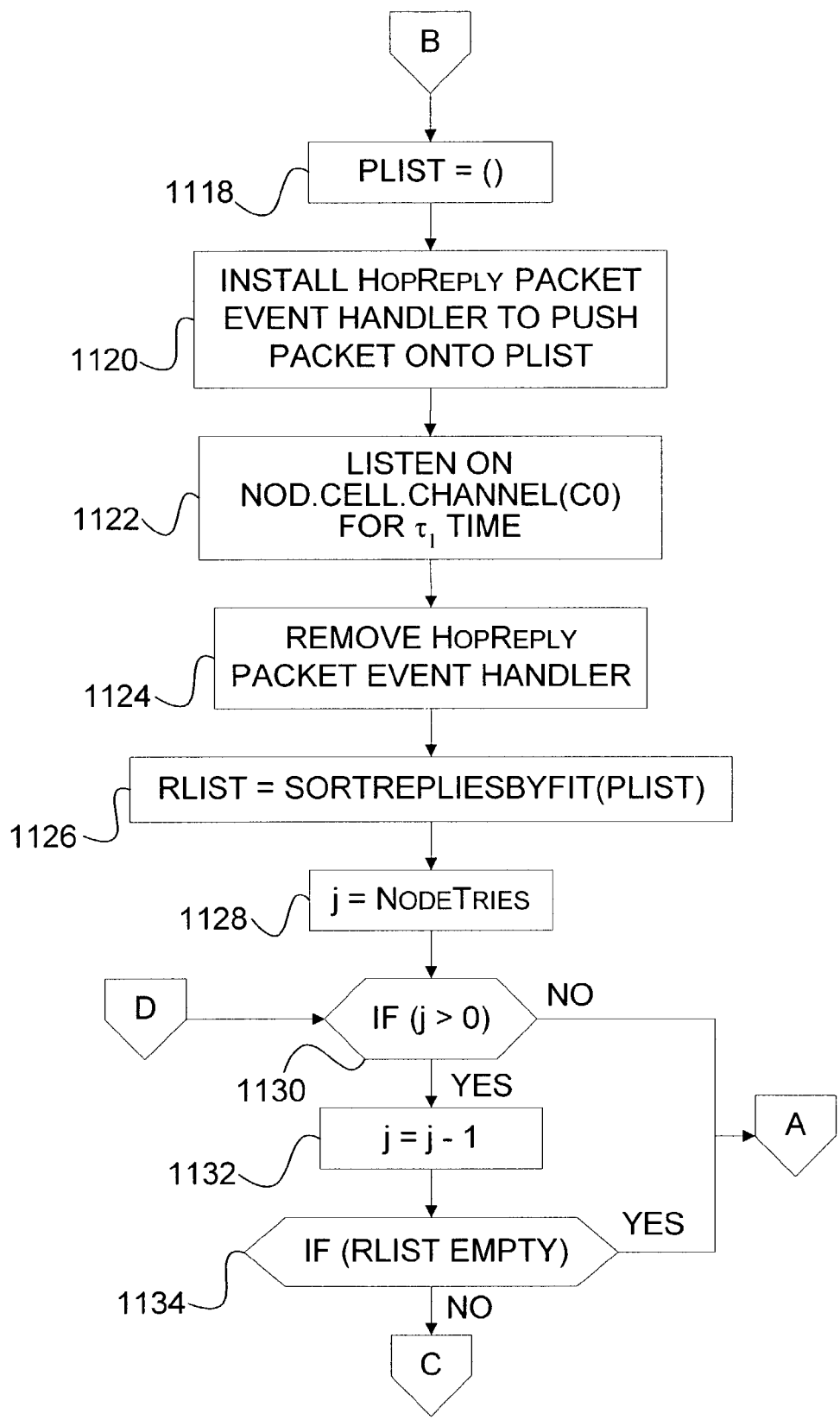
Figure 11C:
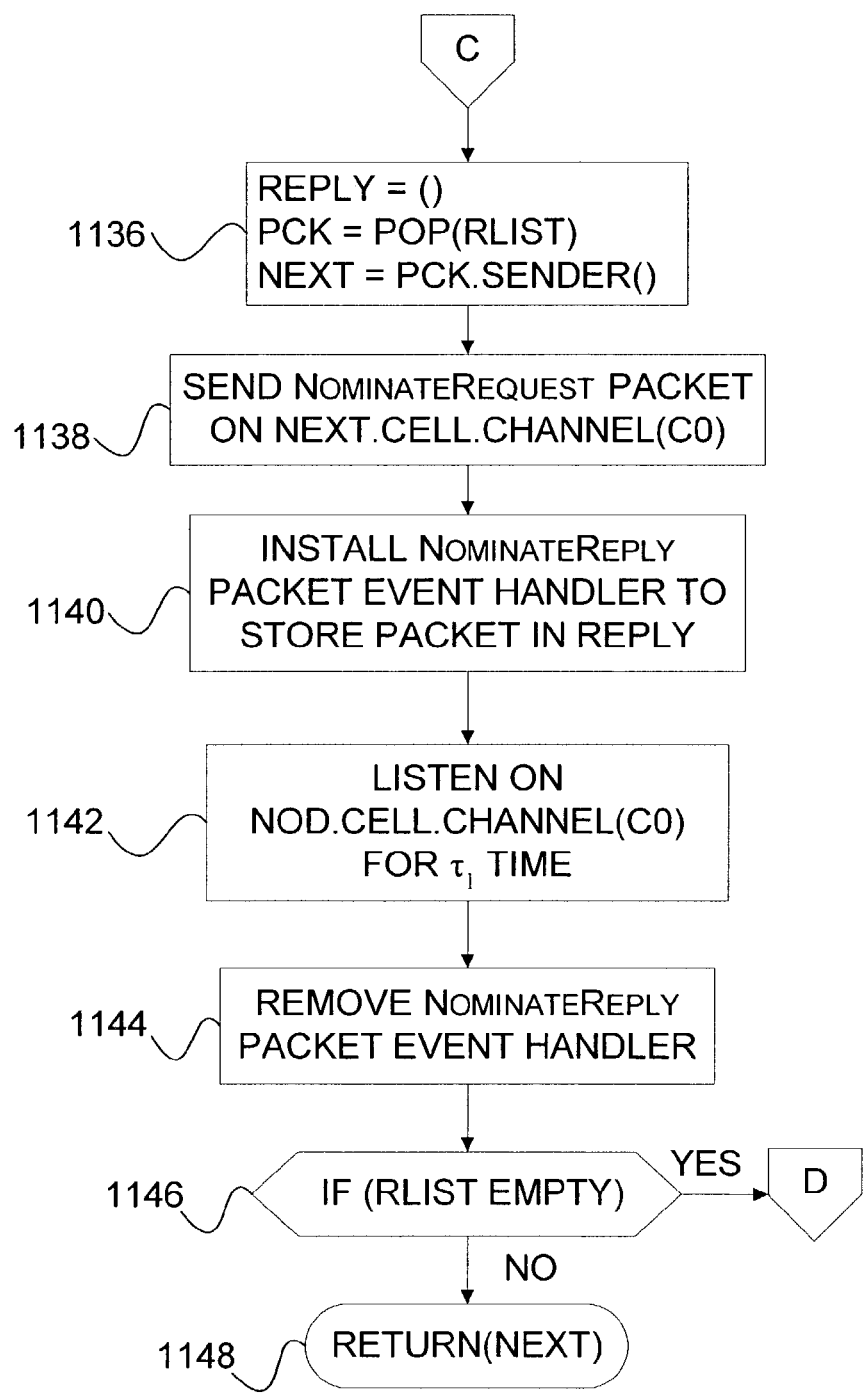

FIGS. 11A-11C illustrate the low-level _HOP method embodiment of the present invention that creates an all wireless route from the source node to the destination node's tentative cell. In FIG. 11A, CLIST 1102 is set to the randomized list of potential next-hop cells, and the function POTENTIAL-NEXT-HOP-CELLS returns a list of cells in NOD's neighborhood such that the projection of each cell's center is closer to DID than the projection of NOD cell's center, and the function RANDOMIZE takes a list and randomly changes the order of the elements. The variable "i" represents the maximum number of cells to try before giving up; "i" is initialized 1104 to the minimum of C<small>ELL</small>T<small>RIES</small>, and the number of elements in CLIST. If i is zero, that is a "no" at the IF(i>0) condition 1106, then the partial route that has been constructed is disbanded and N<small>ULL</small> is returned via the testing sending and returning steps 1112, 1114, and 1116. While there are more cells to try, a "yes" at condition 1106, i is decremented and CEL is set to the top element in CLIST 1108. A H<small>OP</small>R<small>EQUEST</small> packet is cellcasted into CEL on its C0 channel 1110.

The event handler mechanism is used as a wakeup call when a specific event occurs. For example, in step 1120, when a H<small>OP</small>R<small>EPLY</small> is received the packet will be pushed onto the PLIST. The node NOD listens for a H<small>OP</small>R<small>EPLY</small> packet on NOD cell's C0 channel for $\tau_1$ time 1122. The H<small>OP</small>R<small>EPLY</small> event handler is removed to prevent interruptions from occurring when H<small>OP</small>R<small>EPLY</small> packets are received 1124. RLIST is set to PLIST sorted by fit 1126.

Frequently, more than one node replies to a H<small>OP</small>R<small>EQUEST</small> packet. The term fit is used to describe how well a reply node matches the "profile" of the H<small>OP</small>R<small>EQUEST</small> packet. A H<small>OP</small>R<small>EQUEST</small> packet's profile is comprised of: (a) the destination node's IP address; (b) the waypoint node's IP address or net address, if specified; (c) the recipient node's IP address; and (d) the requested communication class.

The H<small>OP</small>R<small>EPLY</small> packet contains a fit value of F<small>IT</small>0, F<small>IT</small>1, F<small>IT</small>2, F<small>IT</small>3 and F<small>IT</small>4. The best fit, F<small>IT</small>0, is when: (a) the packet's destination IP address matches the reply node's IP address; (b) the packet's waypoint IP address matches the reply node's IP address; or (c) the packet's recipient address matches the reply node's IP address.

The second best fit, F$_{IT}$1, is when: (a) the packet's recipient address is the C$_{ELL}$C$_{AST}$ address, or if the packet's waypoint network address is specified and it matches one of the reply node's network addresses, and (b) the reply node can accommodate the packet's requested communication class, and (c) the reply node is a stationary node.

The third place fit, F$_{IT}$2, is when: (a) the packet's recipient address is the C$_{ELL}$C$_{AST}$ address, or if the packet's waypoint network address is specified and it matches the reply node's network address; and (b) the reply node can accommodate the packet's requested communication class, and (c) the reply node is within the circle, centered about the cell center with a radius of s/2.

The fourth place fit, F$_{IT}$3, is when: (a) the packet's recipient address is the CELLCAST address, or if the packet's waypoint network address is specified and it matches the reply node's network address, (b) the reply node can accommodate the packet's requested communication class, and (c) the reply node is within the doughnut, centered about the cell center, with a radius between $$\frac{\sqrt{3}}{2} \times s$$

and s.

The last place fit, F$_{IT}$4, is when: (a) the packet's recipient address is the C$_{ELL}$C$_{AST}$ address, or if the packet's waypoint network address is specified and it matches the reply node's network address, and (b) the reply node can accommodate the packet's requested communication class, and (c) the reply node is within the doughnut, centered about the cell center, with a radius between s and $(3\sqrt{3}/2)s$.

For the inner loop, j is initialized to N$_{ODE}$T$_{RIES}$, the maximum number of nodes to try before giving up on hopping through a cell 1128. If j is zero, that is a "no" at the IF(j>0) condition 1130, then try to hop through another cell, that is, step back to the IF(i>0) condition 1106. Otherwise, attempt to hop through a node in CEL, a "yes" at IF(j>0) condition 1130. The counter j is first decremented 1132. If no other H$_{OP}$R$_{EPLY}$ packets were received, that is, a "yes" at the IF(RLIST EMPTY) condition 1134, then try to hop through another cell, that is, step back to the IF(i>0) condition 1106. Otherwise, there are more nodes in CEL that responded, that is, a "no" at the IF(RLIST EMPTY) condition 1134. REPLY is initialized to an empty list and NEXT is set to the best fitting node that sent a H$_{OP}$R$_{EPLY}$ packet 1136. A N$_{OMINATE}$R$_{EQUEST}$ packet is sent to NEXT on its cell's C0 channel 1138. A N$_{OMINATE}$R$_{EPLY}$ packet event handler that stores the packet in REPLY is installed 1140. NOD listens for the N$_{OMINATE}$R$_{EPLY}$ from NEXT for $\tau_1$ time 1142. The N$_{OMINATE}$R$_{EPLY}$ event handler is removed to prevent interruptions from occurring if additional N$_{OMINATE}$R$_{EPLY}$ packets are received 1144. If no N$_{OMINATE}$R$_{EPLY}$ packet was received from NEXT (yes at condition 1146), try to nominate another node (step back to 1130). Otherwise, a N$_{OMINATE}$R$_{EPLY}$ packet was received and NEXT is returned 1148.

Diffusion Search

Node hopping constructs most of the route to within the neighborhood of the destination's tentative cell. From there, a diffusion search is initiated in the event the destination has moved since route construction was initiated. A diffusion search begins at the center and progresses outward in all directions. The premise is that the destination has not moved very far, if at all, from its last known cell. The objective of the diffusion search is to visit each cell, within a radius of the destination's last known cell, in an orderly manner, at different times and from different directions. The radius of the search area is determined by the speed at which the destination is moving and the freshness of its last known cell. Another parameter defines the number of times each cell in the search area is visited. If the network is sparsely populated, then each cell is searched multiple times from separate directions. If on the other hand, the network is densely populated, then fewer visits to each cell are required to locate the destination.

Search ring 0 is the center cell of a diffusion search, and search ring 1 is the set of cells that comprise the neighborhood of search ring 0, excluding search ring 0. Search ring 2 is the union of the neighborhoods of every cell in search ring 1 minus search ring 0 and search ring 1. If c is a cell, then N(c) is defined to be the set of cells that comprise the neighborhood of c, and $R^i(c)$ is the search ring i, centered at c. Each cell in the ring is indexed starting with the right most cell being index 0 and increasing in a counter-clockwise direction. The $j^{th}$ cell of the $i^{th}$ ring is referred to as $R^i_j(c)$. Search ring n can now be formally defined.

Search ring n of cell c is defined to be:

$$R^n(c) = \begin{cases} c & n = 0; \\ N(c) - c & n = 1; \\ \bigcup_{i=0}^{6(n-1)} N(R_i^{n-1}(c)) - R^{n-1}(c) - R^{n-2}(c) & \text{otherwise} \end{cases} \quad [5]$$

Figure 12A:
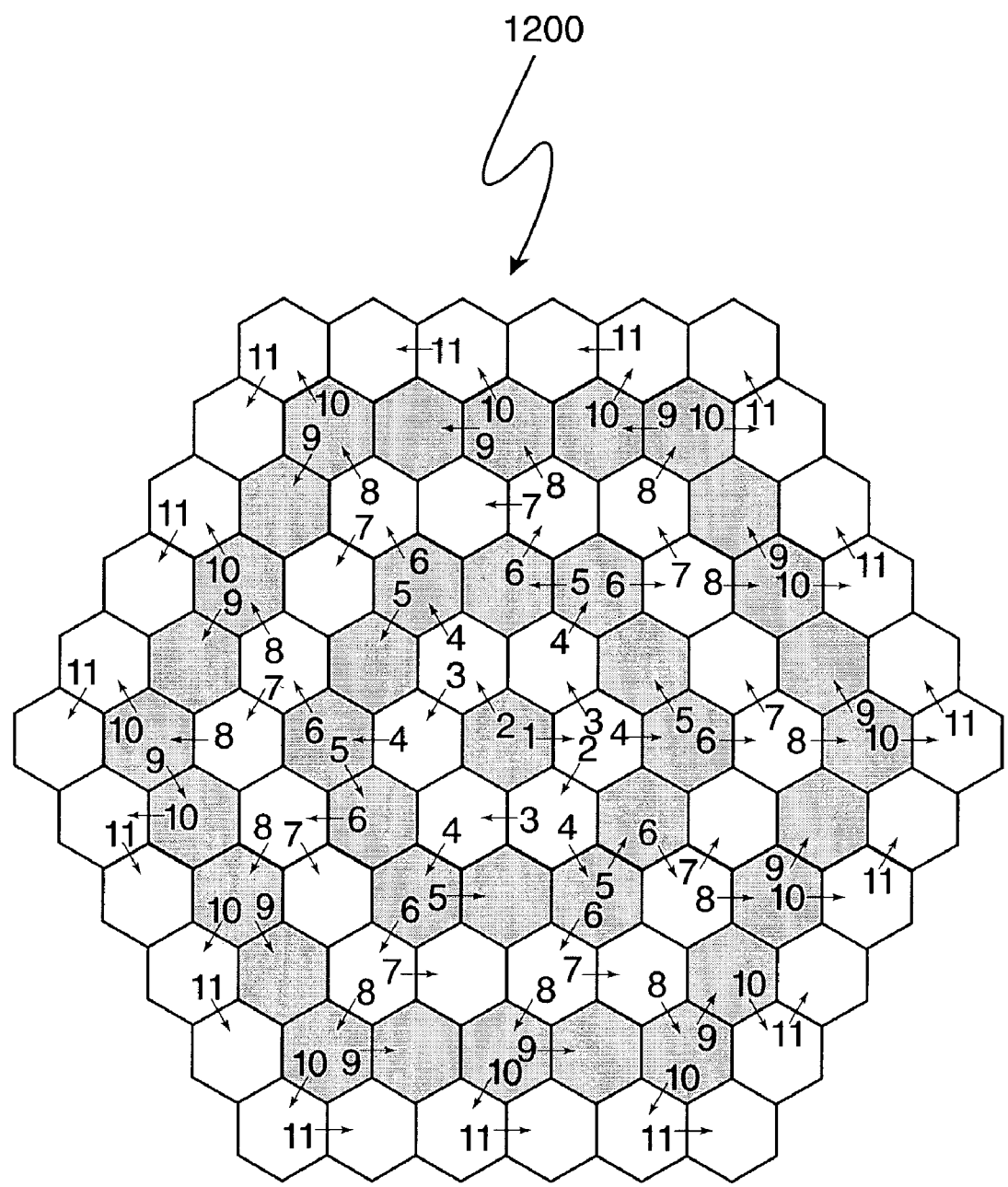
FIG. 12A illustrates a first diffusion search mostly progressing from even indexed cells of inner rings to even indexed cells of outer rings, with overlap=0.
Figure 12B:
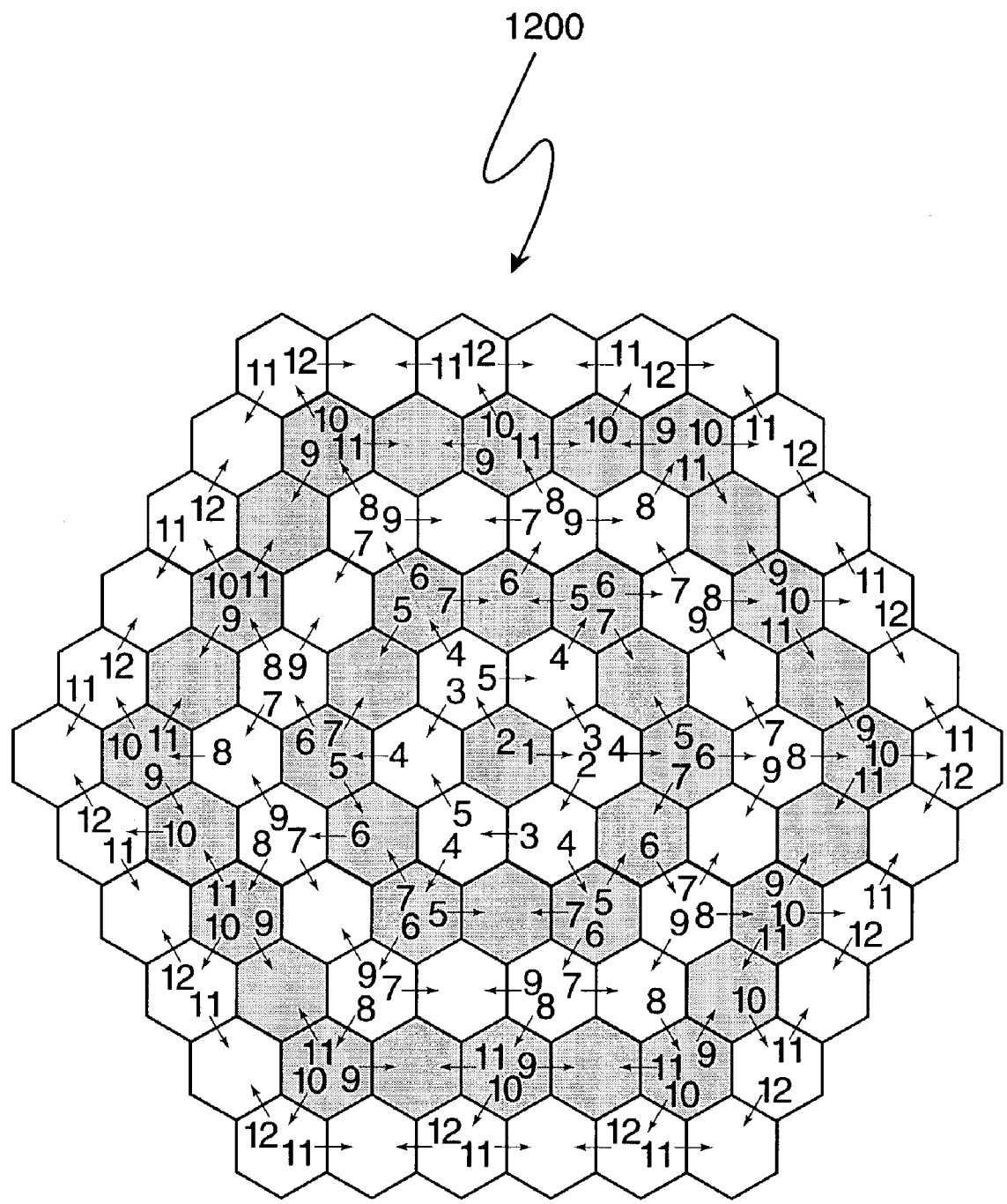
FIG. 12B illustrates a first diffusion search mostly progressing from even indexed cells of inner rings to even indexed cells of outer rings, with overlap=1.
Figure 12C:
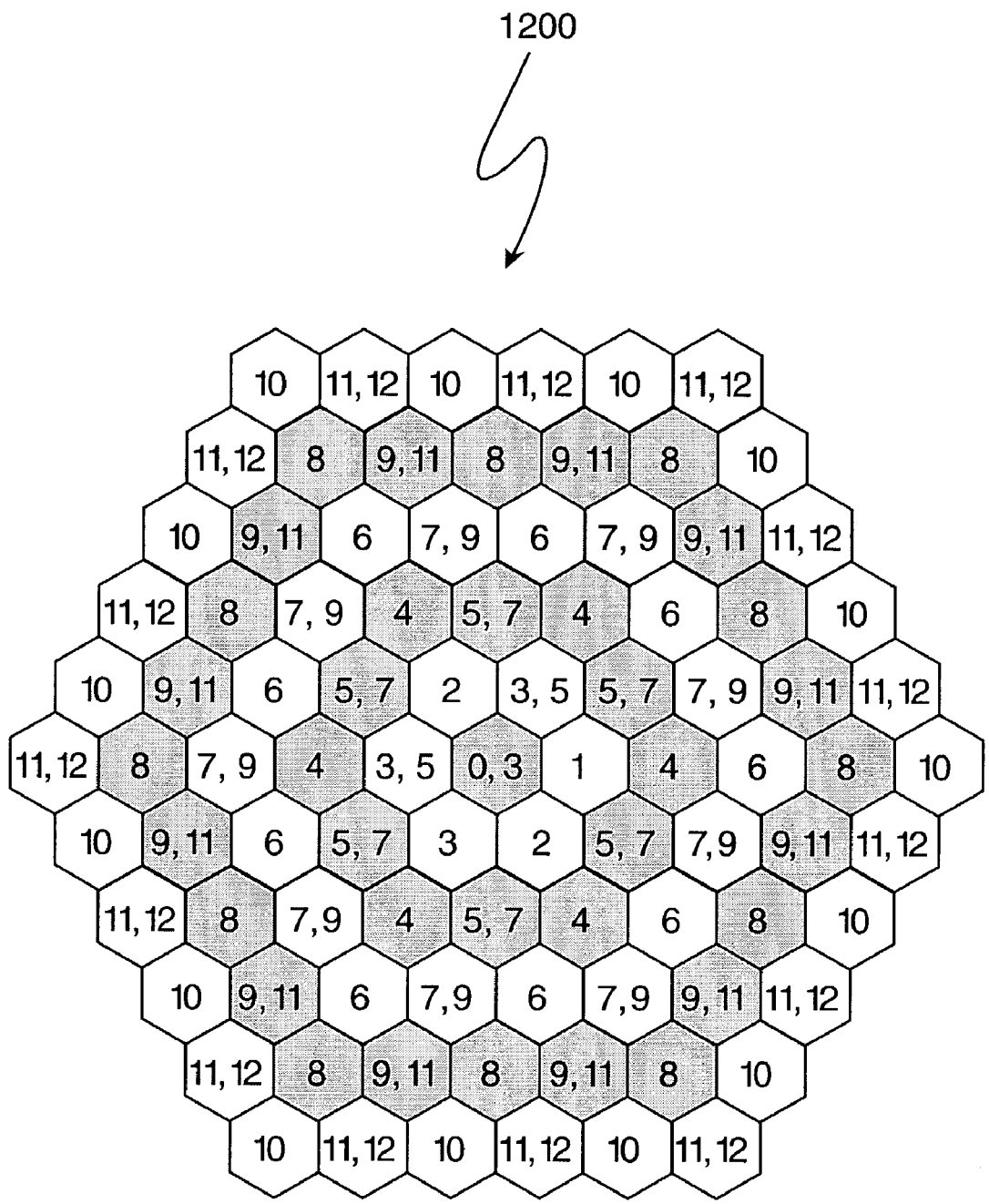
FIG. 12C illustrates a diffusion search cell visit times, first diffusion search, with overlap=1.

Search rings are concentric with search ring i−1 contained within search ring i. FIGS. 12A-12C illustrate a diffusion search of radius 5 1200, with even search rings shaded. Generally, a diffusion search progresses from inner rings to outer rings. Arrows in these figures signify a transition from one cell to another and individually represent the sender node cellcasting into the recipient's cell. The number that appears at the quill end of the arrow (opposite the arrowhead) is the soonest time at which a particular transition can occur, and is also termed its "firing time." Time is measured in terms of transition firings. That is, a transition firing at time 2 immediately follows the transition that fires at time 1 and immediately proceeds the transition that fires at time 3. FIGS. 12A-12B show a diffusion search in which each ring is first visited in its even cells. In FIG. 12A, OLAP=0, and progress within each ring is from lower numbered cells to next higher numbered cells (except from ring 1). FIG. 12B illustrates how odd-cell-ring-indexed cells are redundantly visited when OLAP=1. The times at which cells in FIG. 12B are visited are listed in FIG. 12C.

Figure 13A:
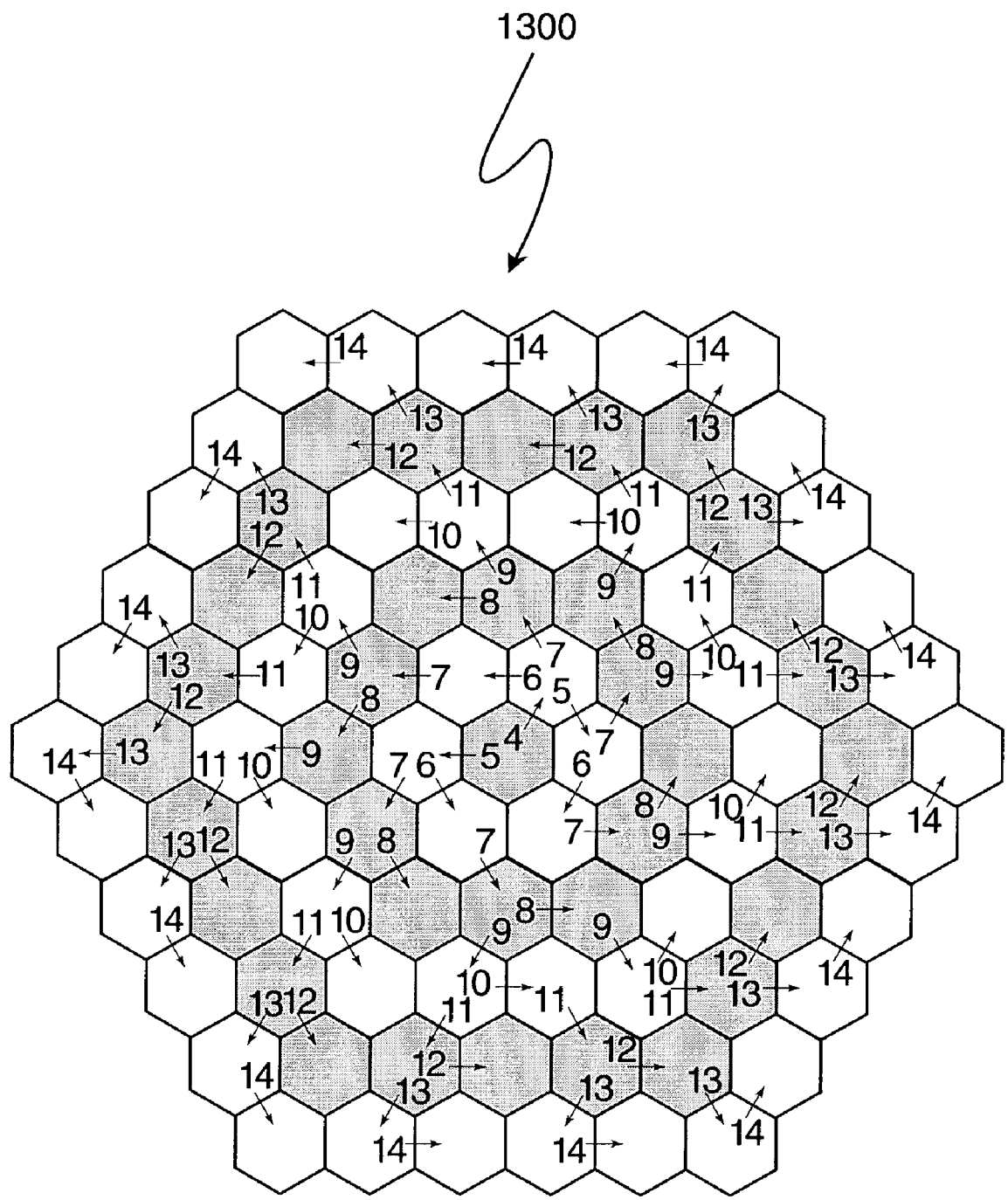
FIG. 13A illustrates a second diffusion search mostly progressing from odd indexed cells of inner rings to odd indexed cells of outer rings, with overlap=0.
Figure 13B:
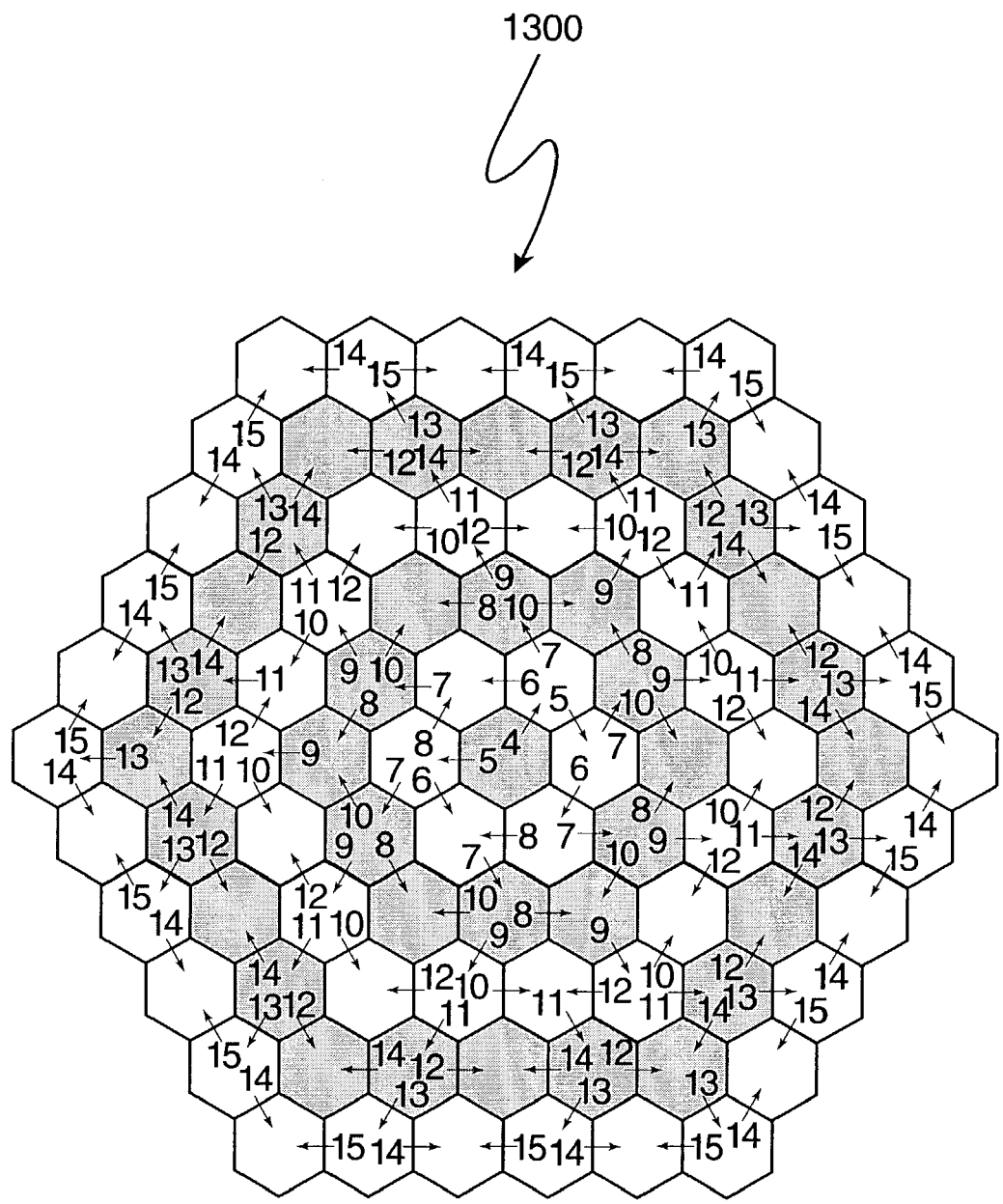
FIG. 13B illustrates a second diffusion search mostly progressing from odd indexed cells of inner rings to odd indexed cells of outer rings, with overlap=1.
Figure 13C:
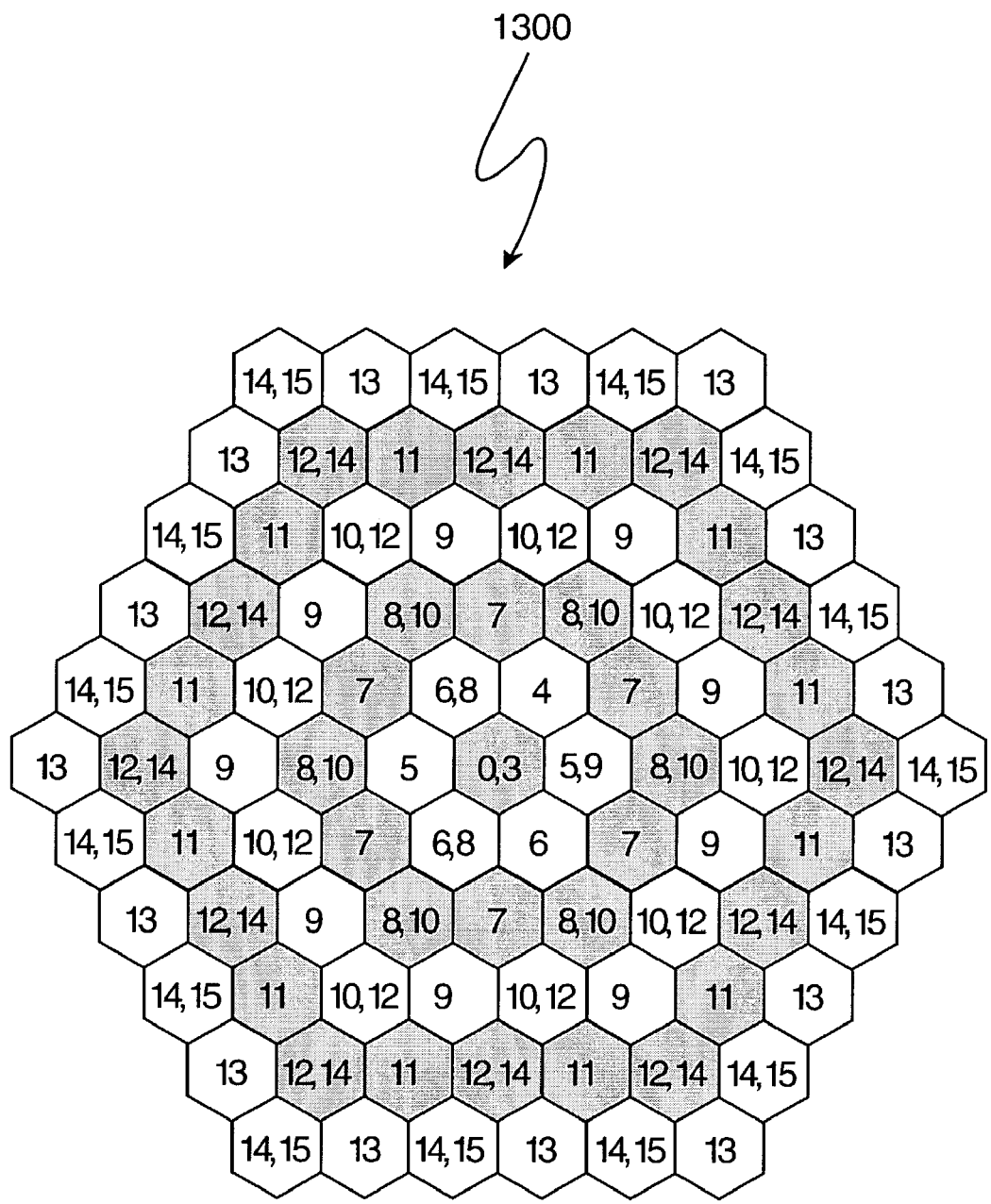
FIG. 13C illustrates a diffusion search cell visit times, second diffusion search, with overlap=1.

FIGS. 13A-13B show the second half of a complete diffusion search 1300. FIG. 13A illustrates that when OLAP=0, progress from inner to outer ring is made along odd numbered cell ring indexes. Progress within a ring is from lower indexed cells to higher numbered cells (except from ring 1), when OLAP=0. FIG. 13B illustrates that when OLAP=1, even-cell-ring-indexed cells are redundantly visited. The times at which cells are visited in the second half of a complete diffusion search are listed in FIG. 13C. When OLAP=1, each cell in a diffusion search area is visited at most three times, from three directions.

Figure 14:
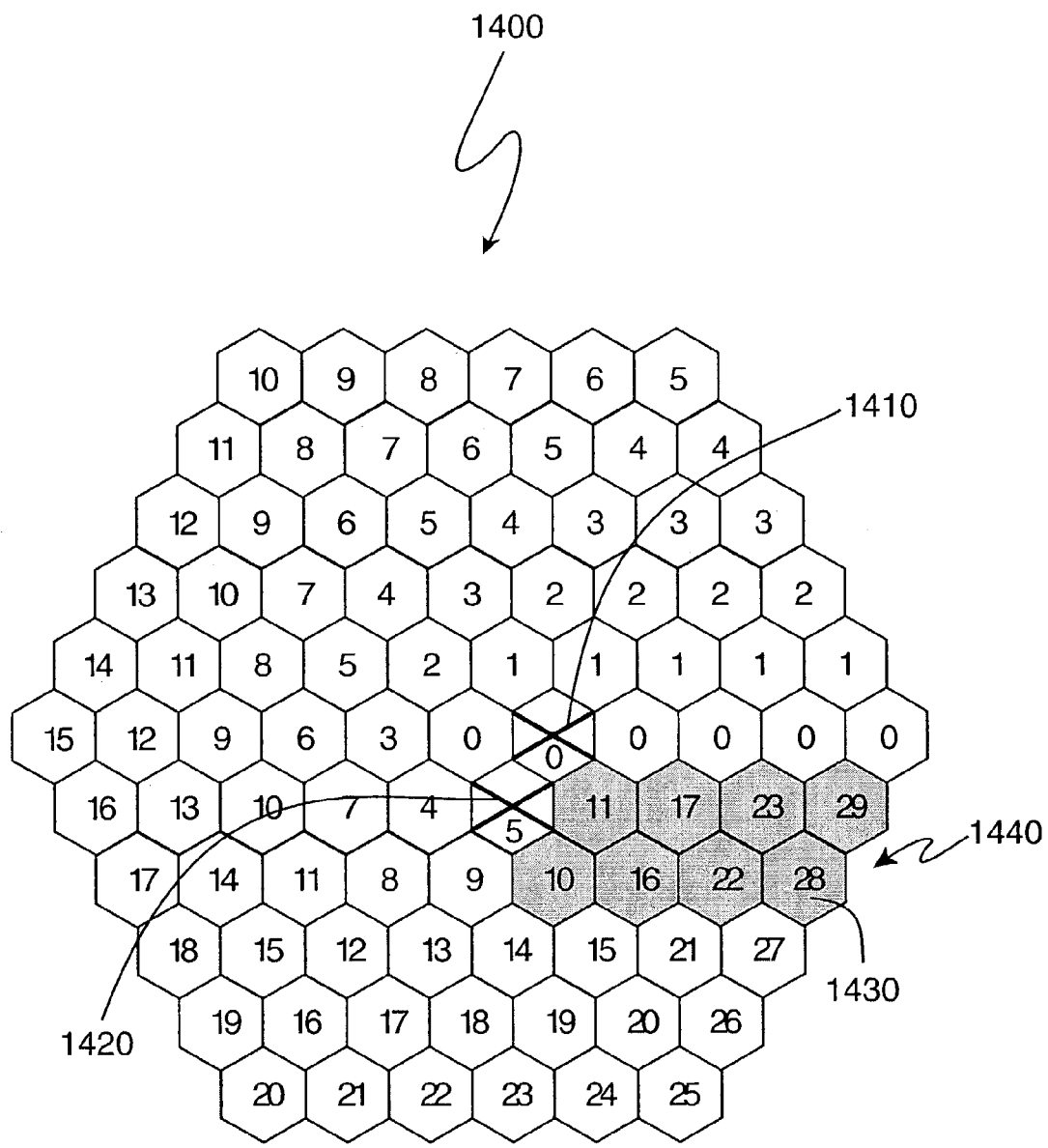
FIG. 14 illustrates an example of a diffusion search that fails for overlap <2, even though the destination node is in the search area.

A diffusion search, unlike flooding, visits each cell in the search area a fixed number of times, depending on the value of OLAP. Flooding can redundantly and often excessively visit the same cell. However, if a cell is disconnected from neighboring cells in such a way that an outward search cannot visit the cell, then a diffusion search will fail where flooding would succeed. The belief is that such network configurations will be rare and short lived. FIG. 14 is an example of a diffusion search with OLAP=1 that failed to locate the destination node 1400. Neither cell with an 'x' in it (cells at index 0, 1410, and 5, 1420, in ring 1) contains a node, causing all shaded cells to be unreachable by the diffusion search. If the destination node is located in one of the shaded cells, then the diffusion search will fail when OLAP<2. However a diffusion search with OLAP≧2 would be able to circumvent the two empty cells and test all cells including the shaded ones.

Figure 15A:
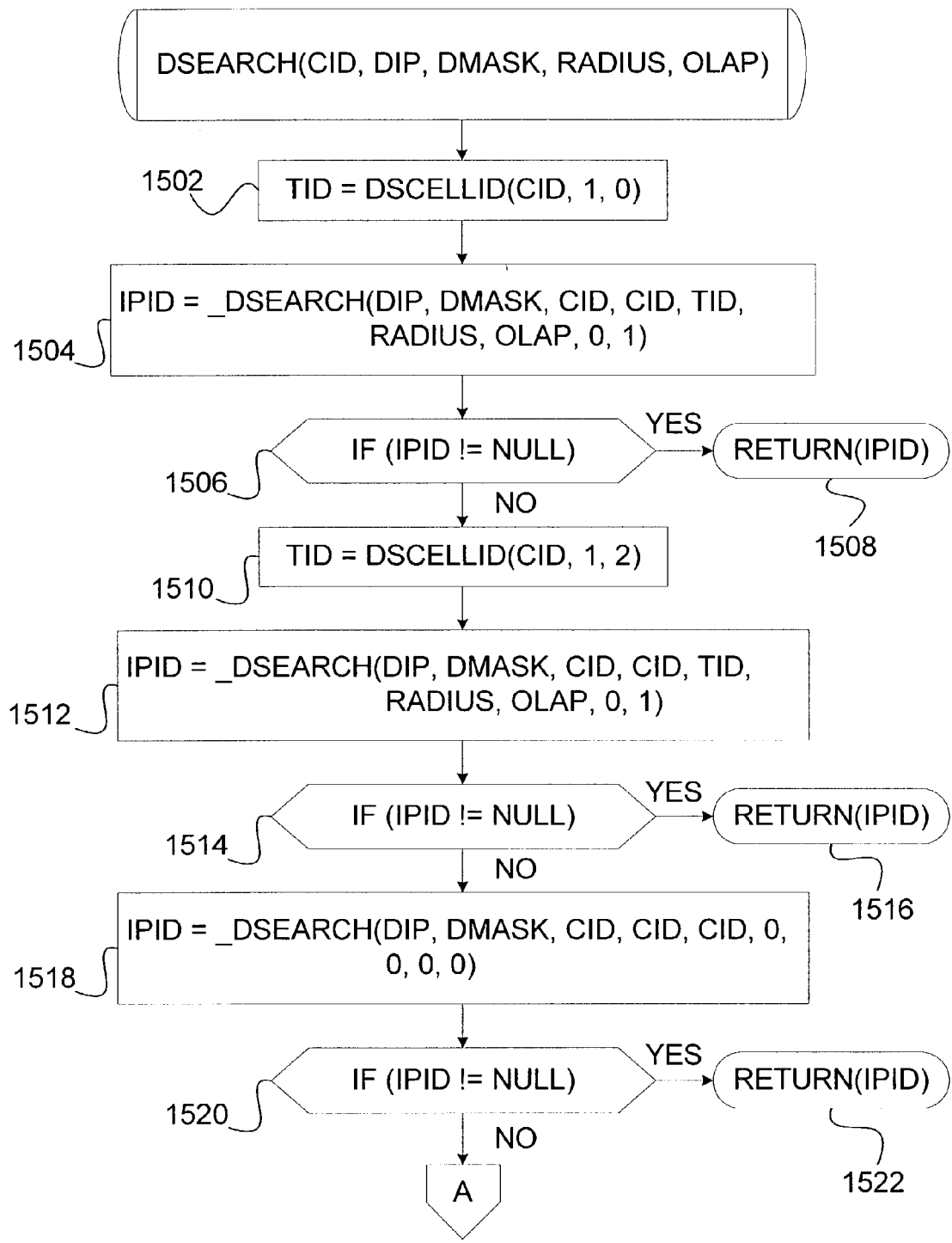
FIGS. 15A-15B illustrate the DSEARCH method according to embodiments of the present invention.
Figure 15B:
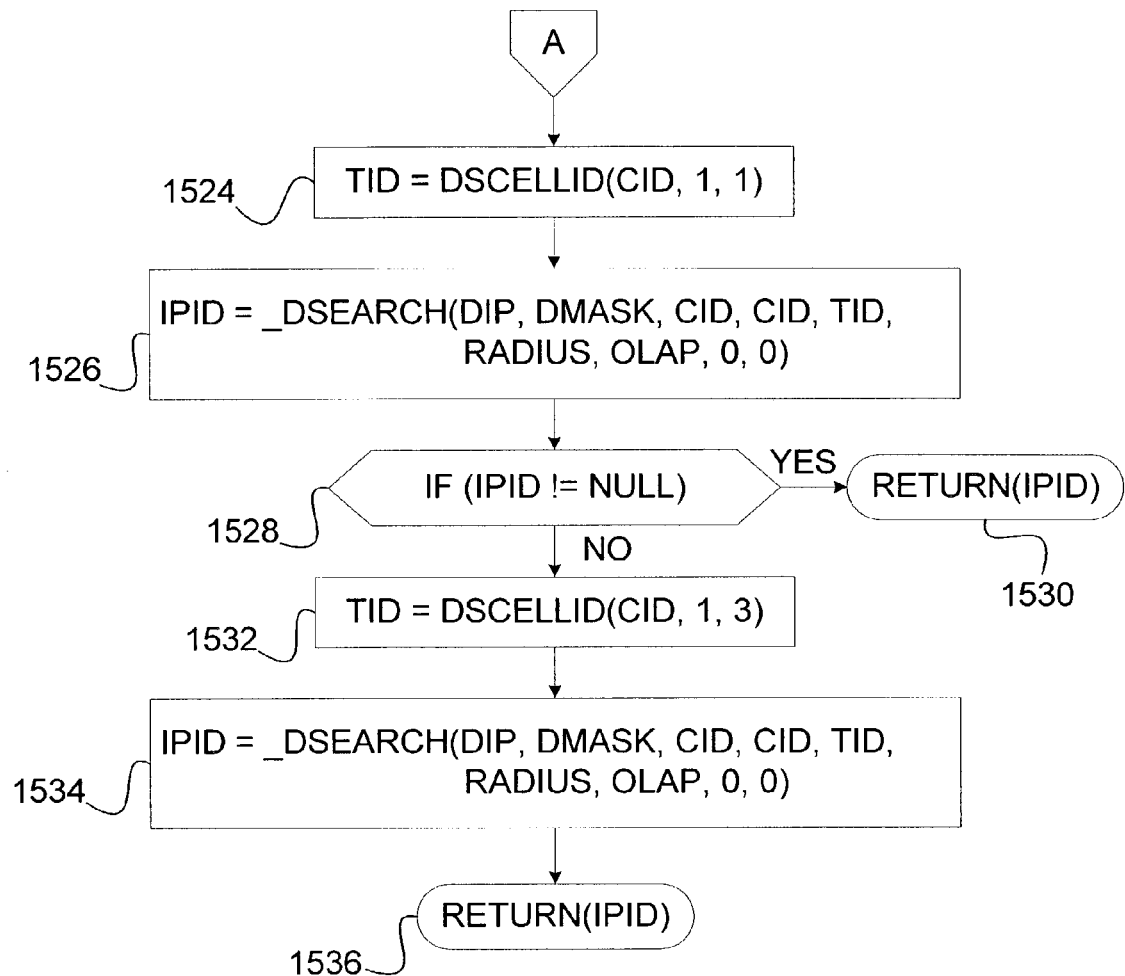
Figure 16A:
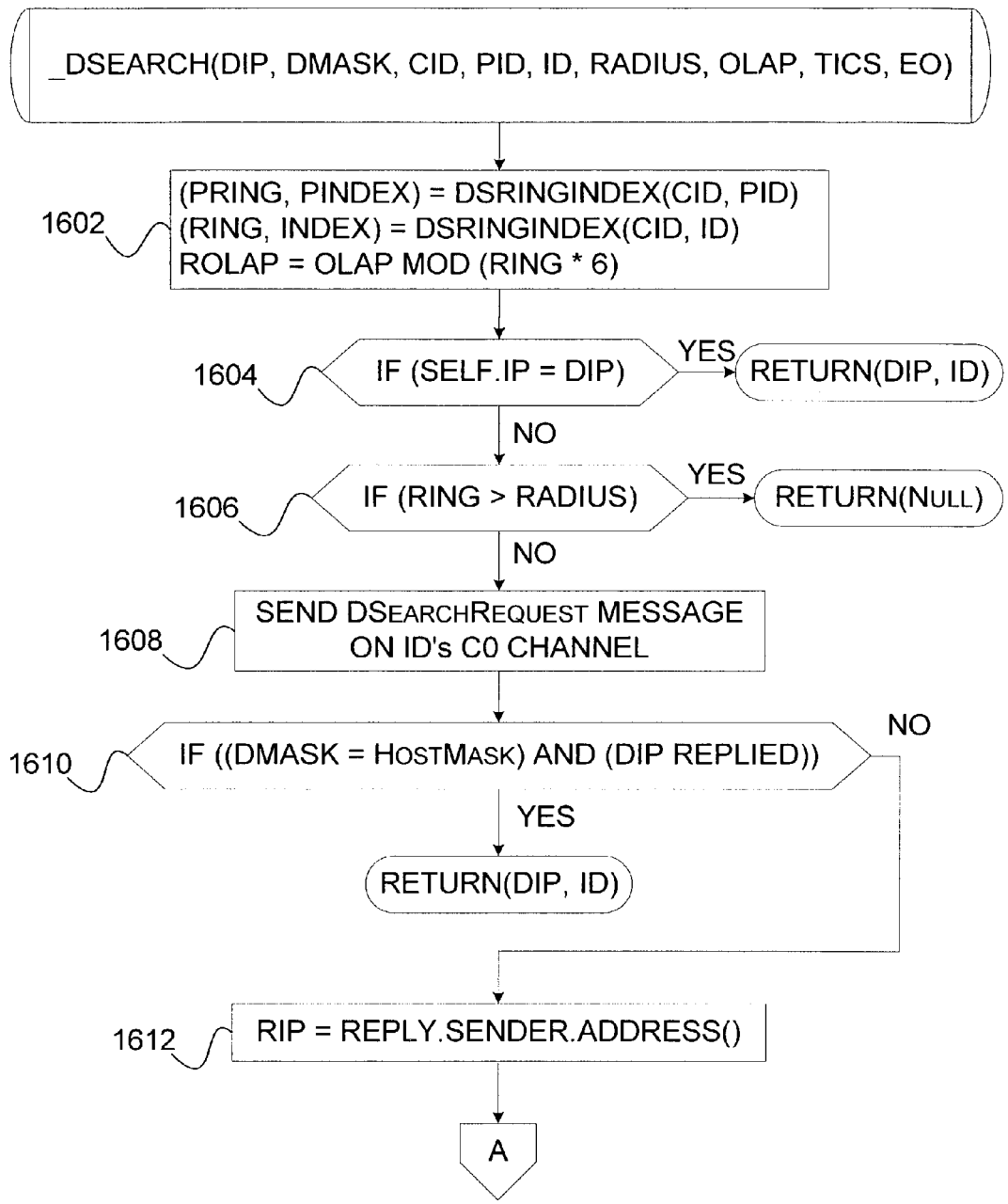
FIGS. 16A-16J illustrate the low-level _DSEARCH method according to embodiments of the present invention.
Figure 16B:
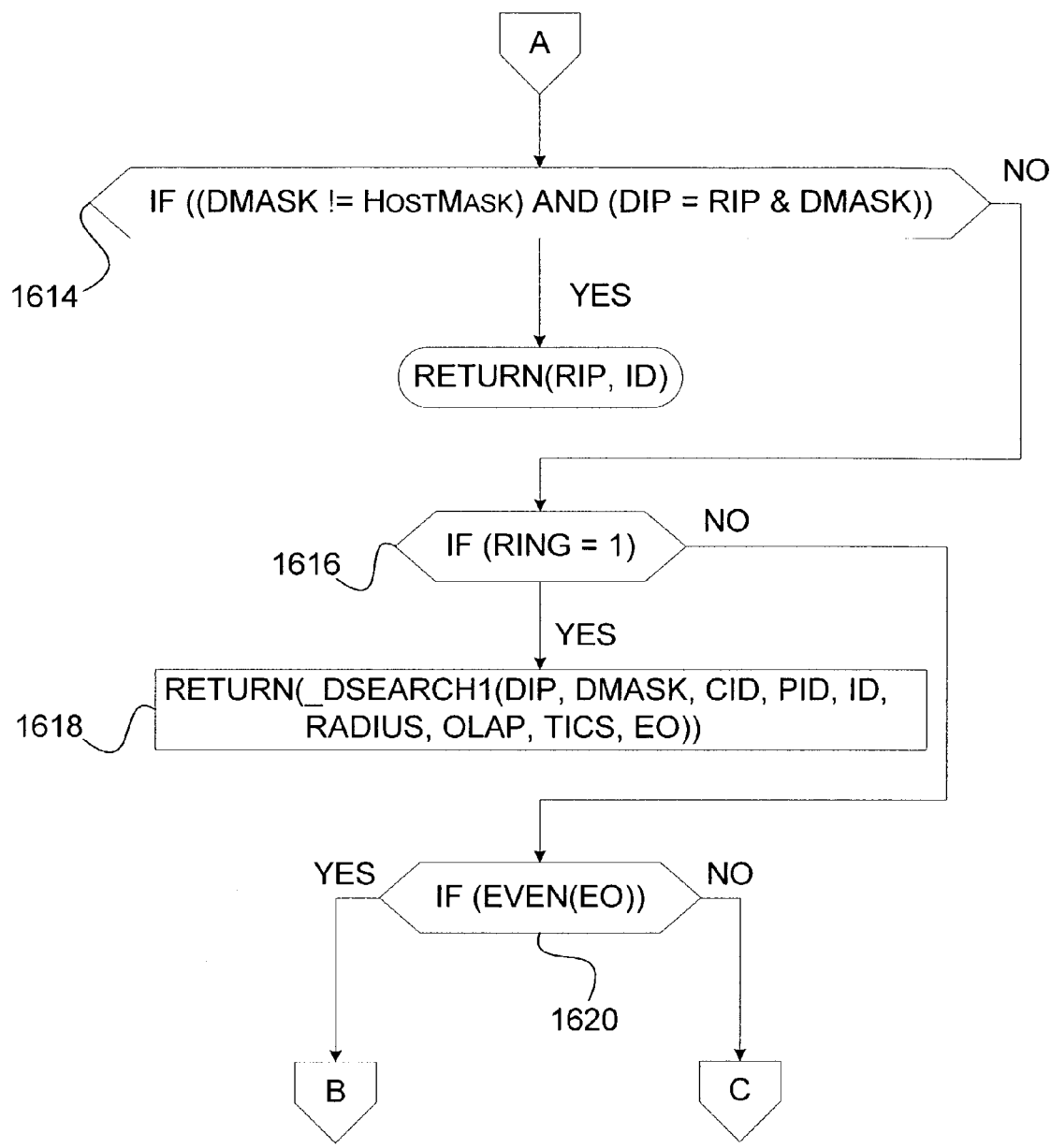
Figure 16C:
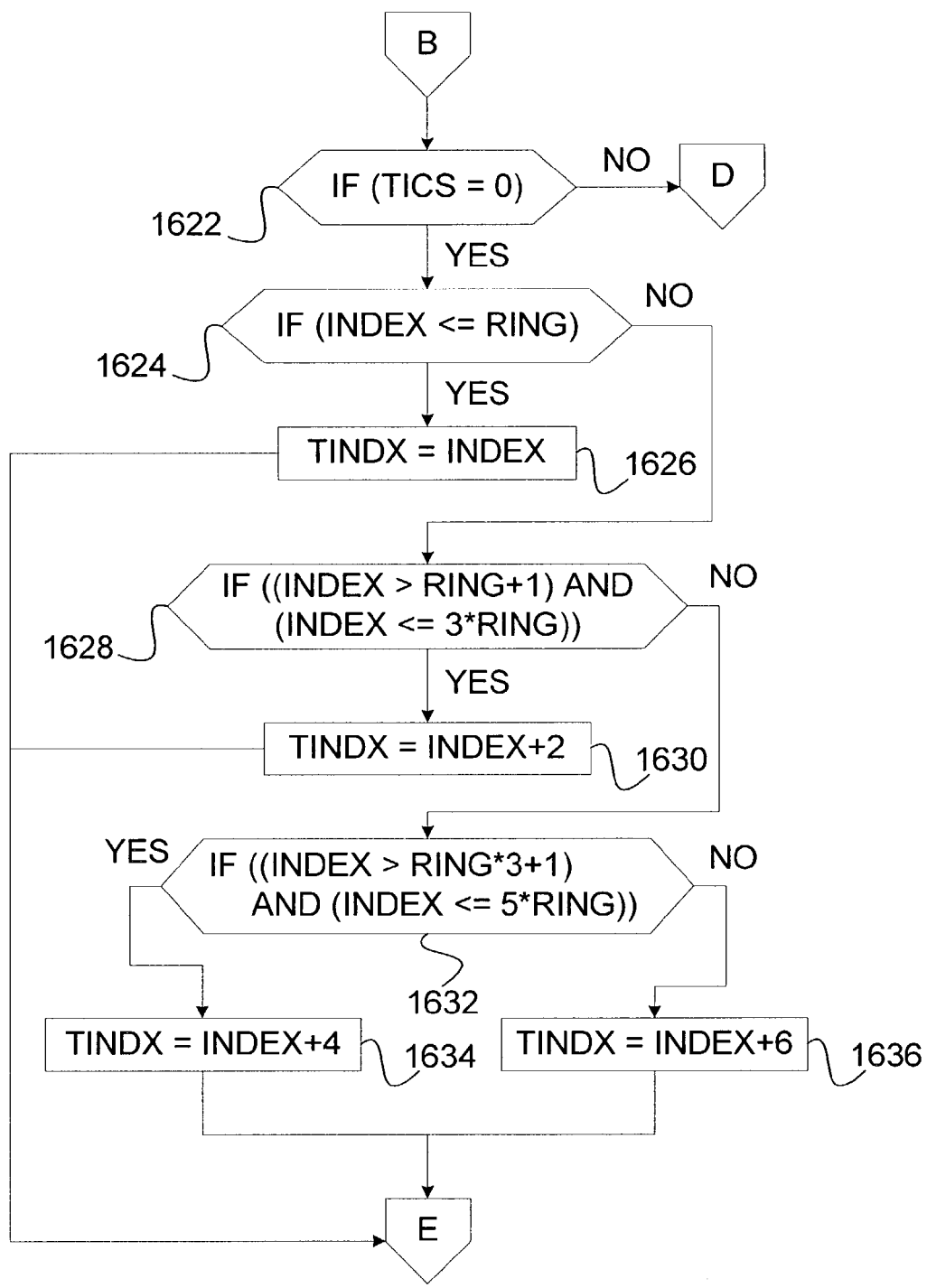
Figure 16D:
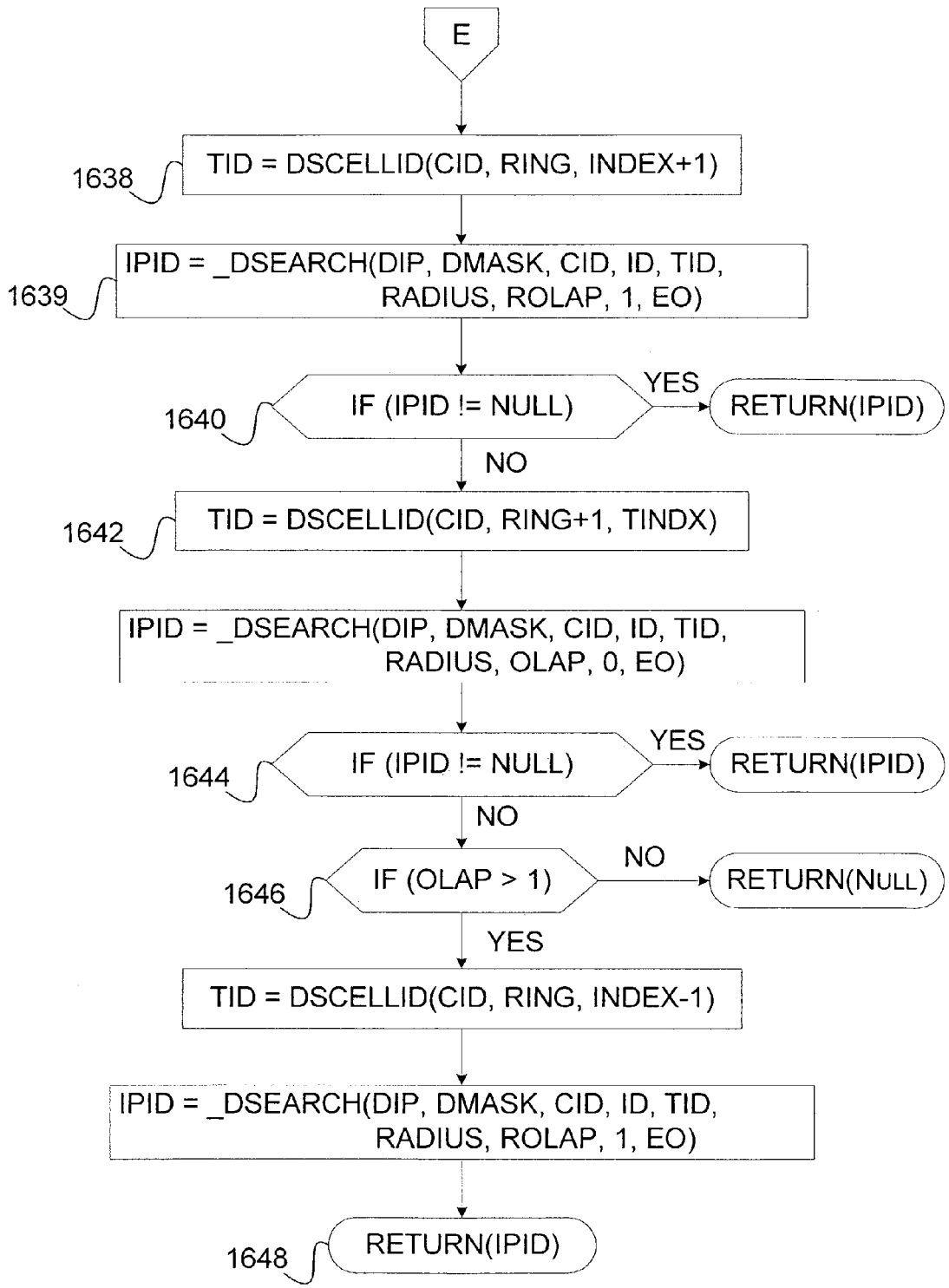
Figure 16E:
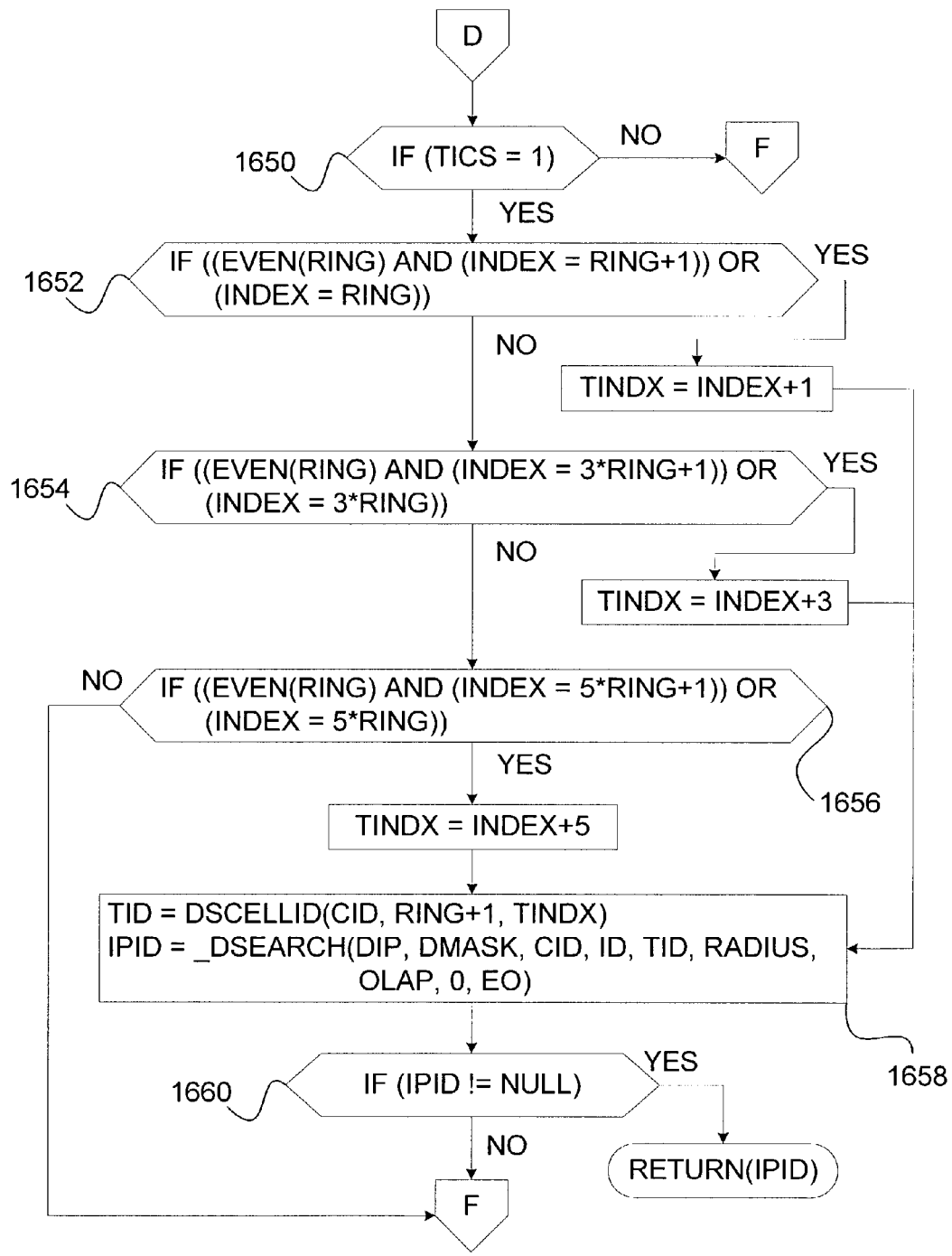
Figure 16F:
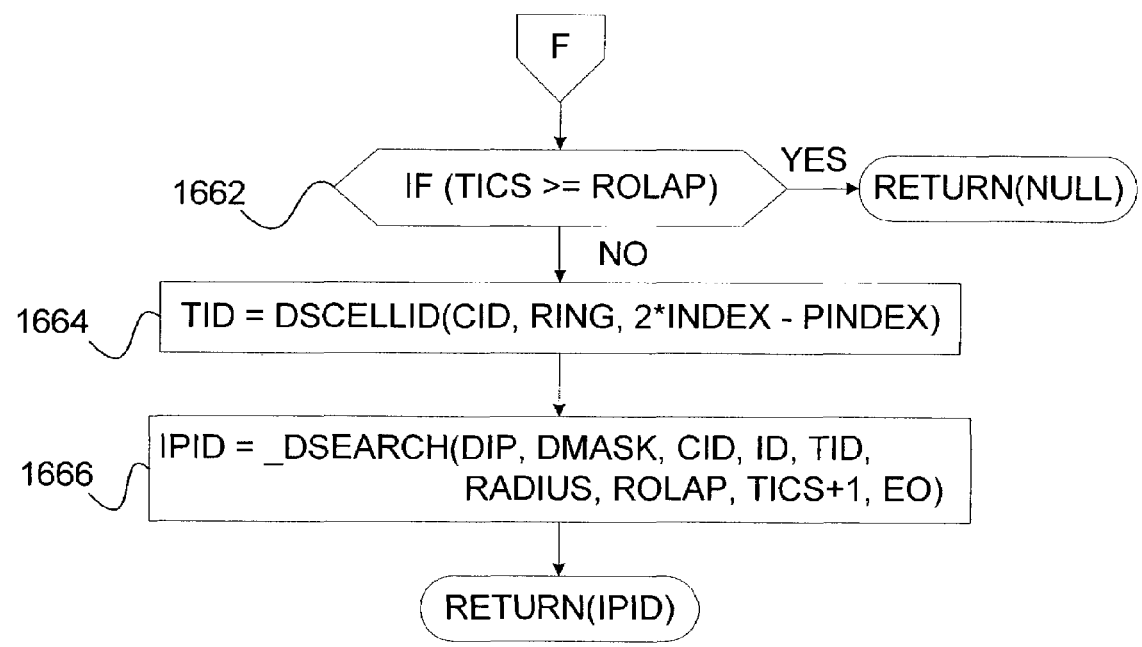
Figure 16G:
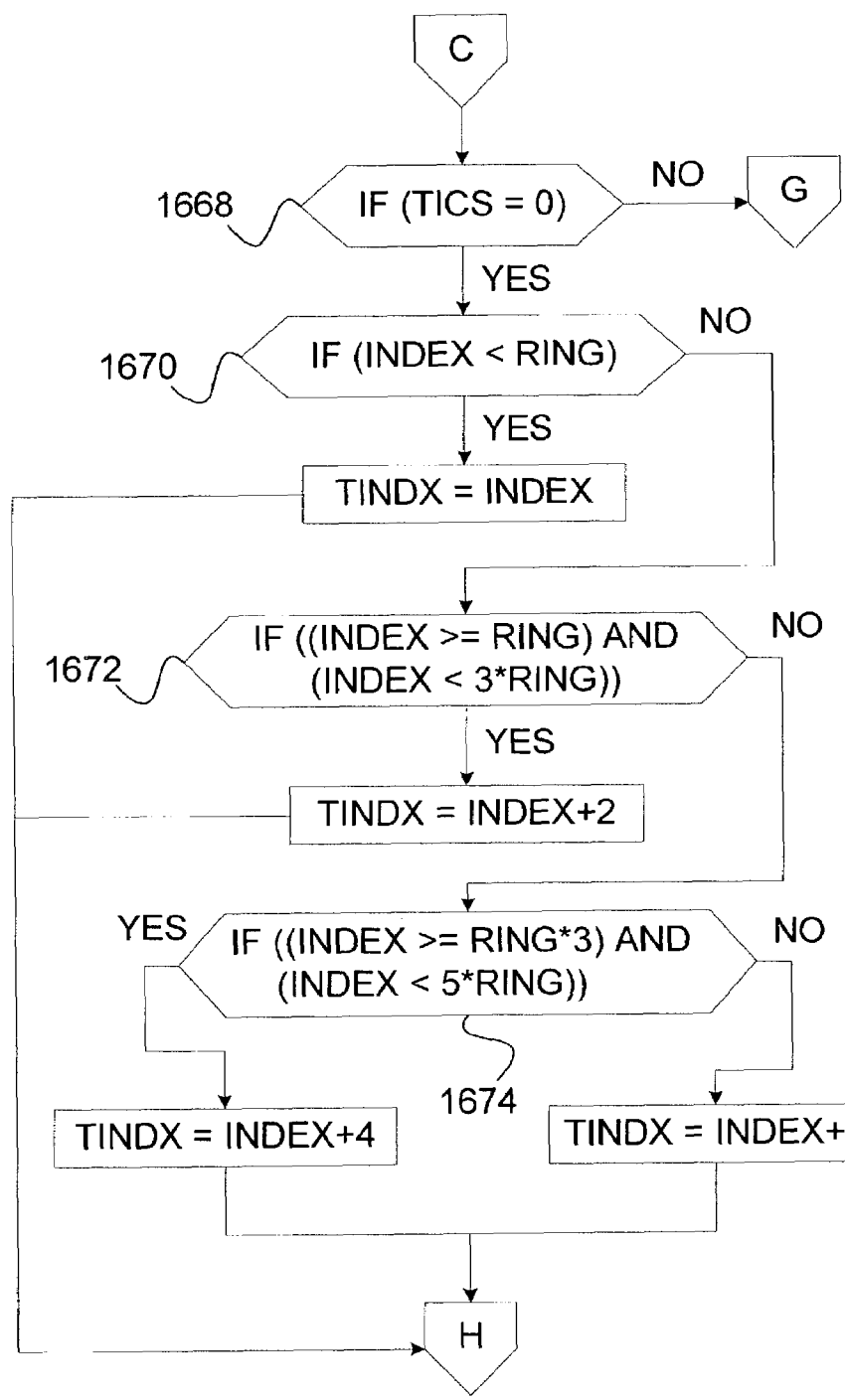
Figure 16H:
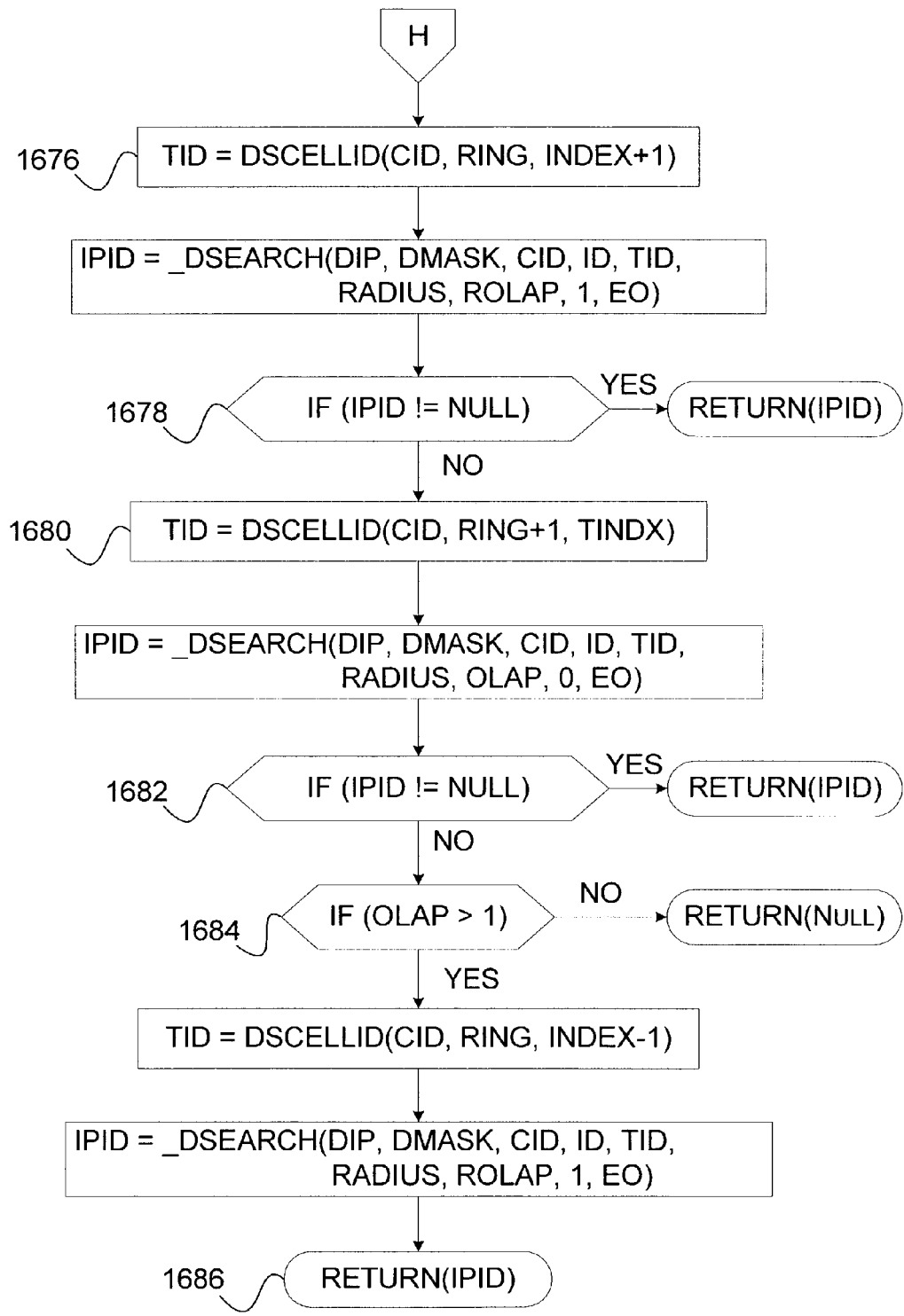
Figure 16I:
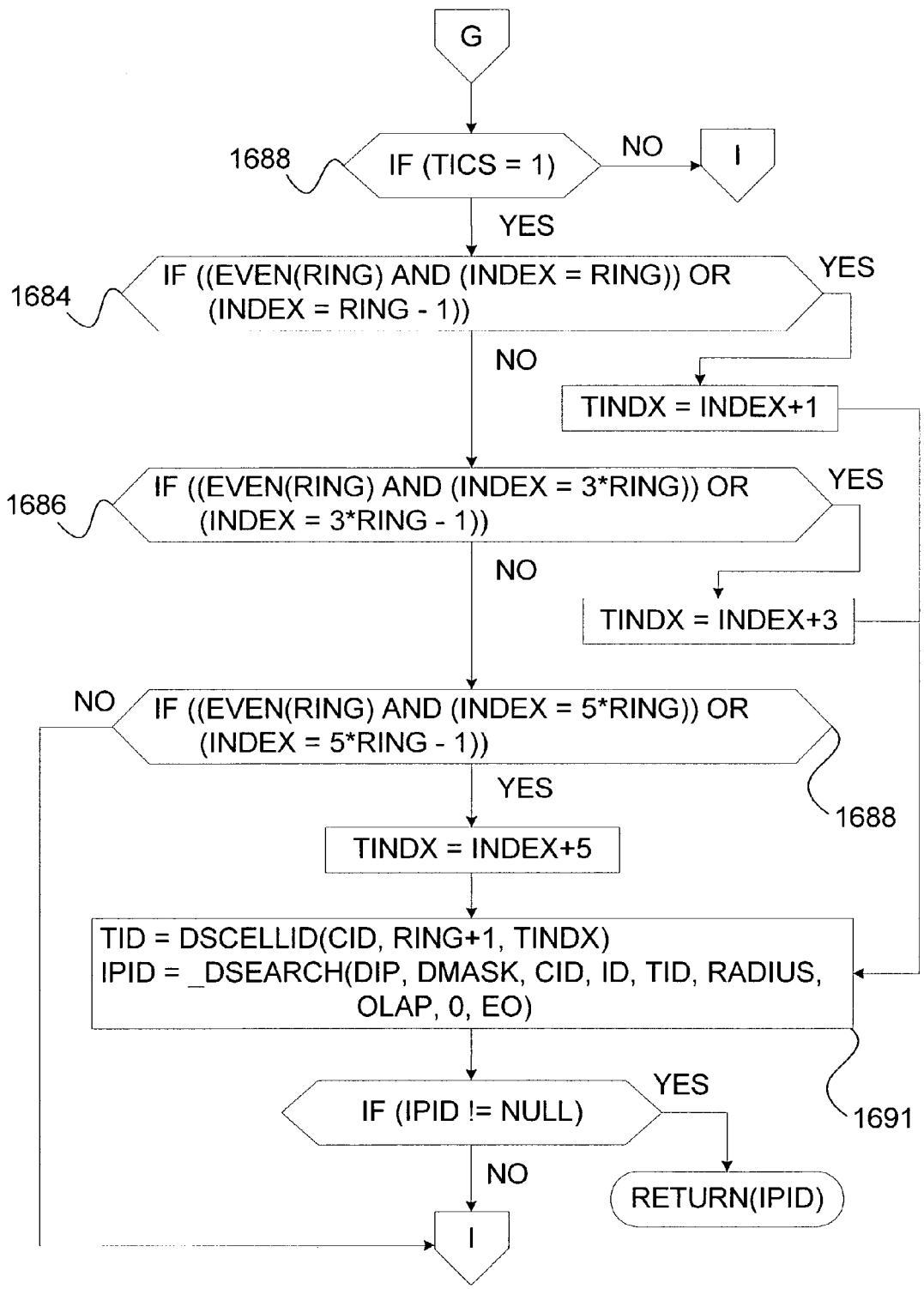
Figure 16J:
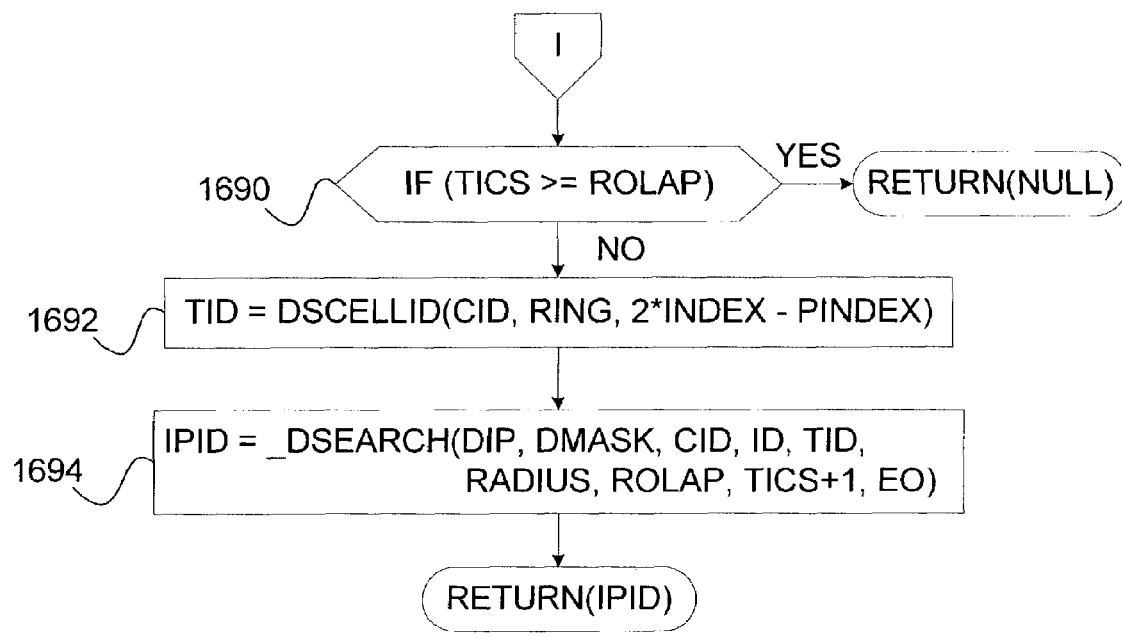
Figure 17A:
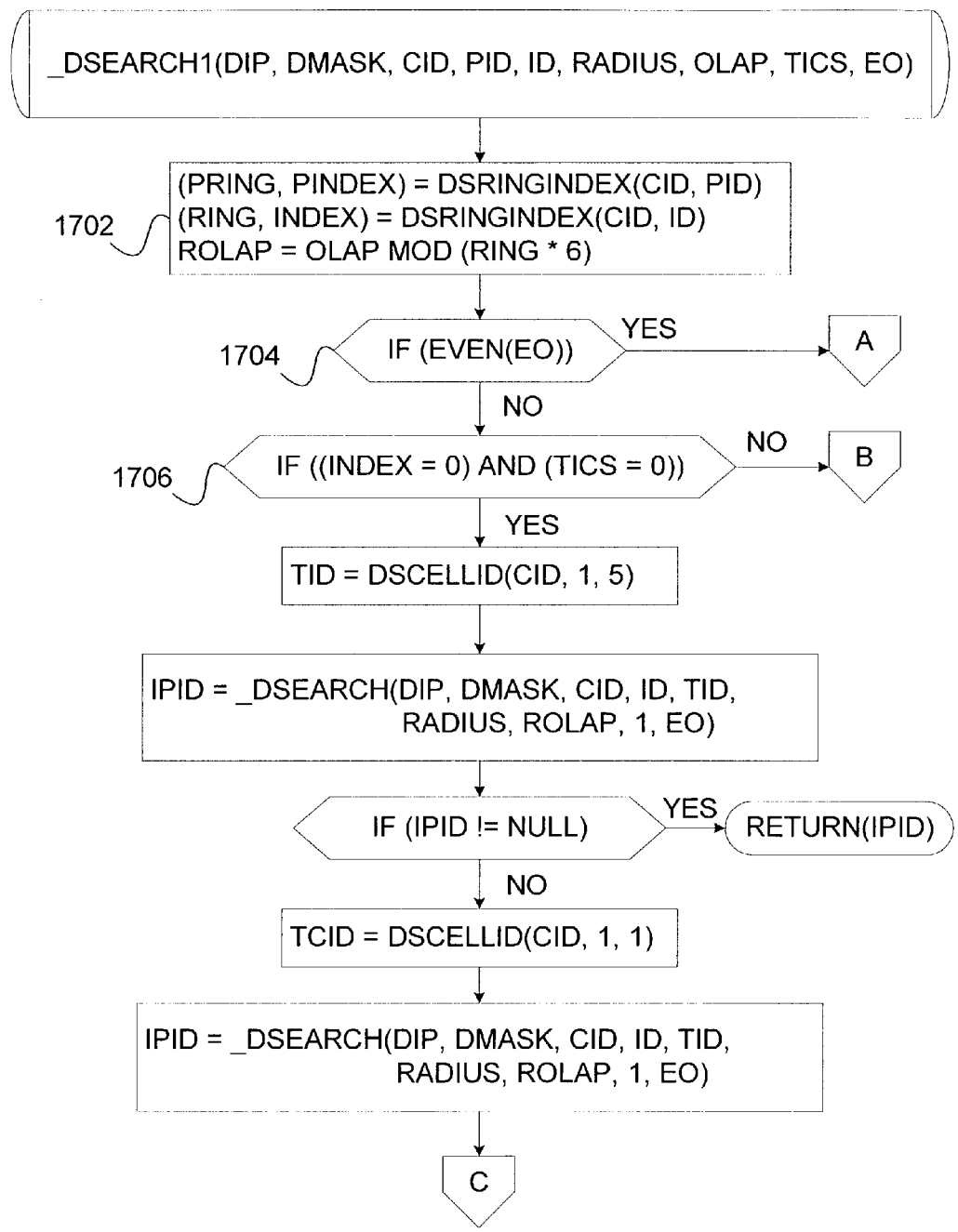
FIGS. 17A-17J illustrate the low-level _DSEARCH1 method implements the diffusion search for the destination node, from ring 1.
Figure 17B:
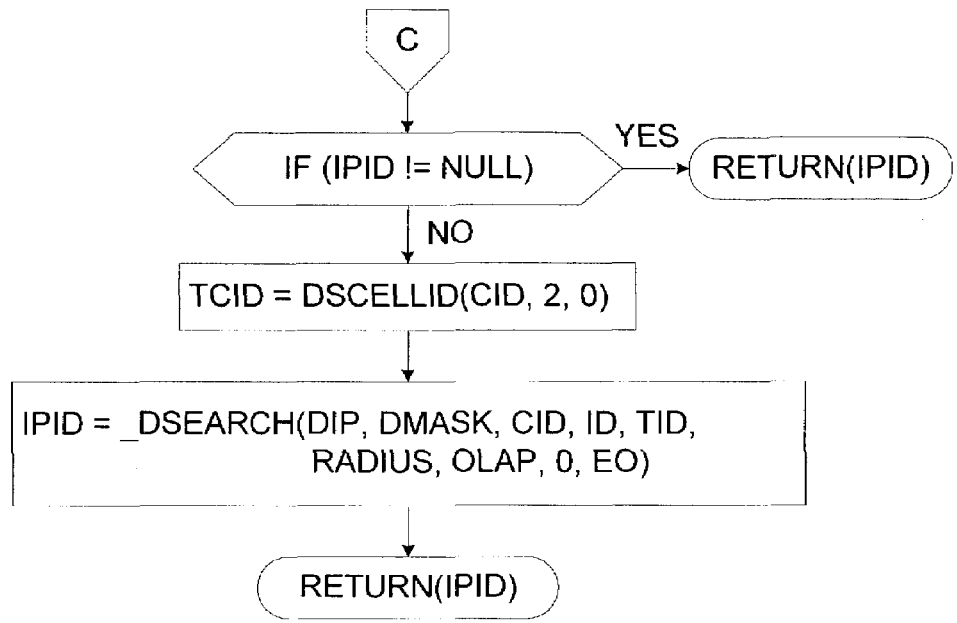
Figure 17B:
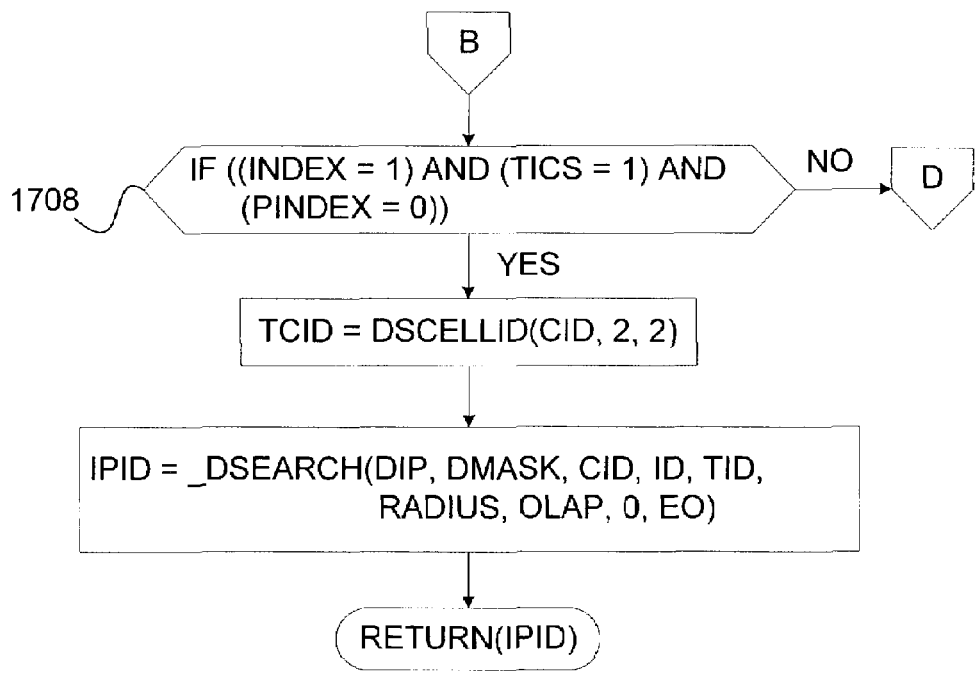
Figure 17C:
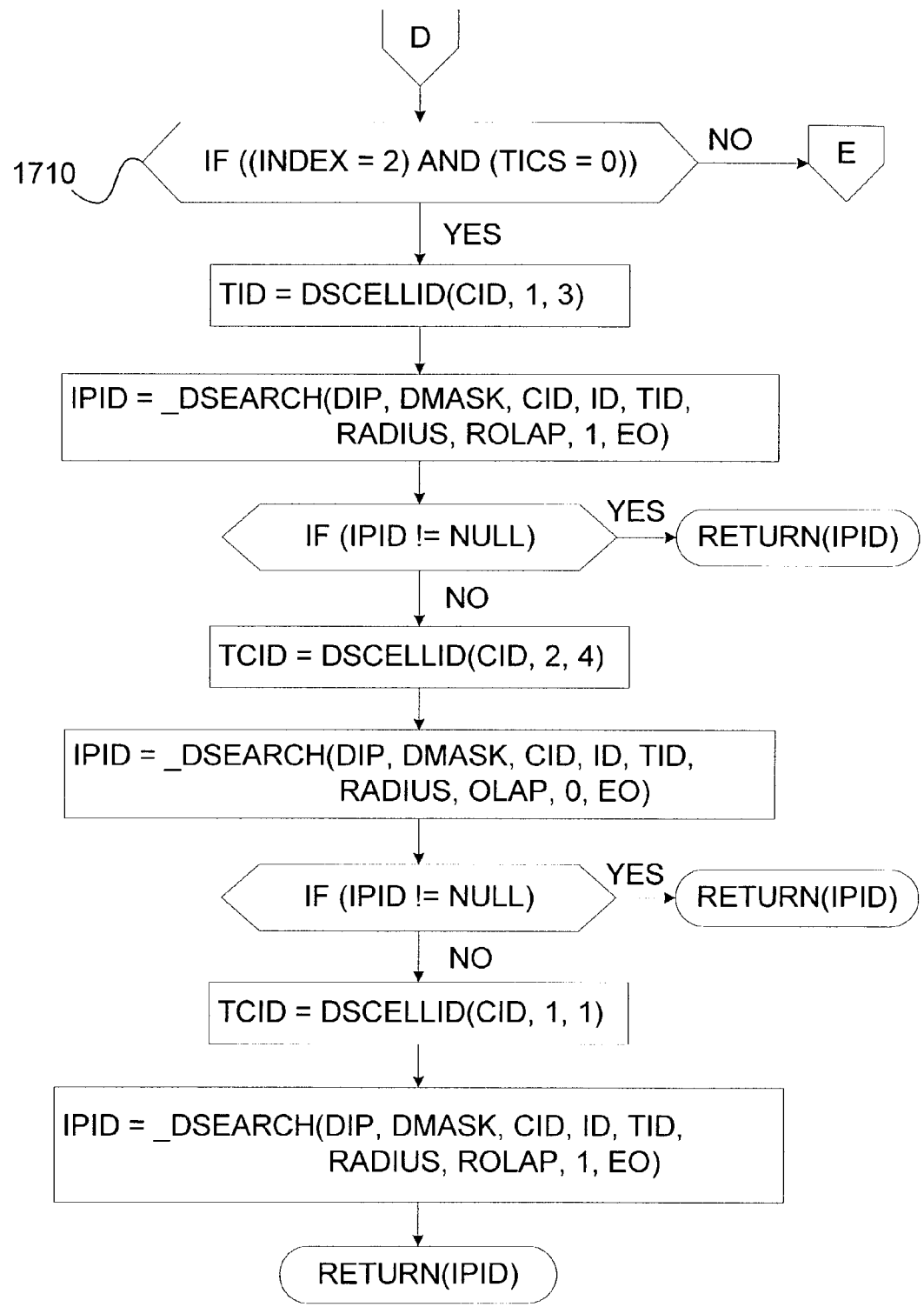
Figure 17D:
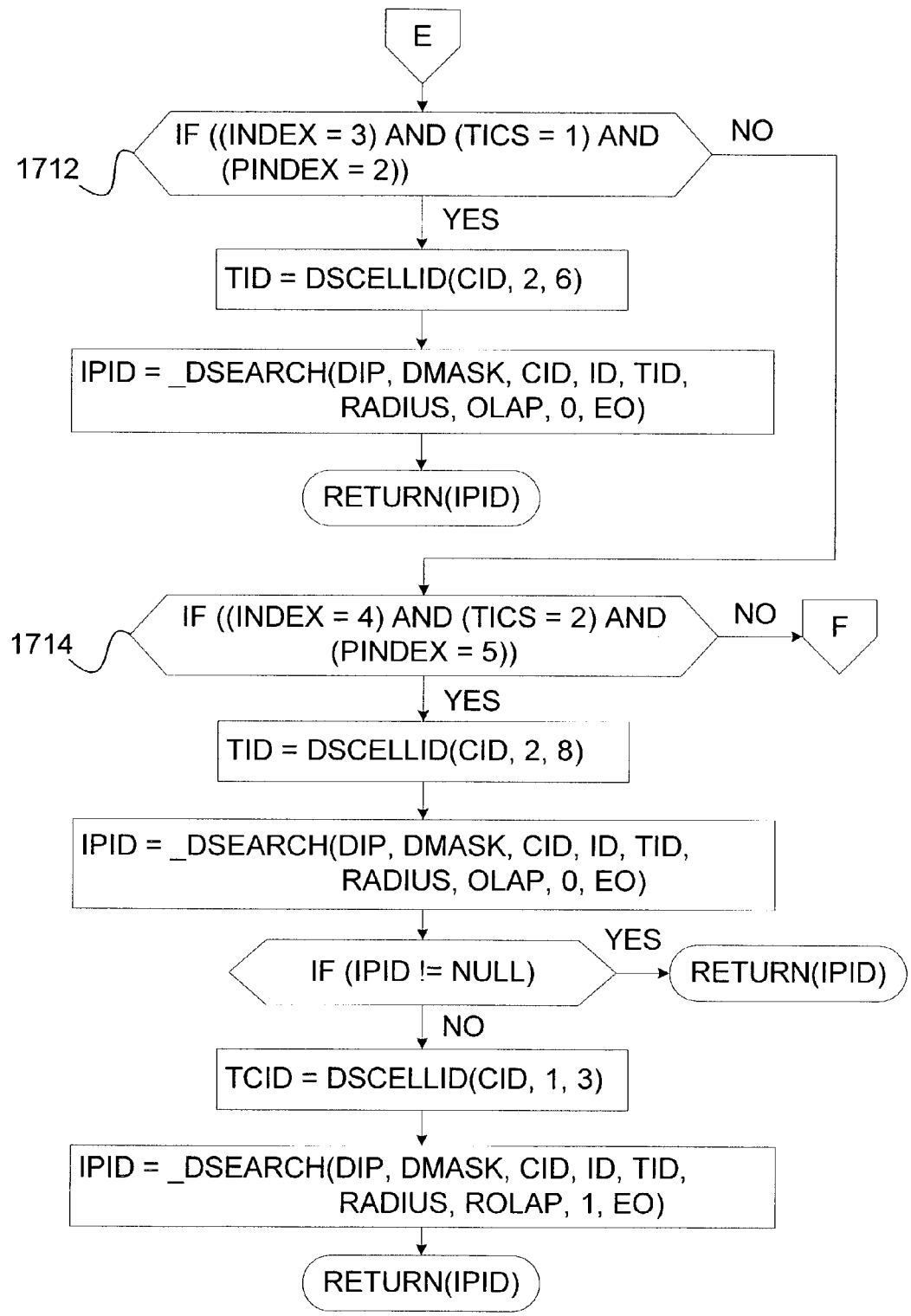
Figure 17E:
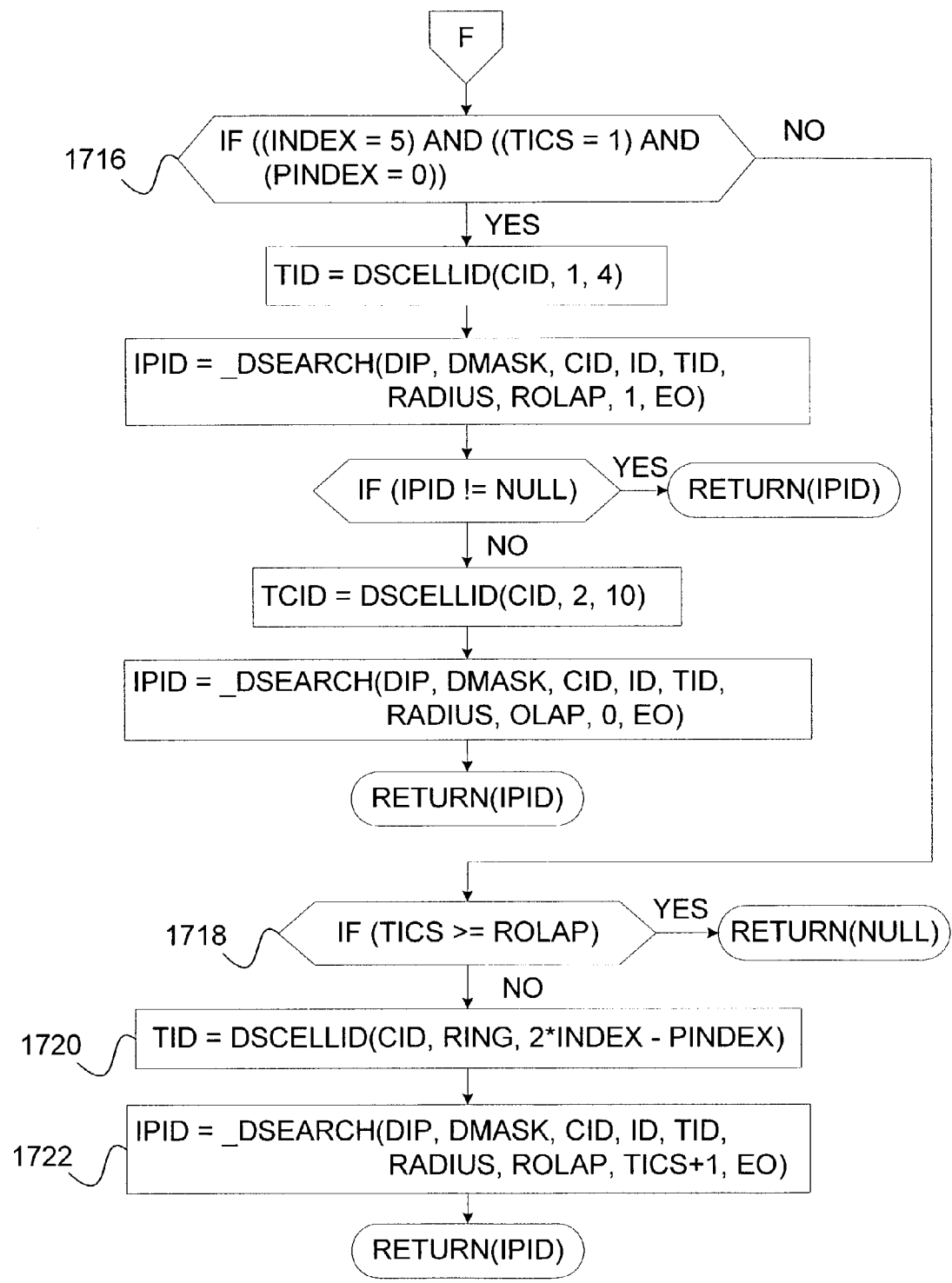
Figure 17F:
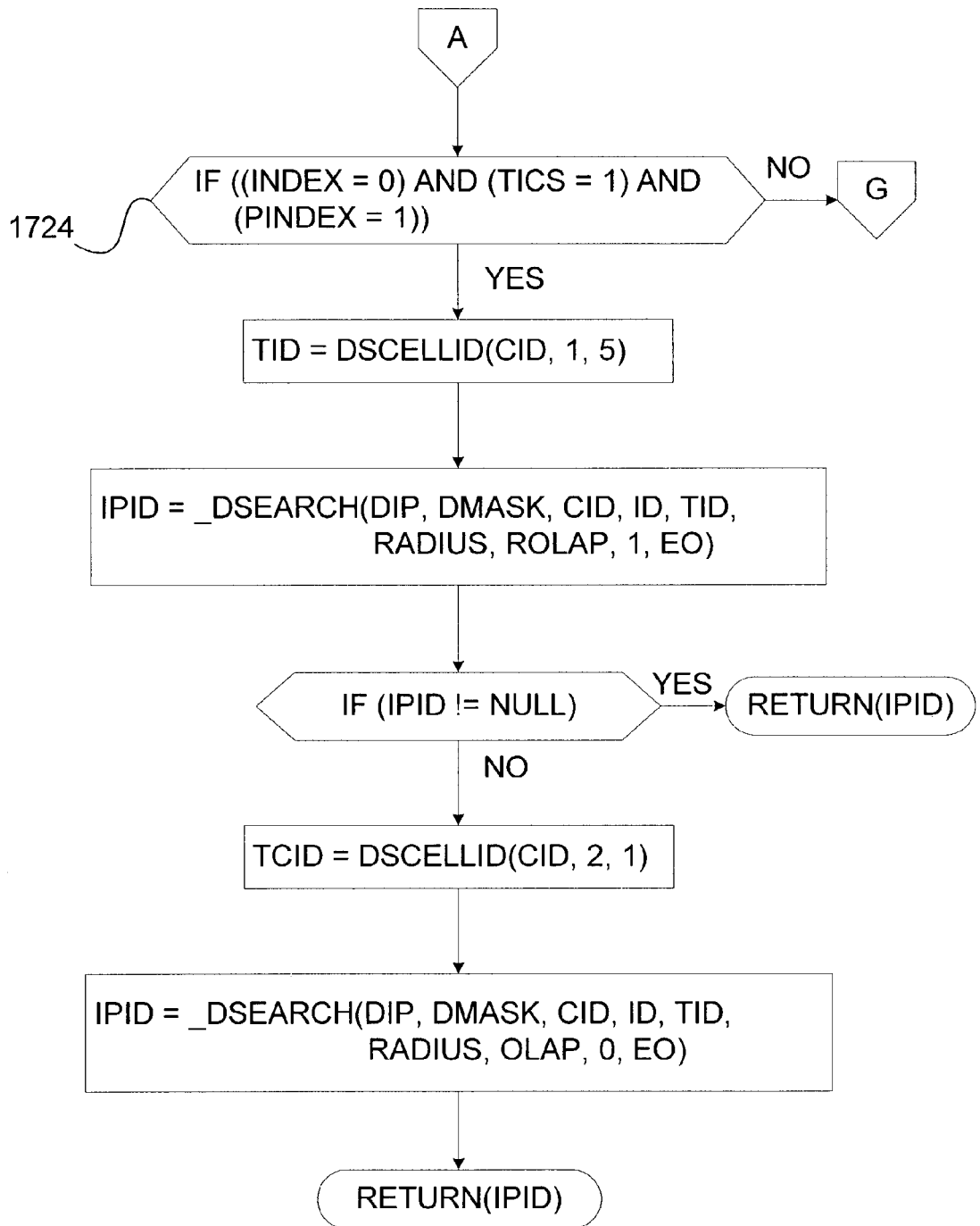
Figure 17G:
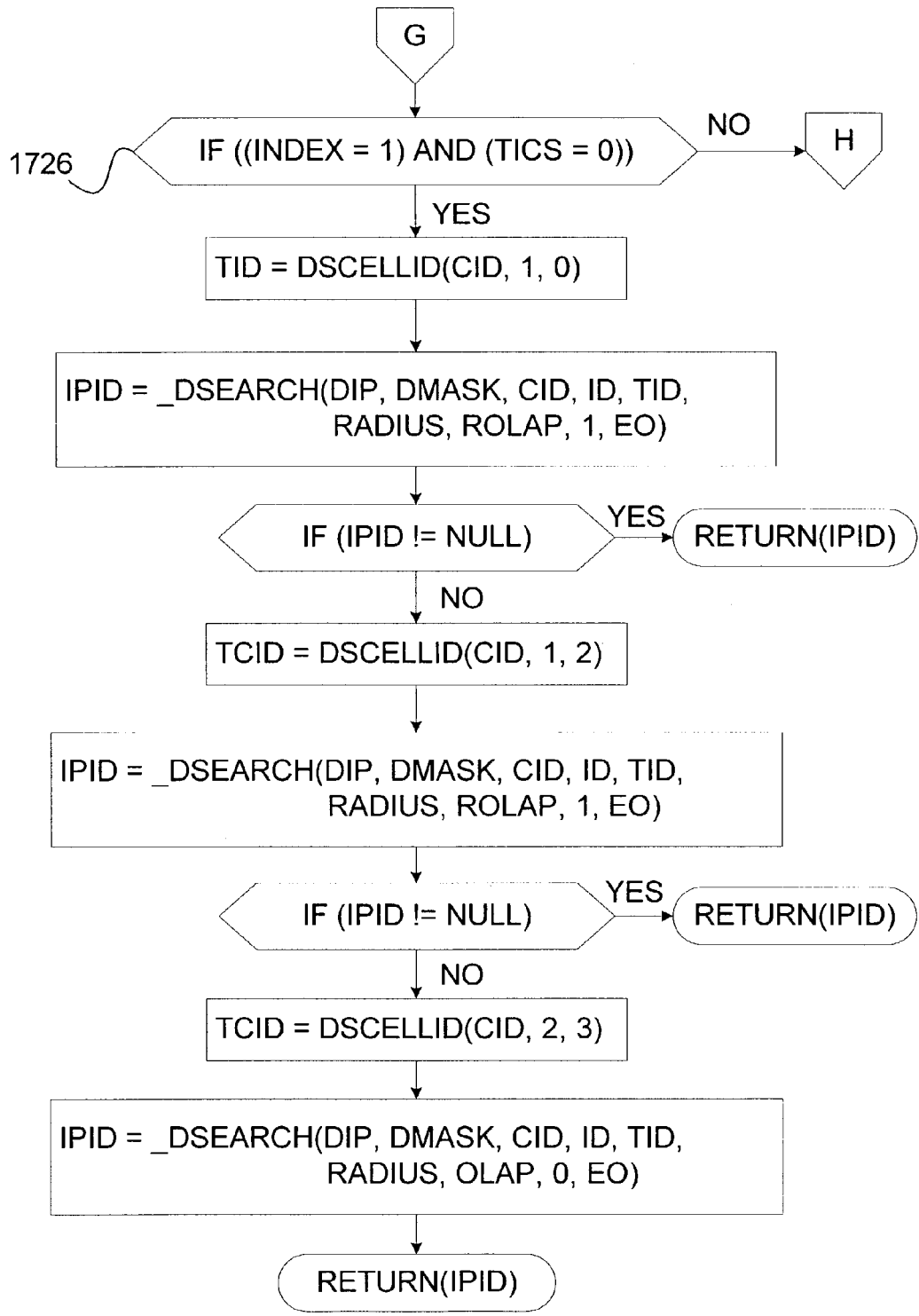
Figure 17H:
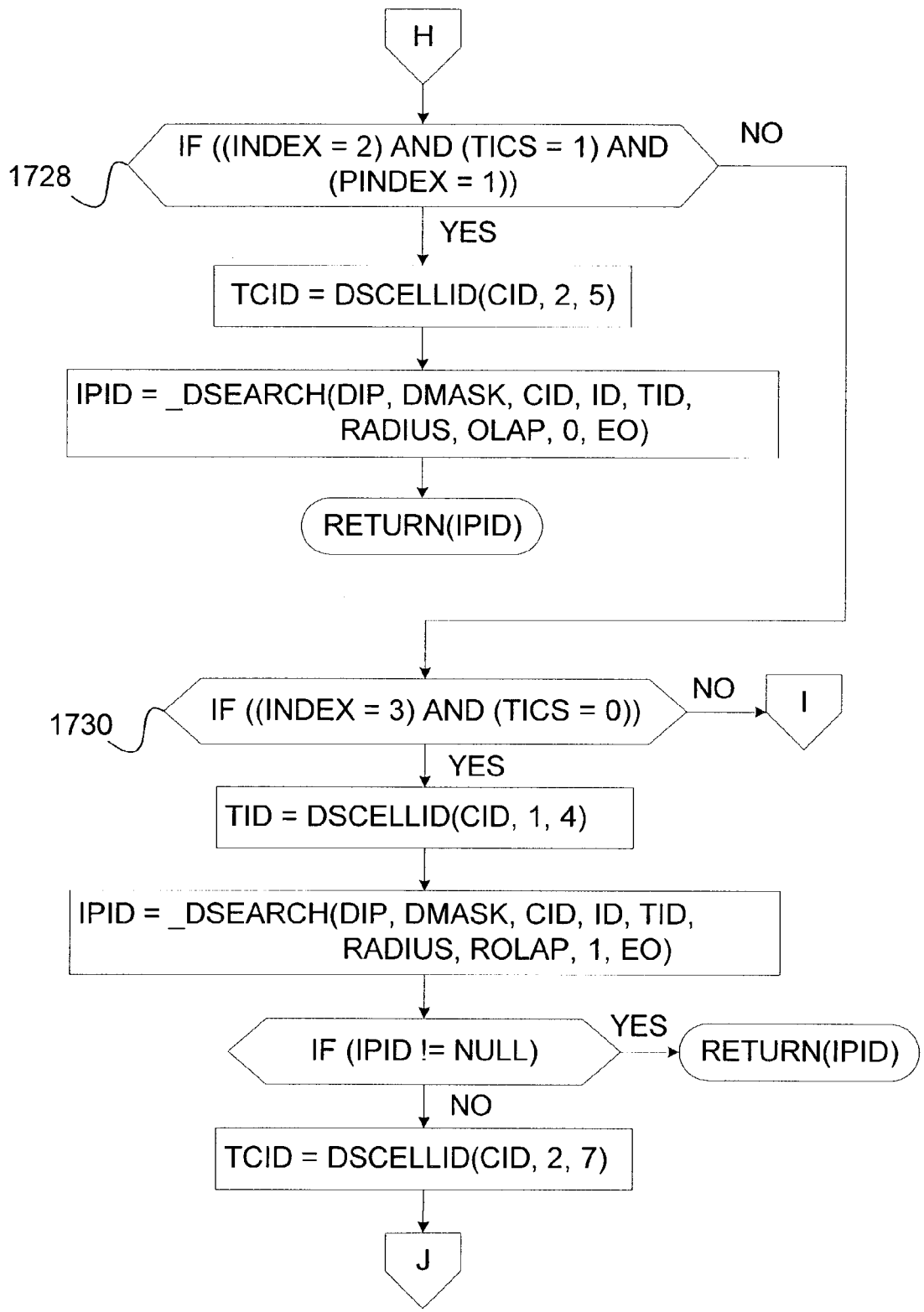
Figure 17I:
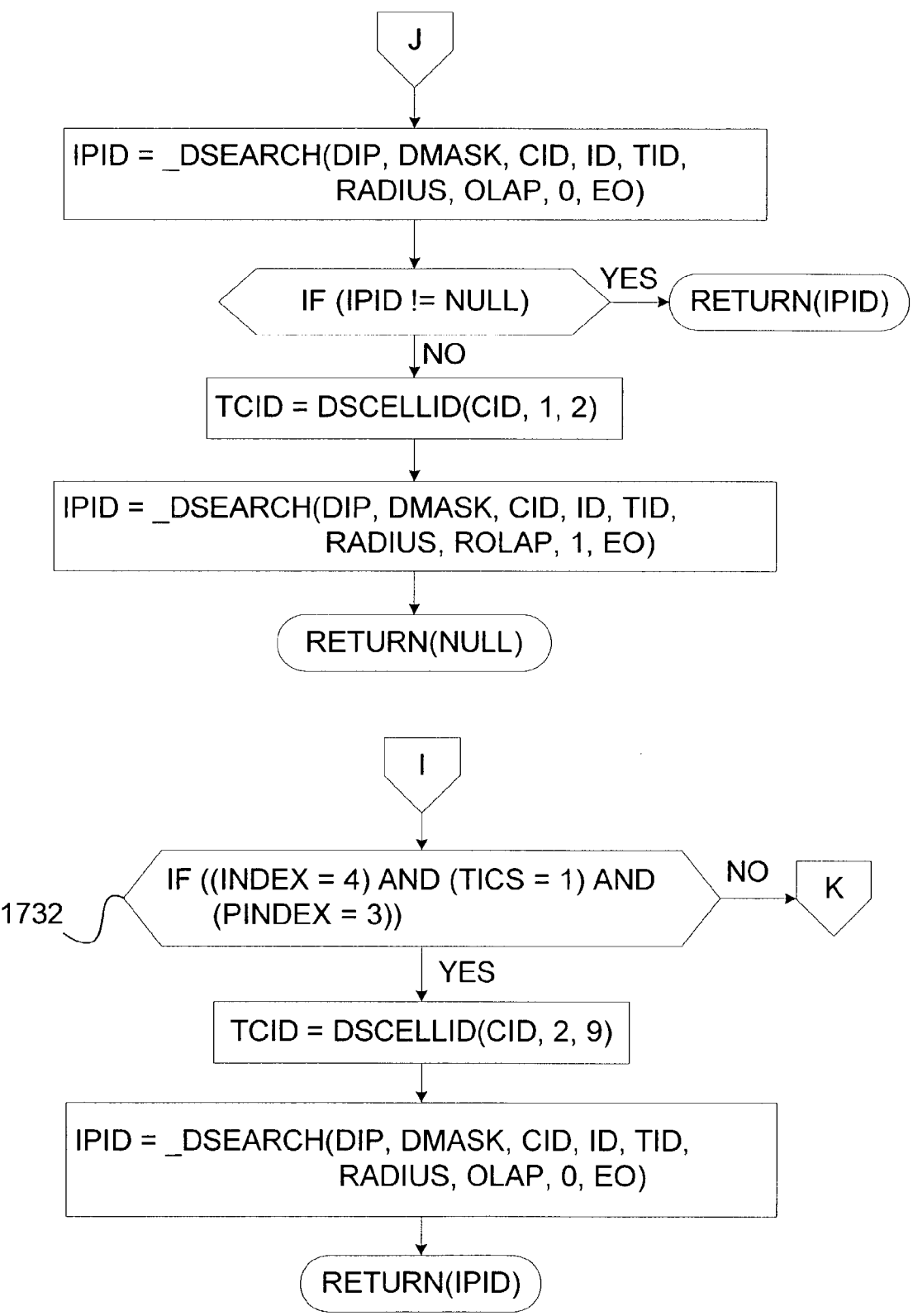
Figure 17J:
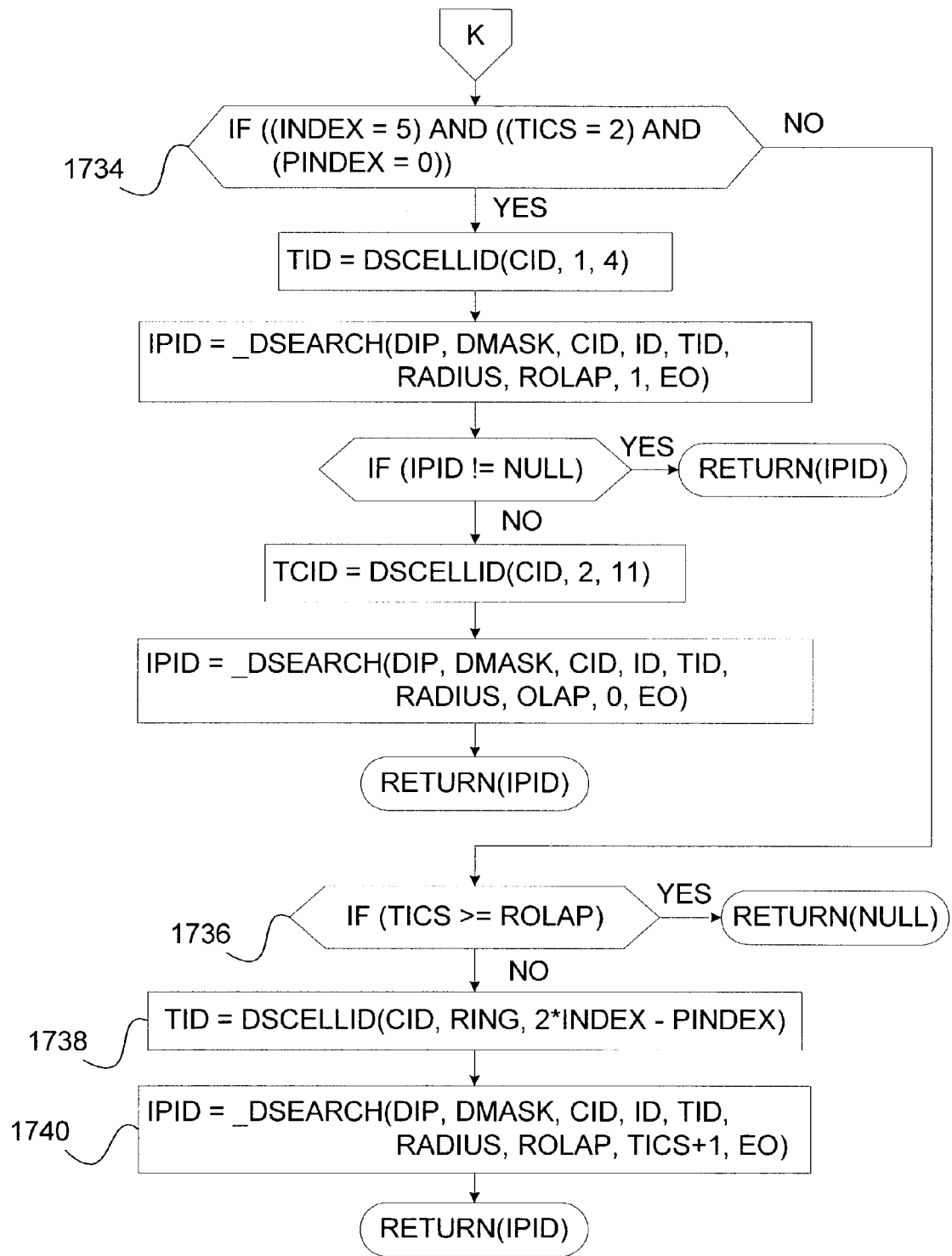

FIGS. 15A-15B illustrate a flowchart of a method embodiment of the present invention that implements the diffusion search for a destination node, termed Dsearch. The DSEARCH flowchart illustrates how diffusion searching progresses from the center cell to cells in the first ring. To be precise, the flowchart does not describe the parallelism or concurrency of the method as illustrated in the FIGS. 12A-12C and FIGS. 13A-13C. This is because the search described by the flowchart is distributed throughout all the cells in the search area. The center node (located in CID) is notified where the destination node is when the destination node creates a route back to the center node (which is not illustrated in the flowchart).

DSEARCH makes heavy use of two functions, DSCEL-LID and _DSEARCH. The function DSCELLID returns the cellid of the next cell to search; the arguments to the function are the search center cell's cellid (CID), the ring-index followed by the cell-ring-index. For example in step 1502 in assigning TID, DSCELLID calculates the cellid of the cell in ring 1, position 0 of the search centered at CID. The internal function _DSEARCH is the workhorse that extends the search into the next cell.

The steps of first assigning TID 1502, first assigning IPID 1504, first testing on IPID 1506 and the first returning of IPID 1508 extends the even half of the search into ring 1, cell index 0, and the steps of a second assigning TID 1510, second assigning IPID 1512, a second testing on IPID 1514 and the second returning of IPID 1516 extends the even half of the search into ring 1, cell index 2. The third step of assigning IPID 1518, a third testing on IPID 1520 and a third returning on IPID 1522 rechecks the center cell. The odd half of the search is extended into ring 1, cell index 1 by the steps of a third assigning of TID 1524, a fourth assigning of IPID 1526, a fourth testing on IPID 1528 and a fourth returning on IPID 1530 and to ring 1 cell index 3 by the steps a fourth testing on TID 1532, a fifth assigning of IPID 1534 and a fifth returning on 1536.

FIGS. 16A-16J illustrate the low-level _Dsearch method embodiment of the present invention that implements the diffusions search for a destination node. _DSEARCH is the low-level method of the diffusion search as it progresses from cell to cell throughout the search area. Because the method's purpose is to convey the system's operations, the flowchart does not convey the parallelism or concurrency as illustrated in the FIGS. 12A-12C and 13A-13C. As the search progresses, control flows from node to node throughout all the cells in the search area. Success is achieved when the destination node creates a route back to the center node, located in CID.

_DSEARCH makes use of the function DSRINGINDEX; it translates a cellid into a corresponding ring-index and cell-ring-index tuple. The function expects as arguments the center cell's cellid and the cellid to translate. The variables PRING and PINDEX are the present cell's ring-index and cell-ring-index, respectively 1602. RING and INDEX are the next cell's ring-index and cell index, respectively. ROLAP is the maximum overlap value relative to the next cell's ring. ROLAP is a limited OLAP so as not to cycle around a search ring more than once. If SELF is the destination node, a "yes" at the IF(SELF.IP=DIP) condition 1604, then return the destination node's IP address and containing cellid pair. Otherwise, the search continues, that is a "no" at IF(SELF.IP=DIP) condition 1604. If the search extends beyond the search radius, that is a "yes" at condition 1606, then NULL is returned, indicating that the destination node was not anywhere in the current run. Otherwise, the current run is within the search radius (no at condition 1606) and searching continues.

SELF cellcasts a DSEARCHREQUEST message on the next cell's C0 channel 1608. If one of the reply nodes is the destination nod, that is a "yes" at the IF((DMASK=HOSTMASK) AND (DIPREPLIED)) condition 1610, then return the destination node and containing cellid pair. Otherwise, either the search implements a region-cast or none of the reply nodes is the destination node, that is a "no" at the IF((DMASK=HOSTMASK) AND (DIPRE-PLIED)) condition 1610. RIP is set to the selected next node's IP address 1612.

If the search was initiated to find a gateway node attached to a specific network that is equal to RIP's network address, that is a "yes" at the IF((DMASK!=HOSTMASK) AND (DIP=RIP & DMASK)) condition 1614, then the gateway node's IP address and its cellid are returned. Otherwise, DIP is an IP address or RIP's network address does not equal the network address in DIP, that is, a "no" at the IF((DMASK!=HOSTMASK) AND (DIP=RIP & DMASK)) condition 1614. If the next cell to search is on ring 1, that is, a "yes" at the IF (RING=1) condition 1616, then the result of _DSEARCH1 1618 is returned.

_DSEARCH1 is a low level search function that only implements the search process from ring 1. Otherwise, the next cell to search is not on ring 1 and the remainder of _DSEARCH is split between the steps to evaluate during an even-run, that is a "yes" at the IF(EVEN(EO)) condition 1620, and the steps to take for an odd-run, that is, a "no" at the IF(EVEN(EO)) condition 1620. A run requires special processing at a next-cell when the current cell is on a different ring (i.e., when TICS=0). Special processing may also be required at adjacent cells on the same ring as the current cell when TICS=1.

For an even-run the search process is as follows. If TICS=0, that is, a "yes" at the IF(TICS=0) condition 1622, and the cell-ring-index is even, then the current run splits into at least two runs (and possibly three runs if OLAP>1). The first run proceeds along the ring in a counter-clockwise direction; the second run advances to next outer ring, though the cell-ring-index may be different, and the third run proceeds along the ring in a clockwise direction. A ring has 6 six corners at: 30°, 90°, 150°, 210°, 270°, and 330°. If the next cell-ring-index is between the 30° corner and the 90° corner, then the subsequent cell, following the next cell will have the same ring-index as the next cell 1626. If the next cell-ring-index is between the 90° and 150° corners, then the subsequent cell, following the next cell will have an INDEX+2 ring cell index 1630. If INDEX is between 150° and 210° corners, then the subsequent cell will have an INDEX+4 ring cell index 1634. Otherwise, the subsequent cell will have an INDEX+6 ring cell index 1636. The steps of a first assigning TID 1638, a first assigning IPID 1639 and a first testing on IPID 1640 cause the search to proceed in a counter-clockwise direction around RING. The steps of a second assigning TID 1642, a second assigning of IPID 1643 and a second test on IPID 1644 extend the search into the outer ring, and steps of a test on OLAP 1646, a third assigning of TID 1647, a third assigning of IPID 1649 and a third return on IPID 1648 cause the search to proceed in a clockwise direction around RING.

Around each ring there are three special cells. If a run first visits one of these cells as the second cell on the ring, then the run is split into two runs; one run proceeds to the outer ring and the other continues around RING in a counter-clockwise direction. If TICS=1, that is "yes" at IF(TICS=1) condition 1650, then the run is visiting the second cell on a ring as it passes through cell ID. Conditions check for the first 1652, second 1654 and third special cells 1656, respectively. The search expands to the outer ring 1658. If the run has not progressed around RING for the maximum number of tics, that is a "no" at condition 1662, then the run proceeds to the next cell of RING in a counter-clockwise direction 1666.

When EO is odd (FIG. 16B), that is a "no" at the IF(EVEN(EO)) condition 1620, then the current run is an odd-run. The processing of an odd-run mirrors step for step those taken for an even-run: the testing step of IF(TICS=0) 1668 corresponds to the first testing on TICS step 1622, the testing step of IF(INDEX<RING) 1670 to the previous even-run testing step of IF(INDEX≦RING) 1624, all the way through to the IPID assignment step 1694 corresponding to the previous even-run IPID assignment step 1666.

FIGS. 17A-17J illustrate the low-level _DSEARCH1 method embodiment of the present invention that implements the diffusion search for the destination node, from ring 1. _DSEARCH1 is the low-level method of the diffusion search, specialized for ring 1. DSEARCH initiates the search process from ring 0; _DSEARCH1 advances the search process through ring 1, and _DSEARCH handles the search process for the remaining rings. Because the method's purpose is to convey the system's operations, the flowchart does not convey the parallelism and concurrency as illustrated in the FIGS. 12A-12C and FIGS. 13A-13C. This is because as the search progresses, control flows from node to node throughout all the cells in the search area. Success is achieved when the destination node creates a route back to the center node, located in CID.

Similar to the way the _DSEARCH method is structured, DSEARCH1 is split in halves; the first half (up to, but not including step 1724) implements the odd-runs, and from step 1724 to the end implements the even-runs. Throughout the method, a cell's cell-ring-index identifies the placement of the cell within the ring, and the TICS value is used to identify the run.

Figure 18A:
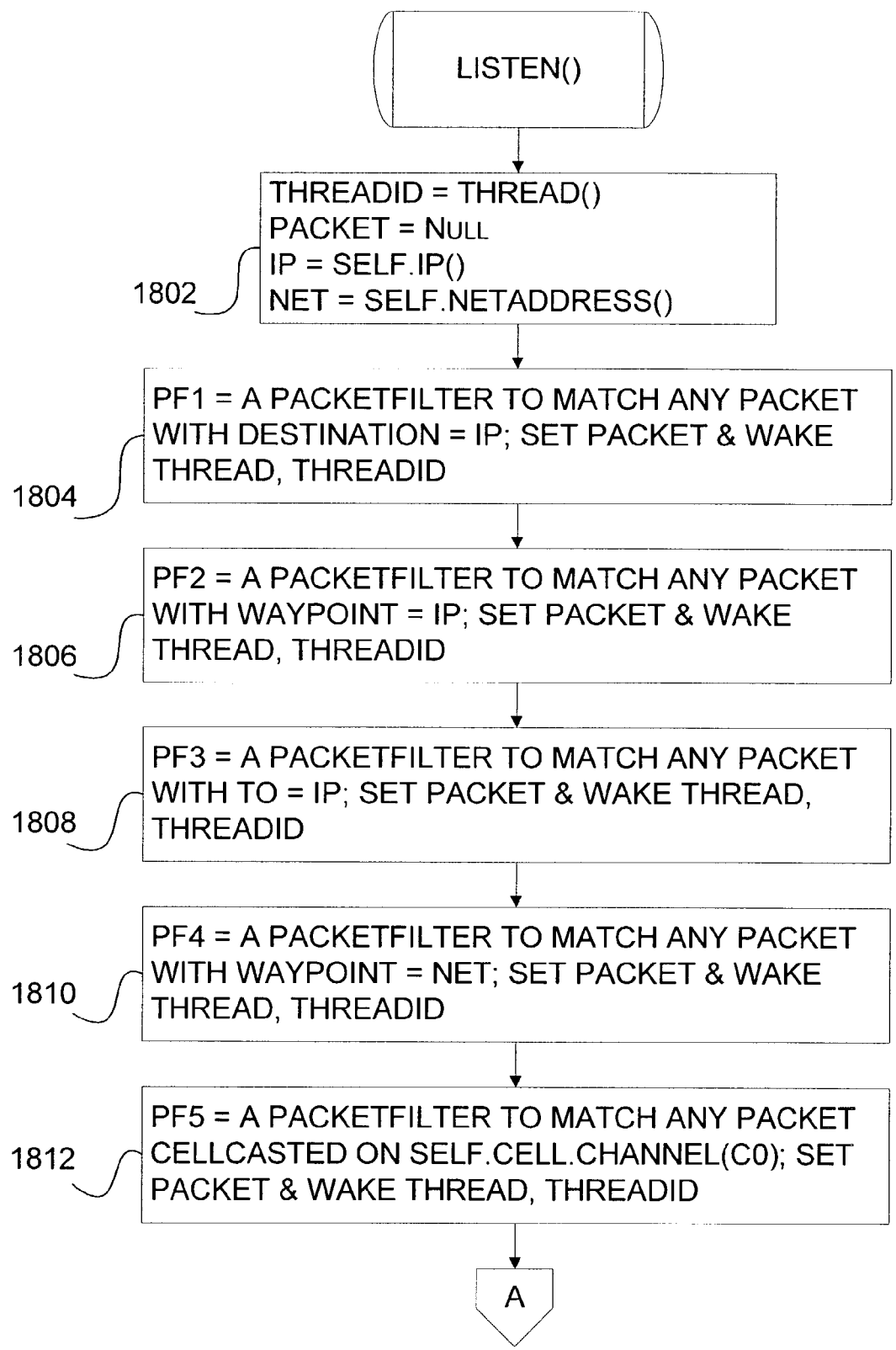
FIGS. 18A-18C illustrate the LISTEN flowchart of the method according to embodiments of the present invention.
Figure 18B:
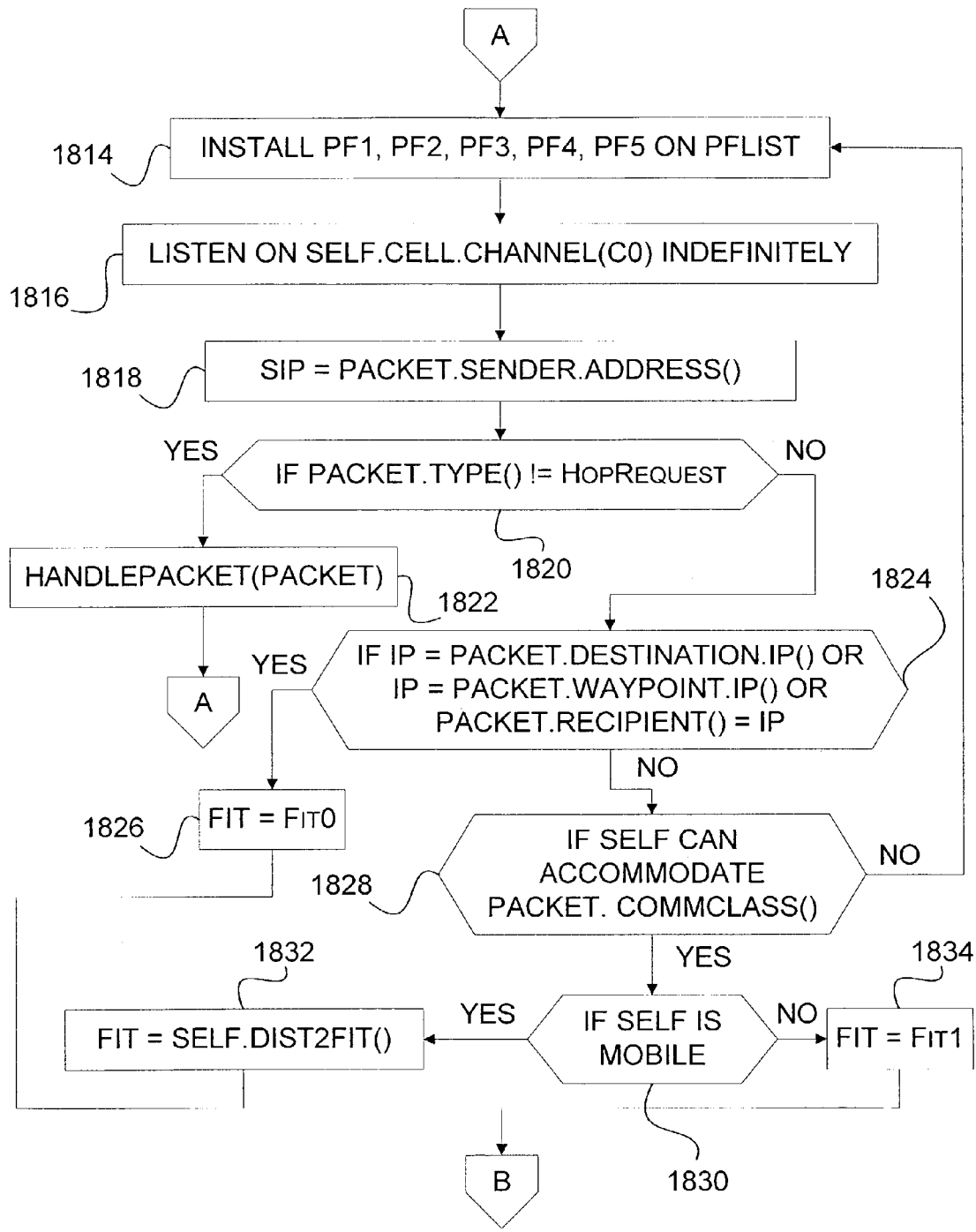
Figure 18C:
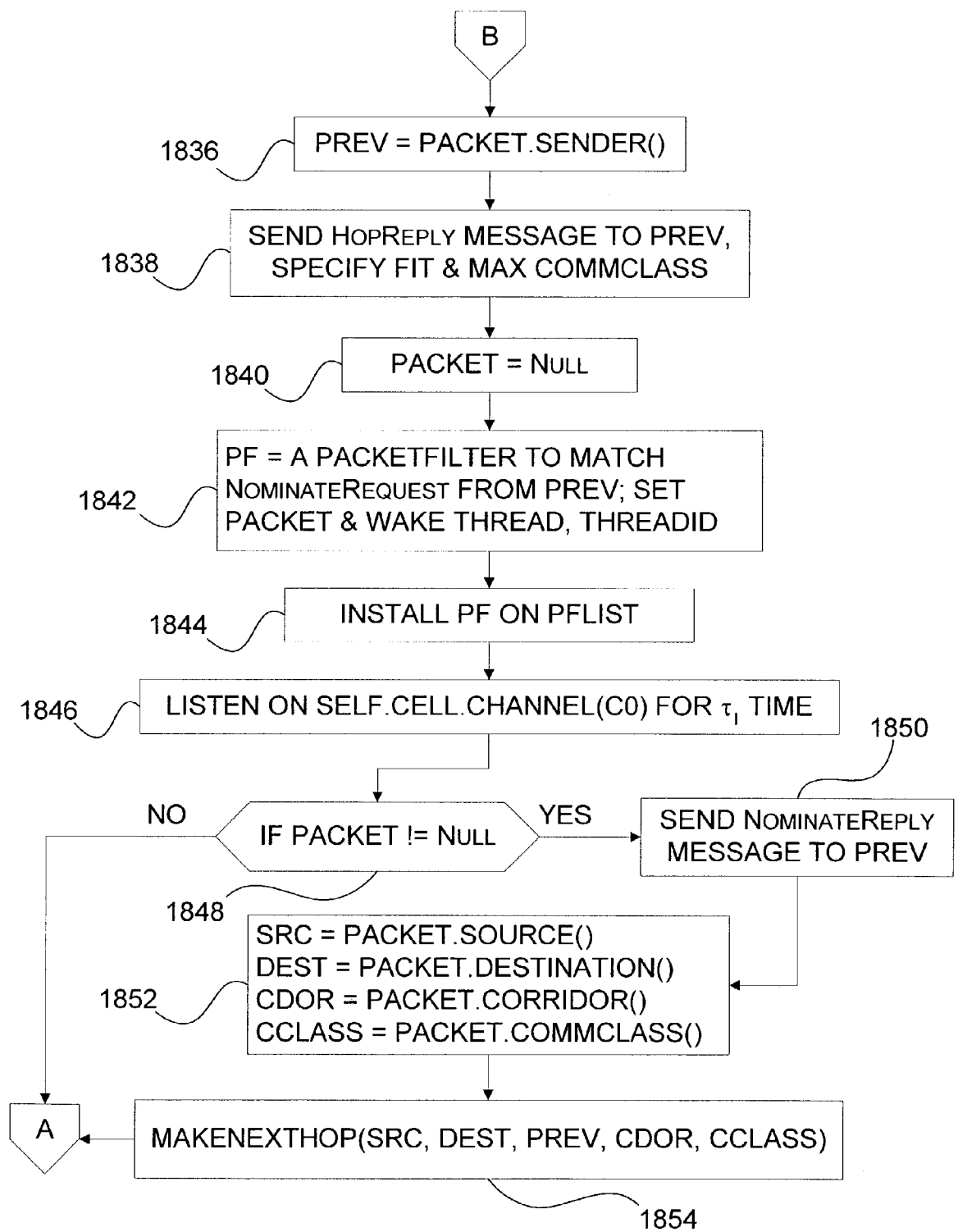

FIGS. 18A-18C illustrate the Listen flowchart that broadly details the method by which a node filters through packets, deciding which ones deserve a response. Each thread has a unique identifier, LISTEN's thread identifier is stored in THREADID. The variable PACKET is used by the various packet filters to communicate with the LISTEN thread. IP contains the node's IP address and NET the node's network address 1802. The packet filter PF1 tests for a packet whose destination IP address matches IP 1804. PF2 tests for a packet whose waypoint IP address matches the IP 1806. PF3 tests for a packet whose to recipient IP address matches IP 1808. PF4 test for a packet whose waypoint network address matches NET 1810, and PF5 matches a packet cellcasted on SELF's C0 channel 1812.

The packet filters PF1-PF5 are installed on the process' packet filter list 1814 then the LISTEN thread spawns a thread to collect packets deserving a response 1816. When LISTEN is reawakened, execution restarts at 1818 where SIP is set to the packet sender's IP address. If the packet's type is not a HopRequest, that is, a "yes" at the IF PACKET.TYPE( )!=HopRequest test condition 1820, then control passes to the undocumented routine HANDLEPACKET 1822 and then SELF listens for another packet. Otherwise, the packet is a HopRequest, that is, a "no" at the IF PACKET.TYPE( )!=HopRequest test condition 1820. If either packet's destination IP address or waypoint IP address or recipient IP address is equal to IP, that is, a "yes" at the IP test condition 1824, then assign FIT to Fit0 1826. Otherwise, the packet was not specifically addressed to SELF, that is, a "no" at the IP test condition 1824. If SELF is unable to accommodate the communication class specified within packet, that is, a "no" at the accommodation test condition 1828, then do not respond to this packet; rather listen for another packet. Otherwise, SELF can accommodate packet's communication class, that is, a "yes" at the accommodation test condition 1828. If SELF is not currently mobile, that is, a "no" at condition 1830, then assign FIT=Fit1 1834. Otherwise, SELF is mobile, that is, a "yes" at the mobile test condition 1830, and FIT is set to a value depending upon the distance between SELF and its cell center calculated by the method DIST2FIT 1832.

PREV is set to the IP address of the sender of the packet 1836. SELF responds to the packet received by sending a HopReply message to the PREV node, specifying FIT and SELF's maximum communication class 1838. The variable PACKET is initialized to Null 1840 in preparation for executing packet filter PF's code when SELF receives a NominateRequest packet back from node PREV 1842. Packet filter PF is installed on the process' packet filter list 1844, and then SELF waits to be reawakened by the receipt of a packet for at most $\tau_1$ time 1846. If a timeout occurs (no at condition 1848) then go back to step 1814. Otherwise, a NominateRequest packet was received, send PREV a NominateReply packet 1850 and then extend the route by hopping to the next node 1854.

Route Maintenance

Once a route is established, each node participating in the route is responsible for keeping its portion of the route current. Nodes reevaluate their route participation when one of the following changes is detected: (a) the node moves to a new cell; (b) the preceding or succeeding node moves to a new cell, or (c) the segment start node or segment end node changes its cell. The first two conditions are considered local changes, whereas, the third condition is considered a global change because it could modify l.

To maintain a route, the following information is of priority: (a) the node's cell; (b) the preceding node's id and cell; (c) the succeeding node's id and cell; (d) the segment start node's id and cell; (e) the segment end node's id and cell, and (f) the segment corridor's radius σ.

Each node participating in the route decides for itself the action to take to maintain the route. The possible actions are: (a) remove myself from the route; (b) replace myself with another node in one of my neighborhood cells; or (c) do nothing. Suppose a, b, c are a sequence of wireless nodes in a route segment whose start and end nodes are α and β, respectively. Route segments are maintained and constrained by the following ordered list:

1. The route must stay connected. Node a's cell and node c's cell must be in b's neighborhood. Only local changes can cause a route to become disconnected.

2. The route should be monotonically non-decreasing; that is, dist(proj(a.cell( ),l),β.cell( ))≧dist(proj(b.cell( ),l), βB.cell( ))≧dist(proj(c.cell( ),l),β.cell( )).

Both global and local changes can cause a route to become monotonically decreasing.

3. All nodes participating in the route segment should be within the σ corridor. That is, dist(b.cell( ),l)≦σ. Both global and local changes can result in a route node being outside the σ corridor.

While a segment that cannot remain connected will be disbanded, the route segment may still be used if the other constraints are not met.

For the following discussion, a, b, and c are a sequence of three adjacent nodes in a route segment with α being the start node and β being the end node. The ray l's vertex is α and passes through β. Assuming the ray's vertex is α, the orientation of l is the angle measured from the positive x-axis to the ray in a counter-clockwise direction.

Figure 19A:
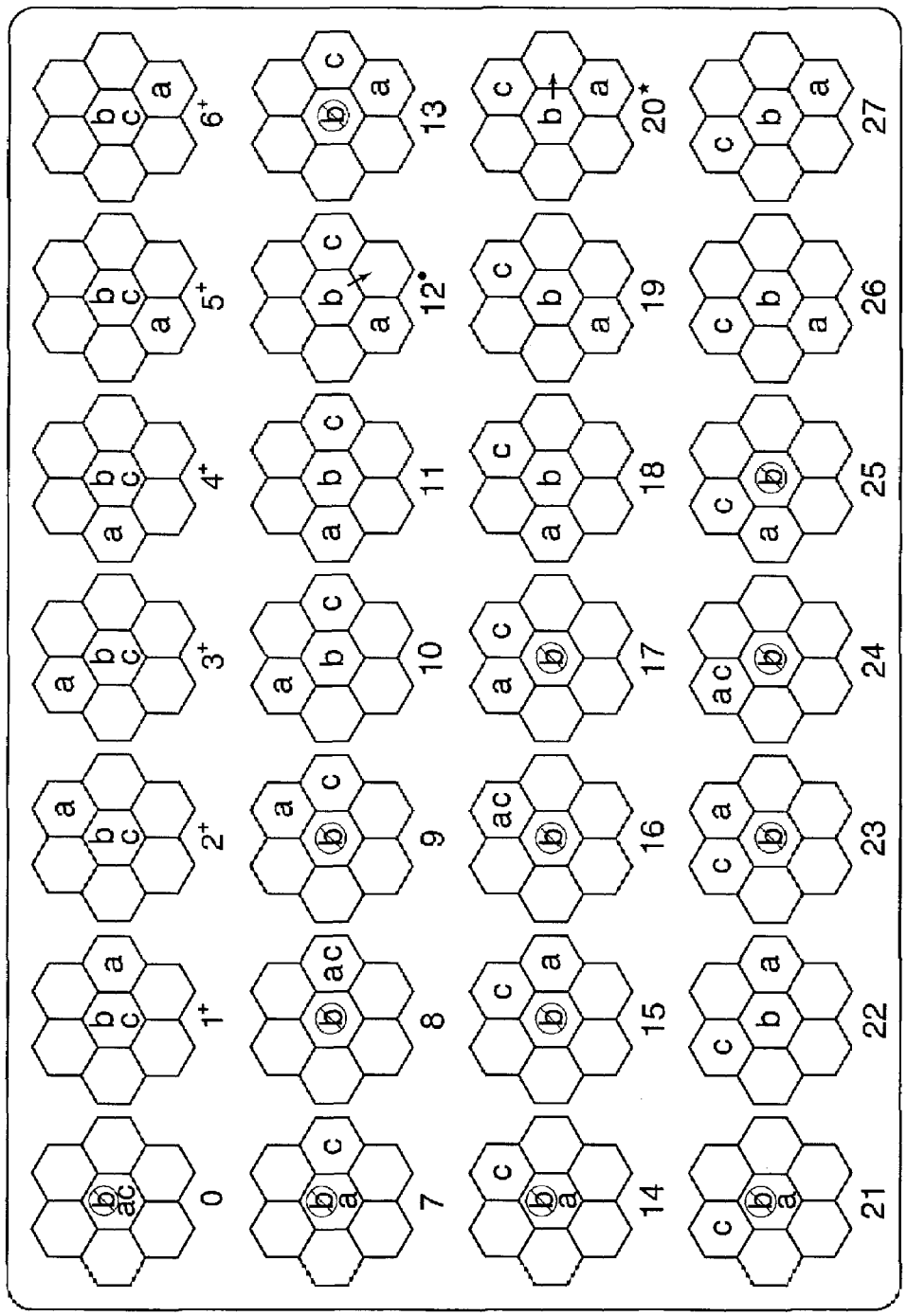
FIGS. 19A-19B illustrate the 49 possible combinations for a 3-sequence of wireless nodes a, b and c.
Figure 19B:
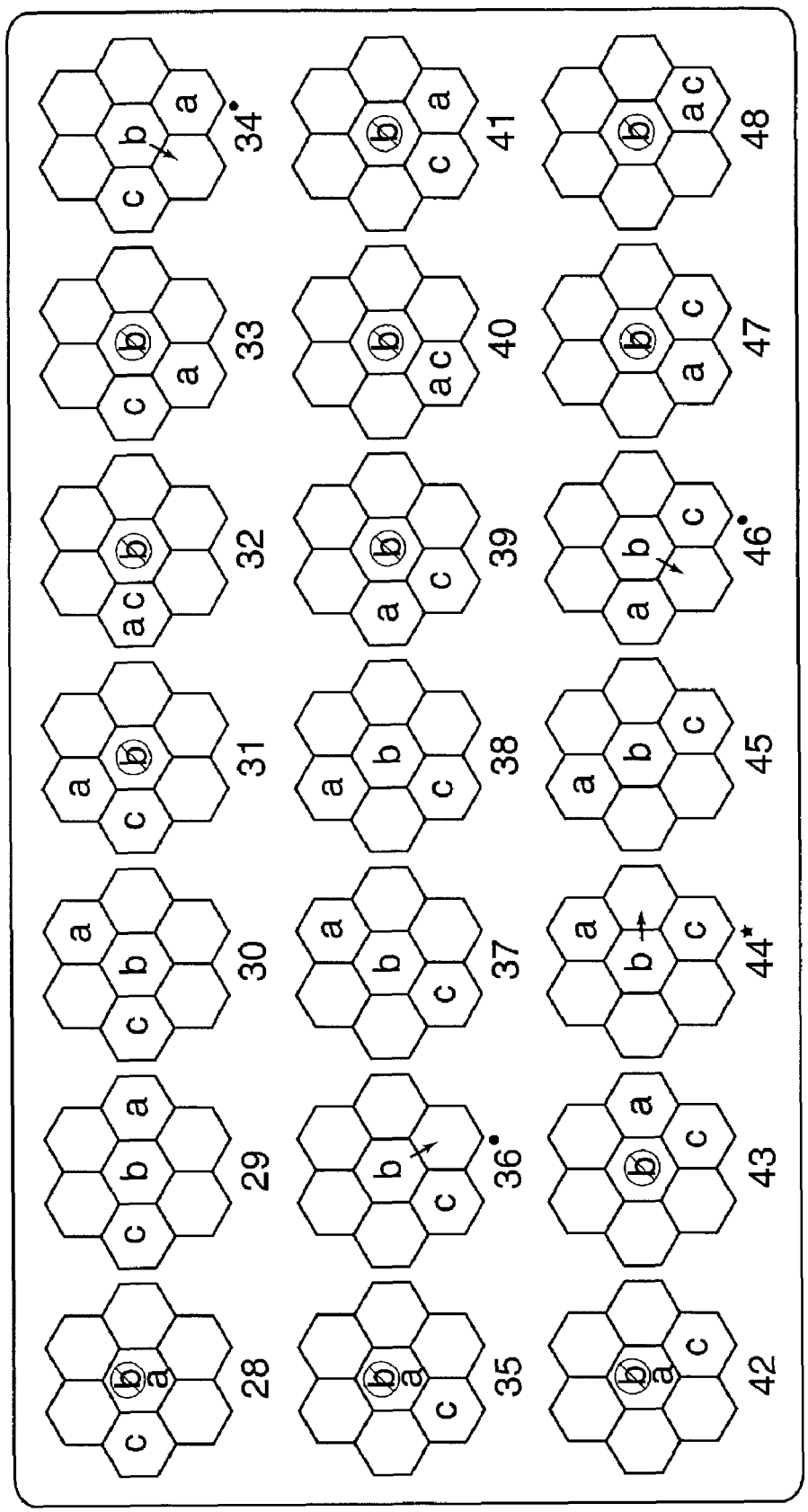
Figure 20A:
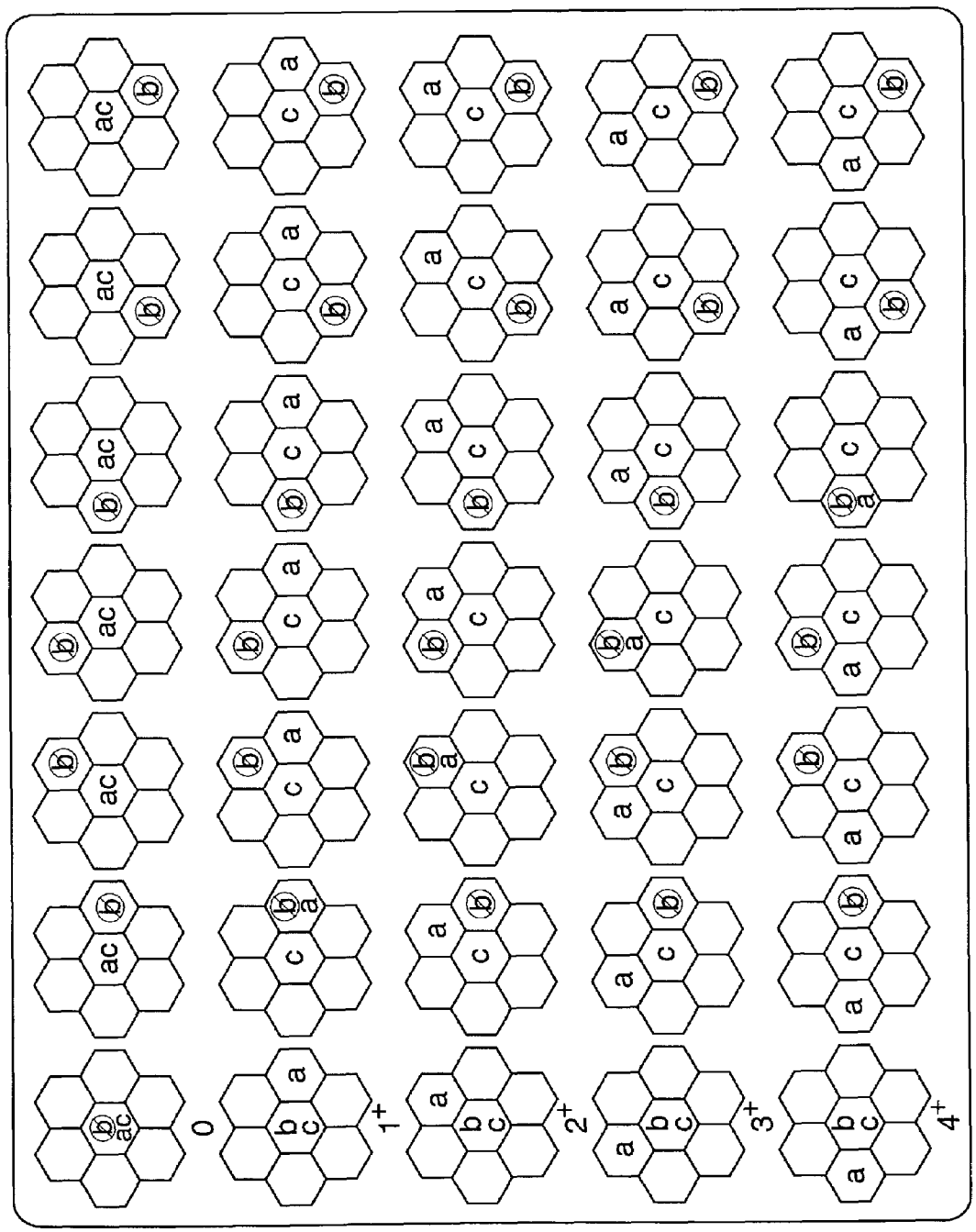
FIGS. 20A-20J illustrate local route updating states 0-48.
Figure 20B:
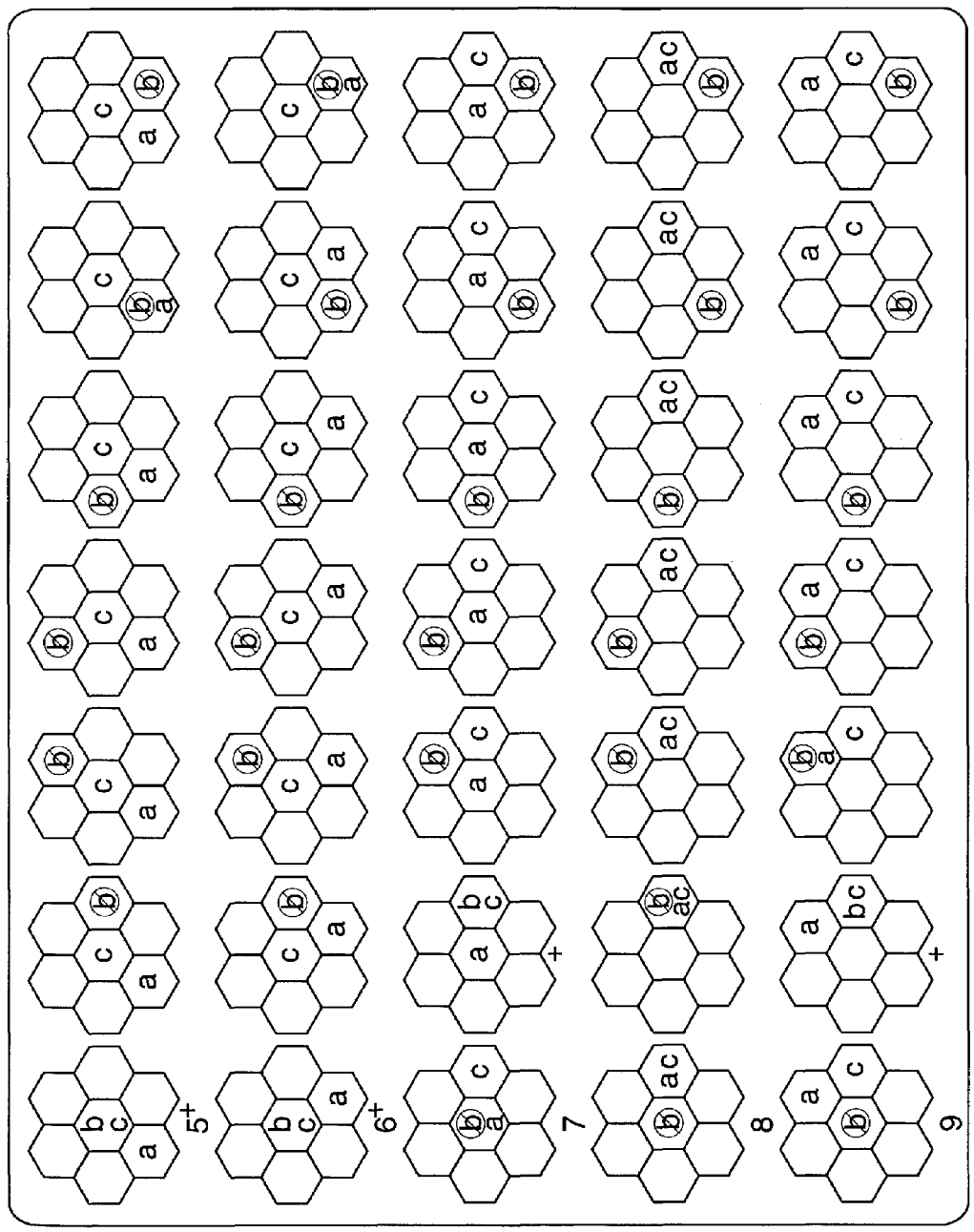
Figure 20C:
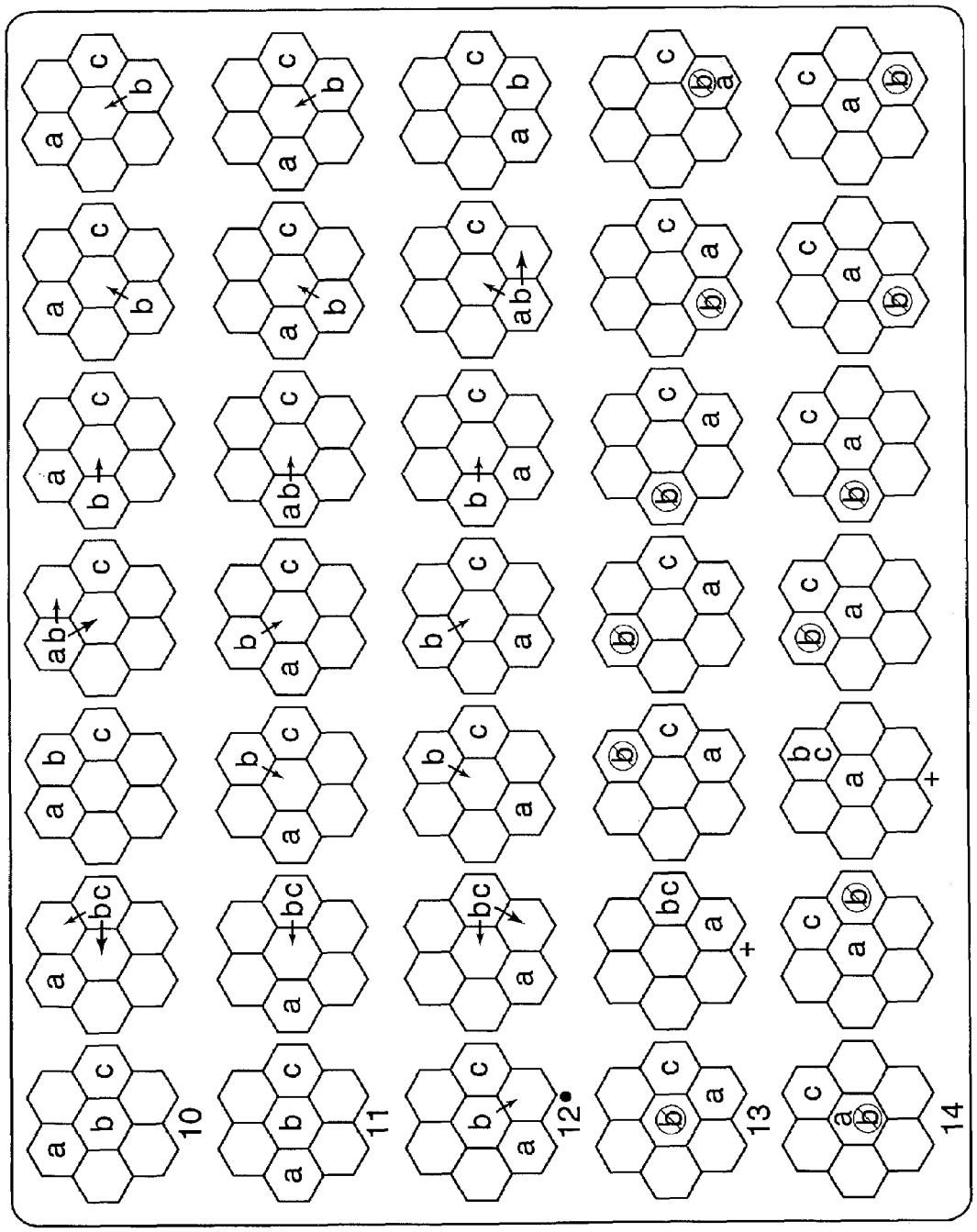
Figure 20D:
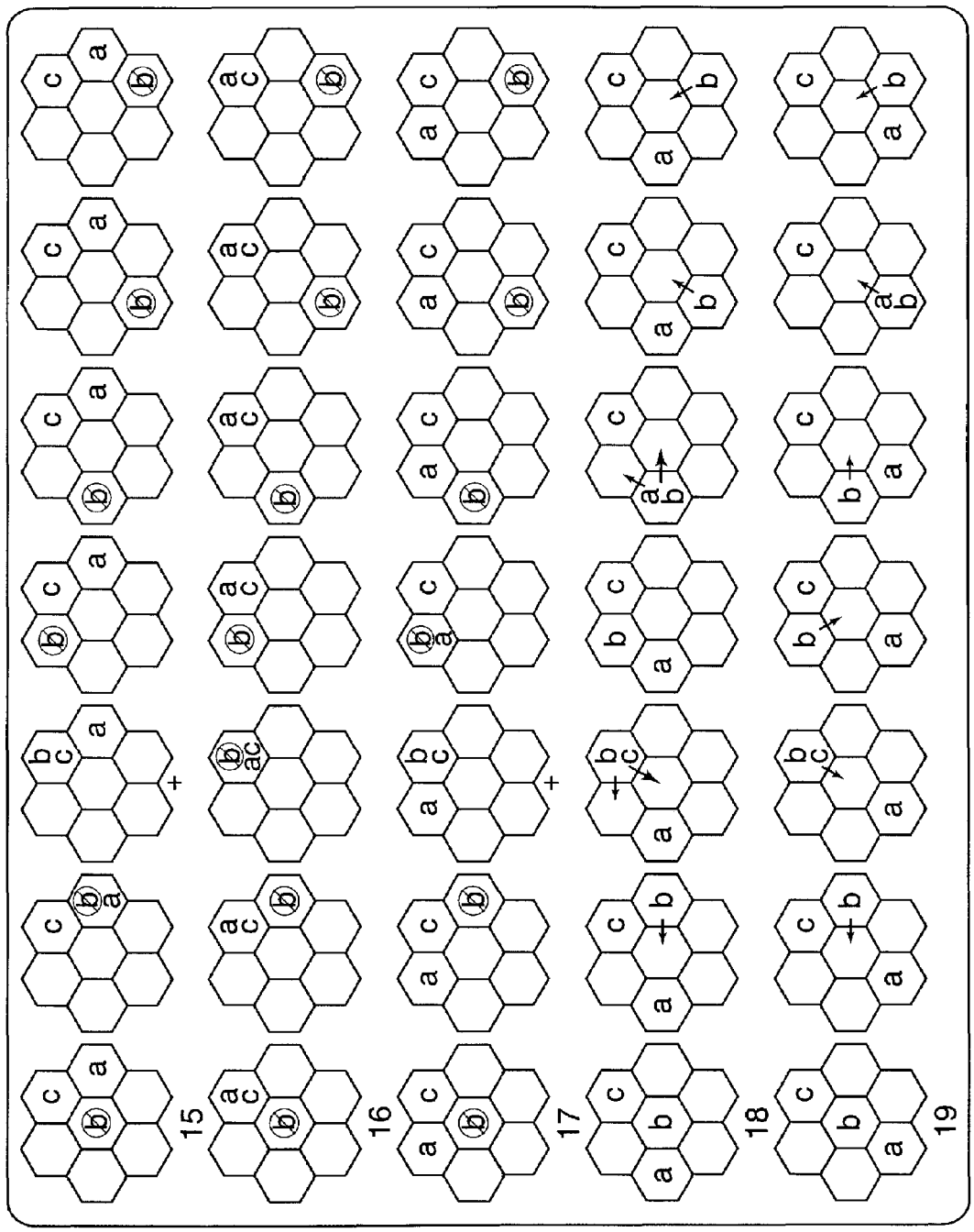
Figure 20E:
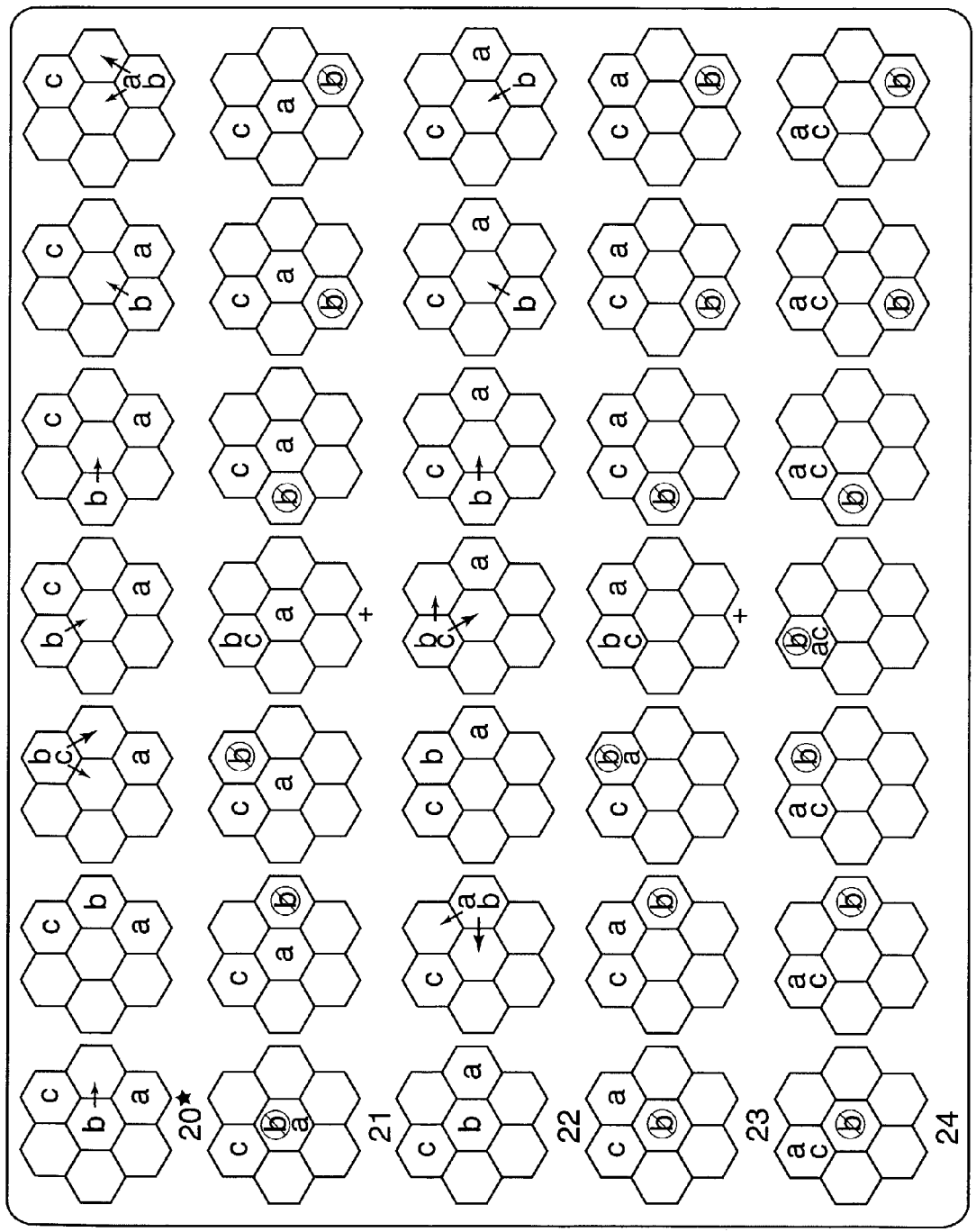
Figure 20F:
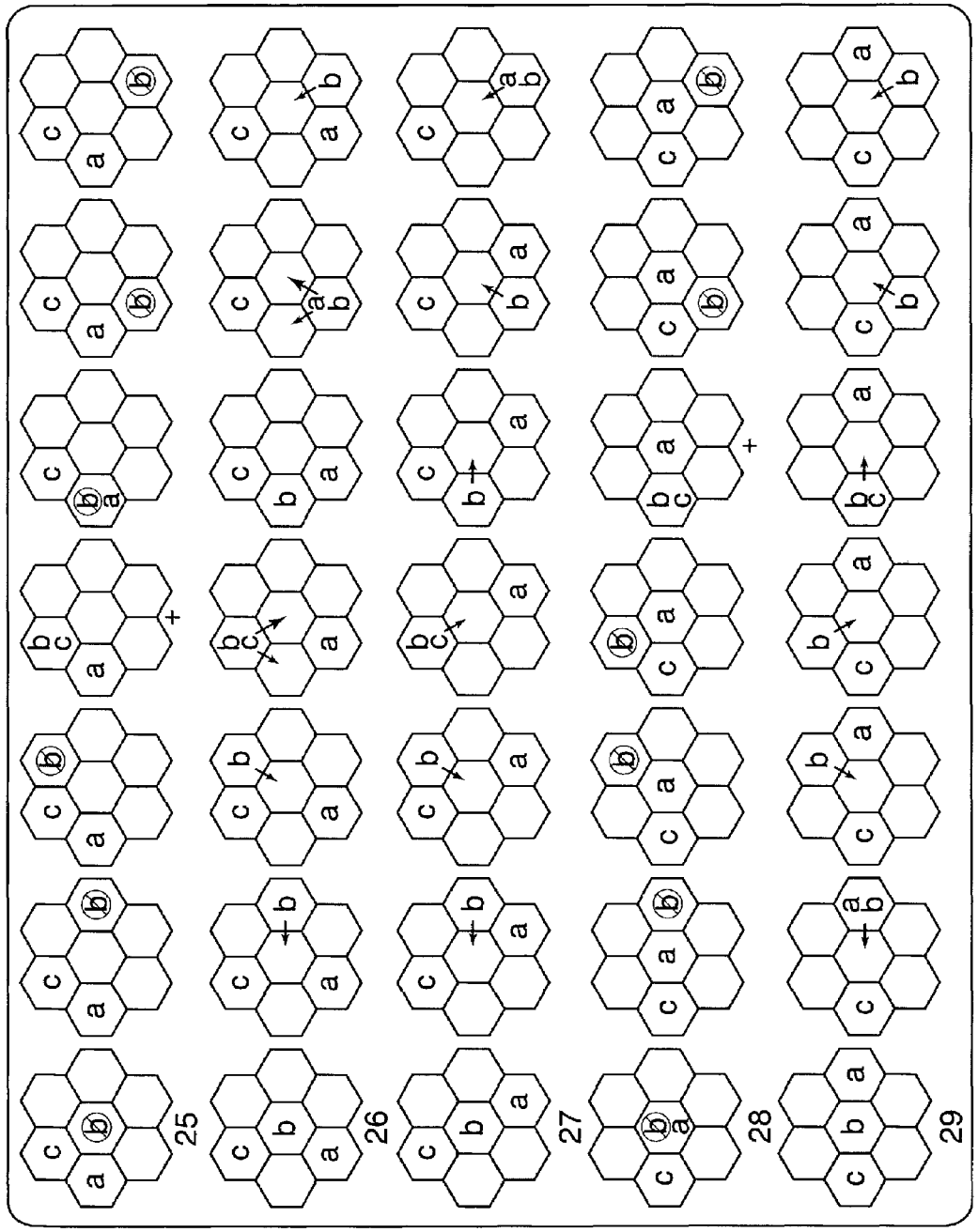
Figure 20G:
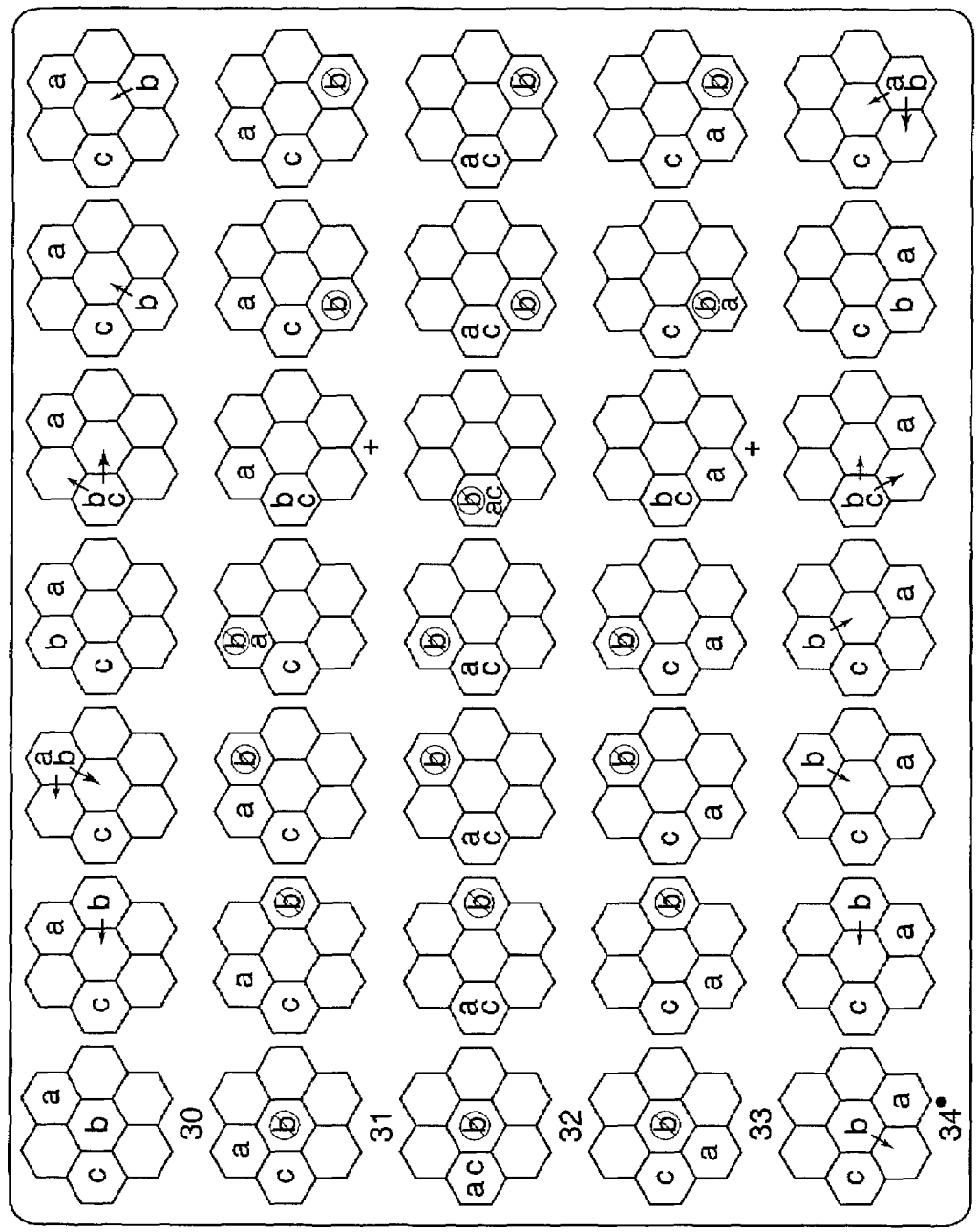
Figure 20H:
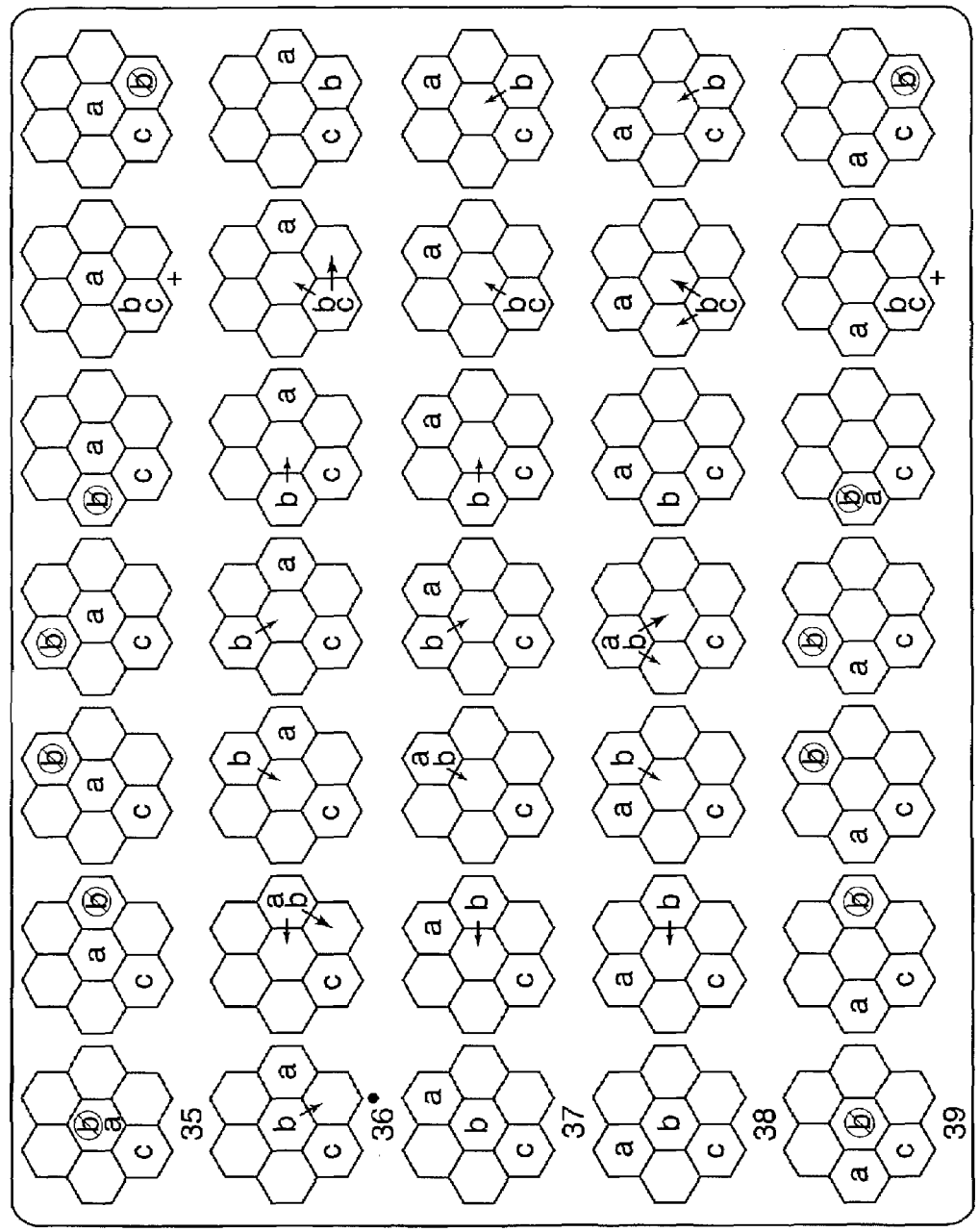
Figure 20I:
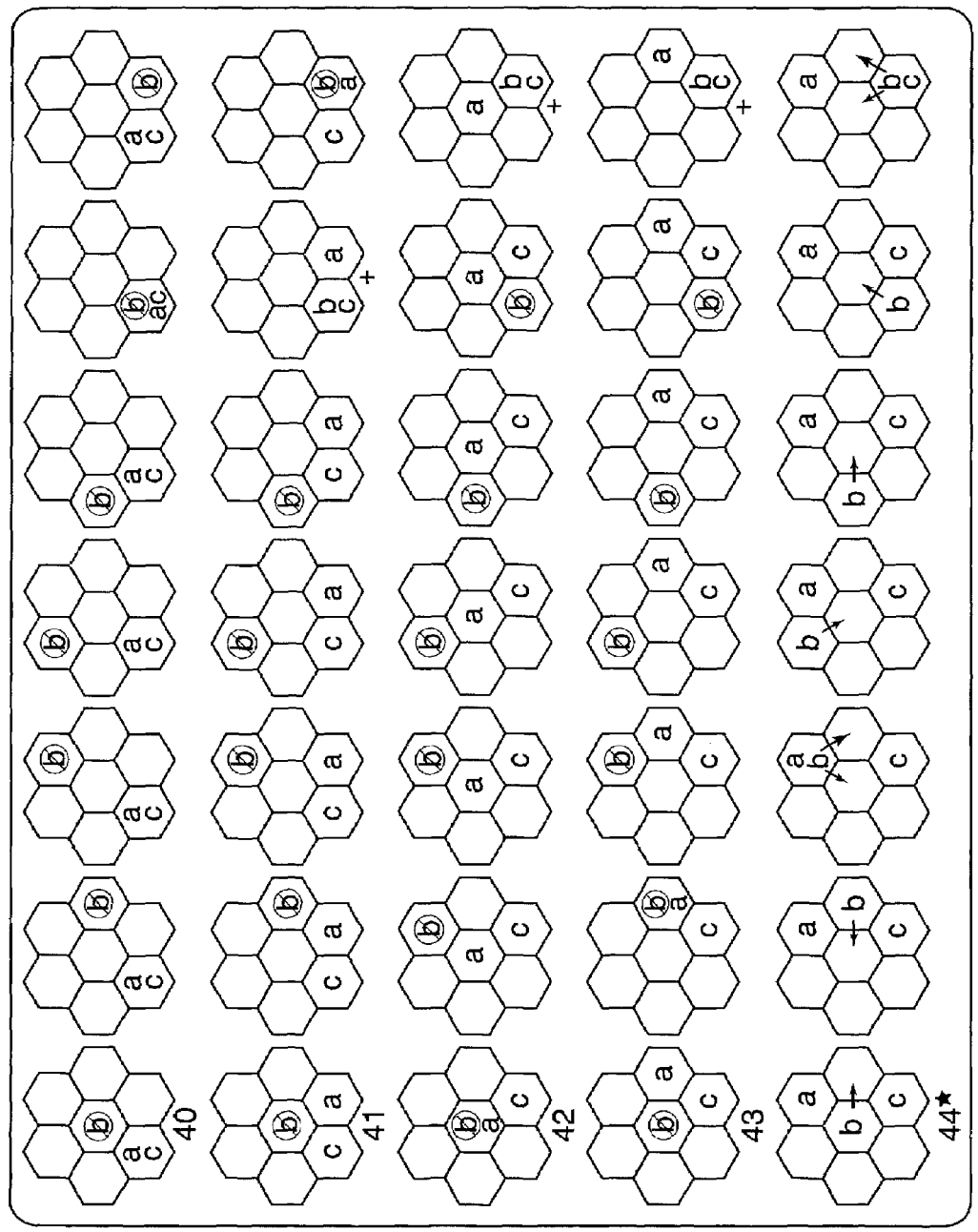
Figure 20J:
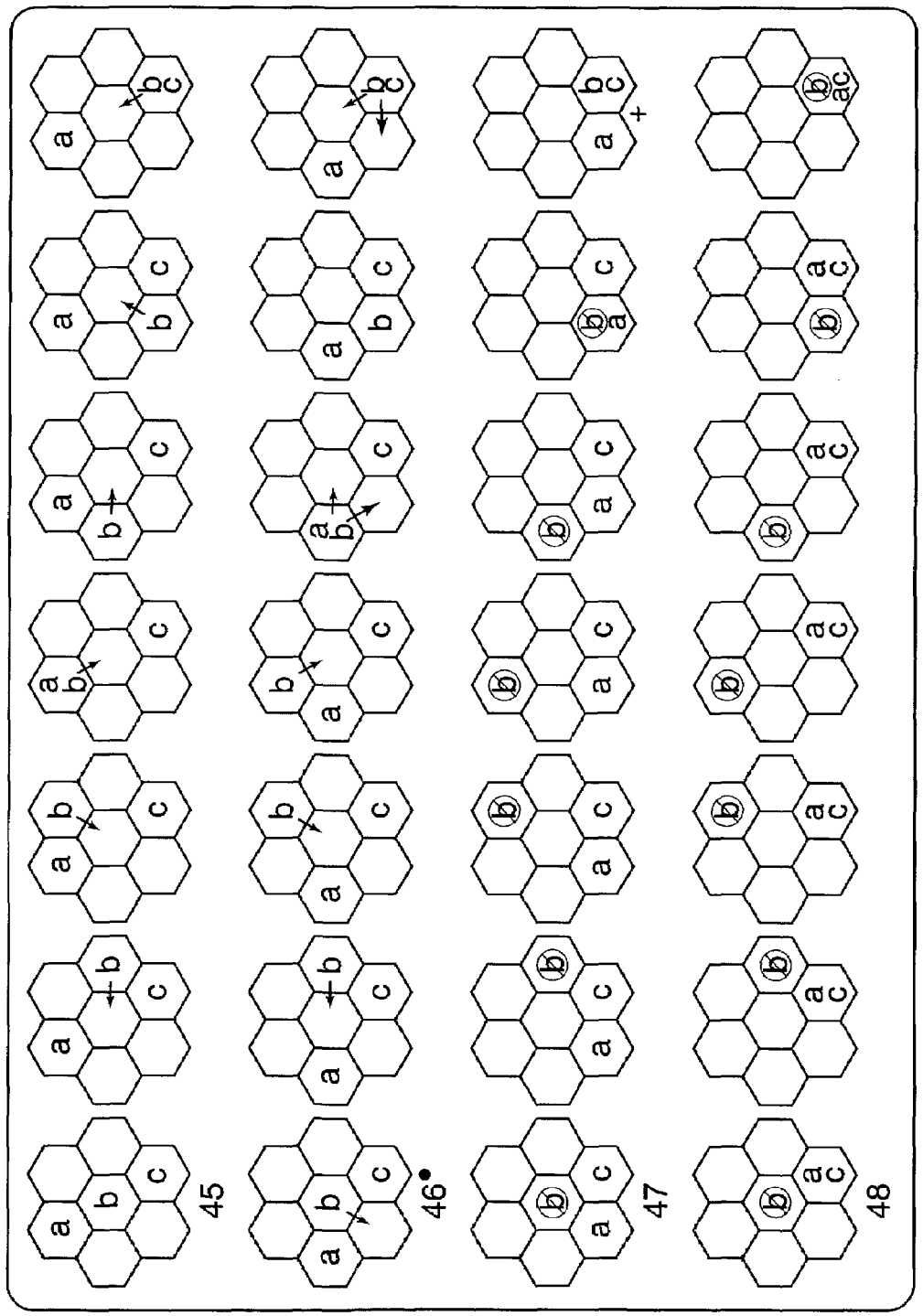

All of the following neighborhood illustrations assume that l is located below the neighborhood and that it has an orientation between [−45°, 45°). FIGS. 19A-19B comprise the set of 49 update neighborhood states that illustrate the action, if any, that node b will take should α, β, a, or c move into a new cell. Node b is always anchored in the neighborhood's center cell. When b is shown with an overstrike "Ø" it means that node b removes itself from the segment. The arrows indicate the cell into which node b must search for its replacement node. The neighborhoods marked with a "*" are actions to restore the route segment to being monotonically non-decreasing. Neighborhoods marked with a " " are actions to bring the route segment back into the corridor. When node c=β, those neighborhoods marked with a "+" signify instances where node b tries to remove itself from the route because the segment end node c has moved inside node a's neighborhood. A movement by α or β to a new cell may or may not influence b. If b is influenced by a change in α or β's position, then either route leg $\overline{ab}$ or leg $\overline{bc}$ may be rendered monotonically decreasing, or node b may suddenly lay outside of the route corridor.

The FIGS. 20A-20J comprise a complete set of all possible route states of the preferred embodiment of the present invention that result from either a local change (where a, b, or c change cells), or a global change (where α or β change cells). The neighborhoods illustrated in FIGS. 19A-19B appear on the left side of FIGS. 20A-20J as row indices. The six neighborhoods to the right of the row index show those configurations in which node b has moved to a new cell.

In those neighborhoods where there are two arrows, the oversized arrow represents the first choice. In the following list of rows: 10, 12, 18, 22, 30, 34, 36, and 46, if b is outside the corridor, then the oversized arrows are significant. Otherwise, b is inside the corridor and the choice of either arrow carries the same weight. In the following list of rows: 20, 26, 38, and 44, the oversized arrow always represents the better choice since it leads to a monotonically decreasing leg $\overline{ab}$ versus the other choice that leads to a monotonically increasing leg $\overline{ab}$.

The orientation of l falls into one of the six orientation ranges: [−30°,30°), [30°,90°), [90°,150°),[150°,210°), [210°,270°), and [270°,330°).

Depending on l's orientation range, the update state neighborhoods in the figures above must be rotated according to the following list:

[−30°,30°) No rotation is necessary;

[30°,90°) Rotate the update states by −60°;

[90°,150°) Rotate the update states by −120°;

[150°,210°) Rotate the update states by −180°;

[210°,270°) Rotate the update states by −240°; and

[270°,330°) Rotate the update states by −300°.

If the orientation of l is on the edge of an orientation range, the update states could flip-flop between two rotation amounts. To handle this situation, the cells in the neighborhoods of α and β are sorted to determine the extreme opposite orientations to which l could possibly change. If the extreme opposite orientations are in the same orientation range, l is allowed to change into that orientation range.

Changes to the Domain Name Services System

The DNS is a fundamental and integral part of the Internet. It is a distributed database that maps between host names and IP addresses. To tightly integrate MAMN with the Internet, or any IP based network, generally, DNS must be enhanced to perform additional mappings. The two most important mappings are the IP-address-to-cellid and cellid-to-IP-addresses mappings. The IP-address-to-cellid performs the mapping from a node's IP address to its cellid.

For DNS to support the IP-address-to-cellid mapping, when a mobile node moves to another cell, it must communicate with the DNS server who has authority for the node's reverse zone. A new DNS resource record type (RR) CELLID is needed. The CELLID record value is the node's recent cellid. Thus, a node must periodically send a message to its DNS server to update its CELLID RR value. The cellid-to-IP-addresses performs the reverse mapping from a cellid to the IP addresses of gateway nodes located in the cell.

The new zone dynamo-net.net is defined. Let cid be a cellid such that cid=$d_m d_{m-1} \ldots d_1 d_0$, where $d_i$ is the $i^{th}$ digit of the cell's id. A cellid-to-IP-addresses query is formulated as: $d_0.d_1 \ldots d_{m-1}.d_m$.dynamo-net.net. Each digit of the cellid is treated as its own subdomain, with the left most (least significant) digit being the most nested subdomain. Encoding the cellid in this way enables a hierarchy of DNS servers to resolve cellid-to-IP-addresses queries. The whole DNS scheme hinges on the existence of a bi-directional functional mapping between cell center position and cellid.

Figure 21A:
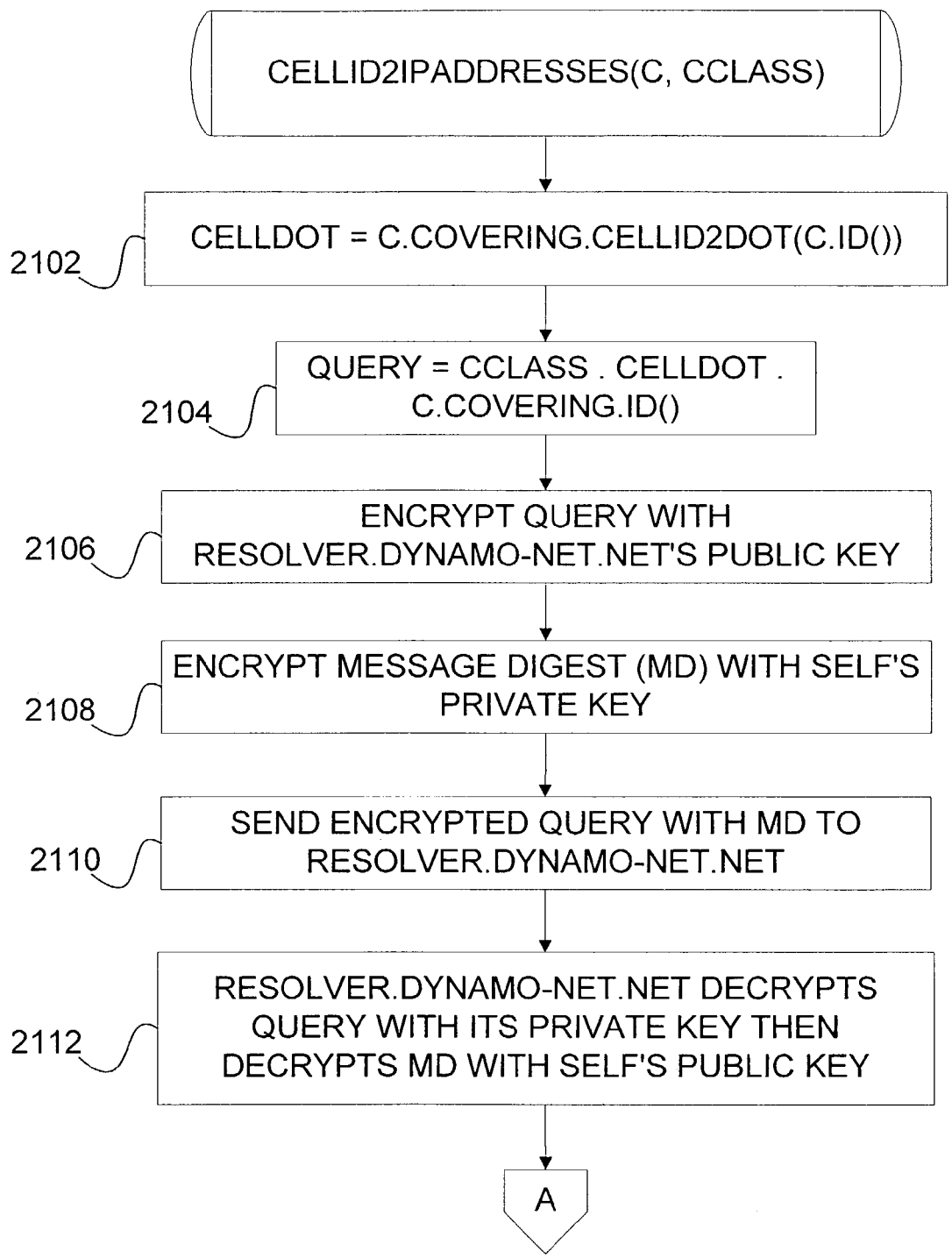
FIGS. 21A-21B illustrate the IPADDRESS2CELLID method according to embodiments of the present invention.
Figure 21B:
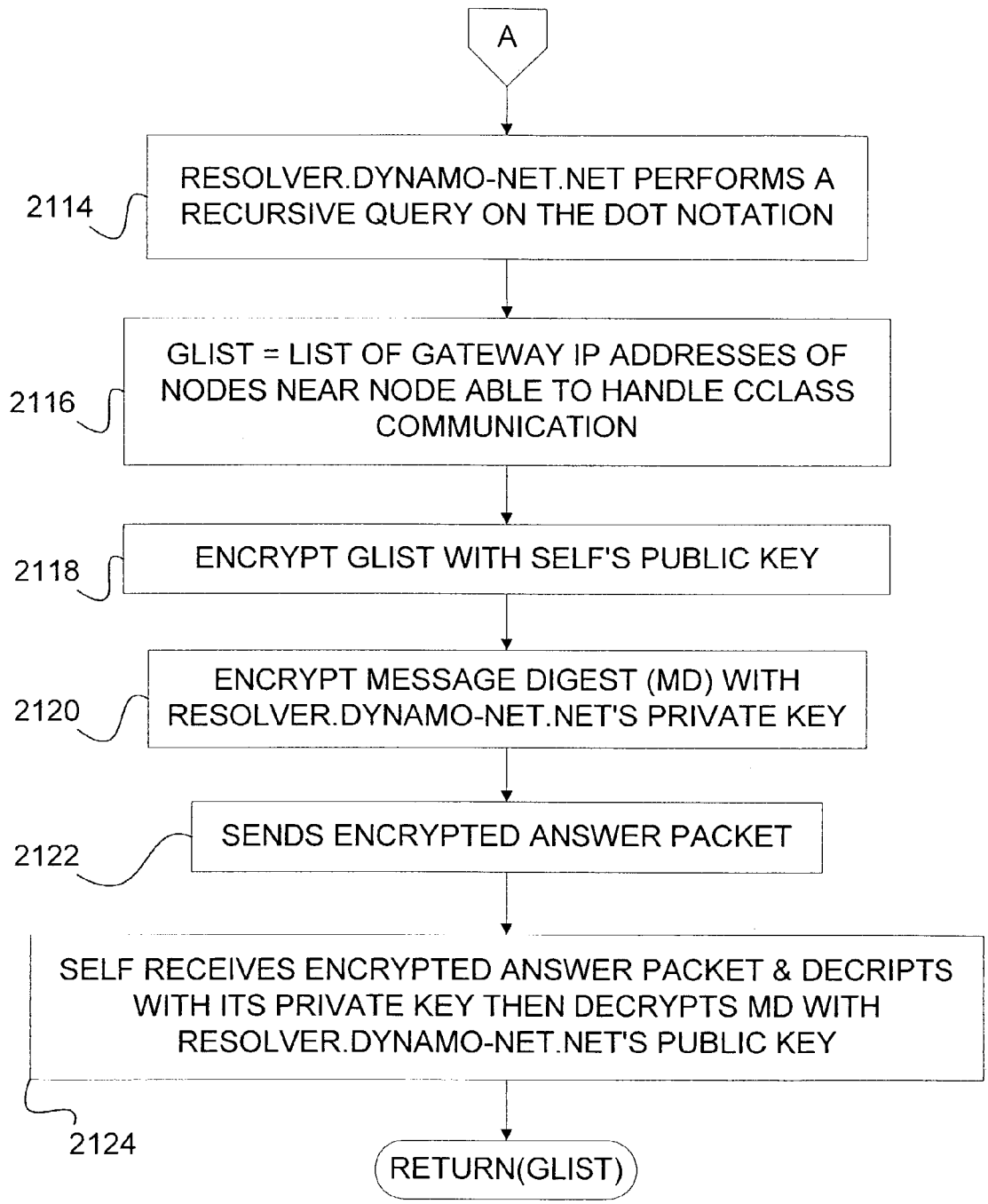

FIGS. 21A-21B illustrate the CELLID2IPADDRESSES method embodiment of the present invention that queries the farm of DNS servers for an exit gateway that is located close to the specified cell and is capable of communicating at the specified communication class. The CELLID2IPADDRESSES returns a list of IP addresses of exit gateway nodes that are close to C and able to handle communication class CCLASS. The technique for assigning cell identifiers within a covering lends itself to a hierarchy of clusters.

The hierarchy provides a natural way to distribute the task of answering CELLID2IPADDRESSES queries across a farm of DNS servers, just as the dot notation of a fully qualified domain name allows DNS queries to be distributed over a hierarchy of name servers. The variable CELLDOT is set to the cell's cellid in dotted notation 2102. QUERY is the concatenation of the minimum communication class, followed by the CELLDOT, followed by the coveringid 2104. The coveringid is for future expansion. The query is encrypted with the public-key of the DNS server farm 2106 and the host using its private-key signs the message digest 2108. The host sends the query to the DNS server farm 2110. When the server farm receives the message it decrypts the query using its private-key; queries the host's authoritative DNS server for the host's public-key; decrypts the message digest using the host's public-key; computes a message digest itself, and compares the two message digests 2112. Presuming the two digests are equal, the farm of DNS servers performs a recursive query on the dot notation query 2114. The list of IP addresses of the possible exit gateway hosts is collected, encrypted and signed by the DNS server farm and returned to SELF by first assigning GLIST the list of gateway IP addresses of nodes near the cell C that are able to handle CCLASS communication 2116, encrypting GLIST with SELF's public key 2118, encrypting the message digest with RESOLVER.DYNAMO-NET.NET's private key 2120, and sending the encrypted answer packet 2122. When SELF receives the answer it uses its private-key to decrypt the message, and it uses the DNS server farm's public-key to check the signature before using the answer list 2124.

Figure 22A:
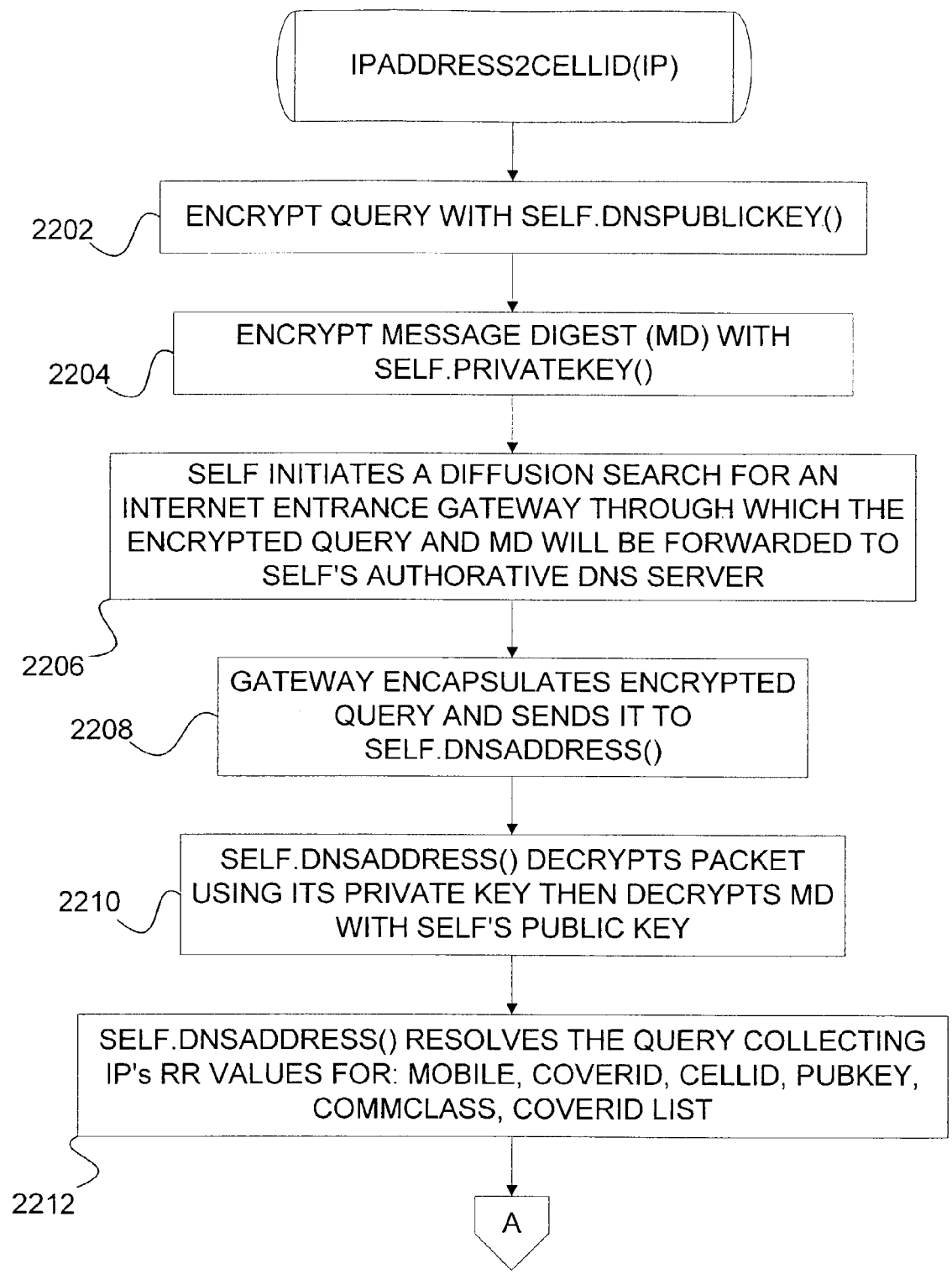
FIGS. 22A-22B illustrate the CELLID2IPADDRESSES method according to embodiments of the present invention.
Figure 22B:
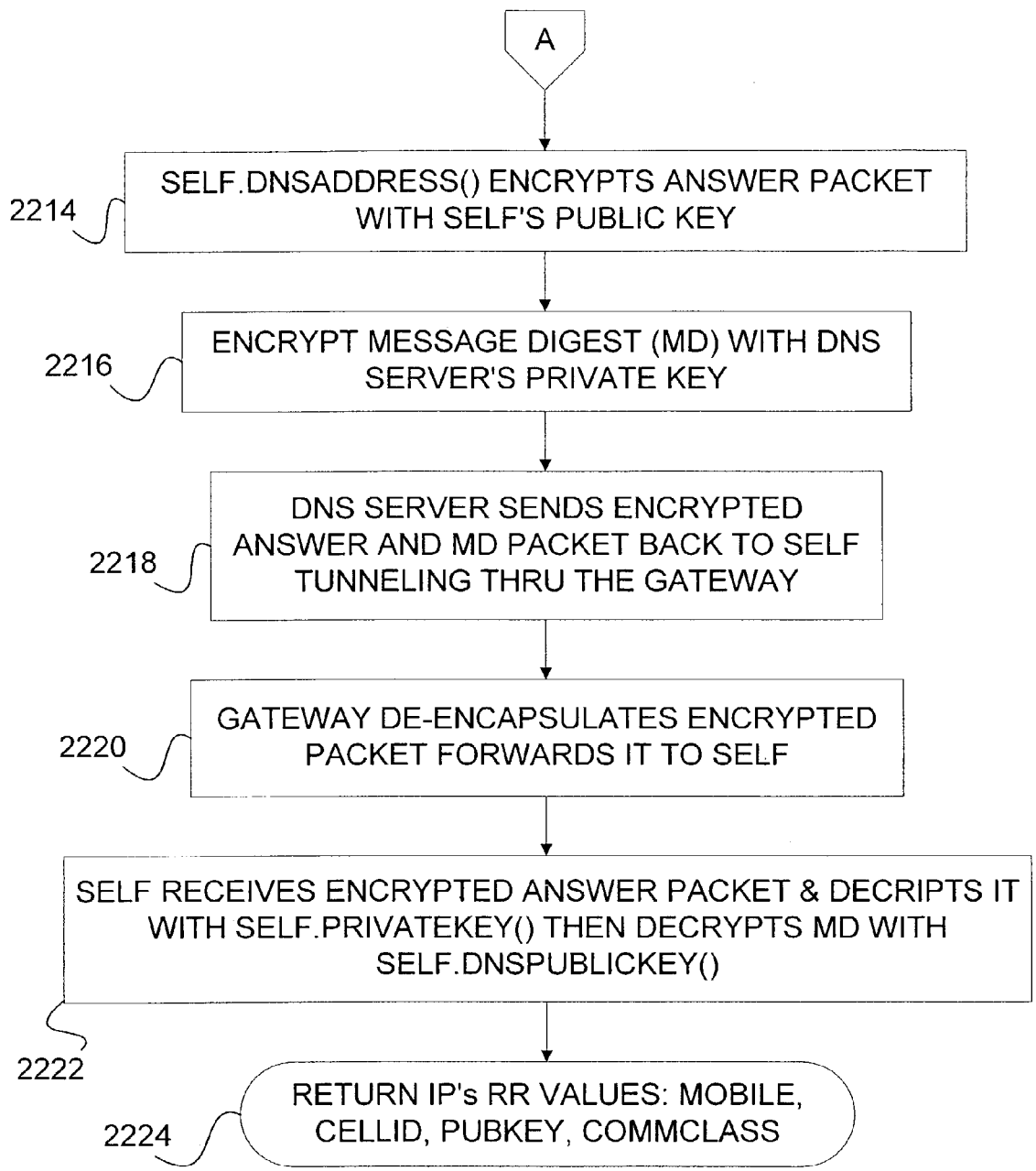

FIGS. 22A-22B illustrate the IPADDRESS2CELLID method embodiment of the present invention that queries the DNS system for a node's tentative cell. Every host connected to the Internet has a unique IP address. For a host to resolve names into IP addresses, at least one DNS server is made available to that host. In the reverse direction, IP address to name, also termed the reverse zone, a specific DNS server is assigned authority for a contiguous block of IP addresses. Dynamo assigns the task of resolving new DNS queries to the node's authoritative DNS server for its reverse zone. Moreover, four new DNS resource records are introduced:

(a) MOBILE—a flag that if TRUE means Dynamo routing should be used when communicating with the node. Otherwise, the flag is FALSE and standard wired Internet routing should be used;

(b) CELL—the node's tentative cell's cellid;

(c) PUBKEY—the node's public-key; and (d) COMMCLASS—the node's maximum communication class.

A new DNS query is introduced: IPAddress2CellID takes an IP address as the query and returns the corresponding resource record values: MOBILE, CELLID, PUBKEY, and COMMCLASS. The node's authoritative DNS server for the node's reverse zone is responsible for answering IPADDRESS2CELLID queries from other hosts about the node. When a node is mobile, it issues all DNS queries to its authoritative DNS server. If the authoritative DNS server cannot answer the query from its cache, it will perform a recursive query to obtain the answer. This allows DNS queries to be encrypted and signed by the node, and the answer to be encrypted and signed by the authoritative DNS server.

Each host, whether it is a node or an authoritative DNS server, possesses a public and private-key pair. The public-key is made available to anyone who wishes to communicate with the host. Whereas, the private-key is kept secret; that is, only the host has a record of it. When a node needs the tentative cell of another node to which it wishes to communicate, the node issues an IPADDRESS2CELLID query to its authoritative DNS server. First the query (or message) is encrypted using the authoritative DNS server's public-key 2202, then the message digest is signed with SELF's private-key 2204. Assuming that SELF does not know of a close gateway, SELF initiates a diffusion search for an Internet entrance gateway through which the encrypted and signed query can be forwarded to SELF's authoritative DNS server 2206.

When a gateway is found, it encapsulates the encrypted and signed query and sends it to SELF's authoritative DNS server using the wired Internet 2208. Once SELF's authoritative DNS server receives the message, it decrypts the message; generates its own digest, and compares it to the digest generated by SELF 2210. Presuming the two message digests compare, the DNS server resolves the query and collects the node's MOBILE, CELLID, PUBKEY and COMMCLASS resource record values 2212. The authoritative DNS server encrypts 2214 the answer message and signs it 2216. The encrypted and signed answer message is encapsulated and tunneled through the gateway 2218. The gateway de-encapsulates the encrypted answer and forwards it through MAMN to SELF 2220. When SELF receives the answer message it decrypts the message, computes a message digest, and compares the computed digest with the signed digest 2222. If the two digests are equal, the four values: MOBILE, CELLID, PUBKEY and COMMCLASS are returned 2224.

Figure 23:
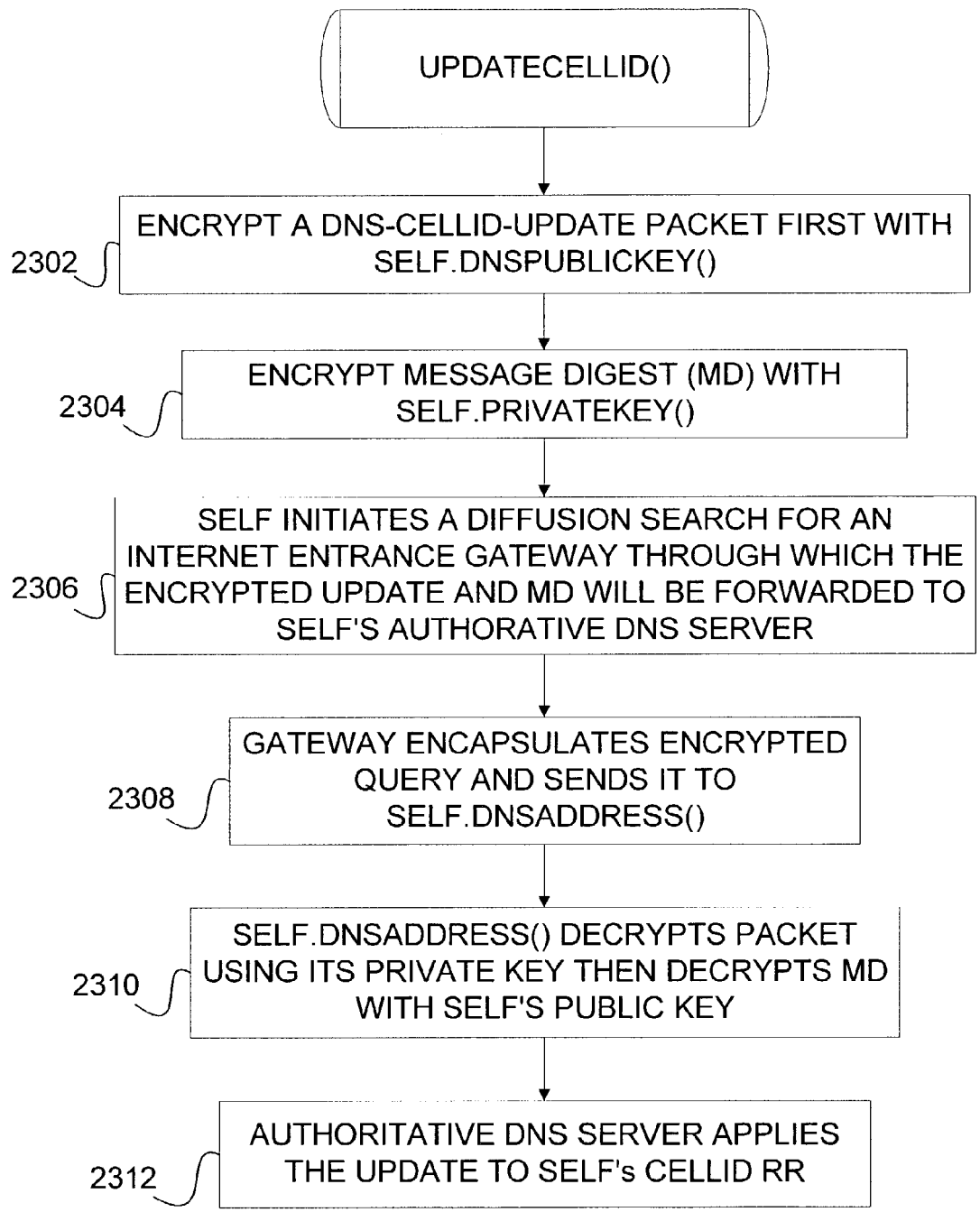
FIG. 23 is the UPDATECELLID flowchart of the method according to embodiments of the present invention.

FIG. 23 illustrates the UPDATECELLID flowchart that describes the method of a mobile node informing its authoritative DNS server that the mobile node has moved to a new cell. As SELF moves from cell to cell its authoritative DNS server needs to update SELF's tentative cell resource record so that the server can give out SELF's most current location when other hosts wish to communicate with SELF. SELF encrypts an update message using its authoritative DNS server's public-key 2302. A message digest is computed and signed using SELF's private-key 2304. The message is sent to an entrance gateway 2306. The gateway encapsulates the encrypted message and sends it over the wired Internet to SELF's authoritative DNS server 2308. The authoritative DNS server decrypts the message using its private-key, computes a message digest and compares the computed message digest with the signed message digest 2310. Assuming the two message digests compare, the authoritative DNS server applies the update to SELF's CELLID resource record 2312.

Clustering

A cluster is an aggregation of cells that forms a hierarchy. Within a hierarchy, the size of a clique is constant. While there are strong similarities between the hierarchies generated by clique of size 7, also termed a 7-clique, and a clique of size 19, also termed a 19-clique, the differences are equally important. Thus, clustering is divided into two sections, 7-cliques and 19-cliques.

7-Clique Clustering

Each cell in a clique has an index. The center cell of a 7-clique has index 0. The cell to the right of the center cell is cell index 1. The remaining 5 cells that surround the center cell are indexed incrementally in a counter-clockwise direction. Referring back, FIG. 2 illustrates the cell indexing of a 7-clique. The unique identification of a cell in a 7-clique requires a single digit of base 7.

Each cluster within a hierarchy is comprised of seven subclusters. A 0-cluster is a cell, and a 1-cluster or clique is comprised of seven subclusters (e.g., 7×0-clusters). A 2-cluster is comprised of 7×1-clusters—a center 1-cluster surrounded by six 1-clusters. A 3-cluster is 7×2-clusters, and so on. In general, an n-cluster is an aggregate of 7×(n−1)-clusters, where n>1.

Each (n−1)-cluster in the union is referred to as a subcluster of the n-cluster, and the n-cluster is called the supercluster. The utility of clusters is that they nest and thus naturally form a hierarchy. The technique for cell indexing of an n-cluster is that every cell in the center subcluster has a 0 as its $d_{n-1}$ base 7 digit. The right most subcluster has 1 as its $d_{n-1}$ digit, and in a counter-clockwise direction, each of the remaining 5 neighboring subclusters have an incrementally larger value as their $d_{n-1}$ digit. All the digits of a cell index, are base 7 digits. Referring again to FIG. 4A, a 3-cluster is illustrated in which each cell's index is comprised of three digits of base 7.

The origin of an n-cluster is the center of the cell with the cellid consisting of all zeros. The width of an n-cluster is the number of cells in the row passing through the cluster's origin. The maximum distance from a cluster's origin to the centroid of a perimeter cell is termed the circumradius. A normalized x unit is the x value such that $$s\frac{\sqrt{3}}{2} \times x$$

is the horizontal distance from the origin to the point (centroid). A normalized y unit is the y value such that s3/2×y is the vertical distance from the origin to the point.

In the following paragraphs, $\lceil x \rceil$ is the greatest integer i such that $i \leq x$. Pertinent attributes of 7-clique clusters include: (a) the total number of cells in an n-cluster is $7^n$; (b) the width of an n-cluster is $7^{n/2}$ if n is even; (c) if n is odd, then the cluster's width is $3 \times 7^{n-1}$; (d) the origin of the zeroth (n−1)-cluster is the origin of its supercluster; (e) the distance squared from the origin of an n-cluster to one of its subcluster's origin (except the zeroth subcluster) is $3 \times 7^{n-1}s$; (f) every subcluster (except the zeroth subcluster) is spaced around its supercluster's origin at 60° intervals; and (g) if the supercluster is an n-cluster where n is odd, then the first subcluster is at a bearing of 0° from the origin of its supercluster, otherwise, the first subcluster is at bearing 19.1066° from the origin of its supercluster.

The following table, Table 2, lists the normalized offsets from the origin of the n-cluster supercluster to the origin of each of the 7 subclusters. If n is odd then the (x, y) offset is in the two columns following the subcluster index. Otherwise, n is even and the (x, y) offset is listed in the last two columns.

TABLE 2

| Index | Odd n x | Odd n y | Even n x | Even n y |
|---|---|---|---|---|
| 0 | 0 | 0 | 0 | 0 |
| 1 | $2 \times 7^{\lceil(n-1)/2\rceil}$ | 0 | $5 \times 7^{\lceil(n-1)/2\rceil}$ | $7^{\lceil(n-1)/2\rceil}$ |
| 2 | $7^{\lceil(n-1)/2\rceil}$ | $7^{\lceil(n-1)/2\rceil}$ | $7^{\lceil(n-1)/2\rceil}$ | $3 \times 7^{\lceil(n-1)/2\rceil}$ |
| 3 | $-7^{\lceil(n-1)/2\rceil}$ | $7^{\lceil(n-1)/2\rceil}$ | $-4 \times 7^{\lceil(n-1)/2\rceil}$ | $2 \times 7^{\lceil(n-1)/2\rceil}$ |
| 4 | $-2 \times 7^{\lceil(n-1)/2\rceil}$ | 0 | $-5 \times 7^{\lceil(n-1)/2\rceil}$ | $-7^{\lceil(n-1)/2\rceil}$ |
| 5 | $-7^{\lceil(n-1)/2\rceil}$ | $-7^{\lceil(n-1)/2\rceil}$ | $-7^{\lceil(n-1)/2\rceil}$ | $-3 \times 7^{\lceil(n-1)/2\rceil}$ |
| 6 | $7^{\lceil(n-1)/2\rceil}$ | $-7^{\lceil(n-1)/2\rceil}$ | $4 \times 7^{\lceil(n-1)/2\rceil}$ | $-2 \times 7^{\lceil(n-1)/2\rceil}$ |

Where cl is the n-cluster, the square of the circumradius ($cr^2$) of an n-cluster is:

$p = cl.\text{origin}(\ ) - cl.\text{subcluster}(1).\text{origin};$ $q = (cl.\text{subcluster}(1).\text{width}(\ ), 0);$ $cr^2 = p^2 + q^2 - 2(p \cdot q);$ for n>1; otherwise, $cr^2 = 3$ when n=1.

Assume for purposes of illustration that the coverage area is fully contained in an n-cluster and that the n-cluster is contained in one band with cell side length s. A cluster is an aggregation of 7 subclusters. Any cell in an n-cluster belongs to exactly one of the 7 (n−1)-clusters and in addition belongs to exactly one (n−2)-cluster that is nested within the (n−1)-cluster. This nesting continues until finally the cell is uniquely defined within its neighborhood. The function $\Xi$ maps a subcluster's index (i.e., a base 7 digit) into the number of x-normalized units between the supercluster's origin and the subcluster's origin. Thus, the total number of x-normalized units a cell is, in the horizontal direction, from the n-cluster's origin is:

$$\sum_{i=0}^{n-1} 7^{\lceil i/2 \rceil}(\Xi(d_i)). \qquad [6,1]$$

For even i, the $\Xi$ function is called XI7EVEN and is defined as:

$\Xi(d_i) = \{0, \text{ if } d_i=0; 5, \text{ if } d_i=1; 1, \text{ if } d_i=2; -4, \text{ if } d_i=3;$
$-5, \text{ if } d_i=4; -1, \text{ if } d_i=5; 4, \text{ if } d_i=6\}, \qquad [6.2]$ and for odd i, the $\Xi$ function is called XI7ODD and is defined as:

$\Xi(d_i) = \{0, \text{ if } d_i=0; 2, \text{ if } d_i=1; 1, \text{ if } d_i=2; -1, \text{ if } d_i=3;$
$-2, \text{ if } d_i=4; -1, \text{ if } d_i=5; 1, \text{ if } d_i=6\}. \qquad [6.3]$ Similarly, the total number of y-normalized units a cell is separated, in the vertical direction, from its containing n-cluster's origin is:

$$\sum_{i=0}^{n-1} 7^{\lceil i/2 \rceil}(\Upsilon(d_i)). \qquad [7.1]$$

where $\Upsilon$ maps a subcluster index into the number of y-normalized units between the supercluster's origin and the subcluster's origin. For even i, the $\Upsilon$ function is called UPSILON7EVEN and is defined as:

$\Upsilon(d_i) = \{0, \text{ if } d_i=0; 1, \text{ if } d_i=1; 3, \text{ if } d_i=2; 2, \text{ if } d_i=3;$
$-1, \text{ if } d_i=4; -3, \text{ if } d_i=5; -2, \text{ if } d_i=6\}, \qquad [7.2]$ and for odd i, $\Upsilon$ is called UPSILON7ODD and is defined as:

$\Upsilon(d_i) = \{0, \text{ if } d_i=0; 0, \text{ if } d_i=1; 1, \text{ if } d_i=2; 1, \text{ if } d_i=3; 0,$
$\text{ if } d_i=4; -1, \text{ if } d_i=5; -1, \text{ if } d_i=6\}. \qquad [7.3]$ Thus, the mapping from cellid to cell centroid position is $$x = \frac{\sqrt{3}}{2} s \sum_{i=0}^{n-1} 7^{\lceil i/2 \rceil}(\Xi(d_i)); \qquad [8.1]$$

$$y = \frac{3}{2} s \sum_{i=0}^{n-1} 7^{\lceil i/2 \rceil}(\Upsilon(d_i)). \qquad [8.2]$$

19—Clique Clustering

In a 19-clique, the neighborhood at the center of the clique has the same cell indices as a 7-clique. The cell with index 7 is to the right of cell 1. The remaining 11 cells are indexed incrementally in a counter-clockwise direction around the neighborhood. One base 19 digit is needed to uniquely identify each cell in a 19-clique.

Figure 24A:
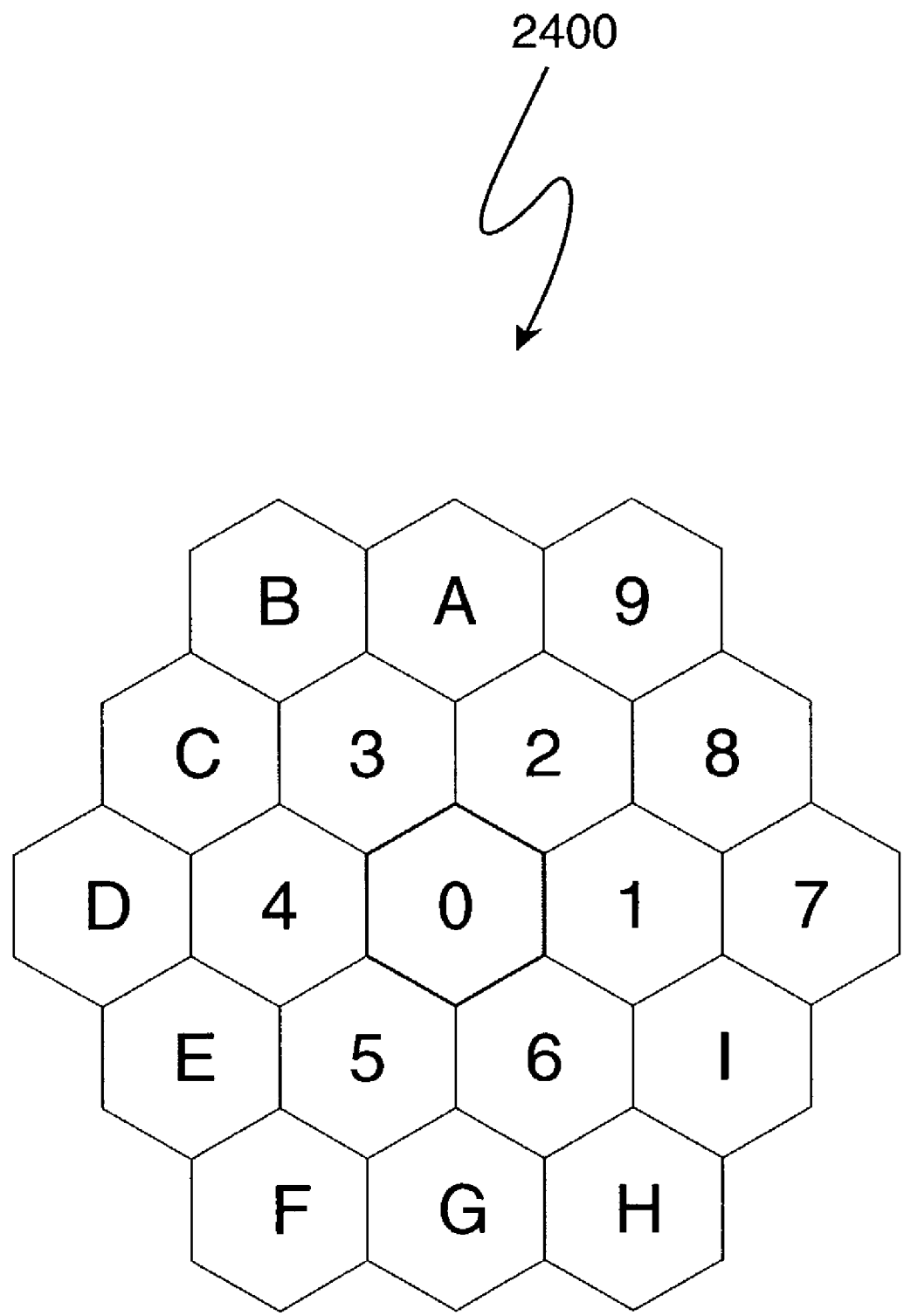
FIG. 24A illustrates a 19 cell clique.
Figure 24B:
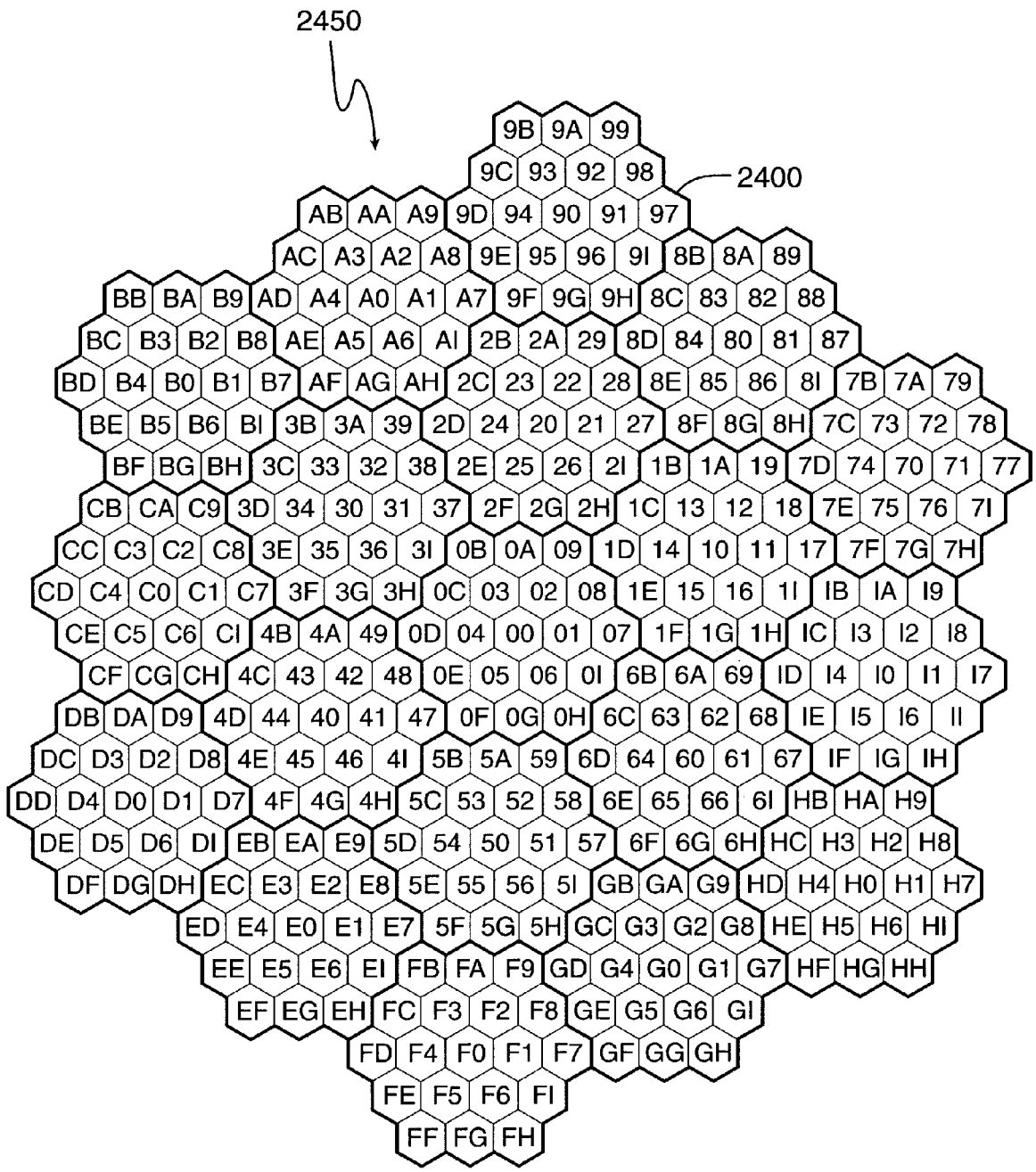
FIG. 24B illustrates a 2-cluster of clique size 19.

FIG. 24A illustrates a 19-clique 2400, and FIG. 24B illustrates a 19-clique 2-cluster 2450. Each cluster is comprised of 19 subclusters 2400 requiring two base-19 digits to uniquely identify every cell. In general, an n-cluster is an aggregate of 19 (n−1)-clusters, where $n \geq 1$. The index of each cell in the 2-cluster 2450 is the subcluster's index followed by the cell's subcluster index. A cell in the center subcluster has 0 as its most significant digit. In a counter-clockwise direction around subcluster 0, the neighboring subclusters are numbered 1 through 6, where subcluster 1 is furthest to the right. The subclusters numbered 7 through i, base 19, form a ring around subclusters 0 through 6. Subcluster 7 is furthest to the right, and in a counter-clockwise direction, each subsequent subcluster has an incrementally larger index.

The following are pertinent attributes regarding 19-clique clusters: (a) the total number of cells in an n-cluster is $19^n$; (b) the width of an n-cluster is $19^{n/2}$ if n is even; (c) if n is odd, then the cluster's width is $5 \times 7^{n-1}$; (d) the origin of the zeroth (n−1)-cluster is the origin of its supercluster; and (e) the distance squared ($d^2$) from the origin of an n-cluster to one of its $i^{th}$-subcluster's origin is $d^2=\{0$, if $i=0$; $3\times 19(n-1)\times s$, if $i=1, \ldots, 6$; $12\times 19(n-1)\times s$, if $i \in \{7, 9, b, d, f, h\}$; $9\times 19(n-1)\times s$, if $i \in \{8, a, c, e, g, i\}$.

Subclusters 1 through 6 are spaced around the supercluster's origin at 60° intervals. Subclusters 7 through i are spaced at 30° intervals around the supercluster's origin. From the supercluster's origin, the bearing of subcluster 1 equals the bearing of subcluster 7.

If the supercluster is an n-cluster, where n is odd, then the subcluster 1 is at a bearing of 0° from the origin of its supercluster. If n is even, then subcluster 1 is at bearing 19.1066° from the origin of its supercluster.

The following tables, Tables 3 and 4, list the normalized offsets from the origin of the n-cluster supercluster to the origin of each of the 19 subclusters. The first table, Table 3, lists the (x,y) offsets for odd values of n.

TABLE 3

| Index | X | Y |
|---|---|---|
| 0 | 0 | 0 |
| 1 | $2 \times 19^{[n-1]/2}$ | 0 |
| 2 | $19^{[n-1]/2}$ | $19^{[n-1]/2}$ |
| 3 | $-19^{[n-1]/2}$ | $19^{[n-1]/2}$ |
| 4 | $-2 \times 19^{[n-1]/2}$ | 0 |
| 5 | $-19^{[n-1]/2}$ | $-19^{[n-1]/2}$ |
| 6 | $19^{[n-1]/2}$ | $-19^{[n-1]/2}$ |
| 7 | $4 \times 19^{[n-1]/2}$ | $19^{[n-1]/2}$ |
| 8 | $3 \times 19^{[n-1]/2}$ | $19^{[n-1]/2}$ |
| 9 | $2 \times 19^{[n-1]/2}$ | $2 \times 19^{[n-1]/2}$ |
| a | $-19^{[n-1]/2}$ | $2 \times 19^{[n-1]/2}$ |
| b | $-2 \times 19^{[n-1]/2}$ | $2 \times 19^{[n-1]/2}$ |
| c | $-3 \times 19^{[n-1]/2}$ | $19^{[n-1]/2}$ |
| d | $-4 \times 19^{[n-1]/2}$ | $19^{[n-1]/2}$ |
| e | $-3 \times 19^{[n-1]/2}$ | $-19^{[n-1]/2}$ |
| f | $-2 \times 19^{[n-1]/2}$ | $-2 \times 19^{[n-1]/2}$ |
| g | $-19^{[n-1]/2}$ | $-2 \times 19^{[n-1]/2}$ |
| h | $2 \times 19^{[n-1]/2}$ | $-2 \times 19^{[n-1]/2}$ |
| i | $3 \times 19^{[n-1]/2}$ | $-19^{[n-1]/2}$ |

The second table, Table 4, lists the normalized offsets for even n.

TABLE 4

| Index | x | y |
|---|---|---|
| 0 | 0 | 0 |
| 1 | $8 \times 19^{[n-1]/2}$ | $2 \times 19^{[n-1]/2}$ |
| 2 | $19^{[n-1]/2}$ | $5 \times 19^{[n-1]/2}$ |
| 3 | $-7 \times 19^{[n-1]/2}$ | $3 \times 19^{[n-1]/2}$ |
| 4 | $-8 \times 19^{[n-1]/2}$ | $-2 \times 19^{[n-1]/2}$ |
| 5 | $-19^{[n-1]/2}$ | $-5 \times 19^{[n-1]/2}$ |
| 6 | $7 \times 19^{[n-1]/2}$ | $-3 \times 19^{[n-1]/2}$ |
| 7 | $16 \times 19^{[n-1]/2}$ | $4 \times 19^{[n-1]/2}$ |
| 8 | $9 \times 19^{[n-1]/2}$ | $7 \times 19^{[n-1]/2}$ |
| 9 | $2 \times 19^{[n-1]/2}$ | $10 \times 19^{[n-1]/2}$ |
| a | $-6 \times 19^{[n-1]/2}$ | $8 \times 19^{[n-1]/2}$ |
| b | $-14 \times 19^{[n-1]/2}$ | $6 \times 19^{[n-1]/2}$ |
| c | $-15 \times 19^{[n-1]/2}$ | $19^{[n-1]/2}$ |
| d | $-16 \times 19^{[n-1]/2}$ | $-4 \times 19^{[n-1]/2}$ |
| e | $-9 \times 19^{[n-1]/2}$ | $-7 \times 19^{[n-1]/2}$ |
| f | $-2 \times 19^{[n-1]/2}$ | $-10 \times 19^{[n-1]/2}$ |
| g | $6 \times 19^{[n-1]/2}$ | $-8 \times 19^{[n-1]/2}$ |
| h | $14 \times 19^{[n-1]/2}$ | $-6 \times 19^{[n-1]/2}$ |
| i | $15 \times 19^{[n-1]/2}$ | $-19^{[n-1]/2}$ |

Where cl is the n-cluster, the square of the circumradius ($cr^2$) of cl is:

$p = cl.\text{origin}(\ ) - cl.\text{subcluster}(7).\text{origin}(\ );$ $q = (cl.\text{subcluster}(1).\text{width}(\ ), 0);$ $cr^2 = p^2 + q^2 - 2(p \cdot q);$ for n>1; otherwise, $cr^2 = 3$ when n=1.

For simplicity of description, again assume that the coverage area is fully contained in an n-cluster and that the n-cluster is contained in one band with cell side length s. A cluster is an aggregation of 19 subclusters. A cell in the n-cluster belongs to exactly one of the 19 (n−1)-clusters. Within the (n−1)-cluster, the cell belongs to exactly one (n−2)-cluster. This process is continued until the cell's index within its 1-cluster is known. The function Ξ maps a subcluster's index (i.e., a base-19 digit) into the number of x-normalized units between the supercluster's origin and the subcluster's origin. Thus, the total number of x-normalized units a cell is, in the horizontal direction, from the n-cluster's origin is:

$$\sum_{i=0}^{n-1} 19^{[i/2]}(\Xi(d_i)). \qquad [9.1]$$

For even i, the Ξ function is called XI19EVEN and is defined as:

$\Xi(d_i) = \{0$, if $d_i=0$; 8, if $d_i=1$; 1, if $d_i=2$; −7, if $d_i=3$; −8, if $d_i=4$; −1, if $d_i=5$; 7, if $d_i=6$; 16, if $d_i=7$; 9, if $d_i=8$; 2, if $d_i=9$; −6, if $d_i=a$; −14, if $d_i=b$; −15, if $d_i=c$; −16, if $d_i=d$; −9, if $d_i=e$; −2, if $d_i=f$; 6, if $d_i=g$; 14, if $d_i=h$; 15, if $d_i=i\}$, [9.2]

and for odd i, the Ξ function is called XI19ODD and is defined as:

$\Xi(d_i) = \{10$, if $d_i=0$; 2, if $d_i=1$; 1, if $d_i=2$; −1, if $d_i=3$; −2, if $d_i=4$; −1, if $d_i=5$; 1, if $d_i=6$; 4, if $d_i=7$; 3, if $d_i=8$; 2, if $d_i=9$; 0, if $d_i=a$; −2, if $d_i=b$; −3, if $d_i=c$; −4, if $d_i=d$; −3, if $d_i=e$; −2, if $d_i=f$; 0, if $d_i=g$; 2, if $d_i=h$; 3, if $d_i=i\}$. [9.3]

Similarly, the total number of y-normalized units a cell is separated, in the vertical direction, from its containing n-cluster's origin is:

$$\sum_{i=0}^{n-1} 19^{[i/2]}(\Upsilon(d_i)), \qquad [10.1]$$

where Υ maps a subcluster index into the number of y-normalized units between the supercluster's origin and the subcluster's origin. For even i, the Y function is called UPSILON19EVEN and is defined as:

$$Y(d_i)=\{0, \text{ if } d_i=0;\ 2, \text{ if } d_i=1;\ 5, \text{ if } d_i=2;\ 3, \text{ if } d_i=3;\\
-2, \text{ if } d_i=4;\ -5, \text{ if } d_i=5;\ -3, \text{ if } d_i=6;\ 4, \text{ if } d_i=7;\\
7, \text{ if } d_i=8;\ 10, \text{ if } d_i=9;\ 8, \text{ if } d_i=a;\ 6, \text{ if } d_i=b;\ 1,\\
\text{if } d_i=c;\ -4, \text{ if } d_i=d;\ -7, \text{ if } d_i=e;\ -10, \text{ if } d_i=f;\\
-8, \text{ if } d_i=g;\ -6, \text{ if } d_i=h;\ -1, \text{ if } d_i=i\},\quad [10.2]$$

and for odd i, the Y function is called UPSILON19ODD and is defined as:

$$Y(d_i)=\{0, \text{ if } d_i=0;\ 0, \text{ if } d_i=1;\ 1, \text{ if } d_i=2;\ 1, \text{ if } d_i=3;\ 0,\\
\text{if } d_i=4;\ -1, \text{ if } d_i=5;\ -1, \text{ if } d_i=6;\ 0, \text{ if } d_i=7;\ 1, \text{ if}\\
d_i=8;\ 2, \text{ if } d_i=9;\ 2, \text{ if } d_i=a;\ 2, \text{ if } d_i=b;\ 1, \text{ if}\\
d_i=c;\ 0, \text{ if } d_i=d;\ -1, \text{ if } d_{i=e};\ -2, \text{ if } d_i=f;\ -2, \text{ if}\\
d_i=g;\ -2, \text{ if } d_i=h;\ -1, \text{ if } d_i=i\}.\quad [10.3]$$

Thus, the mapping from cellid to cell center position is $$x = \frac{\sqrt{3}}{2} s \sum_{i=0}^{n-1} 19^{\lceil i/2 \rceil}(\Xi(d_i));\text{ and} \quad [11.1]$$

$$y = \frac{3}{2} s \sum_{i=0}^{n-1} 19^{\lceil i/2 \rceil}(\Upsilon(d_i)). \quad [11.2]$$

Position to Cellid

To calculate the cellid of the cell containing the (lat, lon) point p, the point is first converted to a normalized (x, y) position relative to the covering cov. A discriminating rectangle is a rectangle formed by joining one-quarter of a cell with the one-quarter of the cell directly above or below, whichever is closer.

Figure 25:
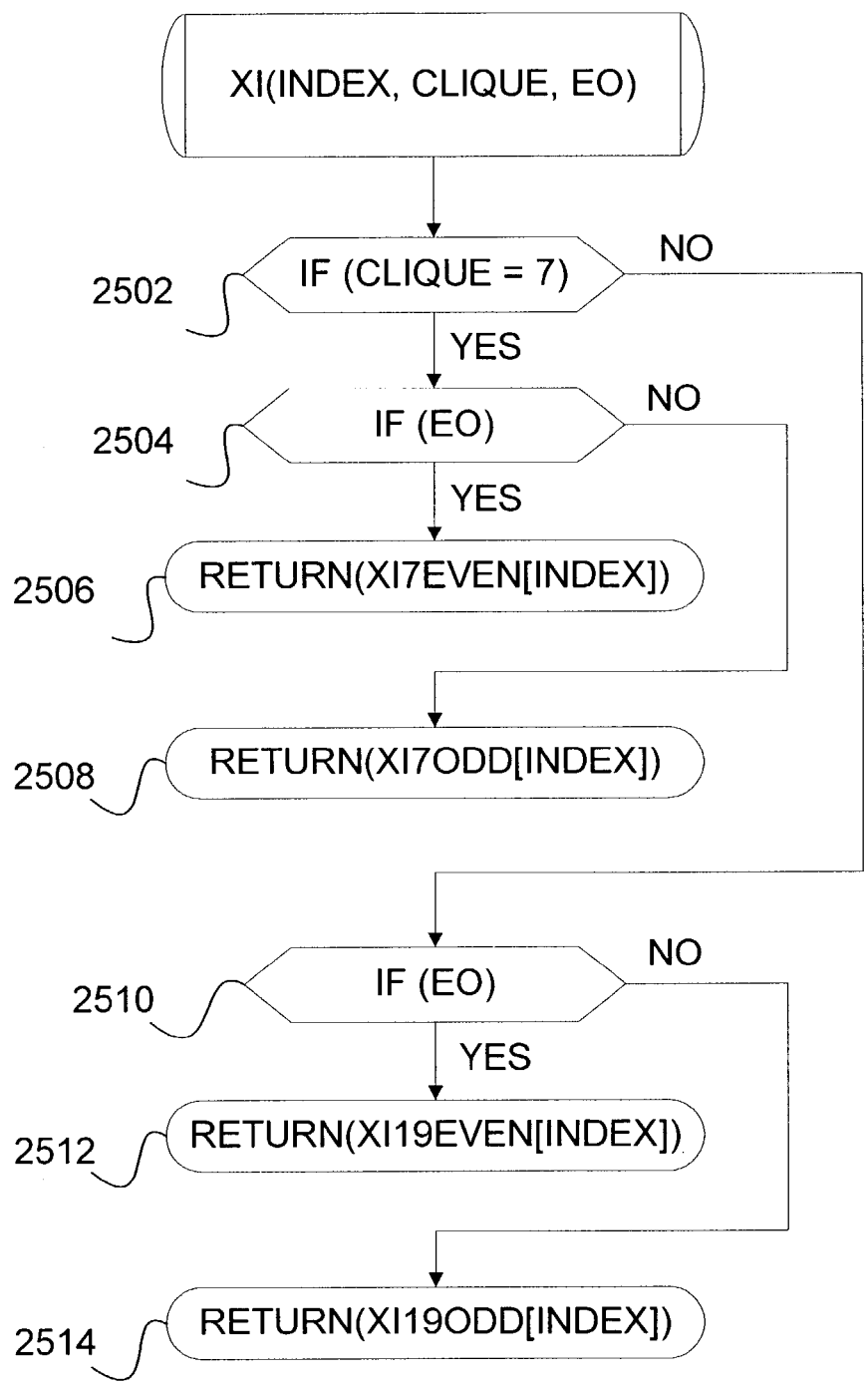
FIG. 25 illustrates the XI method according to embodiments of the present invention.

FIG. 25 illustrates the XI method embodiment of the present invention that returns the x-offset constant needed for computing the distance between a sub-cluster center and its cluster origin when calculating the total number of x-normalized units from which a cell is, in the horizontal direction, from the n-cluster's origin. There are four tables of x-offset constants. The correct table depends on the clique size and the oddness or evenness of the cluster size. The four offset tables are: XI7EVEN, XI7ODD, XI19EVEN, and XI19ODD; they are defined in Equations: 6.2, 6.3, 9.2, and 9.3, respectively.

Figure 26:
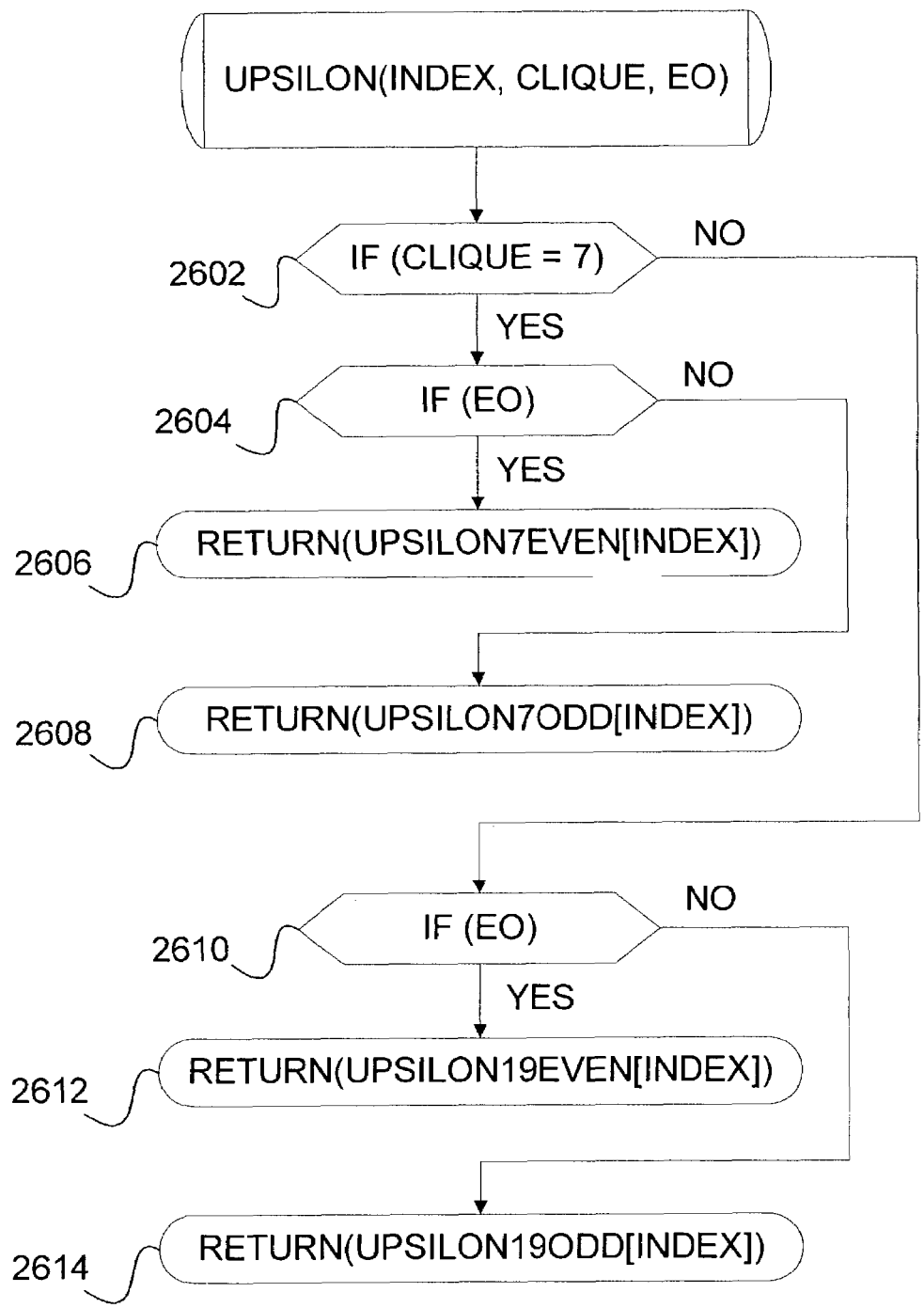
FIG. 26 illustrates the UPSILON method according to embodiments of the present invention.

FIG. 26 illustrates the UPSILON method embodiment of the present invention that returns the y-offset constant needed for computing the distance between a sub-cluster and its cluster origin when calculating the total number of y-normalized units a cell is (in the vertical direction) from the n-cluster's origin. There are four tables of y-offset constants. The correct table depends on the clique size and the oddness or evenness of the cluster. The four offset tables are: UPSILON7EVEN, UPSILON7ODD, UPSILON19EVEN, and UPSILON19ODD; they are defined in Equations: 7.2, 7.3, 10.2, and 10.3, respectively.

Figure 27A:
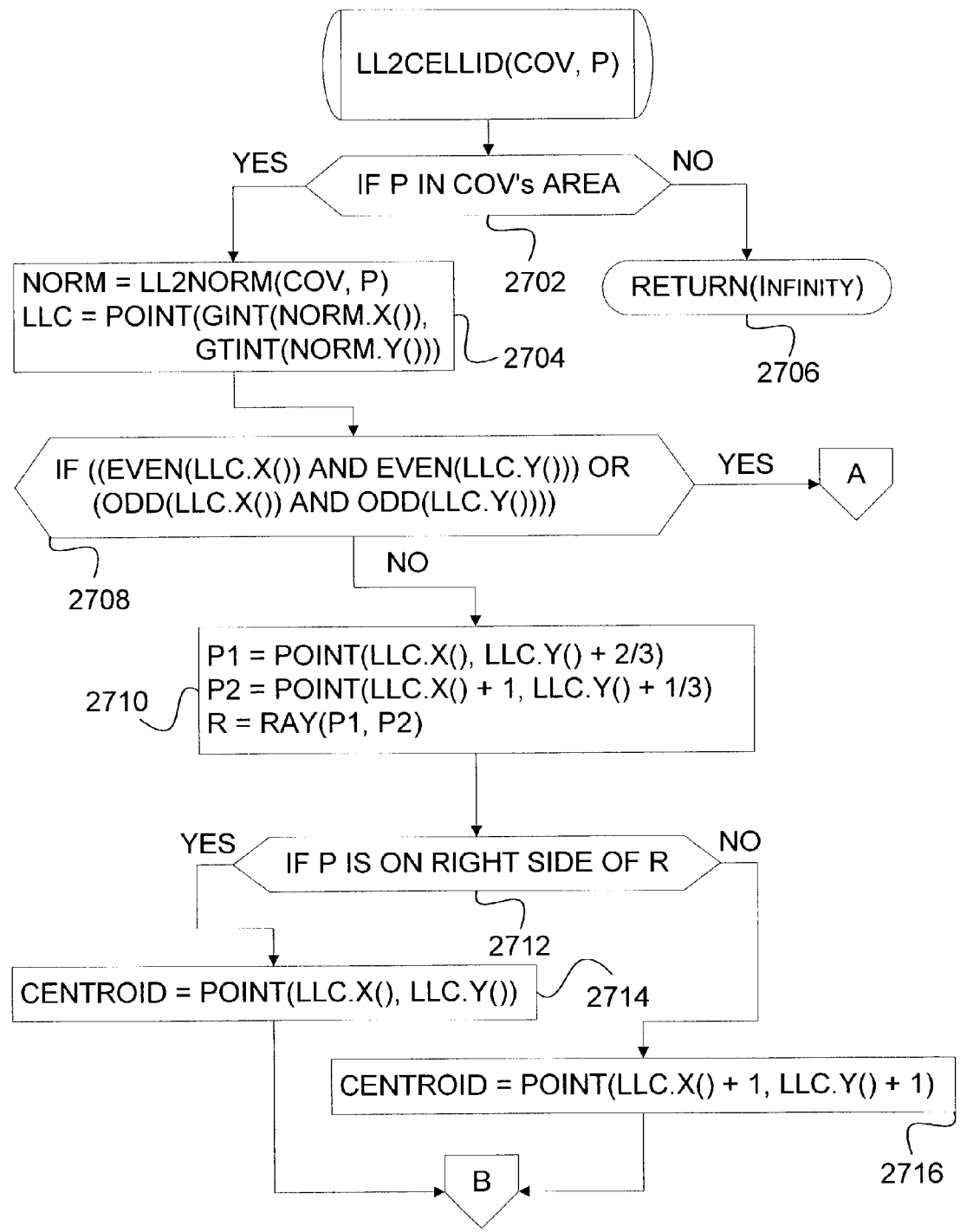
FIGS. 27A-27B illustrate the LL2CELLID method according to embodiments of the present invention.
Figure 27B:
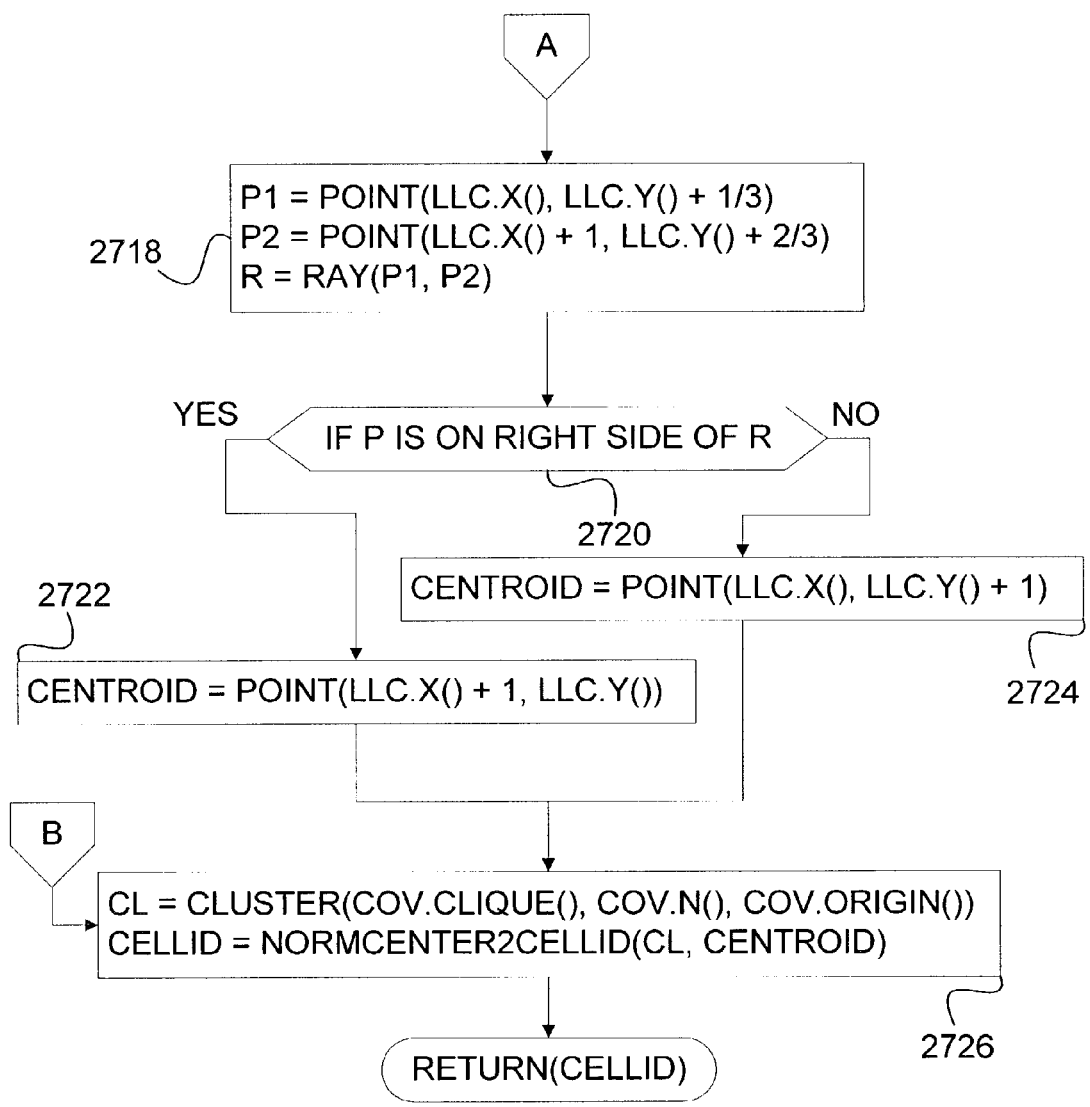

FIGS. 27A-27B illustrate the LL2CellID method that returns the cellid of the cell that contains the (lat, lon) point P. To determine the containing cell of P, the point must first be converted into the distance to the covering's origin, measured in meters. Because the horizontal distance between longitudinal lines decreases the farther one moves from the equator, it is convenient to introduce a new coordinate system called the "normalized system" in which units are measured in normalized-x and normalized-y lengths. A normalized-x unit is $$x \div \frac{\sqrt{3}}{2} s,$$

and a normalized-y unit is $$y \div \frac{3}{2} s,$$

where s is the cell side length. Once the point is converted to its corresponding (normalized-x, normalized-y) distances, the cell center closest to the point is ascertained. Finally, the cell center position is converted to the cell's cellid.

Figure 28A:
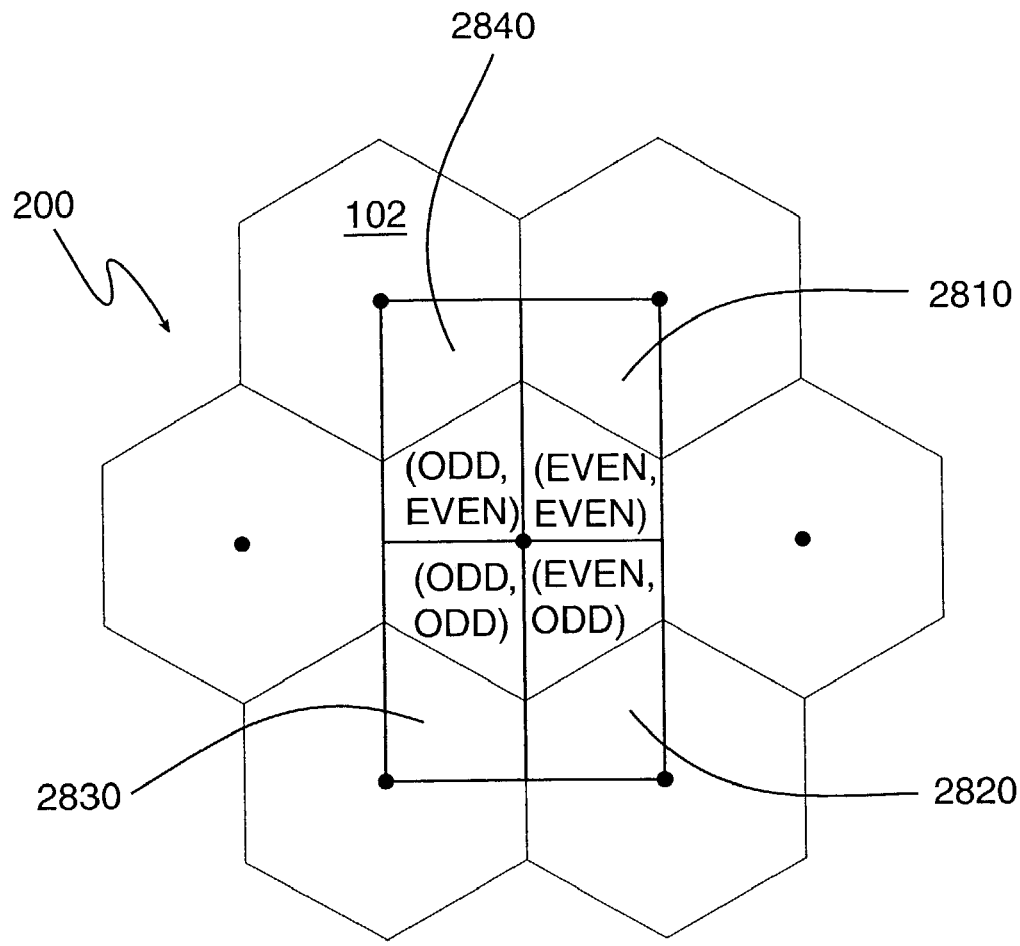
FIG. 28A illustrates the four discriminating rectangles that cover a cell used in determining a point's containing cell.

If P is not contained in the covering area (no at condition 2702) then INFINITY is returned. Otherwise, P is in COV's area (yes at condition 2702). NORM is set to P's corresponding (normalized-x, normalized-y) distances, and LLC is set to the integral point whose x value is the greatest integer≦normalize-x, and whose y value is the greatest integer≦normalize-y 2704. The point is located in a block of 4 discriminating rectangles. Once the discriminating rectangle that contains the point is determined, the point must be in one of the two cells that intersect the rectangle. It is a simple test to learn which cell contains the point. The step of testing 2708 through the step of assigning CENTROID 2724 perform these calculations. Lastly, the containing cell's normalized (x, y) center is converted to its cellid 2726 and is returned. As arguments to function LL2CellID, P is a (lat, lon) point and COV is a covering object. If P is within the covered area then LL2CELLID will return the cellid of the cell that contains P. If the point is outside the covered area, then ∞ (INFINITY) is returned. The point is converted 2704 to its normalized (x, y) position, relative to the covering. The lower-left corner of the discriminating rectangle that contains P is stored in the variable LLCORNER. FIG. 28A illustrates the manner in which four discriminating rectangles: (even, even) 2810, (even, odd) 2820, (odd, odd) 2830, and (odd, even) 2840 completely cover the center cell of the neighborhood in 200. The orientation of the discriminating rectangle's separating ray R is from point P1 to point P2, where P1 is on the left edge of the discriminating rectangle.

Figure 28B:
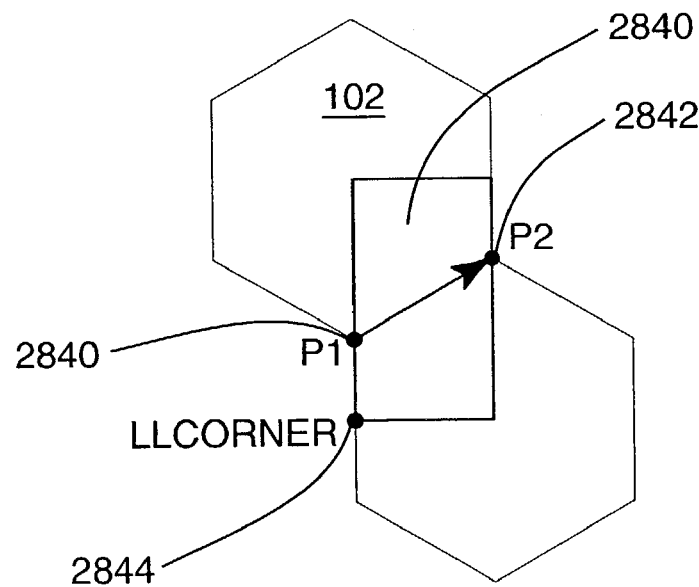
FIG. 28B illustrates the orientation of the separating ray p1p2 for discriminating rectangles (odd, even) and (even, odd)

FIG. 28B shows the orientation of R for the two discriminating rectangles identified as (odd, even) and (odd, odd) in FIG. 28A. The method calculates the normalized (x, y) center position of the point's containing cell and converts the containing cell's normalized center position to its cellid 2726.

Figure 29A:
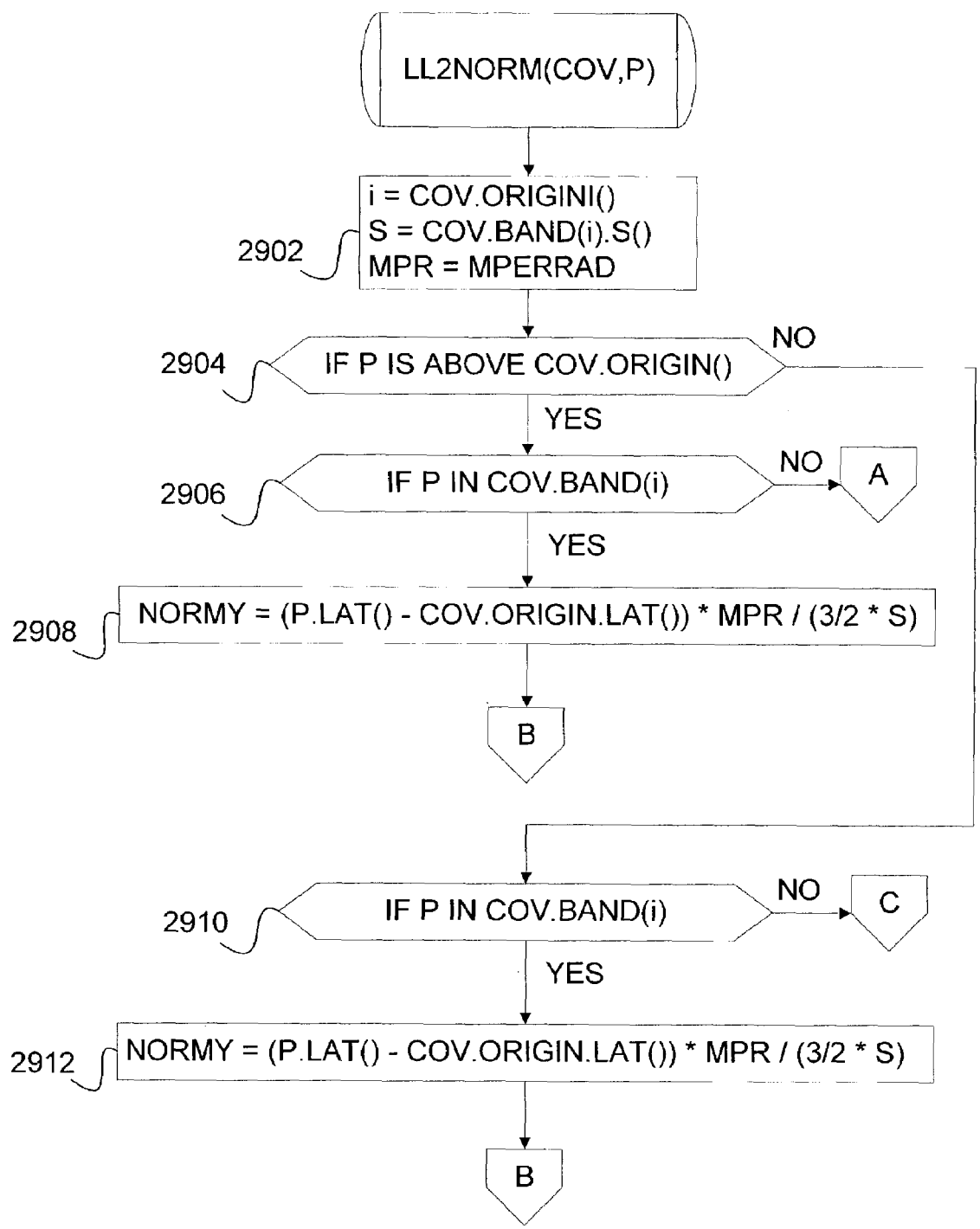
FIGS. 29A-29C illustrate the LL2NORM method according to embodiments of the present invention.
Figure 29B:
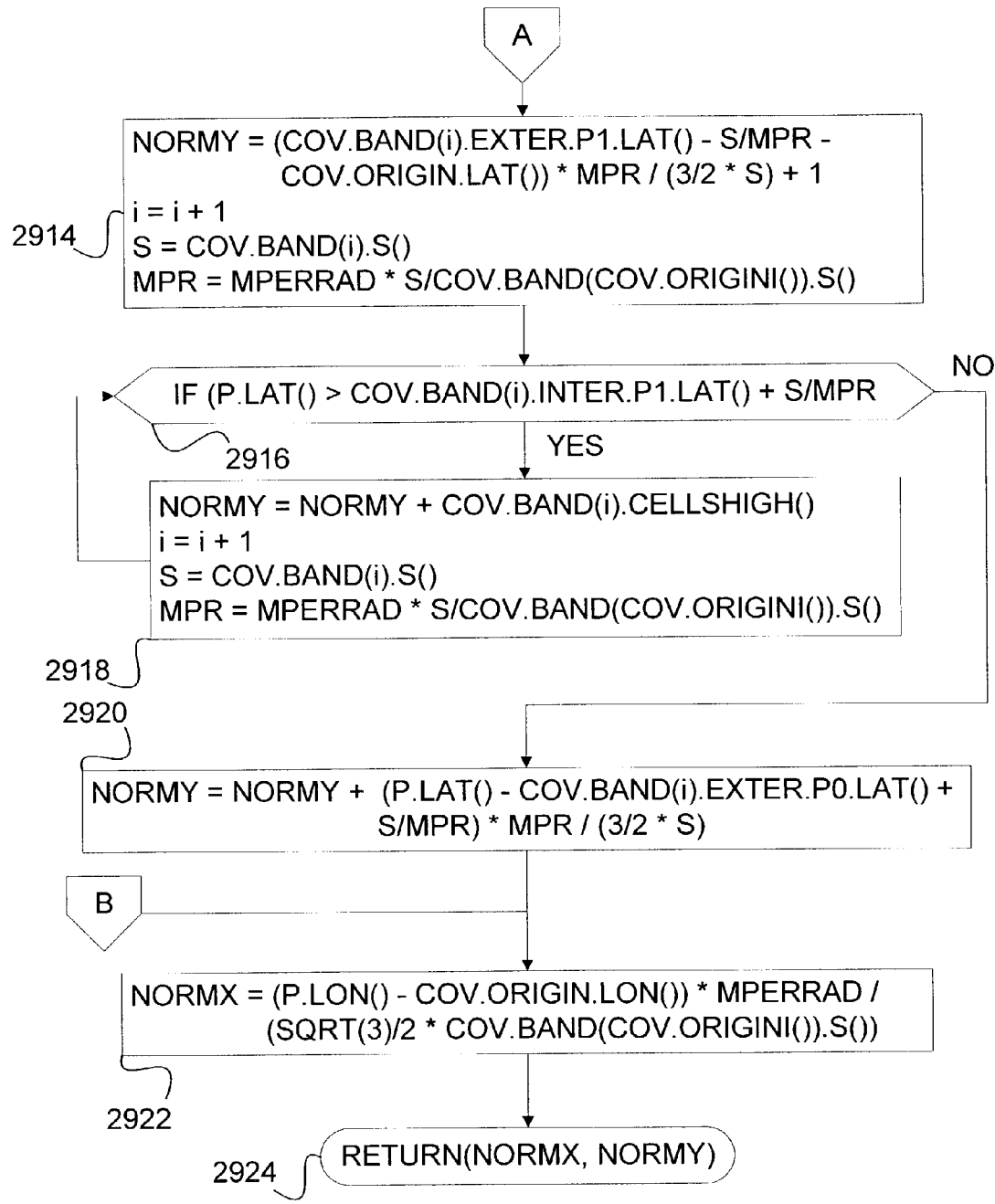
Figure 29C:
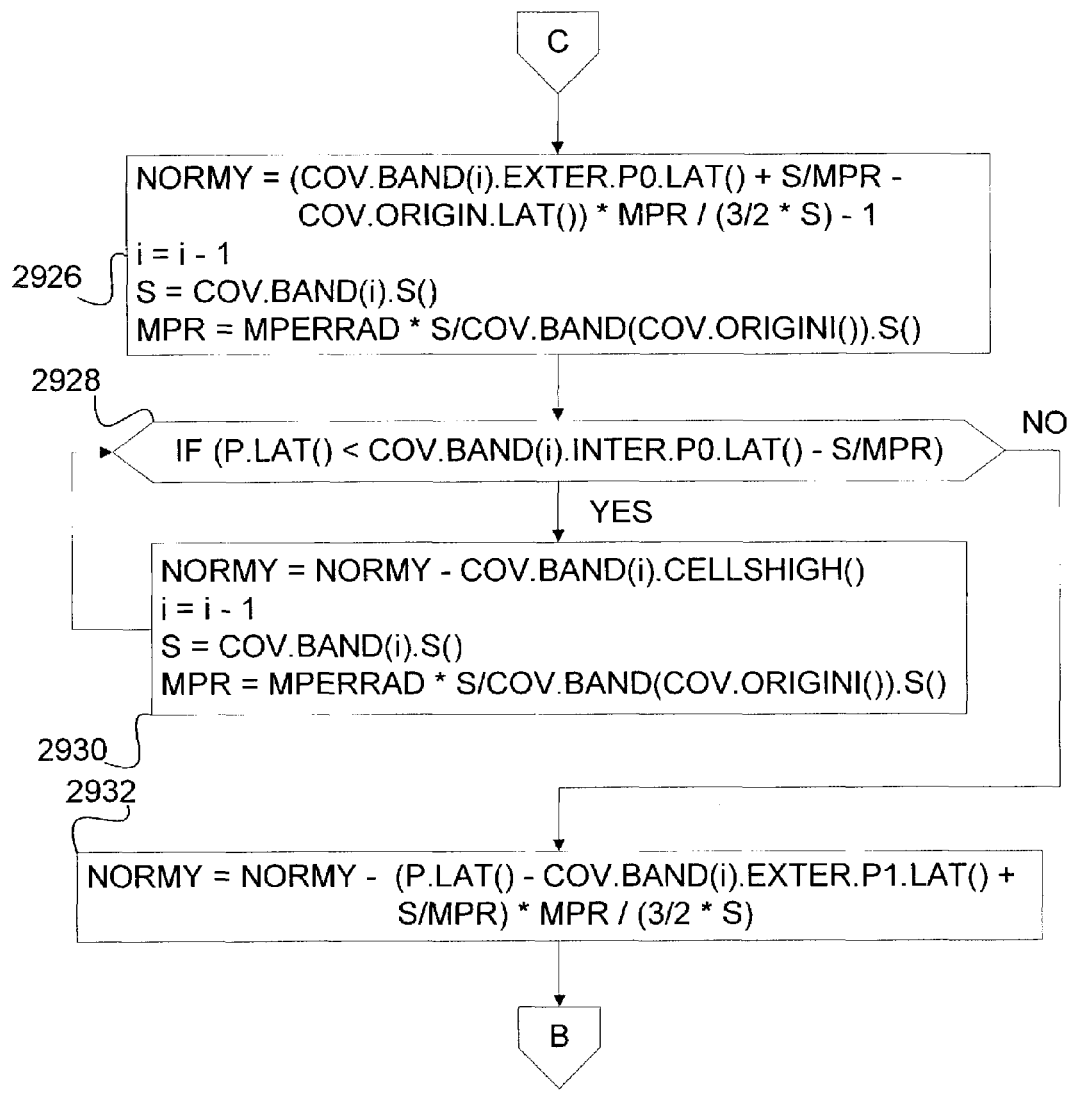

FIGS. 29A-29C illustrate the LL2Norm method that returns the (lat, lon) point P's corresponding (normalized-x, normalized-y) distances. To determine the point's corresponding normalized distances, the band that contains the point must be determined. The length of a cell side (s) changes from band to band. In determining the vertical distance that P is from the origin of COV, the normalized distances are calculated first. The variable i is the index of the band containing the covering's origin; S is set to the cell side length of the $i^{th}$ band, and MPR is the constant meters-per-radian 2902. If P is above the covering's origin, that is, a "yes" at the IF P IS ABOVE COV.ORIGIN( ) testing condition 2904, and P is within the $i^{th}$ band, that is, "yes" at the IF P IN COV.BAND(i) testing condition 2906, then NORMY is simply the lat distance between the point's lat and the covering origin's lat converted into normalized y units 2908. If P is above the center band, that is, a "no" at the IF P IN COV.BAND(i) condition 2906, then the vertical distance between P and the covering's origin must be computed band by band 2914-2920.

Otherwise, P is below the covering's origin, a "no" at the IF P IS ABOVE COV.ORIGIN( ) testing condition 2904. If P is within the $i^{th}$ band, a "yes" at the IF P IN COV.BAND(i) testing condition 2910, then NORMY is the vertical distance between P and the covering origin converted into normalized y units 2912. If P is below the center band, that is a "no" at condition 2910, then the vertical distance between P and the covering's origin must be computed band by band 2926-2932. Lastly, NORMX is calculated using the cell side length of the band containing P 2922 and then the distances (NORMX, NORMY) are returned.

The function LL2NORM expects two arguments, COV and P, where COV is the covering object containing the (lat, lon) point P. The index of the band object containing the covering's origin is stored in the variable i. The conditional 2904 separates points that are above and below the origin. If P is contained in the origin's band then the y-norm units are calculated by normalizing the vertical distance between the origin and P. Otherwise, P is in a band above the origin's band. The number of normalized y-units between the origin and the line that passes through the cell centers in the first row of the band above the origin's band are calculated. So referring back to FIG. 4C for example, the first cell row of B2 passes through the centers of cells: 425 and 426, and continuing through 131 and 125. The vertical distance between the origin and line is 2 norm-y units. The while loop iterates over all bands whose interior rectangle's topside is below the point P. For the band containing the point, the number of normalized-y units that is equivalent to the distance from the center of the first row to the point is added. The method also handles the case where p is below the origin. The normalized-x units are calculated as if the point were located in the origin's band. Finally, the point containing the normalized x and y units is returned 2924.

The function NORMCENTER2CELLID expects two arguments: CL the cluster object believed to contain the point P. If P is contained in one of the cluster's cells then the cellid of the point's containing cell is returned. Otherwise, P is not in any of the cluster's cells and ∞ is returned. The containing cell's cellid is the sum of the containing subcluster's indices times the clique size raised to the subcluster's depth.

Figure 30:
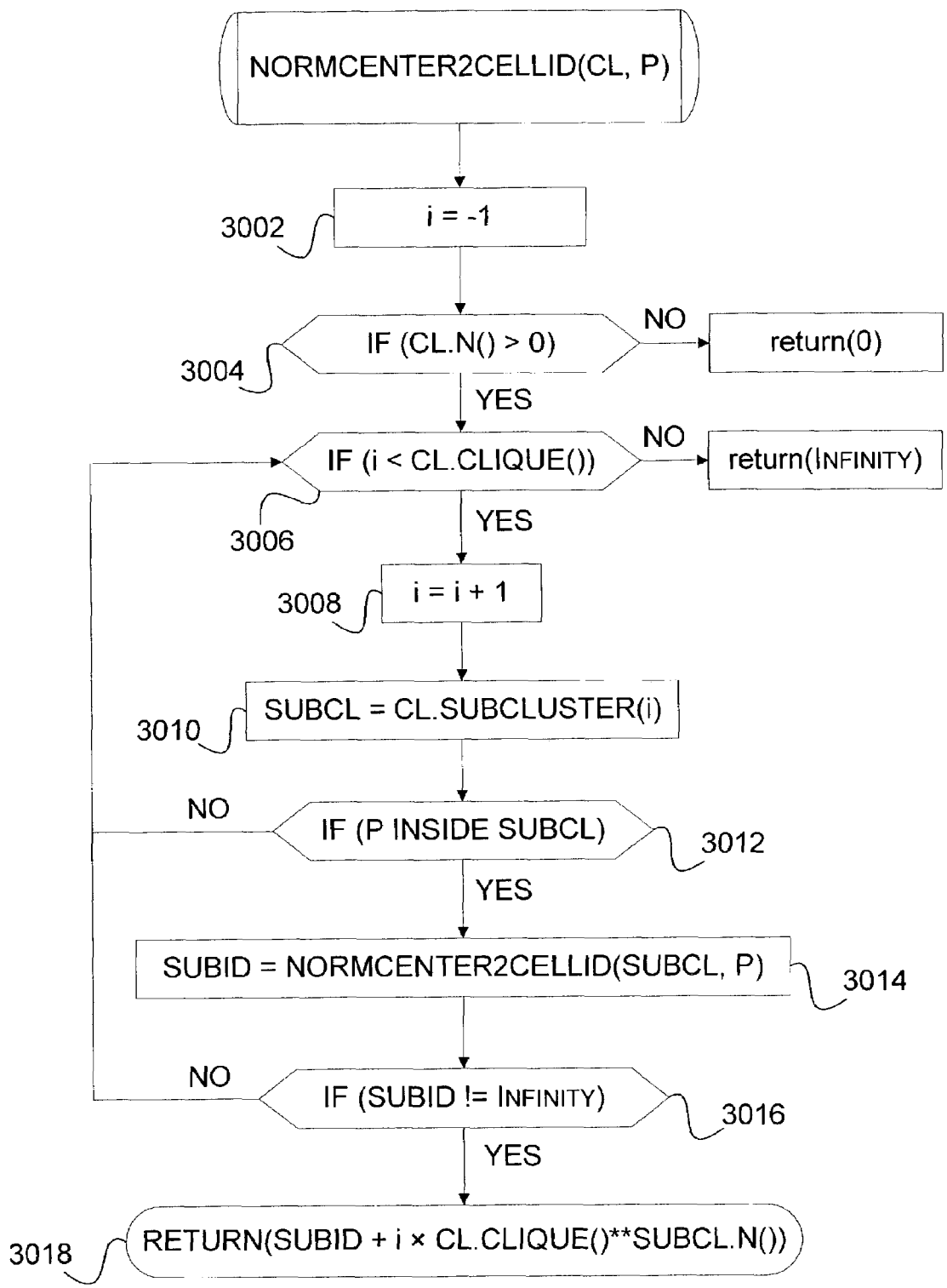
FIG. 30 illustrates the NORMCENTER2CELLID method according to embodiments of the present invention.

FIG. 30 illustrates the NormCenter2CellID method embodiment of the present invention that returns the corresponding cellid of the cell whose center is the specified normalized distance from the cluster's origin. Converting a normalized cell center position to its cellid is a recursive process. Starting with the largest cluster (the n-cluster), find the point's containing sub-cluster's index (the (n-1)-cluster index with respect to its containing n-cluster). The subcluster's identifier is the point's containing sub-cluster's index times the clique size raised to the $n^{th}$ power. The cellid is the sum of all the sub-cluster identifiers.

The sub-cluster index (i) is initialized to −1 3002. If the cluster is a 0-cluster then return 0 (no at condition 3004). Otherwise, if the sub-cluster index variable is greater than the largest allowable value (no at condition 3006) then return INFINITY. Otherwise, i is a valid sub-cluster index (yes at condition 3006) and i is incremented 3008. SUBCL is set to the $i^{th}$ sub-cluster 3010. If P is not inside the SUBCL (no at condition 3012) then check the next sub-cluster. Otherwise, P is inside SUBCL (yes at condition 3012). Set SUBID to the cellid of the cell containing P with respect to the sub-cluster SUBCL 3014. If SUBID is INFINITY (no at condition 3016), then P was not really inside SUBCL; check the next sub-cluster. Otherwise, P is contained in SUBCL (yes at condition 3016); return P's containing cell's cellid with respect to CL 3018.

Figure 31A:
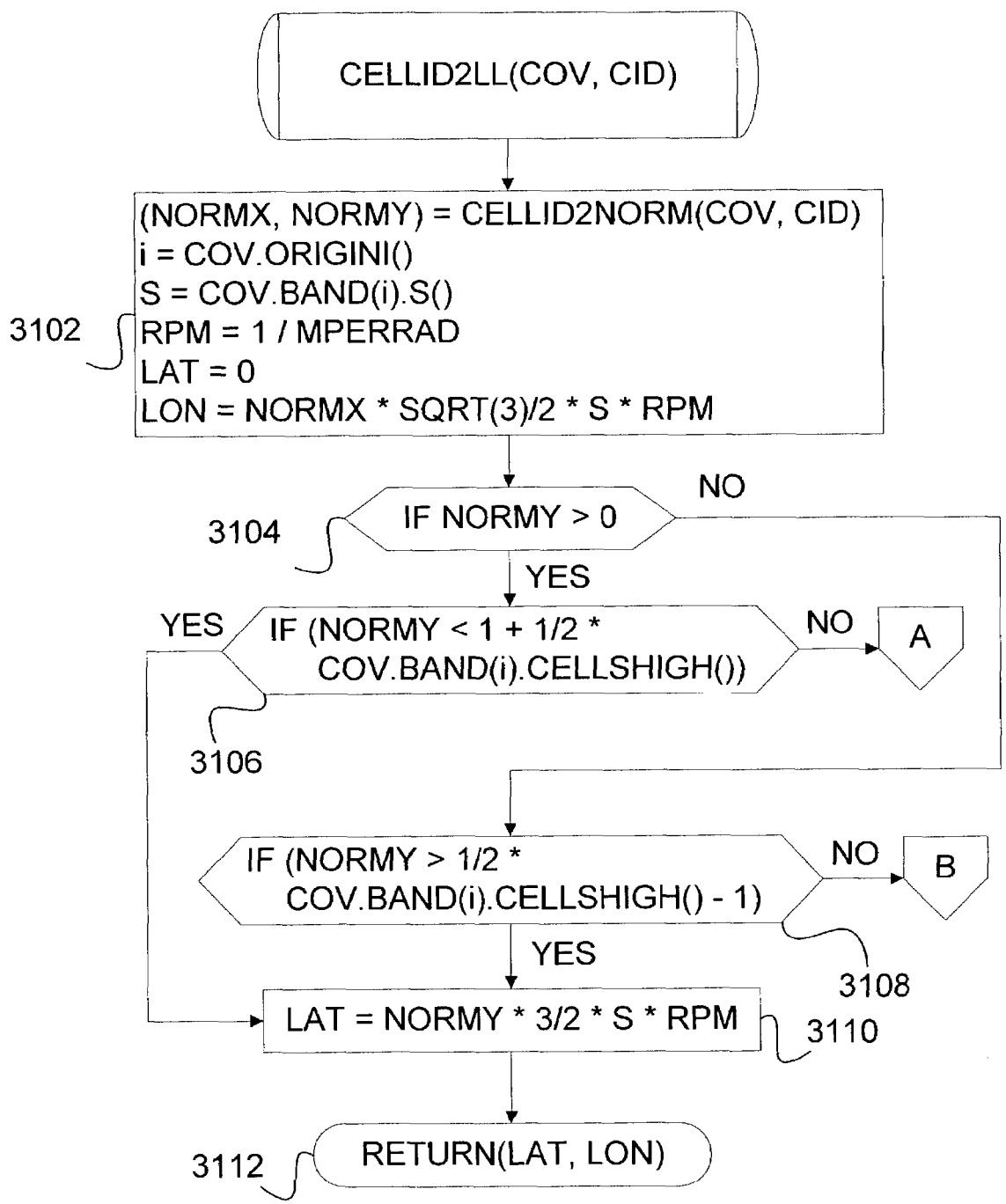
FIGS. 31A-31C are flowcharts of the CELLID2LL method according to embodiments of the present invention.
Figure 31B:
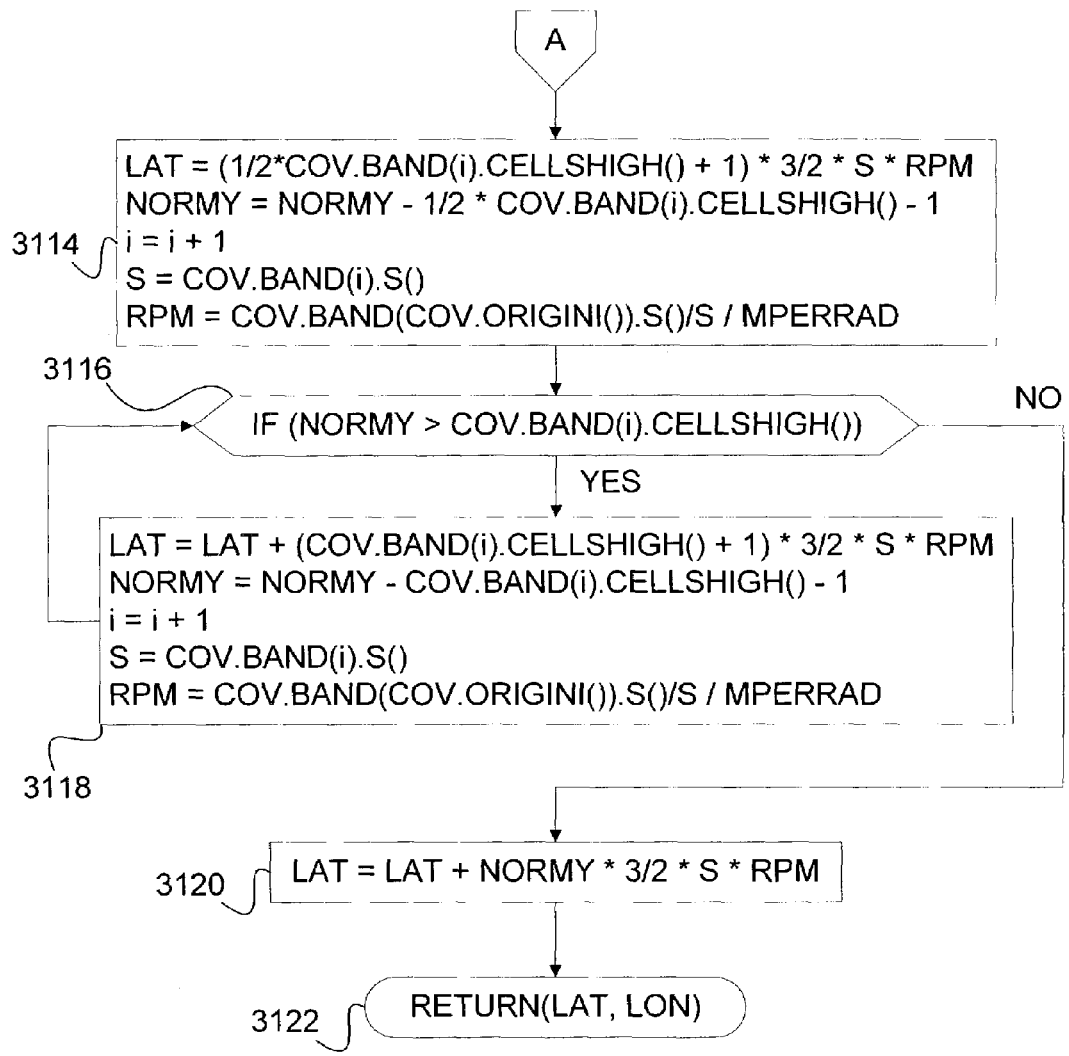
Figure 31C:
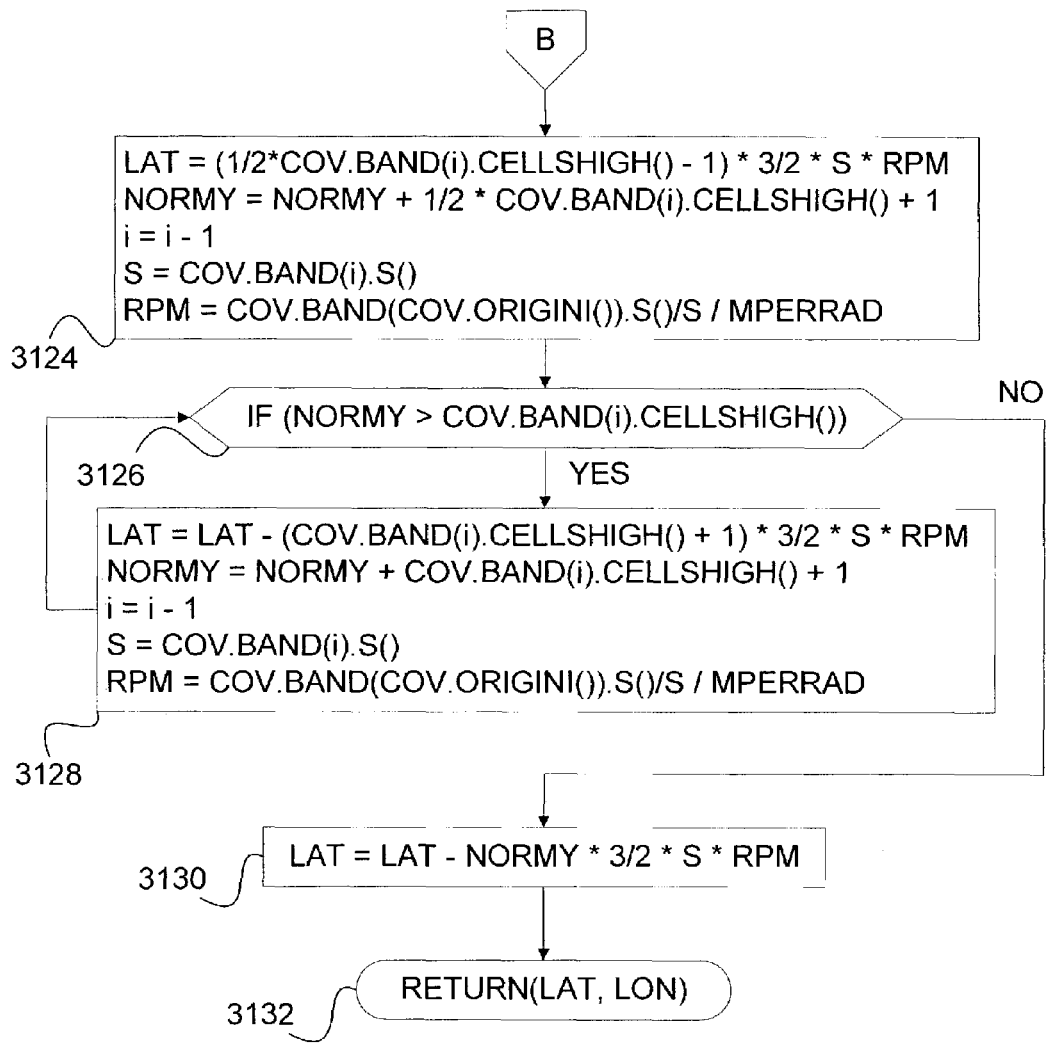

FIGS. 31A-31C illustrate the CELLID2LL method of the present invention that returns the cell's (lat, lon) center position of the specified cellid within the designated covering. A cellid's cell center position (lat, lon) point is calculated and returned. CELLID2LL is the inverse of the method LL2CELLID. To determine a cellid's center (lat, lon) position, the distance (measured in normalized-x and normalized-y units) between the cellid's cell center and the covering's origin is calculated. Refer back to the explanation of method LL2CELLID for details on normalized units.

The variables NORMX and NORMY are set to the cell center's position measured in normalized-x and normalized-y units from COV's origin. The variable i is the middle band index; it contains the COV's origin. S is the cell side length (measured in meters) in band i. RPM is the constant radians-per-meter. LAT is initialized to 0, and LON is calculated 3102. If the cell is above the origin (yes at condition 3104) then if CELLID is a member of the $i^{th}$ band (yes at condition 3106) then LAT can be computed in one step, 3110, and the cellid's cell's center (lat, lon) position is returned. Otherwise, CELLID is not a member of the $i^{th}$ band (no at condition 3106). LAT is calculated by adding the lat height of each band (½ the height of the middle band, plus the height of the band containing CID from its bottom to the center of CID, plus the height of all bands between) and adding their sum to the COV origin's lat position 3114-3122.

Otherwise, the cell is not above the origin (no at condition 3104). If CELLID is a member of the $i^{th}$ band (yes at condition 3108) then LAT can be computed in one step, 3110, and the cellid's cell's center (lat, ion) position is returned. Otherwise, CELLID is not a member of the $i^{th}$ band, that is a "no" at the NORMY test condition 3108. LAT must be calculated by converting the height of each band between the middle band and the one containing CID to its lat distance, then add the sum of the lat distances to the origin's lat position 3124-3132.

Figure 32:
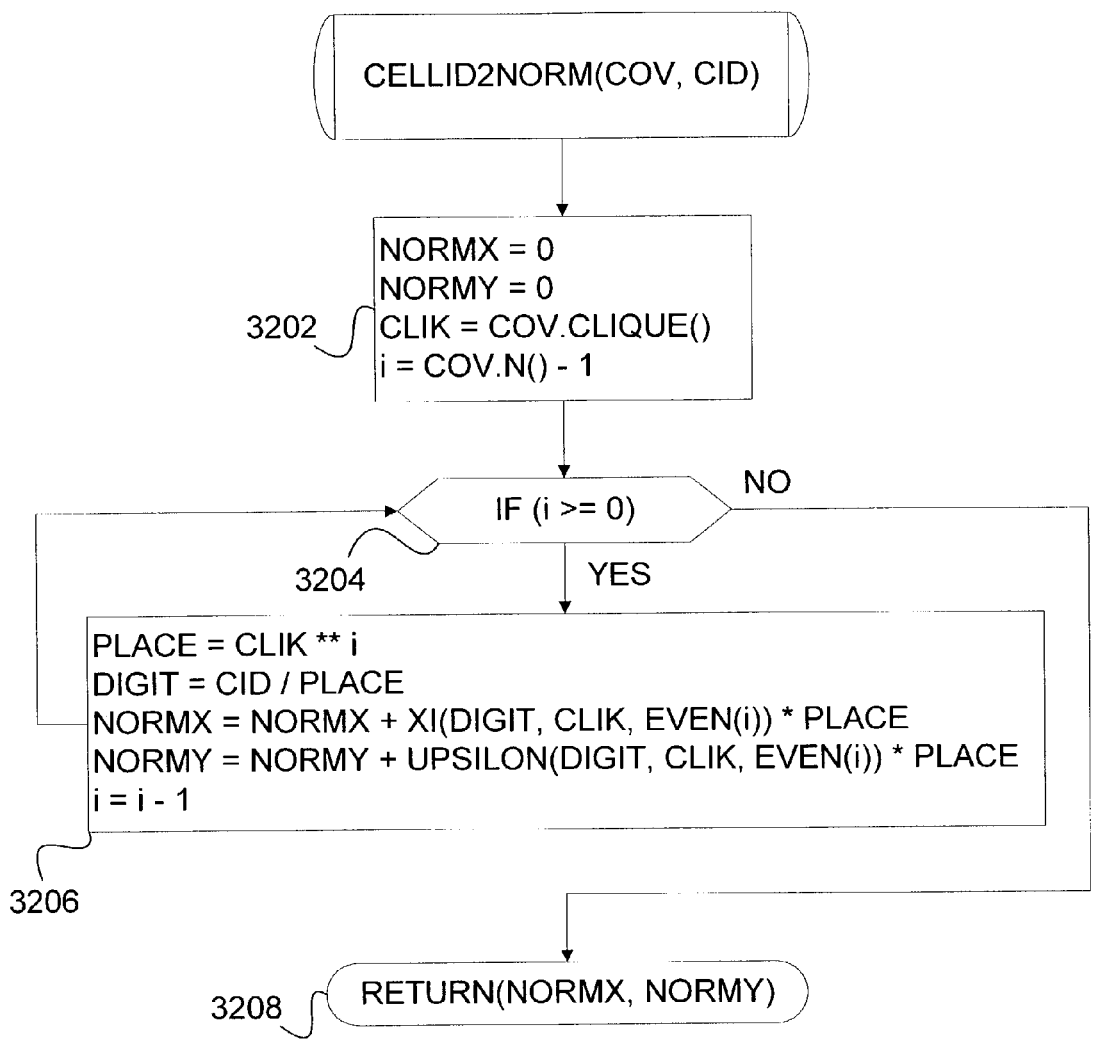
FIG. 32 is a flowchart of the CELLID2NORM method according to embodiments of the present invention.

FIG. 32 illustrates the CELLID2NORM method embodiment of the present invention that returns the cell center's normalized distance from the covering's origin. A cellid is converted to its normalized distance from the covering's origin by iteratively calculating the sub-cluster's normalized distance from its containing cluster's origin, beginning with the cell's normalized distance from its containing clique's origin. This process continues until the normalized distance between the cell's containing (n−1)-cluster's origin and the origin of its n-cluster has been calculated 3206 and returned 3208.

New DNS Resource Records

Additional DNS RR are needed to integrate MAMN with other TCP/IP networks. New DNS query types must be introduced to retrieve the values of the new resource records. The previously discussed CELLID RR contains the cellid of a cell that the node recently visited. When the node is mobile, the MOBILE RR is set to true; otherwise it is false. The MOBILE RR is used to determine if the node is connected to a wired network using its IP address or if it is mobile in a MAMN network.

MAMN supports secure communications by employing a hybrid public/private cryptosystem. Briefly, private key cryptography uses one key to both encrypt and decrypt data. The key must be kept secret for the communication to be secure. Public key cryptography is based on a pair of keys, a private key and a public key. The public key is used to encrypt data that the private can decrypt (also, data encrypted with the private key are decrypted using the public key). Neither the secrecy of the data nor the private key are compromised by making public the public key. The private key is kept in secrecy. Each node has its own public-private key pair and shares its public key freely with others. One drawback to public key cryptography is that it is slower than private key cryptography. The hybrid public/private cryptosystem uses public key cryptography to establish a session and exchange a random session key, which is then used as the key of a private key method.

A new RR, PUBKEY, contains the node's public key. A source node can send a secure data packet to a destination node by encoding the data packet with the destination's public key. The destination then decrypts the data packet by applying its private key. To secure DNS queries, a mobile node issues the query only to a DNS server for which it knows the public key; the DNS server that has authority for the node's reverse zone acts as the node's default DNS server.

In its preferred embodiment, one employs MAMN by overlapping coverings each using a different set of channels. A node may be able to communicate in more than one covering, concurrently. Thus for each covering in which a node is able to participate, a 2-tuple record is required. The 2-tuple contains the following fields:

COMMCLASS holds the highest communication class that the node supports. The value is one of: C1, C2, C3, C4, or C5; and COVERID holds the covering's unique identifier.

For a non-gateway node, the DNS server that has authority for the node's reverse zone also has authority for the new DNS resource records. Suppose the node's IP address is 192.168.1.249, and that the address is a valid, public, routable IP address. The authoritative DNS server for the domain 1.168.192.in-addr.arpa also has authority for the node's CELLID, MOBILE, PUBKEY, and 2-tuple list of (COMMCLASS, COVERID) resource records.

Gateway nodes are registered to the cellids and coverings in which they are located. A farm of DNS servers can be setup to answer cellid-to-IP-addresses queries. For each wired network to which the gateway node is attached, a 2-tuple record is needed for the gateway node to be used as an exit-gateway. The 2-tuple contains the following fields: (a) COMMCLASS has the same meaning as previously defined; and (b) NETADDR is the address of the network to which the gateway is connected.

A cellid-to-IP-addresses query specifies three parameters: (a) the id of the covering; (b) the cellid; and (c) the minimum acceptable communication class. A list of IP addresses of gateway nodes that meet the minimum requirements is returned. The list could be empty and, if so, neighboring cells are queried. The example C2.3.5.7.32.dynamo-net.net represents the cellid-to-IP-addresses query requesting all gateway nodes participating in the covering whose id is 32, located in the cell whose id is 753, and able to communicate in at least class C2. In general, the query format is: COMMCLASS.$d_0.d_1 \ldots d_m$.COVERID.dynamo-net.net, where COMMCLASS is the minimum acceptable communication class that the gateway node must support, $d_m \ldots d_1d_0$ is the cellid, and COVERID is the covering's identifier.

The specialized farm of DNS servers also support additional queries, such as: (a) position-to-coverings which, given a position, returns a set of coverids of coverings that contain the position; and (b) covering-properties which given a coverid returns all the important properties (eg., the width of the cover, the number of bands, the height of each band, the origin's position, the cell side length, the minimum cluster size that contains the cover, the Class 0 channels, the Class channels, and the like).

While certain exemplary embodiments have been described and shown in the accompanying drawings, it is to be understood that such embodiments are merely illustrative of and not restrictive on the broad invention. The scope of each claim term is not limited to the specific constructions and arrangements shown and described, since various other modifications may occur to those ordinarily skilled in the art.

Therefore, the invention has been disclosed by way of example and not limitation, and reference should be made to the following claims to determine the scope of the present invention.

I claim:

1. A method for establishing a route in a communications network comprising the steps of:
   (1) providing a network comprised of a plurality of communications nodes, each communications node within a containing cell, wherein at least one communications node is a source node; each source node possessing a route evaluation function and a destination region specified by a center cell and a radius;
   (2) each communications node that is a source node performing the steps of:
      (A) initiating region casting, if the containing cell of the source node is the same as the center cell of the destination region; said region casting being of increasing radius outward from the center cell;
      (B) determining route constraint parameters and route configuration attributes based on the route evaluation function;
      (C) initiating node-hopping to the center cell of the destination region, if route configuration stipulates a completely wireless route between the source node and the center cell of the destination region; said node-hopping conducted within route constraints from and to wireless communications nodes;
      (D) selecting a compatible way point communications node if the determined route configuration dictates that the route should pass through a way point communications node;
      (E) initiating diffusion searching for the compatible way point communications node and its tentative containing cell, if the determined route configuration dictates that the route should pass through the way point communications node and if the containing cell of the way point communications node is unavailable; and
      (F) initiating the node-hopping to the tentative containing cell of the way point communications node, if the route configuration dictates that the route should pass through said way point communications node and if the tentative containing cell of the way point communications node is available; said node-hopping conducted within the route constraints;
   (3) each communications node performing the steps of:
      (A) determining a unique surface position;
      (B) determining a containing cell from the determined surface position;

(C) listening for and replying to packets requiring a response;
(D) continuing the region casting when compatibility requested until region boundary is reached;
(E) continuing the node-hopping when the compatibility requested until the node contained in the center cell of the destination region is reached;
(F) continuing node-hopping when compatibility requested until node contained in the way point's tentative containing cell is reached;
(G) initiating the region casting when a node is nominated as the region cast initiator;
(H) continuing the diffusion searching when the compatibility requested until the compatible way point communications node is found or until the diffusion search boundary is reached; and
(I) initiating diffusion searching when a node is nominated as a diffusion search initiator;
(4) each way point communications node, that is not an entrance gateway, becomes the source node and the method continues at (2); and
(5) each way point communications node that is the entrance gateway node, performing the steps of:
(A) determining an exit gateway node proximate to the center cell of the destination region; and
(B) transmitting a packet to the exit gateway node.

2. The method for establishing a route in a communications network as claimed in claim 1 wherein the source node is a wired node and at least one way point communications node is the exit gateway node; the method further comprising the steps of:
querying, by the source node, of a modified Domain Name System for the exit gateway node close to the center cell of the destination region;
receiving a cellid-to-IP-address query by the modified Domain Name System;
returning a set of Internet Protocol addresses of potential exit gateway nodes close to the center cell of the destination region based on a cell identifier of the center cell of the destination region, by the modified Domain Name System, to the source node; and
transmitting one of more packets to the exit gateway node, by the source node; thereafter the transmission causing the exit gateway node to act as a wireless source node.

3. The method as claimed in claim 1 wherein each communications node, its respective containing cell and Internet Protocol (IP) address are relatable by a modified Domain Name System.

4. The method as claimed in claim 1 wherein each communications node, its respective containing cell and Internet Protocol address are relatable by a modified Domain Name System wherein the steps of determining a containing cell and determining an exit gateway node execute the modified Domain Name System comprising the steps of:
returning cell resource records to a first requesting node according to an Internet Protocol address received from the first requesting node; and
returning to a second requesting node a respective Internet Protocol address for each node having characteristics satisfying a received set of criteria from the second requesting node.

5. A method for establishing a route in a communications network comprising the steps of:
(1) providing a network comprised of a plurality of communications nodes; each communications node having a respective containing cell; wherein at least one communications node is a source node; each source node possessing a route evaluation function and a specified destination node;
(2) each communications node that is the source node performing the steps of:
(A) determining a tentative cell of the specified destination node;
(B) initiating diffusion searching, if the containing cell of the source node is the same as the tentative containing cell of the destination node; said diffusion searching being of increasing radius from the tentative cell of the destination node;
(C) determining route constraint parameters and route configuration attributes based on the route evaluation function;
(D) initiating node-hopping to the tentative cell of the destination node, if route configuration stipulates a completely wireless route between the source node and the destination node; said node-hopping conducted within route constraints from and to wireless communications nodes;
(E) selecting a compatible way point communications node, if the route configuration dictates the route should pass through a way point communications node and if a way point node is located in the tentative containing;
(F) initiating the diffusion searching for at least one compatible way point communications node, if the route configuration dictates the route should pass through the way point communications node and if the way point node is located in the tentative containing cell of the way point communications node; and
(G) initiating the node-hopping to the tentative containing cell of the way point communications node, if the route configuration dictates the route should pass through the way point communications node and if the tentative containing cell of the way point communications node is available; said node-hopping conducted within the route constraints;
(3) each communications node performing the steps of:
(A) determining a unique surface position;
(B) determining a containing cell from the determined surface position;
(C) listening for and replying to packets requiring a response;
(D) continuing the diffusion searching when compatibility requested until the way point communications node is located or until the destination node is located or until diffusion search boundary is reached;
(E) continuing the node-hopping when the compatibility requested until a node contained in the tentative cell of the destination node is reached or until a node contained in the tentative cell of the way point communications node is reached; and
(F) initiating the diffusion searching if a communications node is nominated as a diffusion search initiator;
(4) each way point communications node, that is not an entrance gateway, becomes the source node and the method continues at (2); and
(5) each way point communications node that is the entrance gateway node, performing the steps of:
(A) determining an exit gateway node proximate to the tentative cell of the destination node; and
(B) transmitting a packet to the exit gateway node.

6. The method as claimed in claim 5 wherein each communications node, its respective containing cell and its Internet Protocol address are relatable by a modified Domain Name System.

7. The method as claimed in claim 5 wherein each communications node, its respective containing cell and its Internet Protocol address are relatable by a modified Domain Name System wherein the steps of determining a tentative cell, determining a containing cell and determining an exit gateway node execute the modified Domain Name System comprising the steps of:
returning cell resource records to a first requesting node according to an Internet Protocol address received from the first requesting node; and
returning to a second requesting node a respective Internet Protocol address for each node having characteristics satisfying a received set of criteria from the second requesting node.

8. A method for establishing a route in a communications network comprising the steps of:
providing a network comprised of a plurality of communications nodes located in a defined array of stationary cells, wherein at least one communications node is a mobile destination node and at least one communications node is a diffusion search initiator node in possession of communicable routing constraints;
initiating diffusion searching by the diffusion search initiator node, thereby contacting communication nodes in adjacent stationary cells; said diffusion searching being of increasing radius across neighboring stationary cells by propagating means of the contacted communications nodes by contacting communications nodes in adjacent outward cells of the defined stationary array and transferring the communicable routing constraints, unless said mobile destination node confirms immediate contact by the initiator node; said diffusion searching having an origin at the initiator node; whereby a route is established from initiator node to said mobile destination node;
propagating the diffusion searching by the contacted communication nodes; the searching progressing into the adjacent cells of the defined stationary array until the first of: contacting the mobile destination node, or reaching a diffusion search boundary; and, if the mobile destination node is contacted, and
creating, by the mobile destination node, a routing back to the initiator node through nodes that satisfy the route constraints.

9. A method for establishing a route in a communications network comprising the steps of:
providing a network comprised of a plurality of communications nodes located in cells, wherein at least one communications node is a mobile destination node and at least one communications node is a diffusion search initiator node in possession of communicable routing constraints;
initiating diffusion searching by the diffusion search initiator node, thereby contacting communication nodes in adjacent cells; said diffusion searching being of increasing radius across neighboring cells by propagating means of the contacted communications nodes by contacting communications nodes in adjacent outward cells and transferring the communicable routing constraints, unless said mobile destination node confirms immediate contact by the initiator node; said diffusion searching having an origin at the initiator node; whereby a route is established between initiator node and said mobile destination node;
propagating the diffusion searching by the contacted communication nodes; the searching progressing into the adjacent cells until the first of: contacting the mobile destination node, or reaching a diffusion search boundary; and, if the mobile destination node is contacted, and
creating by the mobile destination node, a routing back to the initiator node through nodes that satisfy the route constraints; and
wherein the network is further comprised of: at least one communications node that is acting as the diffusion search initiator node, at least one communications node that is a mobile destination node and at least one communications node that is a way point node acting as an exit gateway node, and at least one communications node that is a way point node acting as an entrance gateway node; the method further comprising the steps following the step of propagating diffusion searching of:
if a contacted node is an entrance gateway node, then
querying, by the entrance gateway node, of modified Domain Name System for a tentative containing cell of the mobile destination node based upon the Internet Protocol address of the mobile destination node;
receiving an IP-address-to-cellid query by the modified Domain Name System;
returning the tentative containing cell of the mobile destination node based on the Internet Protocol address of the mobile destination node, by the modified Domain Name System, to the entrance gateway node;
querying, by the entrance gateway node, of the modified Domain Name System for an exit gateway node Internet Protocol address close in distance to the tentative containing cell of the mobile destination node;
receiving the query by the modified Domain Name System;
returning the Internet Protocol address of one or more potential exit gateway nodes near the tentative containing cell of the mobile destination node, by the modified Domain Name System, to the entrance gateway node;
selecting, by the entrance gateway node, the exit gateway node from the set of potential exit gateway nodes; and
transmitting one or more packets to the exit gateway node, by the entrance gateway node; thereafter the transmission causing the exit gateway node to act as a wireless source node establishing a completely wireless route to the mobile destination node.

10. A method for establishing a route in a communications network comprising the steps of:
providing a network comprised of a plurality of communications nodes located in cells, wherein at least one communications node is a mobile destination node and at least one communications node is a diffusion search initiator node in possession of communicable routing constraints;
initiating diffusion searching by the diffusion search initiator node, thereby contacting communication nodes in adjacent cells; said diffusion searching being of increasing radius across neighboring cells by propagating means of the contacted communications nodes by contacting communications nodes in adjacent outward cells and transferring the communicable routing constraints, unless said mobile destination node confirms immediate contact by the initiator node; said diffusion searching having an origin at the initiator node; whereby a route is established between initiator node and said mobile destination node;

propagating the diffusion searching by the contacted communication nodes; the searching progressing into the adjacent cells until the first of: contacting the mobile destination node, or reaching a diffusion search boundary; and, if the mobile destination node is contacted, and creating, by the mobile destination node, a routing back to the initiator node through nodes that satisfy the route constraints; and wherein the network is further comprised of: at least one communication node that is a way point node acting as an exit gateway node; a communications node that is a mobile destination node and a communication node that is a wired source node; the method further comprising the steps preceding the step of initiating diffusion searching of:

querying, by the source node, of a modified Domain Name System for a tentative containing cell of the mobile destination node based upon the Internet Protocol address of the mobile destination node;

receiving the IP-address-to-cellid query by the modified Domain Name System;

returning the tentative containing cell of the mobile destination node based on the Internet Protocol address of the mobile destination node, by the modified Domain Name System, to the source node;

querying, by the source node, of the modified Domain Name System for the exit gateway node Internet Protocol address close in distance to the tentative containing cell of the mobile destination node;

receiving the query by the modified Domain Name System returning the Internet Protocol address of one or more potential exit gateway nodes near the tentative containing cell of the mobile destination node, by the modified Domain Name System, to the source node;

selecting, by the source node, the exit gateway node from the set of potential exit gateway nodes; and transmitting one or more packets to the exit gateway node, by the source node;

thereafter the transmission causing the exit gateway node to act as a wireless source node establishing a completely wireless route to the mobile destination node.

* * * * *